United States Patent [19]
Tipton et al.

[11] Patent Number: 6,097,995
[45] Date of Patent: Aug. 1, 2000

[54] HAZARDOUS MATERIALS AND WASTE REDUCTION MANAGEMENT SYSTEM

[75] Inventors: David K. Tipton; Darren W. Gozy; David A. Coleman, all of Berea, Ky.

[73] Assignee: Chemmist Limited Partnership, Berea, Ky.

[21] Appl. No.: 08/349,633

[22] Filed: Nov. 30, 1994

[51] Int. Cl.[7] .................................................. G05B 21/00
[52] U.S. Cl. .............................. 700/266; 700/79; 700/80; 700/91; 705/28
[58] Field of Search ...................................... 235/376, 385; 700/9, 21, 79, 80, 90, 91, 266; 705/28, 29

[56] References Cited

U.S. PATENT DOCUMENTS

| | | |
|---|---|---|
| 4,034,339 | 7/1977 | Free et al. . |
| 4,695,954 | 9/1987 | Rose et al. . |
| 4,737,910 | 4/1988 | Kimbrow . |
| 4,839,806 | 6/1989 | Goldfischer et al. . |
| 4,866,255 | 9/1989 | Sing . |
| 4,929,818 | 5/1990 | Bradbury et al. . |
| 4,961,533 | 10/1990 | Teller et al. . |
| 5,014,875 | 5/1991 | McLaughlin et al. . |
| 5,171,120 | 12/1992 | Bernard, II et al. . |
| 5,226,782 | 7/1993 | Rigling . |
| 5,239,491 | 8/1993 | Mucciacciaro . |
| 5,532,928 | 7/1996 | Stanczyk et al. ........................ 364/406 |

*Primary Examiner*—Paul P. Gordon
*Attorney, Agent, or Firm*—Jones, Day, Reavis & Pogue

[57] ABSTRACT

A user controlled chemical management system for small-, medium- and large-sized organizations for use with a computer. The chemical inventory management system includes a chemical inventory control system allowing a user to manage chemicals from a central station, the plurality of combined receiving and outpost stations, to allow for the tracking of individual chemical containers throughout its life. In addition, an environmental, health and safety information system as contained in the chemical management system to allow the user create customized chemical storage groups that are color coded for a particular area. Also included is a safety equipment management system to allow accurate records to be kept of all safety equipment. Finally, an international chemical compatibility system is included with a compliance/education design to create compliance/education files for any country in the world.

39 Claims, 116 Drawing Sheets

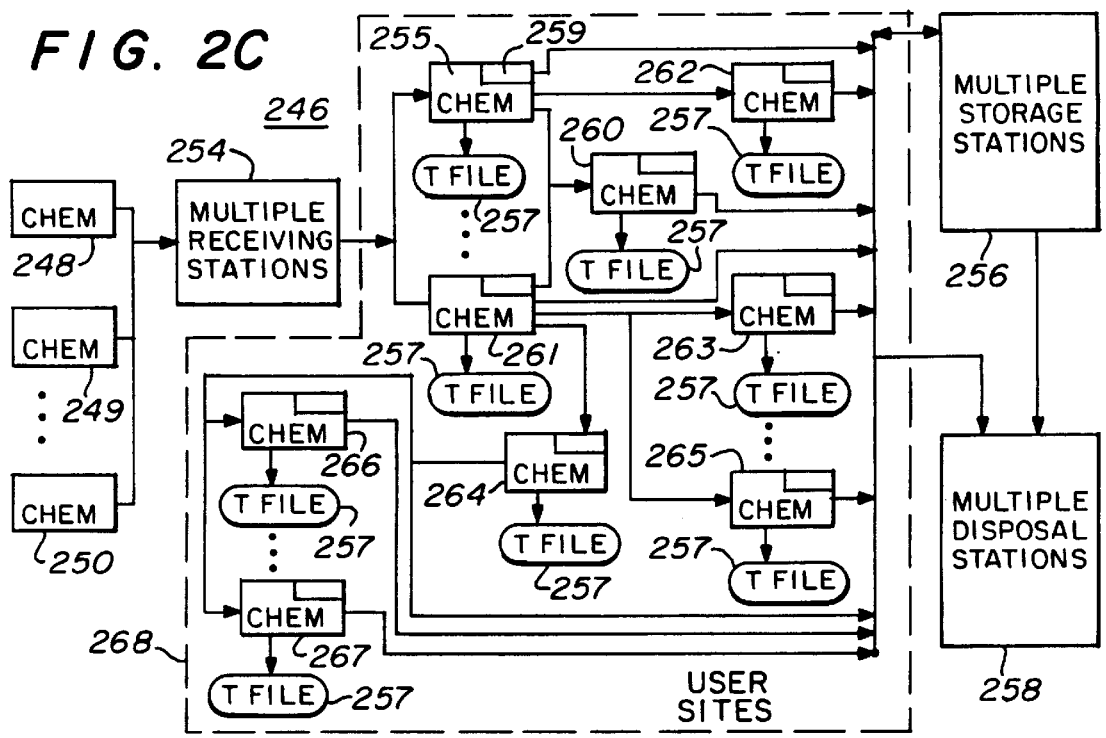
FIG. 2C
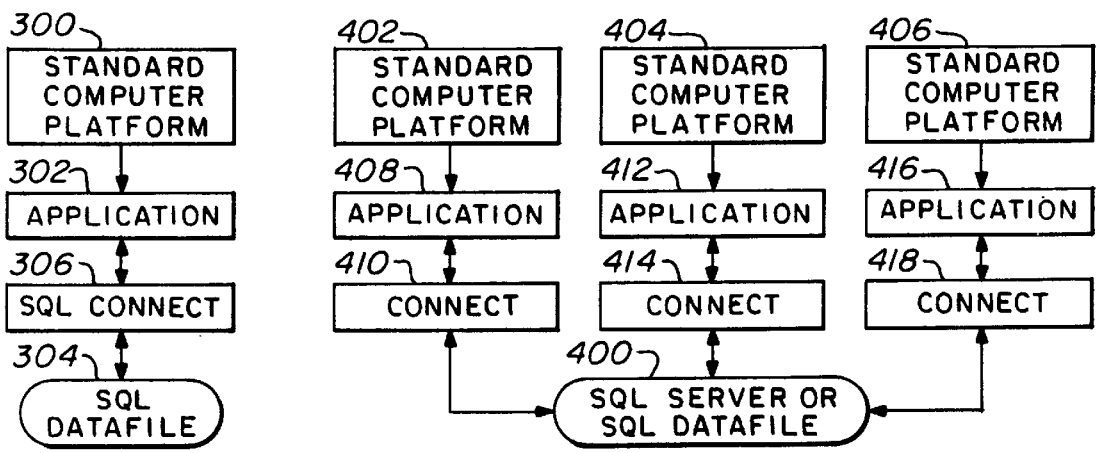
FIG. 3
FIG. 4
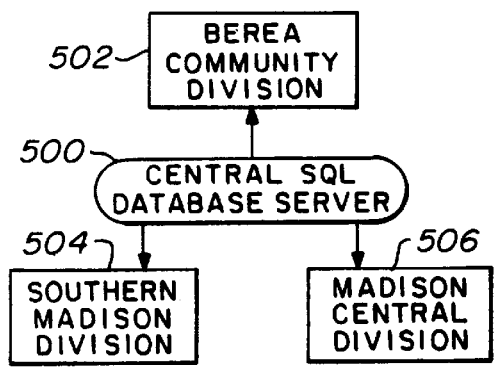
FIG. 5A
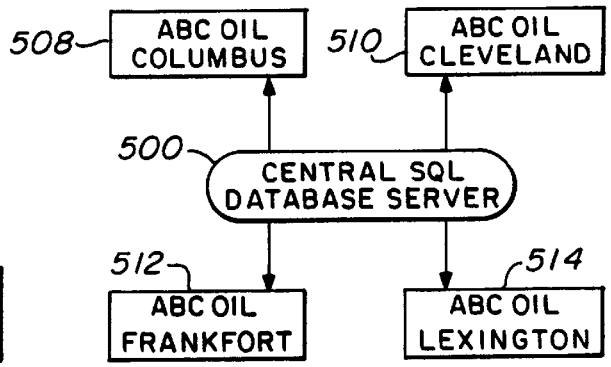
FIG. 5B

ADMINISTRATIVE SETUP

SERVER: SQL
HOSTNAME:
USERNAME:
PASSWORD:
DBVER:
INIT:
DATAFILE PATH:

☒ DISABLE USER AFTER _3_ INVALID LOGIN ATTEMPTS
☒ EXPIRE PASSWORDS AFTER _365_ DAYS

USERS

ID: 2   RIGHTS ▼
NAME: DARREN
PW: ●●●●●●

WEIGHT CONVERSION   VOLUME CONVERSION

☒ ALLOW CHANGE PASSWORD
☒ LOG IN ENABLED
☒ TRACE USER ACTIONS

702
— IDLE TIME TILL AUTO-LOGOFF _5_ MINUTES

ASSIGNED ON SEP 29 93   [MAKE COPY] [TRACE LOG]

USER PREFERENCES

ID: 1  ASSIGNED ON SEP 29 93
NAME: ADMINISTRATOR
PW:

802 — WEIGHT CONVERSION
- 1 GRAMS
- 3 MILLIGRAMS

804 — VOLUME CONVERSION
- 2 MILLILITER

806
- ☐ LOAD FIRST RECORD FROM TYPE LIST (WHEN A MAIN RECORD IS FOUND ON THE INQUIRY SCREEN)
- ☐ CHECK E-MAIL EVERY FIVE MINUTES?
  - ⦿ NOTIFY WITH MESSAGE
  - ○ NOTIFY WITH SERIES OF SYSTEM BEEPS
- ☐ SHOW ALL NONEXCLUSIVE VENDORS
- ☐ SHOW ALL NONEXCLUSIVE CONTACTS

[CANCEL] [SAVE]

FIG. 8

DIVISION FUNCTION RIGHTS

MENUS
- CONTAINER RECORDS HIERARCHICAL
- MAIN CHEMICAL RECORDS HIERARCHICAL
- PALETTES HIERARCHICAL
- OTHERS HIERARCHICAL
- TYPE RECORDS HIERARCHICAL
- MAIN MENU

COMMANDS
- SET-UP FUNCTION
- IN USE INQUIRY SCREEN
- SURPLUS INQUIRY SCREEN
- WASTE INQUIRY SCREEN
- - - - - - - - - - - - - - - -
- MAIN CHEMICAL RECORDS
- TYPE RECORDS
- CONTAINER RECORDS
- OTHERS

WINDOWS
- CONTAINER RECORDS
- DESIGNATION SETUP
- INQUIRY SCREEN
- MAIN CHEMICAL RECORDS
- BOX STYLE PALETTE
- HORIZONTOL PALETTE
- VERTICAL PALETTE
- CURRENT USER WINDOW
- TYPE RECORDS

OBJECTS
- TYPE LIST
- DEPARTMENT ACCESS BUTTON
- EDIT
- INSERT
- DELETE

○ INVISIBLE    ○ GRAYED

FIG. 9A

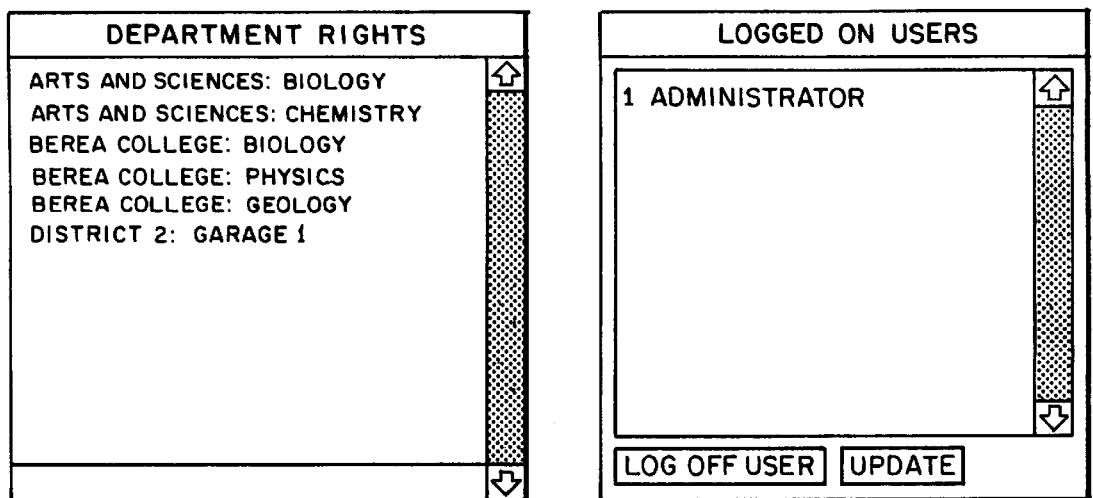

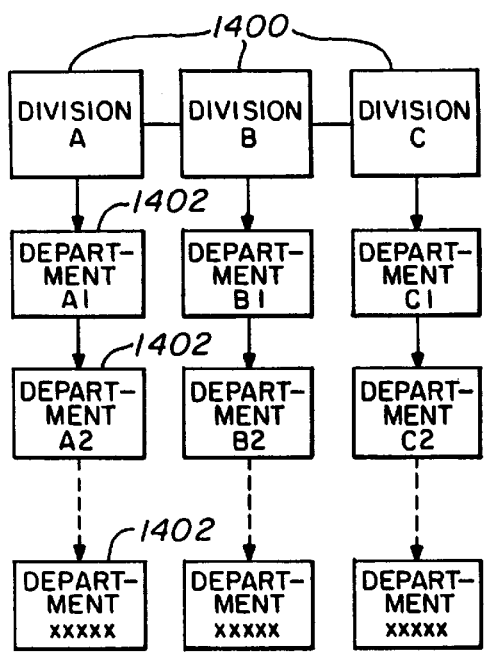
FIG. 14
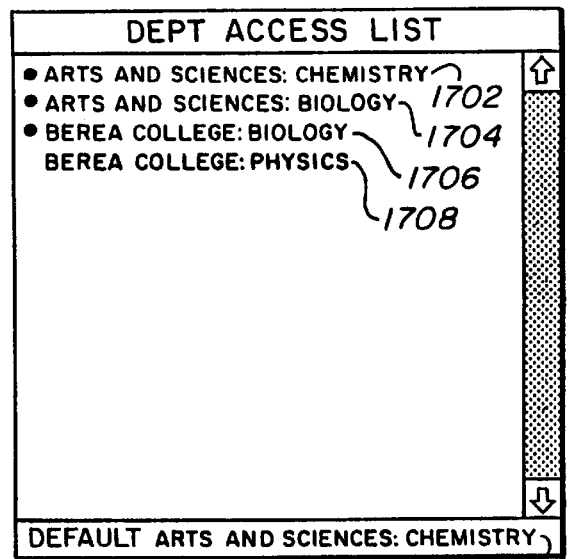
FIG. 17
DIVISION RECORDS
DIVISION ID: 1
NAME: ARTS AND SCIENCES
CONTACTS:
1500
FIG. 15
DEPARTMENT RECORDS
DEPT ID: 4   DIVISION: DISTRICT 2   ICON
NAME: PHYSICS
CONTACTS:
[VIEW BLOCKS] [GET ID BLOCK]  ☒ COMPUTER GENERATED IDs?
1600
FIG. 16

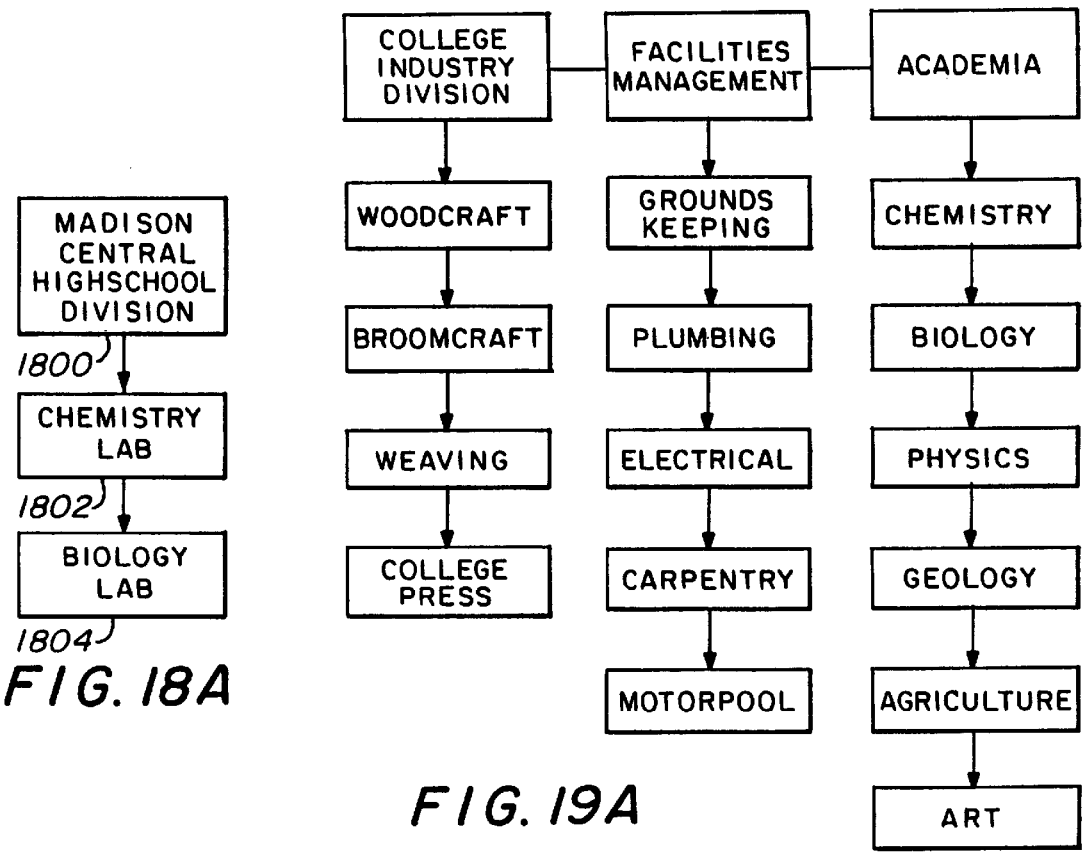
FIG. 18A
FIG. 19A
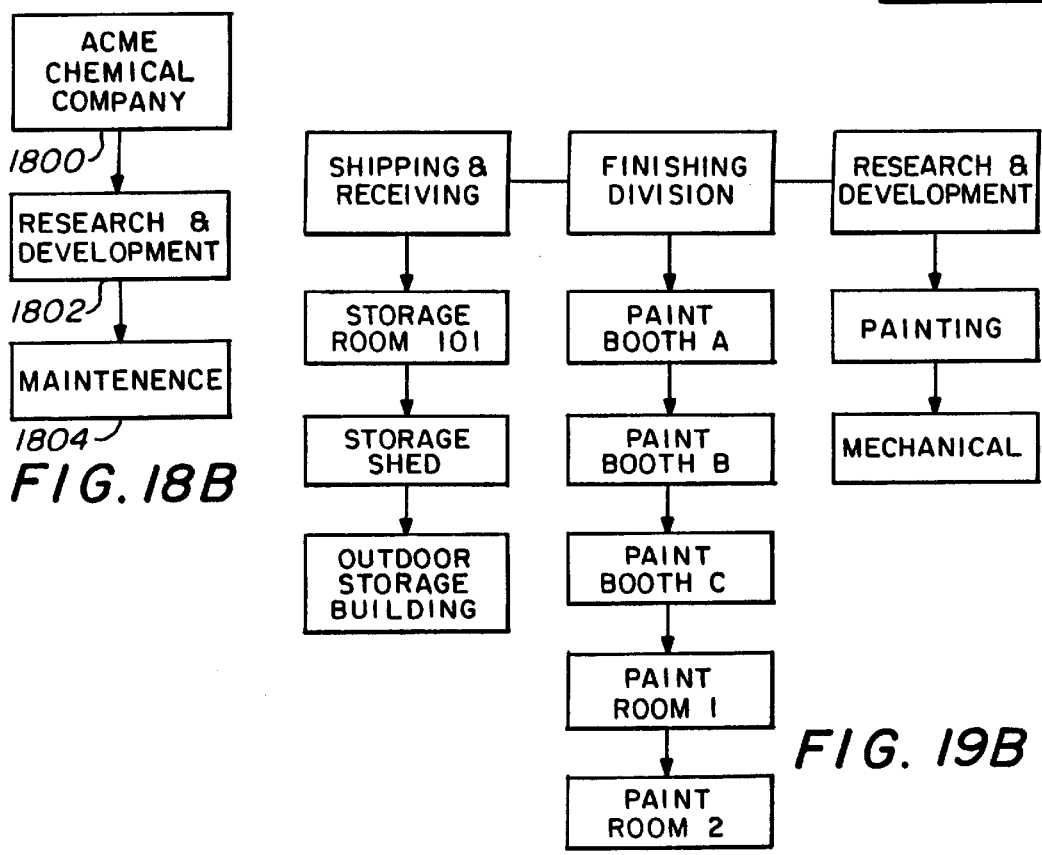
FIG. 18B
FIG. 19B

FIG. 21A

IN USE INQUIRY — 2102

MULTIPLE DEPARTMENT INQUIRY

| Field | Value |
|---|---|
| ID/CRS NO. | 67-64-1   CLASS PURE |
| PREFIX-NAME | AC-ACETONE |
| GROUPING | CARBONYL   STRUCTURE C6H12O6 |
| INORGANIC | MOLECULAR WT 1.27   STORAGE GROUP FLAMMABLE & COMBUSTIBLES |
| LIQUID | DENSITY 1.791   COLOR CODE RED |

| PURITY | GRADE | DESCRIPTION |
|---|---|---|
| 99.9999% | SPECTRO | |
| 97.9% | ACS | |
| 97.099% | HPLC | 2104 |
| 100% | ABC | |

SURPLUS AVAILABLE

| WTg | VOLml | RECEIVED | EXPIRES | DIV | DEPT |
|---|---|---|---|---|---|
| 950/950 | 1000/1000 | MAR 29 94 | MAR 9 98 | ARTS AND S | CHEMISTRY |
| 791/791 | 1000/1000 | MAR 29 94 | MAR 9 98 | ARTS AND S | CHEMISTRY |
| 376/396 | 475/500 | APR 11 94 | JAN 1 96 | ARTS AND S | CHEMISTRY |
| 317/317 | 400/400 | MAR 29 94 | MAR 9 98 | ARTS AND S | BIOLOGY |
| 317/317 | 400/400 | MAR 29 94 | MAR 9 98 | ARTS AND S | BIOLOGY |
| 317/317 | 400/400 | MAR 29 94 | MAR 9 98 | ARTS AND S | BIOLOGY |
| 475/475 | 500/500 | MAR 29 94 | MAR 9 98 | ARTS AND S | CHEMISTRY |
| 475/475 | 500/500 | MAR 29 94 | MAR 9 98 | ARTS AND S | CHEMISTRY |

TOTAL IN 13 CONTAINERS    3935.523g    4400.443ml

IN USE INQUIRY — 2106

ARTS AND SCIENCES / CHEMISTRY

| Field | Value |
|---|---|
| ID/CRS NO. | 67-64-1   CLASS PURE |
| PREFIX-NAME | AC-ACETONE |
| GROUPING | CARBONYL   STRUCTURE C6H12O6 |
| INORGANIC | MOLECULAR WT 1.27   STORAGE GROUP FLAMMABLE & COMBUSTIBLES |
| LIQUID | DENSITY 1.791   COLOR CODE RED |

| PURITY | GRADE | DISCRIPTION |
|---|---|---|
| 99.9% | ACS | |
| 97.099% | HPLC | 2108 |
| 100% | ABC | |
| ? | ? | ? |

SURPLUS AVAILABLE

| ID | BLDG | ROOM | WTg | VOLml | RECEIVED | EXPIRES | DIV |
|---|---|---|---|---|---|---|---|
| 1101248 | 1 | 63 | 5/4 | 6/4 | FEB 7 94 | FEB 8 94 | ARTS |
| 1101255 | 1 | 63 | 8/100 | 10/89 | FEB 24 94 | FEB 2 94 | ARTS |
| 1101256 | 1 | 63 | 16/100 | 20/89 | FEB 24 94 | FEB 2 94 | ARTS |
| 1101258 | 1 | 63 | 16/100 | 20/89 | FEB 24 94 | FEB 2 94 | ARTS |

TOTAL IN 4 CONTAINERS    44.823g    56.000ml

2104

FILE EDIT CHEMMIST ADMINISTRATOR COMMANDS

IN USE INQUIRY    MULTIPLE DEPARTMENT INQUIRY

| ID/CAS NO. | 67-64-1 | CLASS PURE | | |
|---|---|---|---|---|
| PREFIX-NAME | | ACETONE | | |
| GROUPING | CARBONYL | STRUCTURE C6H12O6 | | |
| INORGANIC | MOLECULAR WT 1.27 | STORAGE GROUP FLAMMABLE & COMBUSTIBLES | | |
| LIQUID | DENSITY 0.791 | COLOR CODE RED | | |

| PURITY | DECRIPTION |
|---|---|
| 99.9999% | SPECTRO |
| 99.9% | ACS |
| 97.099% | HPLC |
| 100% | ABC |

SURPLUS AVAILABLE

| ID | BLDG | ROOM | WT G | VOL ML | RECEIVED | EXPIRES | DIV |
|---|---|---|---|---|---|---|---|
| M 1101227 | 1 | 63 | 950/950 | 1000/1000 | MAR 29 94 | MAR 9 98 | ARTS |
| M 1101229 | 1 | 63 | 791/791 | 1000/1000 | MAR 29 94 | MAR 9 98 | ARTS |
| 1101254 | 1 | 63 | 168/396 | 212/500 | APR 11 94 | JAN 1 96 | ARTS |
| M 1101550 | 1 | 63 | 317/317 | 400/400 | MAR 29 94 | MAR 9 98 | ARTS |
| M 1101551 | 1 | 63 | 317/317 | 400/400 | MAR 29 94 | MAR 9 98 | ARTS |
| M 1101552 | 4 | 0 | 317/317 | 400/400 | MAR 29 94 | MAR 9 98 | ARTS |
| 1101555 | 1 | 63 | 473/475 | 497/500 | MAR 29 94 | MAR 9 98 | ARTS |
| 1101556 | 1 | 63 | 475/475 | 500/500 | MAR 29 94 | MAR 9 98 | ARTS |

TOTAL IN 13 CONTAINERS    3725.523 G    4134.957 ML

```
┌─────────────────────────────────────────────────────────────────┐
│                        IN USE INQUIRY                            │
├─────────────────────────────────────────────────────────────────┤
│  ID/CAS NO.  [98-76-5]  CLASS TRADE NAME  MULTIPLE DEPARTMENT INQUIRY │
│  PREFIX-NAME [        EXPO DRY ERASE CLEANER         ]          │
│  GROUPING   [CLEANING SUPPLIES]  STRUCTURE [        ]           │
│  ORGANIC    MOLECULAR WT 0.00   STORAGE GROUP FLAMMABLE & COMBUSTIBLES │
│  LIQUID              DENSITY 1.000       COLOR CODE RED         │
├─────────────────────────────────────────────────────────────────┤
│  VENDOR        PRODUCT NO.              (SURPLUS AVAILABLE)     │
│  [ I ]         [ 4533212 ]                                      │
│                                          (COMPONENTS)           │
│                                           2508                  │
├─────────────────────────────────────────────────────────────────┤
│  ID      BLDG  ROOM   WT G    VOL ML    RECEIVED   EXPIRES  DIV │
│  [1101243]  I   63   100/100  100/100   JUN 20 94           ARTS│
│                                                                 │
├─────────────────────────────────────────────────────────────────┤
│  TOTAL IN 1 CONTAINERS        100 G     198.000 ML              │
└─────────────────────────────────────────────────────────────────┘
   2504
```

```
┌─────────────────────────────────────────────────────────────────┐
│                        IN USE INQUIRY                            │
├─────────────────────────────────────────────────────────────────┤
│  ID/CAS NO.  [NO-CAS-10000] CLASS VAR. MIX  MULTIPLE DEPARTMENT INQUIRY │
│  PREFIX-NAME [            LAB 101 WASTES           ]            │
│  GROUPING   [UNKNOWNS]      STRUCTURE [        ]                │
│  ORGANIC    MOLECULAR WT 0.00   STORAGE GROUP FLAMMABLE & COMBUSTIBLES │
│  LIQUID              DENSITY             COLOR CODE RED         │
├─────────────────────────────────────────────────────────────────┤
│  [THERE ARE NO TYPE RECORDS FOR A VARIABLE MIX]  (SURPLUS AVAILABLE) │
│                                                    2508         │
├─────────────────────────────────────────────────────────────────┤
│  ID      BLDG  ROOM   WT G    VOL ML    RECEIVED   EXPIRES  DIV │
│  [1101202]  I    0   178/178  199/199   JUN 22 94           ARTS│
│                                                                 │
├─────────────────────────────────────────────────────────────────┤
│  TOTAL IN 1 CONTAINERS        178.000 G  198.000 ML             │
└─────────────────────────────────────────────────────────────────┘
   2506
```

COMPONENTS OF UNKNOWN 1 — 2600

- 2602: 50.00% ACETONE  99.9999% SPECTRO  FROM CONTAINER ID 1099226
- 2604: 32.00% WATER
- 2606: 15.00% BENZENE  99.9% ACS  FROM CONTAINER ID 1101248
- 2608: 3.00% INERT INGREDIENTS

LIST ALL MAIN CHEMICAL RECORDS THAT ARE AVAILABLE AS MIXTURE COMPONENTS WERE

- 2610: MAIN ID/CAS #
- 2612: IS EQUAL TO
- 2614: 67-64-1
- 2616: BUILD LIST 50.00% OF UNKNOWN 1 IS

MAIN ID | NAME | TYPE | CONTAINER ID

2618

ADD  REPLACE  REMOVE

FIG. 32

MAIN CHEMICAL RECORDS — 3200

- 3202 — MAIN ID: 12-34-5
- 3204 — PREFIX: 1,2
- 3206 — NAME: BENZENEDIMETHANOL
- 3214 — STRUCTURE: C6H4(CH2OH)2
- 3210 — DENSITY:
- 3216 — MOLE WT: 138.17
- 3208 — GROUPING / STORAGE GROUP
- 3212 — TYPE: ● ORGANIC  ○ INORGANIC
- CLASS: ● PURE  ○ PRESET  ○ TRADE NAME  ○ VARIABLE MIX — 3222
- 3218 — PHYSICAL STATE: ○ SOLID  ● LIQUID  ○ GAS

STRUCTURE PICTURE — 3220

```
                       SURPLUS INQUIRY
   ID/CAS NO.    98-76-5   CLASS TRADE NAME    MULTIPLE DEPARTMENT INQUIRY
   PREFIX-NAME              EXPO DRY ERASE CLEANER
   GROUPING     CLEANING SUPPLIES   STRUCTURE
   ORGANIC    MOLECULAR WT 0.00    STORAGE GROUP FLAMMABLE & COMBUSTIBLES
   LIQUID         DENSITY 1.000          COLOR CODE RED
   VENDOR          PRODUCT NO.                    SURPLUS AVAILABLE
   1               4533212
                                                    COMPONENTS

ID       BLDG  ROOM    WT g     VOL ML    RECEIVED    EXPIRES    DIV
   1101286   1     0     100/100   100/100   JUN 22 94              ARTS

TOTAL IN 1 CONTAINERS         100.000 G    100.000 ML
```

```
                       SURPLUS INQUIRY
   ID/CAS NO.    75-43-2   CLASS PRESET MIX    MULTIPLE DEPARTMENT INQUIRY
   PREFIX-NAME                 UNKNOWN 1
   GROUPING     UNKNOWNS          STRUCTURE  C12H6O8
   ORGANIC    MOLECULAR WT 2.22    STORAGE GROUP INORGANIC ACIDS
   SOLID          DENSITY 1.000          COLOR CODE GREEN
   THERE ARE NO TYPE RECORDS FOR A MIXED SUBSTANCE.   SURPLUS AVAILABLE

COMPONENTS

ID       BLDG  ROOM    WT g     VOL ML    RECEIVED    EXPIRES    DIV
   1101293   6     0     100/100   100/100   JUN 22 94              ARTS

TOTAL IN 1 CONTAINERS         100.000 G    100.000 ML
```

SURPLUS INQUIRY

| | | | |
|---|---|---|---|
| ID/CAS NO. | 67-64-1 | CLASS PURE | MULTIPLE DEPARTMENT INQUIRY |
| PREFIX-NAME | ACETONE | | |
| GROUPING | CARBONYL | STRUCTURE | C6H12O6 |
| INORGANIC LIQUID | MOLECULAR WT 1.27 DENSITY 0.791 | STORAGE GROUP FLAMMABLE & COMBUSTIBLES COLOR CODE RED | |

| PURITY | GRADE | DISCRIPTION |
|---|---|---|
| 99.9% | ACS | |
| 97.099% | HPLC | |
| 100% | | |
| ? | ? | ? |

| ID | BLDG | ROOM | WT G | VOL ML | RECEIVED | EXPIRES | DIV |
|---|---|---|---|---|---|---|---|
| 1101247 | 1 | 63 | 49/100 | 62/89 | FEB 24 94 | FEB 2 98 | ARTS |

TOTAL IN 1 CONTAINERS     49.177 G    62.17 ML

SURPLUS INQUIRY

| | | | |
|---|---|---|---|
| ID/CAS NO. | NO-CAS-10001 | CLASS VAR. MIX | MULTIPLE DEPARTMENT INQUIRY |
| PREFIX-NAME | LAB 202 WASTES | | |
| GROUPING | UNKNOWNS | STRUCTURE | |
| ORGANIC LIQUID | MOLECULAR WT 0.00 DENSITY 0.791 | STORAGE GROUP FLAMMABLE & COMBUSTIBLES COLOR CODE RED | |

THERE ARE NO TYPE RECORDS FOR A VARIABLE MIX.  (SURPLUS AVAILABLE)

(COMPONENTS)

| ID | BLDG | ROOM | WT G | VOL ML | RECEIVED | EXPIRES | DIV |
|---|---|---|---|---|---|---|---|
| 1101283 | 4 | 0 | 78/78 | 99/99 | JUN 22 94 | | ARTS |

TOTAL IN 1 CONTAINERS     78.000 G    98.609 ML

WASTE INQUIRY

| | | | |
|---|---|---|---|
| ID/CAS NO. | 67-64-1 | CLASS PURE | MULTIPLE DEPARTMENT INQUIRY |
| PREFIX-NAME | | ACETONE | |
| GROUPING | CARBONYL | STRUCTURE | C6H12O6 |
| INORGANIC LIQUID | MOLECULAR WT 1.27 DENSITY 0.791 | STORAGE GROUP FLAMMABLE & COMBUSTIBLES COLOR CODE RED | |

| PURITY | GRADE | DISCRIPTION |
|---|---|---|
| 99.9999% | SPECTRO | |
| 99.9% | ACS | |
| 97.099% | HPLC | |
| 100% | ABC | |

| ID | BLDG | ROOM | WT G | VOL ML | RECEIVED | EXPIRES | DIV |
|---|---|---|---|---|---|---|---|
| 1102233 | 5 | 101 | 22/45 | 28/45 | MAR 2 94 | APR 6 94 | ARTS |

TOTAL IN 1 CONTAINERS 22 G 27.813 ML

WASTE INQUIRY

| | | | |
|---|---|---|---|
| ID/CAS NO. | 75-43-2 | CLASS PRESET MIX | MULTIPLE DEPARTMENT INQUIRY |
| PREFIX-NAME | | UNKNOWN 1 | |
| GROUPING | UNKNOWNS | STRUCTURE | C12H6O8 |
| ORGANIC SOLID | MOLECULAR WT 2.22 DENSITY 1.000 | STORAGE GROUP INORGANIC ACIDS COLOR CODE GREEN | |

THERE ARE NO TYPE RECORDS FOR A MIXED SUBSTANCE. | SURPLUS AVAILABLE

COMPONENTS

| ID | BLDG | ROOM | WT | VOL | RECEIVED | EXPIRES | DIV |
|---|---|---|---|---|---|---|---|

TOTAL IN 1 CONTAINERS 22.000 G 27.813 ML

WASTE INQUIRY

| | | | |
|---|---|---|---|
| ID/CAS NO. | 98-76-5 | CLASS TRADE NAME | MULTIPLE DEPARTMENT INQUIRY |
| PREFIX-NAME | EXPO DRY ERASE CLEANER | | |
| GROUPING | CLEANING SUPPLIES | STRUCTURE | |

ORGANIC LIQUID   MOLECULAR WT 0.00   STORAGE GROUP FLAMMABLE & COMBUSTIBLES
                 DENSITY 1.000       COLOR CODE RED

| VENDOR | PRODUCT NO. | | |
|---|---|---|---|
| 1 | 4533212 | | |

(SURPLUS AVAILABLE)
(COMPONENTS)

| ID | BLDG | ROOM | WT G | VOL ML | RECEIVED EXPIRES | DIV |
|---|---|---|---|---|---|---|
| 1101286 | 1 | 0 | 100/100 | 100/100 | JUN 22 94 | ARTS |

TOTAL IN 1 CONTAINERS   100.000 G   100.000 ML

WASTE INQUIRY

| | | | |
|---|---|---|---|
| ID/CAS NO. | NO-CAS-10002 | CLASS VAR. MIX | MULTIPLE DEPARTMENT INQUIRY |
| PREFIX-NAME | CHEMISTRY WASTE CONTAINER | | |
| GROUPING | UNKNOWNS | STRUCTURE | |

ORGANIC LIQUID   MOLECULAR WT 0.00   STORAGE GROUP FLAMMABLE & COMBUSTIBLES
                 DENSITY 0.898       COLOR CODE RED

THERE ARE NO TYPE RECORDS FOR A VARIABLE MIX.   (SURPLUS AVAILABLE)
(COMPONENTS)

| ID | BLDG | ROOM | WT G | VOL ML | RECEIVED EXPIRES | DIV |
|---|---|---|---|---|---|---|
| 1101284 | 1 | 0 | 187/187 | 203/203 | JUN 22 94 | ARTS |

TOTLE IN 1 CONTAINERS   187.000 G   208.241 ML

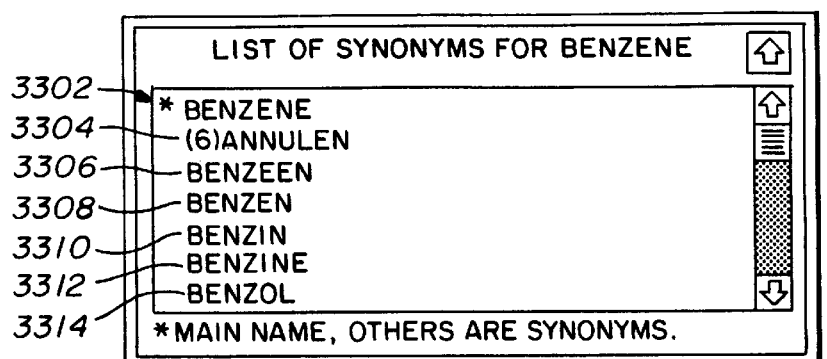
FIG. 33
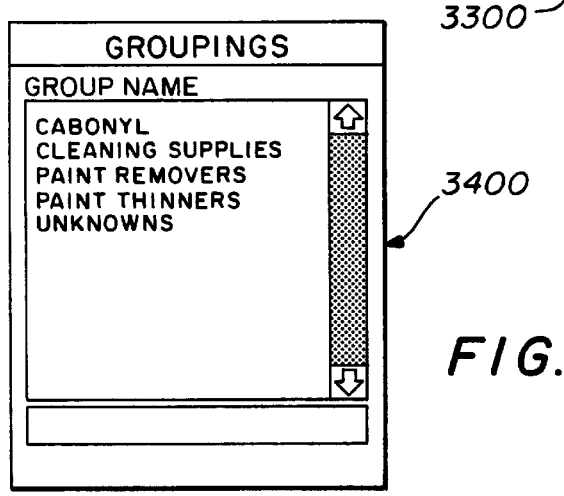
FIG. 34
FIG. 35

```
                        IN USE INQUIRY
ID/CAS NO.  [67-64-1]  CLASS PURE        MULTIPLE DEPARTMENT INQUIRY
PREFIX-NAME  [              ACETONE              ]
GROUPING   [CARBONYL]    STRUCTURE [C6H12O6]
INORGANIC  MOLECULAR WT 1.27   STORAGE GROUP FLAMMABLE & COMBUSTIBLES
LIQUID          DENSITY 0.791        COLOR CODE RED
```

| PURITY | GRADE | DISCRIPTION | SURPLUS AVAILABLE |
|---|---|---|---|
| 99.9999% | SPECTRO | | |
| 99.9% | ACS | | |
| 97.099% | HPLC | 3804 | |
| 100% | ABC | | |

| ID | BLDG | ROOM | WT G | VOL ML | RECEIVED | EXPIRES | DIV |
|---|---|---|---|---|---|---|---|
| M 1101227 | 1 | 63 | 950/950 | 1000/1000 | MAR 29 94 | MAR 9 98 | ARTS |
| M 1101229 | 1 | 63 | 791/791 | 1000/1000 | MAR 29 94 | MAR 9 98 | ARTS |
| 1101254 | 1 | 63 | 376/396 | 475/500 | APR 11 94 | JAN 1 96 | ARTS |
| M 1101550 | 1 | 63 | 317/317 | 400/400 | MAR 29 94 | MAR 9 98 | ARTS |
| M 1101551 | 1 | 63 | 317/317 | 400/400 | MAR 29 94 | MAR 9 98 | ARTS |
| M 1101552 | 4 | 0 | 317/317 | 400/400 | MAR 29 94 | MAR 9 98 | ARTS |
| 1101555 | 1 | 63 | 475/475 | 500/500 | MAR 29 94 | MAR 9 98 | ARTS |
| 1101556 | 1 | 63 | 475/475 | 500/500 | MAR 29 94 | MAR 9 98 | ARTS |

3802

TOTAL IN 13 CONTAINERS        3935.523 G    4400.443 ML

GRADE CODES

| ABBREVIATION | EXTENDED GRADES |
|---|---|
| | UNKNOWN OR NOT STATED |
| ACS | CERTIFIED/REAGENT |
| BIO. | BIOTECHNICAL GRADE |
| CHROM. | CHROMATOGRAPHY |
| CP | CHEMICAL PURE |
| ELECTROPHORESIS | ELECTROPHORESIS |
| FCC | FOOD CHEMICALS CODEX |
| HISTOLOGICAL | HISTOLOGICAL |
| HPLC | HPLC |
| LAB | LAB GRADE |
| NF | NATIONAL FORMULARY |
| NF/FCC | NATIONAL FORMULARY/FOOD CHEMICALS |
| OPTIMA | OPTIMA (FISHER) |
| PRAC | PRACTICAL GRADE |

FIG. 40

DESCRIPTION CODES

| ABBREVIATION | EXTENDED DESCRIPTION |
|---|---|
| | UNKNOWN OR NOT STATED |
| (5A) 45/60 MESH | (5A) 45/60 MESH |
| .2 M SOLUTION | .2 MOLAR IN SOLUTION |
| .75 MOLAR | .75 MOLAR |
| 0.1 MOLAR | 0.1 MOLAR |
| 0.5 MOLAR | 0.5 MOLAR |
| 1 MOLAL SOL. | 1 MOLAL SOLUTION |
| 1 MOLAR | 1 MOLAR |
| 1% W/W DSS | CONTAINS 1% W/W DSS |
| 10-12% WATER AD | 10-12% WATER ADDED |
| 100 PPM | 100 PARTS PER MILLION |
| 100-200 MESH | 100-200 MESH (SIZE OF PARTICLES) |
| 12,28-200 MESH | GRADE 12, 28-200 MESH |

FIG. 41

CHEMICAL TYPE/VENDOR RECORDS

- TRADE NAME VENDOR: ACME CHEMICAL
- PRODUCT NUMBER: 4533212
- ☐ IS THIS VENDOR THE ONLY SOURCE OF THIS PRODUCT?

FIG. 42

IN USE CONTAINER RECORDS

| CONTAINER ID | 1101229 | | MANUFACTURER | ALDRICH CHEMICAL CO. |
|---|---|---|---|---|
| ARTS & SCIENCES:CHEMISTRY | | | PRODUCT NUMBER | 112098 |
| WEIGHT | 0.000 | G | RETAILER | ALDRICH CHEMICAL CO. |
| | 791.000 | G | PRODUCT NUMBER | 112098 |
| VOLUME | 0.000 | ML | PO NUMBER | 12 |
| | 1000.000 | ML | LOT NUMBER | 1 |
| CONTAINER TYPE | MULTIPLE: CASE | | PROJECT | CHEMMIST |
| CONT SIZE | 1000.000 | ML | CONTROLLER | DAVID K. TIPTON |
| COUNT WITHIN | 0 | | BUILDING | SCIENCE BUILDING |
| DATE: | OPEN | | FLOOR | BASEMENT |
| RECEIVED | MAR 29 94 | | ROOM | 13 C |
| EXPIRES | MAR 9 98 | | LOCATION | SHELVING UNIT 2 |
| INVENTORY | MAR 29 94 | | SPECIFIC LOCATION | SHELF 1 |
| WASTE | | | | |

IN USE CONTAINER RECORDS

CONTAINER ID: 1101555
ARTS & SCIENCES:CHEMISTRY
ARTS & SCIENCES:CHEMISTRY — 4404
ARTS & SCIENCES:BIOLOGY — 4402

ORIGINAL: 500.000 ML
CONTAINER TYPE: GLASS BOTTLE
CONT SIZE: 100.000 ML

DATE:
RECEIVED: MAR 29 94
EXPIRES: MAR 9 98
INVENTORY: MAR 29 94
WASTE:

MANUFACTURER: ALDRICH CHEMICAL CO.
PRODUCT NUMBER: 112098
RETAILER: ALDRICH CHEMICAL CO.
PRODUCT NUMBER: 112098
PO NUMBER: 12
LOT NUMBER: 1
PROJECT: CHEMMIST
CONTROLLER: DAVID K. TIPTON
BUILDING: SCIENCE BUILDING
FLOOR: BASEMENT
ROOM: 13C
LOCATION: CABINET 1
SPECIFIC LOCATION: TOP SHELF

IN USE CONTAINER RECORDS

CONTAINER ID: 1101555
ARTS & SCIENCES:CHEMISTRY

WEIGHT LEFT: 475.000 G
ORIGINAL: 475.000 G

VOLUME LEFT: 500.000 ML
ORIGINAL: 500.000 ML

CONTAINER TYPE:
— 4504
55 GALLON DRUM
MUTIPLE:CASE
GAS CYLINDER
GLASS BOTTLE — 4502
PLASTIC BOTTLE

RECEIVED: MAR 29 94
EXPIRES: MAR 9 98
INVENTORY: MAR 29 94
WASTE:

MANUFACTURER: ALDRICH CHEMICAL CO.
PRODUCT NUMBER: 112098
RETAILER: ALDRICH CHEMICAL CO.
PRODUCT NUMBER: 112098
PO NUMBER: 12
LOT NUMBER: 1
PROJECT: CHEMMIST
CONTROLLER: DAVID K. TIPTON
BUILDING: SCIENCE BUILDING
FLOOR: BASEMENT
ROOM: 13C
LOCATION: CABINET 1
SPECIFIC LOCATION: TOP SHELF

CONTAINER TYPES — 4600

CONTAINER TYPES
- 55 GALLON DRUM
- CASE
- GAS CYLINDER
- GLASS BOTTLE
- PLASTIC BOTTLE

4602

☐ MULTIPLE CONTAINER — 4604

FIG. 47

OPEN MULTIPLE CONTAINER — 4700

| CONTAINER ID | WEIGHT | VOLUME | LOCATION |
|---|---|---|---|
| 0 | 475.000 G | 500.000 ML | PARENT |
| 0 | 475.000 G | 500.000 ML | PARENT |

CONTAINER TYPE: MULTIPLE: CASE
CONT SIZE: 1000.000 ML

LOCATION
- PARENTS
- DEFAULT
- OTHER

SET DEFAULT LOCATION

DELETE  OK  CANCEL

| | WEIGHT | VOLUME | |
|---|---|---|---|
| AMOUNT LEFT | 0.437 KG | 0.132 GAL | 100% IN CONTAINER |
| ORIGINAL AMT | 0.437 KG | 0.132 GAL | 100% OF ORIGINAL AMOUNT |

✋ APPROXIMATE AMOUNT WOULD BE 218.5 GRAMS OR 250 MILLILITERS
DO YOU WANT TO CHANGE PRESENT
INVENTORY AMOUNT TO THIS AMOUNT?

CANCEL — 4812   OK — 4810

| | WEIGHT | VOLUME | |
|---|---|---|---|
| AMOUNT LEFT | 0.437 KG | 0.132 GAL | ORIGINAL INVENTORY LEVEL |
| ORIGINAL AMT | 0.437 KG | 0.132 GAL | |

4808

IN USE INQUIRY

| ID/CAS NO. | 67-64-1 | CLASS PURE | MULTIPLE DEPARTMENT INQUIRY |
|---|---|---|---|
| PREFIX-NAME | | ACETONE | |
| GROUPING | CARBONYL | STRUCTURE | C6H12O6 |

INORGANIC MOLECULAR WT 1.27 STORAGE GROUP FLAMMABLE & COMBUSTIBLES
LIQUID DENSITY 0.791 COLOR CODE RED

| PURITY | GRADE | DESCRIPTION | SURPLUS AVAILABLE |
|---|---|---|---|
| 99.9999% | SPECTRO | | |
| 99.9% | ACS | | |
| 97.099% | HPLC | 4902 | 4904 |
| 100% | ABC | | |

| ID | BLDG | ROOM | WT G | VOL ML | RECEIVED | EXPIRES | DIV |
|---|---|---|---|---|---|---|---|
| M 1101227 | 1 | 63 | 950/950 | 1000/1000 | MAR 29 94 | MAR 9 98 | ARTS |
| M 1101229 | 1 | 63 | 791/791 | 1000/1000 | MAR 29 94 | MAR 9 98 | ARTS |
| 1101254 | 1 | 63 | 376/396 | 475/475 | APR 11 94 | JAN 1 96 | ARTS |
| M 1101555 | 1 | 63 | 317/317 | 400/400 | MAR 29 94 | MAR 9 98 | ARTS |
| M 1101551 | 1 | 63 | 317/317 | 400/400 | MAR 29 94 | MAR 9 98 | ARTS |
| M 1101552 | 4 | 0 | 317/317 | 400/400 | MAR 29 94 | MAR 9 98 | ARTS |
| 1101555 | 1 | 63 | 475/475 | 500/500 | MAR 29 98 | MAR 9 98 | ARTS |
| 1101556 | 1 | 63 | 475/475 | 500/500 | MAR 29 98 | MAR 9 98 | ARTS |

TOTAL IN 13 CONTAINERS      3935.523G      4400.443ML

IN USE INQUIRY

| ID/CAS NO. | 67-64-1 | CLASS PURE | MULTIPLE DEPARTMENT INQUIRY |
|---|---|---|---|
| PREFIX-NAME | | ACETONE | |
| GROUPING | CARBONYL | STRUCTURE | C6H12O6 |

INORGANIC MOLECULAR WT 1.27 STORAGE GROUP FLAMMABLE & COMBUSTIBLES
LIQUID DENSITY 0.791 COLOR CODE RED

| PURITY | GRADE | DESCRIPTION | STORAGE AVAILABLE |
|---|---|---|---|
| 99.9999% | SPECTRO | | |
| 99.9% | ACS | | |
| 97.099% | HPLS | 5002 | 5004 |
| 100% | ABC | | |

| ID | BLDG | ROOM | WT G | VOL ML | RECEIVED | EXPIRES | DIV |
|---|---|---|---|---|---|---|---|
| M 1101227 | 1 | 63 | 2/2 | 0/0 | MAR 29 94 | MAR 9 98 | ARTS |
| M 1101229 | 1 | 63 | 2/2 | 0/0 | MAR 29 94 | MAR 9 98 | ARTS |
| 1101254 | 1 | 63 | 1/1 | 0/0 | APR 11 94 | JAN 1 96 | ARTS |
| M 1101550 | 1 | 63 | 1/1 | 0/0 | MAR 29 94 | MAR 9 98 | ARTS |
| M 1101551 | 1 | 63 | 1/1 | 0/0 | MAR 29 94 | MAR 9 98 | ARTS |
| M 1101552 | 4 | 0 | 1/1 | 0/0 | MAR 29 94 | MAR 9 98 | ARTS |
| 1101555 | 1 | 63 | 1/1 | 0/0 | MAR 29 94 | MAR 9 98 | ARTS |
| 1101555 | 1 | 63 | 1/1 | 0/0 | MAR 29 94 | MAR 9 98 | ARTS |

TOTAL IN 13 CONTAINERS      8.786 LB      1.162 GAL

```
                    CONVERSIONS              ◄─ 5100
          CONV ID    [6]
       CONV SYMBLE   [LB]
        CONV NAME    [POUNDS]
       CONV FACTOR   [0.0022325000]
        CONV TYPE    ● WEIGHT
                     ○ VOLUME
       LOCKED BY 0
```

FIG. 51

```
                    IN USE CONTAINER RECORDS                   5210
                                                          5208
CONTAINER ID  [1101555]        MANUFACTURER  [ALDRICH CHEMICAL CO.] ⇩
[ARTS & SCIENCES: CHEMISTRY]⇩  PRODUCT NUMBER [ACME CHEMICAL       ]⇧
WEIGHT: LEFT    [475.000]  G — 5202              [ALDRICH CHEMICAL CO.]
        ORIGINAL [475.000] G   RETAILER       [EASTMAN KODAK       ]
                             PRODUCT NUMBER   [SIGMA               ]
VOLUME: LEFT    [500.000] ML — 5204            [TEST VENDOR 2       ]⇩
        ORIGINAL [500.000] ML  PO NUMBER     [12]         5212
CONTAINER TYPE                 LOT NUMBER    [1]
[GLASS BOTTLE]            ⇩    PROJECT       [CHEMMIST]
CONT SIZE  [100.000]  ML       CONTROLLER    [DAVID K. TIPTON]  5214
      5206                     BUILDING      [SCIENCE BUILDING] ⇩
DATE:                    5216 — FLOOR        [BASEMENT]         ⇩
RECEIVED  [MAR 29 94]    5218 — ROOM         [13A]              ⇩
EXPIRES   [MAR 9 94]            LOCATION     [SHELVING UNIT 2]  ⇩
INVENTORY [MAR 29 94]           SPECIFIC     [SHELF 1]          ⇩
WASTE     [        ]            LOCATION  5222        5220
```

IN USE CONTAINER RECORDS — 5700

- CONTAINER ID: 1101555
- ARTS & SCIENCES: CHEMISTRY
- WEIGHT LEFT: 475.000 G
- ORIGINAL: 475.000 G
- VOLUME LEFT: 500.000 ML
- ORIGINAL: 500.000 ML
- CONTAINER TYPE: GLASS BOTTLE
- CONT SIZE: 100.000 ML
- DATE:
  - RECEIVED: MAR 29 94
  - EXPIRES: MAR 9 98
  - INVENTORY: MAR 29 94
  - WASTE:
- MANUFACTURER: ALDRICH CHEMICAL CO.
- PRODUCT NUMBER: 112098
- RETAILER: ALDRICH CHEMICAL CO.
- PRODUCT NUMBER: 112098
- PO NUMBER: 12
- LOT NUMBER: 1
- PROJECT: CHEMMIST — 5706
- CONTROLLER: DAVID K. TIPTON — 5702
- BUILDING: SCIENCE BUILDING
- FLOOR: BASEMENT
- ROOM: BASEMENT
- LOCATION: FIRST FLOOR / SECOND FLOOR — 5704
- SPECIFIC LOCATION: THIRD FLOOR

FIG. 59

IN USE CONTAINER RECORDS — 5900

- CONTAINER ID: 1101555
- ARTS & SCIENCES: CHEMISTRY
- WEIGHT LEFT: 475.000 G
- ORIGINAL: 475.000 G
- VOLUME LEFT: 500.000 ML
- ORIGINAL: 500.000 ML
- CONTAINER TYPE: GLASS BOTTLES
- CONT SIZE: 100.000 ML
- DATE:
  - RECEIVED: MAR 29 94
  - EXPIRES: MAR 9 98
  - INVENTORY: MAR 29 94
  - WASTE:
- MANUFACTURER: ALDRICH CHEMICAL CO.
- PRODUCT NUMBER: 112098
- RETAILER: ALDRICH CHEMICAL CO.
- PRODUCT NUMBER: 112098
- PO NUMBER: 12
- LOT NUMBER: 1
- PROJECT: CHEMMIST — 5902
- CONTROLLER: 13A
- BUILDING: 13B / 12 — 5904
- FLOOR: 11 / 10 — 5906
- ROOM: 13A
- LOCATION: SHELVING UNIT 2
- SPECIFIC LOCATION: SHELF 1

FIG. 62

LOCATION SETUP — 6200

FLOOR BASEMENT    ROOM 13A    LOCATION SHELVING UNIT 2

- SHELF 6
- SHELF 5
- SHELF 4
- SHELF 3
- SHELF 2
- SHELF 1

SPECIFIC LOCATIONS
- NEW
- EDIT
- DELETE

FIG. 63

IN USE CONTAINER RECORDS — 6300

| Field | Value | Field | Value |
|---|---|---|---|
| CONTAINER ID | 1101555 | MANUFACTURER | ALDRICH CHEMICAL CO. |
| ARTS & SCIENCES: CHEMISTRY | | PRODUCT NUMBER | 112098 |
| WEIGHT LEFT | 475.000 G | RETAILER | ALDRICH CHEMICAL CO. |
| ORIGINAL | 475.000 G | PRODUCT NUMBER | 112098 |
| VOLUME LEFT | 500.000 ML | PO NUMBER | 12 |
| ORIGINAL | 500.000 ML | LOT NUMBER | 1 |
| CONTAINER TYPE | GLASS BOTTLE | PROJECT | CHEMMIST |
| CONT SIZE | 100.000 ML | CONTROLLER | DAVID K. TIPTON |
| | | BUILDING | SCIENCE BUILDING |
| DATE: | | FLOOR | SHELF 1 |
| RECEIVED | MAR 29 94 | ROOM | SHELF 2 / SHELF 3 |
| EXPIRES | MAR 9 98 | LOCATION | SHELF 4 / SHELF 5 |
| INVENTORY | MAR 29 94 | SPECIFIC LOCATION | TOP SHELF |
| WASTE | | | |

IN USE INQUIRY — 6400

- ID/CAS NO. [ ] — 6414
- CLASS PURE
- MULTIPLE DEPARTMENT INQUIRY
- PREFIX-NAME [ ACETONE ] — 6402
- GROUPING [ ]
- STRUCTURE [ ]
- MOLECULAR WT
- DENSITY
- STORAGE GROUP
- COLOR CODE

FIG. 64B

IN USE INQUIRY — 6400

- ID/CAS NO. [67-64-1]   CLASS PURE   MULTIPLE DEPARTMENT INQUIRY
- PREFIX-NAME [ ACETONE ]
- GROUPING [CARBONYL]   STRUCTURE [C6H12O6]
- INORGANIC   MOLECULAR WT 1.27   STORAGE GROUP FLAMMABLE & COMBUSTIBLES
- LIQUID   DENSITY 0.791   COLOR CODE RED

| PURITY | GRADE | DESCRIPTION | (SURPLUS AVAILABLE) |
|---|---|---|---|
| 97.099% | HPLC | | |
| 100% | ABC | | |
| ? | ? | ? | |

IN USE INQUIRY — 6400

- ID/CAS NO. [67-64-1]   CLASS PURE   MULTIPLE DEPARTMENT INQUIRY
- PREFIX-NAME [ ACETONE ]
- GROUPING [CARBONYL]   STRUCTURE [C6H12O6]
- INORGANIC   MOLECULAR WT 1.27   STORAGE GROUP FLAMMABLE & COMBUSTIBLES
- LIQUID   DENSITY 0.791   COLOR CODE RED

| PURITY | GRADE | DESCRIPTION | (SURPLUS AVAILABLE) |
|---|---|---|---|
| 97.099% | HPLC | | |
| 100% | ABC | | |
| ? | ? | ? — 6406 | |

6410

| ID | BLDG | ROOM | WTG | VOL ML | RECIEVED | EXPIRES | DIV |
|---|---|---|---|---|---|---|---|
| 1101413 | 1 | 63 | 250/250 | 316/316 | APR 11 94 | JAN 1 96 | ARTS |
| 1101414 | 1 | 63 | 250/250 | 316/316 | APR 11 94 | JAN 1 96 | ARTS |
| 1101415 | 1 | 63 | 250/250 | 316/316 | APR 11 94 | JAN 1 96 | ARTS |
| 1101416 | 1 | 63 | 250/250 | 316/316 | APR 11 94 | JAN 1 96 | ARTS |
| 1101417 | 1 | 63 | 250/250 | 316/316 | APR 11 94 | JAN 1 96 | ARTS |

TOTAL IN 5 CONTAINERS   1250.000 G   1580.28 ML

6408

IN USE CONTAINER RECORDS (6412)

| | | | |
|---|---|---|---|
| CONTAINER ID | 1101413 | MANUFACTURER | ALDRICH CHEMICAL CO. |
| ARTS & SCIENCES: CHEMISTRY | | PRODUCT NUMBER | 112098 |
| WEIGHT INDIV | 250.000 G | RETAILER | ALDRICH CHEMICAL CO. |
| TOTAL | 250.000 G | PRODUCT NUMBER | 112098 |
| VOLUME INDIV | 315.000 ML | PO NUMBER | 12 |
| TOTAL | 315.000 ML | LOT NUMBER | 1 |
| CONTAINER TYPE | MULTIPLE: CASE | PROJECT | CHEMMIST |
| | | CONTROLLER | DAVID K. TIPTON |
| CONT SIZE | 1000.000 ML | | |
| COUNT WITHIN | 0 | BUILDING | SCIENCE BUILDING |
| DATE: | OPEN | FLOOR | BASEMENT |
| RECEIVED | APR 11 94 | ROOM | 13C |
| EXPIRES | JAN 1 95 | LOCATION | CABINET 1 |
| INVENTORY | APR 11 94 | SPECIFIC LOCATION | TOP SHELF |
| WASTE | | | |

FIG. 64D

IN USE INQUIRY (6500)

ID/CAS NO. 67-64-1    CLASS PURE    MULTIPLE DEPARTMENT INQUIRY
PREFIX-NAME    ACETONE
GROUPING    CARBONYL    STRUCTURE C6H12O6
INORGANIC    MOLECULAR WT 1.27    STORAGE GROUP FLAMMABLE & COMBUSTIBLES
LIQUID    DENSITY 0.791    COLOR CODE RED

| PURITY | GRADE | DESCRIPTION | SURPLUS AVAILABLE |
|---|---|---|---|
| 97.099% — 6508 | HPLC | | |
| 100% — 6510 | ABC | | |
| ? — 6506 | ? | ? | |

| ID | BLDG | ROOM | WTG | VOL ML | RECEIVED | EXPIRES | DIV |
|---|---|---|---|---|---|---|---|
| | | | | 6504 | | | |

TOTAL IN 7 CONTAINERS    117 G    107 ML

FIG. 65

USER DEFINED REPORTS

MAIN FILE SEARCHES ( BY NAME )

( BY MANUFACTURER )   ( BY SUPPLIER )

INDIVIDUAL CHEMICAL SEARCHES ( BY REF # )   ( BY LOCATION )

( EXPIRED CHEMICALS BY LOCATION )   ( DATE OF PURCHASE )

( ALL CHEMICALS )   ( NO-CAS-# )

( ALL ORGANIC CHEMICALS )   ( ALL ORGANIC CHEMICALS )

( LOW INVENTORY )   ( EXPIRED CHEMICALS )

( INDIVIDUAL CHEMICALS )

MEQ BASIC PROGRAM EDITER

PROGRAMS

SEARCH.LIB   ( IMPORT )
MYTRANS.BAS   ( DELETE )
MEQCHEM.GEN

```
540      DATA   51614,144,156,0,239,143,77,240,228,18,127,152,34,33,9,33,5
550      DATA   51630,229,129,180,122,47,122,1,129,9,229,129,180,125,38,12
560      DATA   51646,128,0,208,6,208,4,208,74,208,75,208,76,18,127,143,11
570      DATA   51662,131,149,133,21,130,21,130,224,180,2,0,80,7,218,231,1
580      DATA   51678,4,192,6,34,33,5,0,0,0,0,0,0,0,0,0,0
590      DATA 65536
600      RESTORE SRCHBERT
1230 INITIAL: CLS
1240     MESSAGE1$="...INITIALIZING...":MESSAGE2$="..SEARCH DRIVER.."
1250     MAXCOL=19: FORM$="C18" : ROW1=2:ROW2=3
1260     ONERR GOTO NOFOUR: LOCATE 4,1
1270     IF MAXCOL=19 THEN LOCATE 1,1: PRINT #0, USING "C18", STRING$(18,46
1280     IF MAXCOL=19 THEN LOCATE 4,1: PRINT #0, USING "C18", STRING$(18,46
1290     LOCATE ROW1: PRINT #0 USING FORM$ MESSAGE1$
```

560      DATA   51646, 128, 0, 208, 6, 208, 4, 208, 74, 208, 75, 208, 76, 18, 127, 143, 117

( CANCEL )   ( OK )

FIG. 70

SCREEN REPORT

CAS #67-64-1     ACETONE
AS OF SEP 28 92     PURITY ?     GRADE ?     DESCRIPTION ?
STORAGE GROUP- FLAMMABLE & COMBUSTIBLES

| DEPARTMENT ROOM | REF # | GRAMS LEFT GRAMS NET | ML LEFT ML NET | MANUFACTURER NUMBER | DATE RECEIVED EXPIRATION DATE |
|---|---|---|---|---|---|
| AGRICULTURE 104 | 2824.04 | 2768.500 3164.000 | 3500.000 4000.000 | UNMARKED | JAN 1 87 |
| AGRICULTURE 122 | 2824.02 | 1265.600 1582.000 | 1600.000 2000.000 | UNMARKED | JAN 1 87 |
| AGRICULTURE 123 | 2824.03 | 300.000 1000.000 | 379.267 1264.223 | UNMARKED | OCT 9 89 |
| AGRICULTURE 212 | 2824.07 | 98.875 197.750 | 125.000 225.000 | CAROLINA | JAN 1 87 |
| BIOLOGY 204 | 2824.05 | 118.650 177.975 | 150.000 225.000 | | JAN 1 87 |
| BIOLOGY 204 | 2824.06 | 276.850 395.500 | 350.000 500.000 | UNMARKED | JAN 1 87 |

FIG. 69

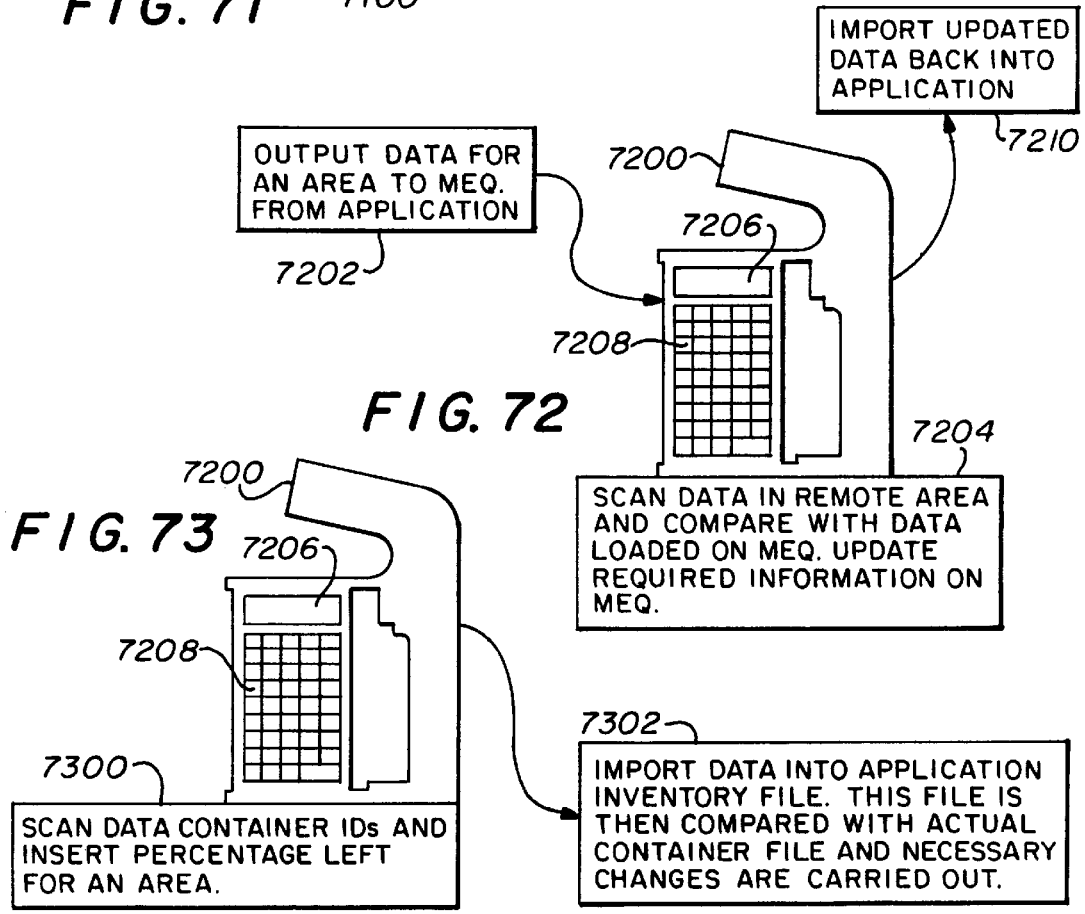

```
                    TRANSFERS
        ┌──────────────────────┐
        │ TO OTHER DEPARTMENT ⬇│
7202'───┤
        CHOOSE NEW DEPARTMENT  │ARTS & SCIENCES: CHEMISTRY ⬇│

BUILDING  │SCIENCE BUILDING ⬇│
                        ROOM  │13C ⬇│
                    LOCATION  │    ⬇│
                    SPECIFIC  │    ⬇│
                    LOCATION
```

7200' — FIG. 72'

```
                    TRANSFERS
        ┌──────────────────┐
        │ TO NEW CONTAINER ⬇│

TRANSFER │10.000│ ML  TO NEW CONTAINER
```

7300' — FIG. 73'

```
                    TRANSFERS
        ┌──────────────────────┐
        │ TO EXISTING CONTAINER ⬇│

TRANSFER │10.000│ ML  TO │1101225       ⬇│
                                    │1101226       ⬆│
                                    │1101227        │
                                    │1101229        │
                                    │1101254        │
                                    │1101550       ⬇│
```

7400 — FIG. 74

```
                    TRANSFERS
        ┌─────────────────┐
        │ TO NEW LOCATION ⬇│

BUILDING  │SCIENCE BUILDING ⬇│
                        ROOM  │13C ⬇│
                    LOCATION  │    ⬇│
                    SPECIFIC  │    ⬇│
                    LOCATION
```

7500 — FIG. 75

TRANSACTIONS FOR CONTAINER 1101254

| USER ID | DATE | TIME | CURRENT WEIGHT | CURRENT VOLUME |
|---|---|---|---|---|
| 1 | JUN 27 94 | 14:06 | 365.5G | 462.074 ML |
| 10G OR 12.642ML CONSUMED 10.000% WENT UP THE STACK, 10.000% WENT DOWN THE DRAIN, 75.000% WAS USED IN PROCESS, AND 5.000% BECAME RESIDUAL WASTE WHICH WAS PUT INTO CONTAINER ID 1182156. | | | | |
| 1 | JUN 27 94 | 14:08 | 367.873G | 465.074 ML |
| 2.373G OR 3ML ADDED FROM CONTAINER ID 1101555. | | | | |
| 1 | JUN 27 94 | 14:09 | 267.873G | 338.652 ML |
| 100G OR 126.442ML CONSUMED 10.000% WENT UP THE STACK, 10.000% WENT DOWN THE DRAIN, 30.000% WAS USED IN PROCESS, AND 50.000% BECAME RESIDUAL WASTE WHICH WAS PUT INTO CONTAINER ID 1178158. | | | | |
| 1 | JUN 27 94 | 14:11 | 167.873G | 212.23 ML |
| 100G OR 126.422ML CONSUMED 10.000% WENT UP THE STACK, 10.000% WENT DOWN THE DRAIN, 30.000% WAS USED IN PROCESS, AND 50.000% BECAME RESIDUAL WASTE. | | | | |

SINGLE PROCESS FOR CONTAINER 1101552

| PRE-PROCESSES | CLEANING SPRAY EQUIPMENT | | |
|---|---|---|---|
| TOTAL CONSUMED | | 10.000 G | 12.642 ML |
| 10.000 % UP STACK | | 1.000 G | 1.264 ML |
| 10.000 % DOWN DRAIN | | 1.000 G | 1.264 ML |
| 30.000 % USED IN PROCESS | | 3.000 G | 3.793 ML |
| 50.000 % RESIDUAL WASTE | | 5.000 G | 6.321 ML |
| RESIDUAL CONTAINER ID | 1178156 | | |

PROCESSES

PROCESSES

| PAINT BOOTH |
| CLEANING SPRAY EQUIPMENT |
| |

7800

7802

PAINT BOOTH

| | PERCENTAGES |
|---|---|
| UP STACK | 30.00 |
| DOWN DRAIN | 30.00 |
| USED IN PROCESS | 30.00 |
| RESIDUAL WASTE | 10.00 |

☐ DEFAULT PROCESS

FIG. 78

```
                                          ┌─7900
        7902                               │
          │    MULTIPLE CONSUMPTION PROCESS
          │  TOTAL OF ALL SUBSTANCES IN THIS MCP 30.000G OR 37.926 ML
             ACETONE 99.9% ACS
             20 G OR 26.284 ML
             BENZENE 97.099% HPLC FROM CONTAINER ID 1101413
             10.000 G OR 12.642 ML
                    7904
             TOTAL CONSUMED         [10.000] G    [12.642] ML

[4.500] % UP STACK      [0.450] G    [0.569] ML
             [0.500] % DOWN DRAIN    [0.050] G    [0.063] ML
             [90.000] % USED IN PROCESS [9.000] G [11.378] ML   RESIDUAL
             [5.000] % RESIDUAL WASTE [0.500] G   [0.632] ML    CONTAINER ID
                                                                [0]
             LIST ALL MAIN RECORDS THAT ARE AVAILABLE AS A COMPONENT OF THIS PROCESS WHERE
             [NAME/SYNONYM ▼] [STARTS WITH ▼] [        ]    (BUILD LIST)
             MAIN ID   NAME  7906   TYPE  7908   7910   CONTAINER ID   7912
             67-64-1   AC-ACETONE    97.099% HPLC         1101413
                 │
              7914
             TRANSFER [9.000] G [11.378] ML OF SELECTED MCP COMPONENTS TO [    ]
             BY PRODUCT LIST [                                              ]
```

FIG. 79

```
                        ┌─8000
      MULTIPLE CONSUMPTION PROCESS
      ALL MULTIPLE CONSUMPTION PROCESSES CREATED BY
      DARREN
      [3]  CLEANING SOLUTION                ▼
      DATE [JUN 23 94]        ☐ PRE-PROCESS
      DESCRIPTION
      ┌────────────────────────────────────┐
      │THIS SOLUTION IS USED TO WASH OUT   │
      │CHEMICAL CONTAINERS IN THE LAB.     │
      │                                    │
      │                                    │
      └────────────────────────────────────┘
                          (MCP COMPONENTS)
```

FIG. 80

ATTENTION ALL PERSONNEL

REMOVE INVENTORY LABEL BEFORE DISPOSING OF ANY EMPTY CHEMICAL CONTAINER

TRACE LOG FOR ADMINISTRATOR — 9100

| Date | Time | Event |
|---|---|---|
| DEC 7 93 | 08:40 | LOG OFF |
| DEC 7 93 | 08:46 | LOG ON |
| DEC 7 93 | 08:48 | LOG OFF |
| DEC 7 93 | 11:22 | LOG ON |
| DEC 7 93 | 14:36 | BLOCK ID REQUEST FOR DIV3 4005 TO 9005 |
| DEC 7 93 | 14:41 | BLOCK ID REQUEST FOR DIV3 9006 TO 9165 |
| DEC 7 93 | 14:49 | BLOCK ID REQUEST FOR DIV2 121046 TO 177046 |
| DEC 8 93 | 08:06 | LOG OFF |
| DEC 8 93 | 08:06 | LOG ON |
| DEC 8 93 | 08:22 | BLOCK ID REQUEST FOR DIV2 177047 TO 177047 |
| DEC 8 93 | 08:26 | BLOCK ID REQUEST FOR DIV2 177048 TO 178048 |
| DEC 8 93 | 09:13 | LOG OFF |
| DEC 8 93 | 09:14 | LOG ON |
| DEC 8 93 | 09:22 | VIEWED MSDS ID 1982722 |
| DEC 8 93 | 09:26 | LOG OFF |

9102

CLEAR LOG

*FIG. 91*

IN USE INQUIRY — 9200

MULTIPLE DEPARTMENT INQUIRY

ID/CAS NO.      CLASS PURE
PREFIX-NAME
GROUPING        STRUCTURE
ORGANIC   MOLECULAR WT    STORAGE GROUP
SOLID     DENSITY          COLOR CODE

PURITY    GRADE    DESCRIPTION    (SURPLUS AVAILABLE)

| ID | BLDG | ROOM | WTG | VOL ML | RECEIVED | EXPIRES | DIV |
|---|---|---|---|---|---|---|---|

TOTAL IN 0 CONTAINERS      0.000 G      0.000 ML 9202    9204

```
                    SAFETY & INFORMATION
         ┌─9306
☒ OSHA  /   ☐ CARCINOGENIC--OSHA REGULATED   ☐ KNOWN      ☐ POTENTIAL
☐ SARA /    REPORT-- IF SPILLED:      LB     THRESHOLD:             LB
PEL [10 PPM]   TLV [        ]─9310
STORAGE HAZARDS                              HANDLING AND SPILL CONTROL
                 9302
```

NFPA HEALTH 1  EXPLOSIVE ☐ A
FLAMMABILITY 3  ─9304  ☐ B  ─9308
REACTIVITY 0  ☐ C

LIQUID FLAMMABLE CLASS: IB   COMBUSTIBLE CLASS:
°F (°C) FLASH PT: 1   IA/IB  BOILING PT: 133(56)   II/IIIA/IIIB  IGNIT. TEMP: 869(465)
SOLID ☐ FLAMMABLE SOL. IC    FLAMMABLE SOLID DWW    ORG. PEROX. SOLID
GAS ☐ FLAMMABLE GAS    ☐ NONFLAMMABLE GAS

OXIDIZER ☐ SOLID ☐ LIQUID     PYROPHORIC ☐ SOLID ☐ LIQUID
☐ FORMS EXPLOSIVE PEROXIDES

GENERAL HEALTH HAZARDS
☐ CORROSIVE    ☐ HIGHLY TOXIC    ☒ ORGANIC TOXANT    ☐ IRRITANT    ☐ FETAL ABBORTION
☐ TERATOGEN    ☐ TOXIC AGENT     ☐ SENSITIVE         ☐ MUTAGEN     ☐ TOXICITY UNKNOWN

RELATIVE HAZARD TO HEALTH
☒ SKIN IRRITATION    ☒ SKIN PENETRATION    ☐ SKIN (OSHA)
☒ EYE CONTACT        ☒ INGESTION           ☒ INHALATION

☐ WATER SOLUABLE    EXTINGUISHING METHODS: 1 & 5

HAZARDOUS WASTE # U002    RTECS # AL3150000    ALDRICH DISPOSAL D

NOTES

─9300

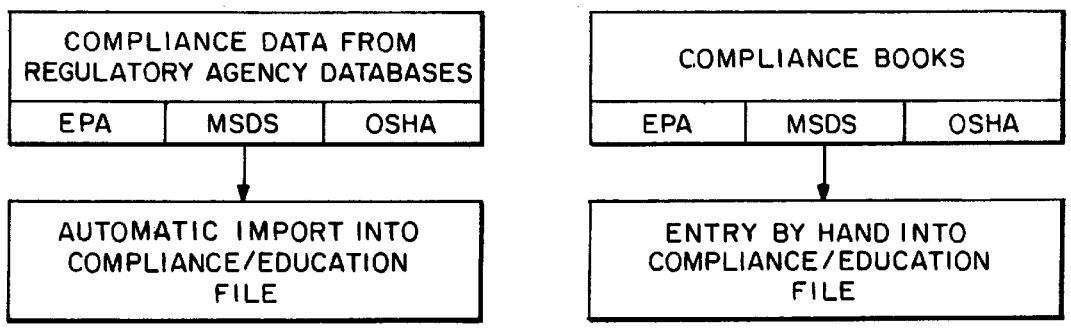

FIG. 94                          FIG. 95

| | | |
|---|---|---|
| 9600 |  | HAS REGULATORY SUGGESTIONS ON HANDLING, STORAGE, ETC... CLICKING THIS BUTTON BRINGS UP A LIST OF ALL ORGANIZATIONS WHO HAVE RECOMMENDATIONS ON THIS SUBSTANCE. |
| 9602 |  | HAS A REGULATION OR LAW DIRECTLY AFFECTING THIS SUBSTANCE. CLICKING THIS BUTTON BRINGS UP A LIST OF ALL ORGANIZATIONS WHO HAVE LAWS REGARDING THIS SUBSTANCE. |
| 9604 |  | HAS SPILL PRECAUTIONS OR REGULATIONS. CLICKING THIS BUTTON BRINGS UP A WINDOW SHOWING WHAT TO DO IF THIS SUBSTANCE IS SPILLED AND THE POSSIBLE EFFECTS OF THE SPILL. |
| 9606 |  | HAS HANDLING PRECAUTIONS OR REGULATIONS. CLICKING THIS BUTTON BRINGS UP A WINDOW SHOWING THE PROPER WAY TO HANDLE THIS SUBSTANCE AND RESULTS OF IMPROPER HANDLING. |
| 9608 |  | HAS ENVIRONMENTAL PRECAUTIONS OR REGULATIONS. CLICKING THIS BUTTON BRINGS UP A WINDOW EXPLAINING THE PROBLEM THIS SUBSTANCE HAS ON THE ENVIRONMENT. |
| 9610 |  | HAS REQUIRED SAFETY APPAREL TO BE WORN WHEN DEALING WITH THIS SUBSTANCE. CLICKING THIS BUTTON BRINGS UP A WINDOW SHOWING THE PROPER APPAREL THAT NEEDS TO BE WORN WHEN WORKING WITH THIS SUBSTANCE. |
| 9612 |  | HAS STORAGE PRECAUTIONS OR REGULATIONS. CLICKING THIS BUTTON BRINGS UP A WINDOW SHOWING THE PROPER WAY THAT THIS SUBSTANCE NEEDS TO BE STORED. |
| 9614 |  | HAS SOME SORT OF MULTIMEDIA PRESENTATION. CLICKING THIS BUTTON PLAYS A QUICKTIME™ MOVIE, ANIMATION SEQUENCE, OR SLIDE SHOW SHOWING CONCERNS REGARDING THIS SUBSTANCE. |

FIG. 96

```
                      USER: GOZY
GROUP  STORAGE GROUPS        SESSION  FLAMMABLE & COMBUSTIBLES
DESCRIPTION                  SESSION NO. 1
```

| | |
|---|---|
| THE FLAMMABLE AND COMBUSTIBLES STORAGE GROUP HAVE RED COLOR CODE. | |

GENERAL DATA

FLAMMABLE MATERIAL IS ANY SOLID, LIQUID, VAPOR OR GAS THAT WILL IGNITE EASILY AND BURN RAPIDLY. MATERIAL IS CONSIDERED COMBUSTIBLE IF IT WILL BURN, REGARDLESS OF ITS AUTOIGNITION POINT (Q.V.), OR WHETHER IT IS SOLID, LIQUID, OR GAS.

FLAMMABLE
FLAMMABLE SOLIDS ARE OF SEVERAL TYPES:
1. DUSTS OR FINE POWDERS (METALS OR ORGANIC SUBSTANCES SUCH AS CELLULOSE, FLOUR, ETC.)
2. THOSE THAT IGNITE SPONTANEOUSLY AT LOW TEMPERATURES (WHITE PHOSPHORUS).
3. THOSE IN WHICH INTERNAL HEAT IS BUILT UP BY MICROBIAL OR OTHER DEGRADATION ACTIVITY (FISH MEAL, WET CELLULOSIC MATERIALS).
4. FILM, FIBERS, AND FABRICS OF LOW-IGNITION POINT MATERIALS

FLAMMABLE LIQUIDS ARE DEFINED BY THE NATIONAL FIRE PROTECTION ASSOCIATION AND THE DEPARTMENT OF TRANSPORTATION (DOT) AS THOSE HAVING A FLASH POINT BELOW 100° F (37.7°C) (CLOSED CUP) AND A VAPOR PRESSURE OF NOT OVER 40 PSIA AT 100° F.

STORAGE SPECS

MSDS LOCATION RECORDS

MSDS LOCATION RECORDS                                    MSDS FILE ▼

| COMPANY NAME | CAT NO | ISSUE DATE | BUILDING | ROOM | BINDER |
|---|---|---|---|---|---|
| MALLINCKRODT | NOT STATED | SEP 5 85 | SCIENCE | 104 | 1 |
| FISHER | A9294 | JAN 16 88 | SCIENCE | 104 | 1 |
| FISHER | A1654 | SEP 15 89 | SCIENCE | 104 | 1 |
| ALDRICH | 15,459-8 | NOV 14 88 | SCIENCE | 104 | 1 |
| ALDRICH | 17997-3 | AUG 3 90 | SCIENCE | 104 | 1 |
| ALDRICH | 27072-5 | MAY 14 92 | SCIENCE | 104 | 1 |

PHONE NUMBER FOR

HOOD CERTIFICATION

DEPT/INDIVIDUAL DOING TESTING_____

HOOD NO._____ DATE _____

SIZE_____ AVERAGE FACE VELOCITY_____

LOWEST VELOCITY READING_____

CFM_____ TBE_____

INSTRUMENT_____

DATE CALIBRATED_____

```
┌─────────────────────────────────────────────────────┐
│         CHEMICAL NAME                               │
│  ┌───────────────────────────────────────────────┐  │
│  │                                               │  │
│  └───────────────────────────────────────────────┘  │
│  ┌─ROUTE OF ENTRY──────────────────────────────────┐│
│  │  INHALATION              SKIN ABSORPTION       ││
│  │  INGESTION               SKIN OR EYE CONTACT   ││
│  └────────────────────────────────────────────────┘│
│  ┌─PHYSICAL HAZARD──────┐ ┌─HEALTH HAZARDS────────┐│
│  │ NO PHYSICAL HAZARDS  │ │ NO HEALTH HAZARD      ││
│  │ COMBUSTIBLE LIQUID   │ │ TOXIC                 ││
│  │ COMPRESSED GAS       │ │ HIGHLY TOXIC          ││
│  │ OXIDIZER             │ │ REPRODUCTIVE TOXIN    ││
│  │ FLAMMABLE GAS        │ │ IRRITANT              ││
│  │ EXPLOSIVE            │ │ CORROSIVE             ││
│  │ FLAMMABLE LIQUID/SOLID│ │ SENSITIZER           ││
│  │ PYROPHORIC           │ │ CARCINOGEN            ││
│  │ ORGANIC PEROXIDE     │ │                       ││
│  │ WATER REACTIVE       │ │                       ││
│  │ UNSTABLE (REACTIVE)  │ │                       ││
│  └──────────────────────┘ └───────────────────────┘│
│  ┌─TARGET ORGANS & AFFECTS────────────────────────┐│
│  │  LUNGS           CENTRAL NERVOUS SYSTEM        ││
│  │  HEART           CARDIOVASCULAR SYSTEM         ││
│  │  KIDNEY          MUCOUS MEMBRANES              ││
│  │  EYES            AUTONOMIC NERVOUS SYSTEM      ││
│  │  SKIN            RESPIRATORY SYSTEM            ││
│  │  PROSTATE        BLOOD                         ││
│  │  BLOOD           MUTAGEN                       ││
│  │  LIVER           TERATOGEN                     ││
│  └────────────────────────────────────────────────┘│
└─────────────────────────────────────────────────────┘
```

FIG. 100

| WEEKLY INSPECTION OF EMERGENCY SHOWER AND EYE-FACEWASH STATIONS | | |
|---|---|---|
| LOCATION _____ BLDG _____ FLOOR _____ PROCESS _____ | | |
| EYEWASH-EYE/FACEWASH STATIONS | YES | NO |
| NOZZLE HEIGHT - BETWEEN 33" AND 45" ABOVE STANDING LEVEL | ___ | ___ |
| WATER VELOCITY - SOFT SPENT STREAM TO BOTH EYES SIMULTANEOUSLY NOT TO EXCEED 30 PSIG | ___ | ___ |
| NOZZLES - COVERS TO PROTECT FROM AIR BORNE CONTAMINATES | ___ | ___ |
| LOCATION - WITHIN 10 SECONDS TRAVEL AND 25 FEET FROM HAZARD | ___ | ___ |
| VALVE TYPE - STAY OPEN VALVE MUST BE MANUALLY SHUT OFF, OFF TO ON IN 1 SECOND, EASILY LOCATED | ___ | ___ |

FIG. 102

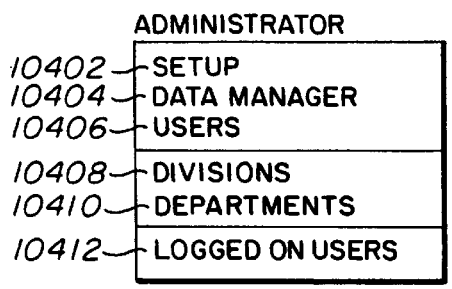
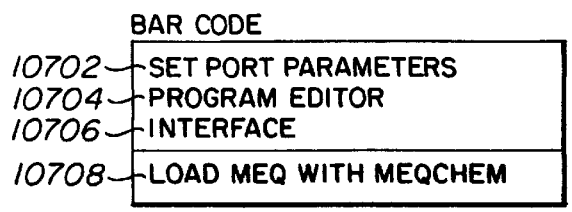
FIG. 104
FIG. 107
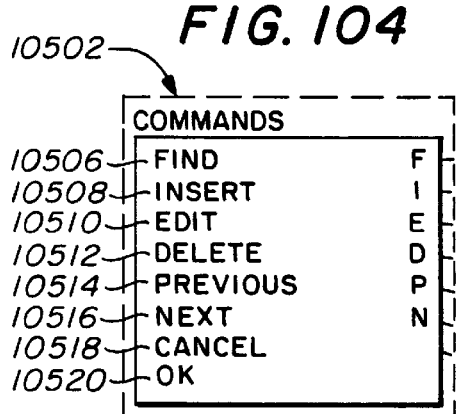
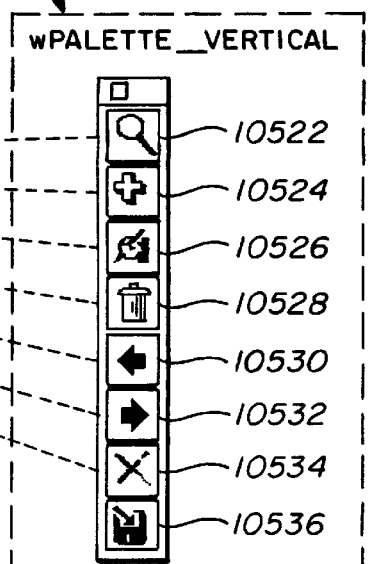
FIG. 105
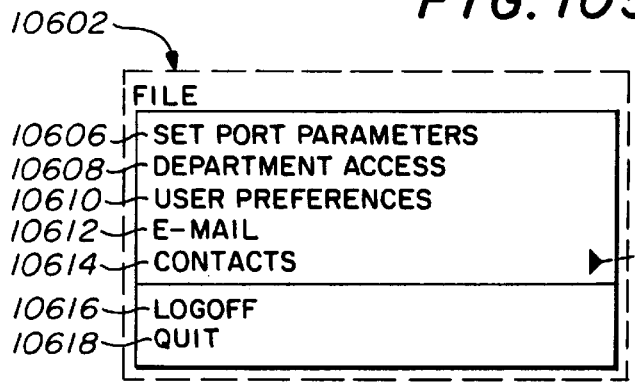
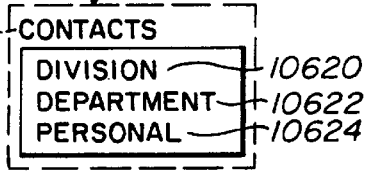
FIG. 106
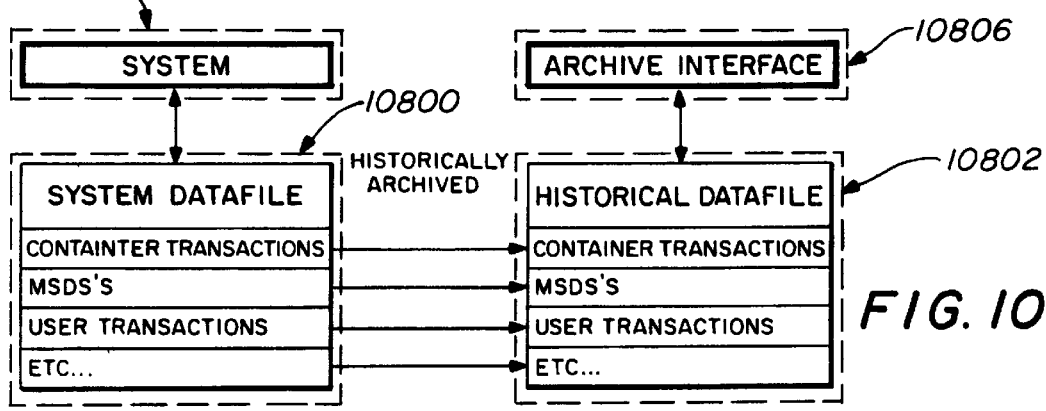
FIG. 108

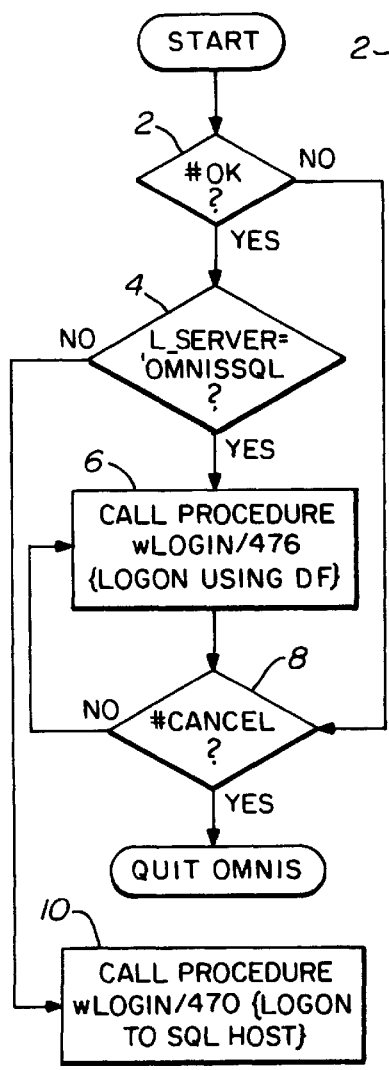
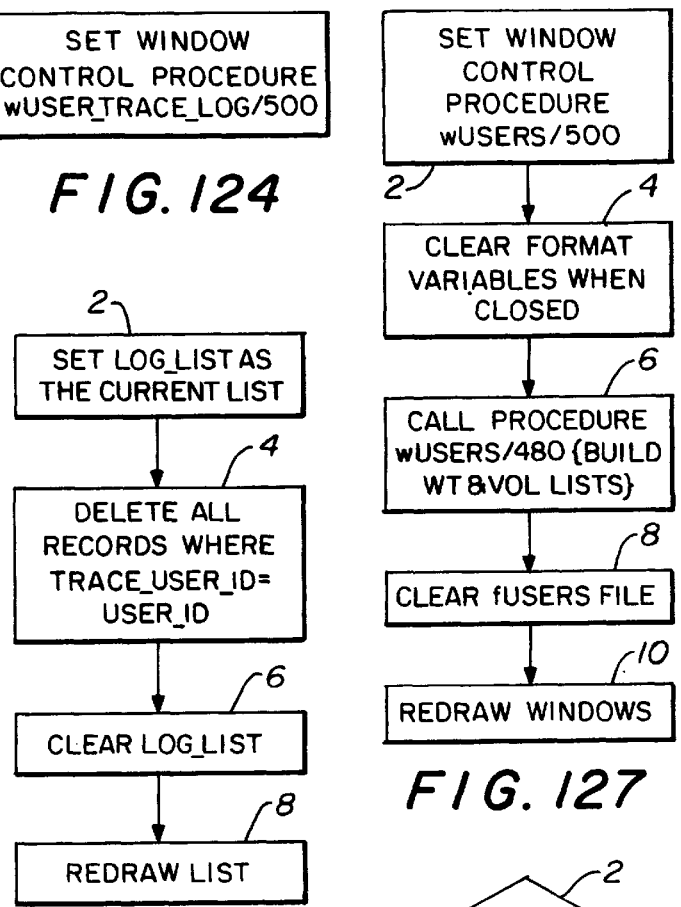
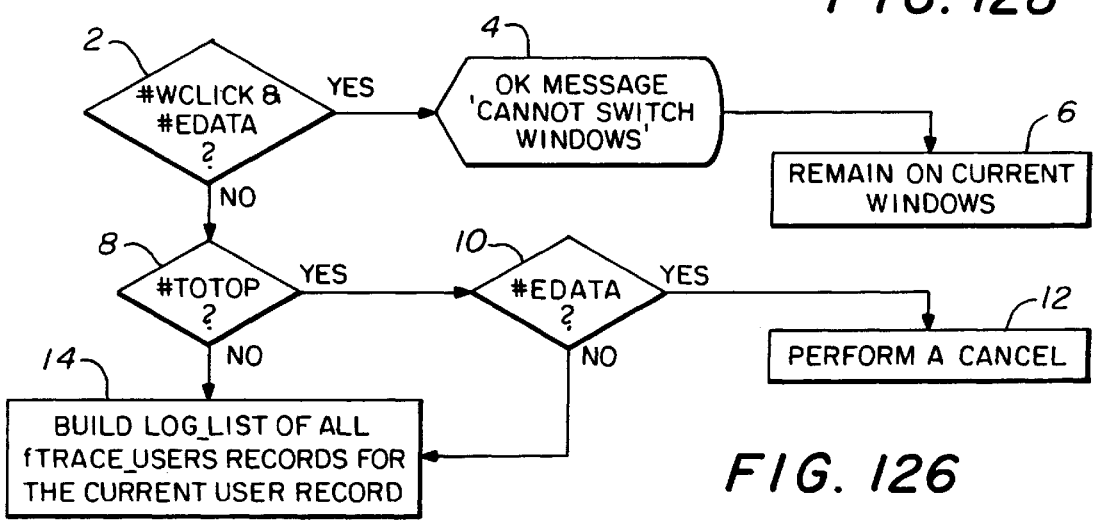

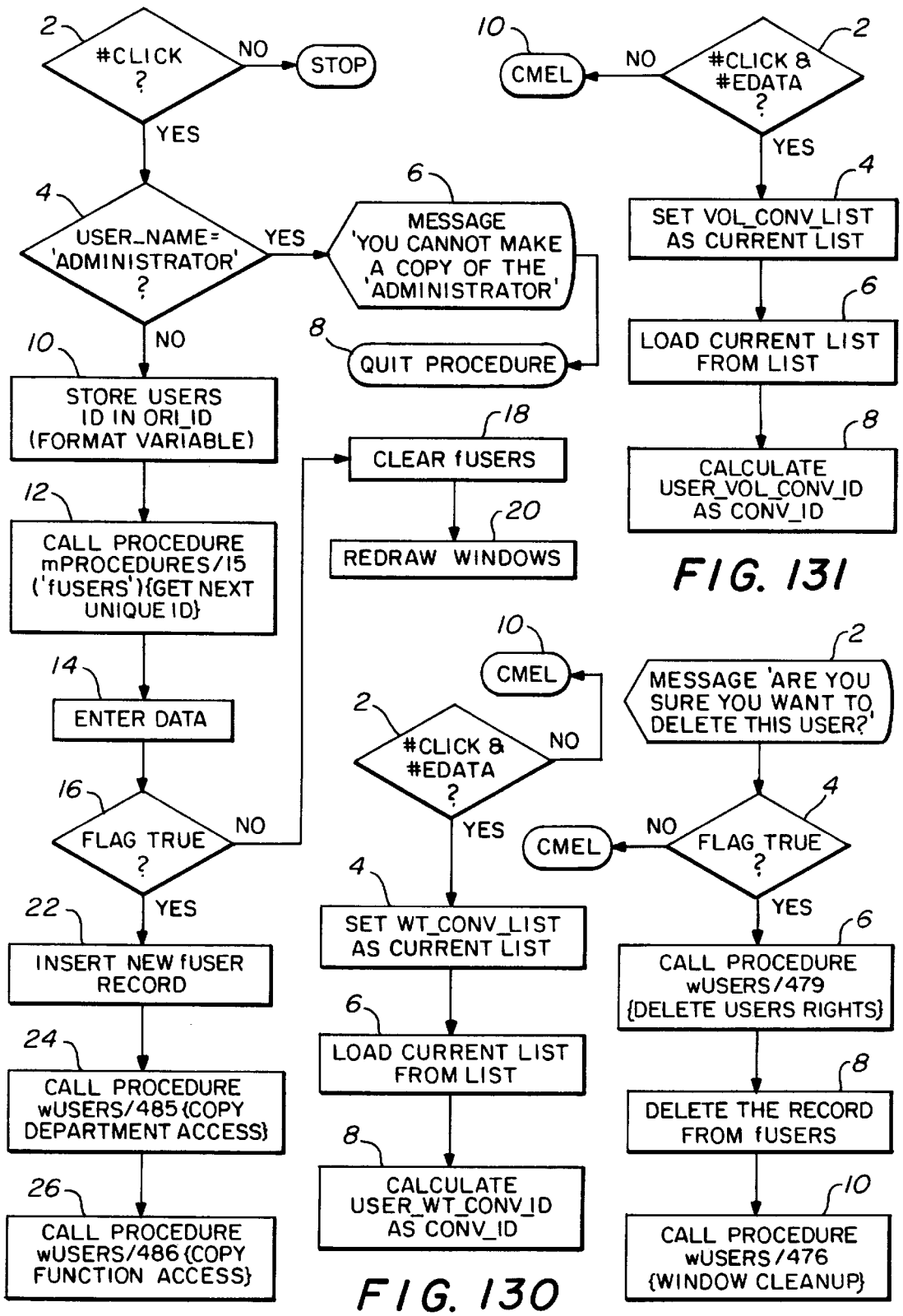

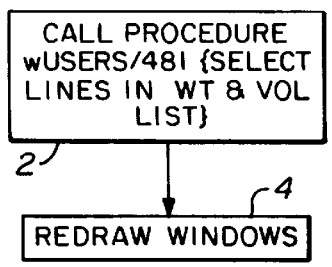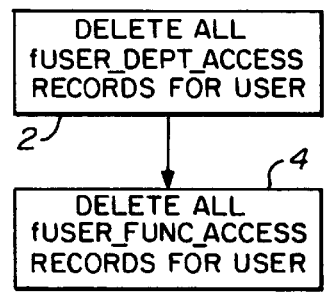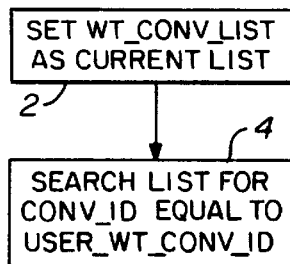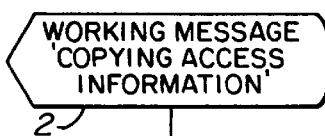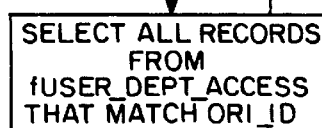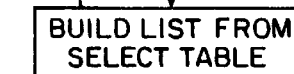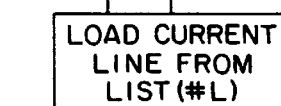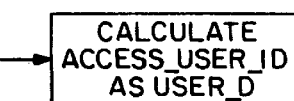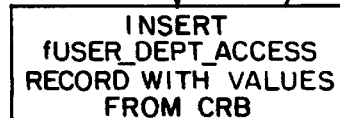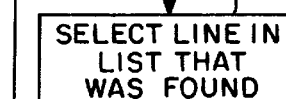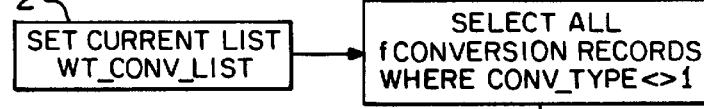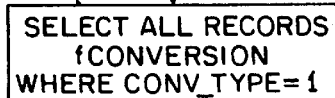
FIG. 133
FIG. 134
FIG. 137
FIG. 136
FIG. 135

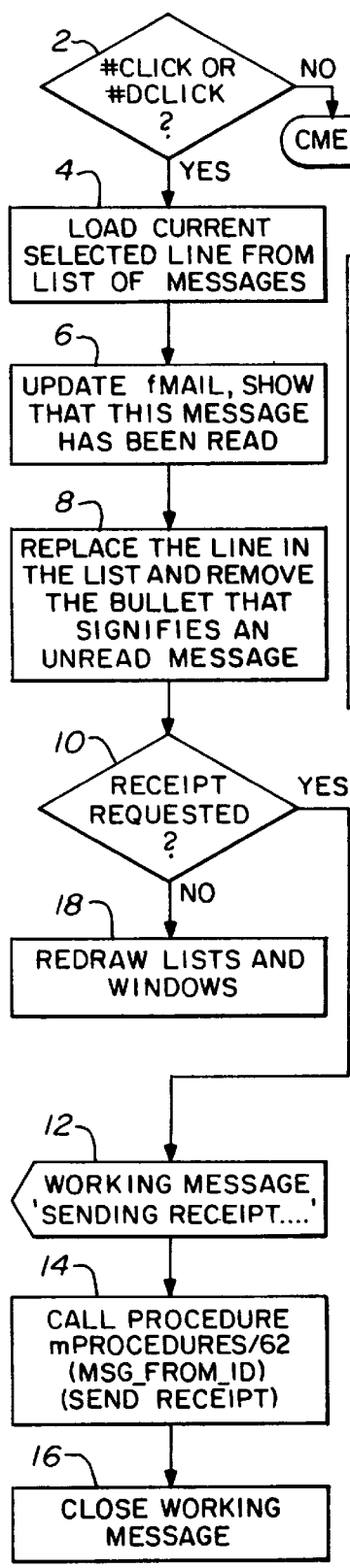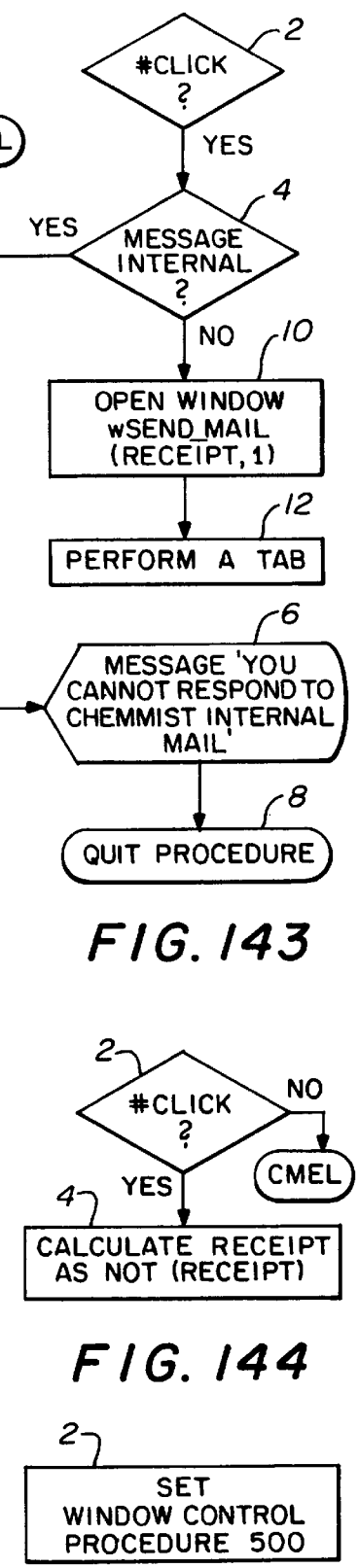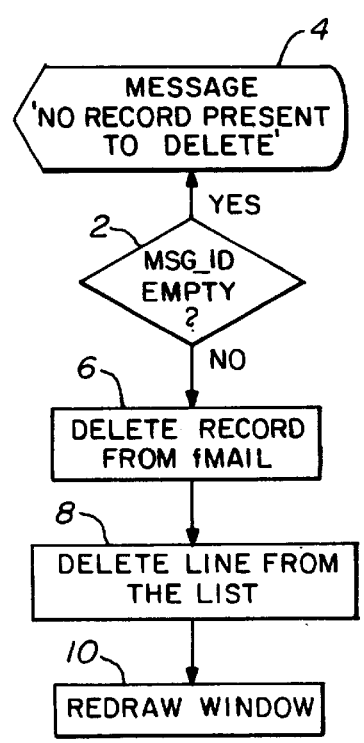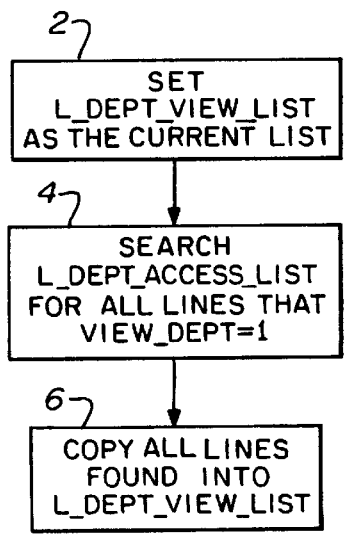

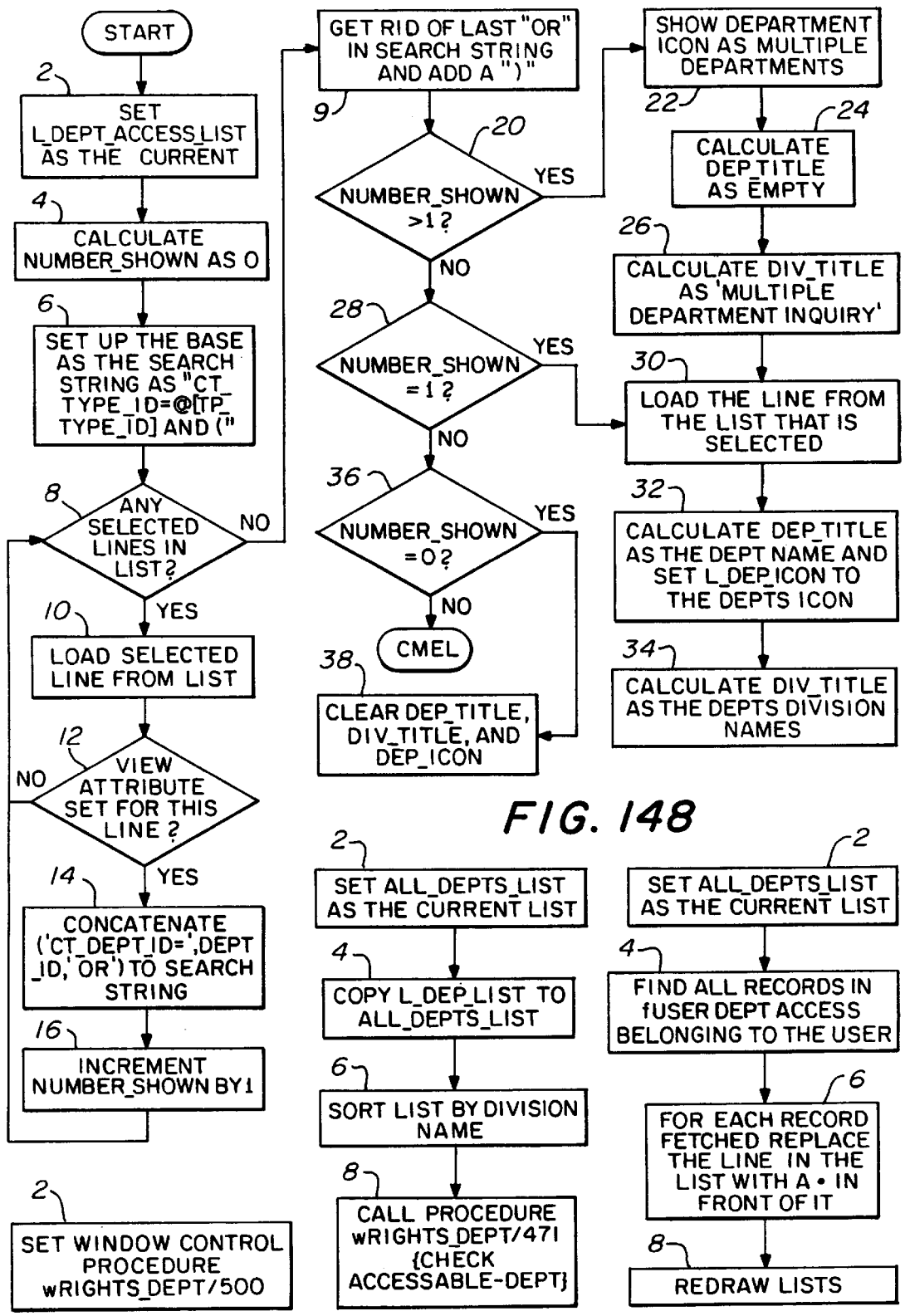

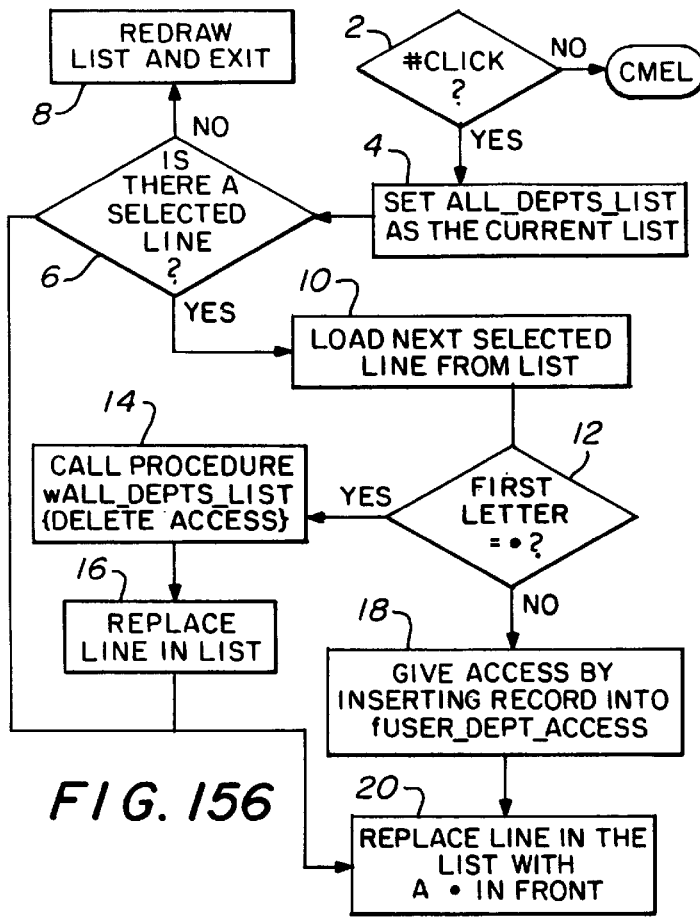
FIG. 156
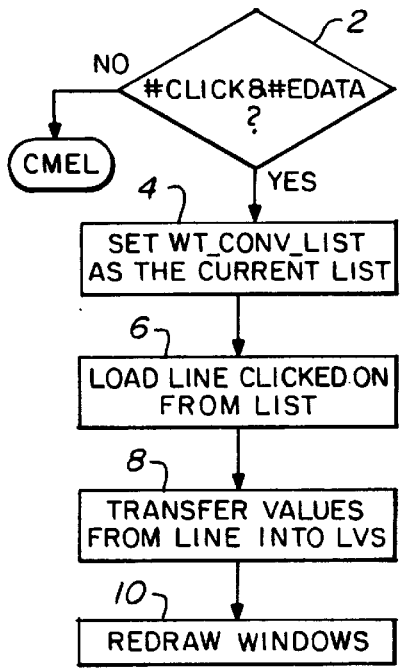
FIG. 159
FIG. 162
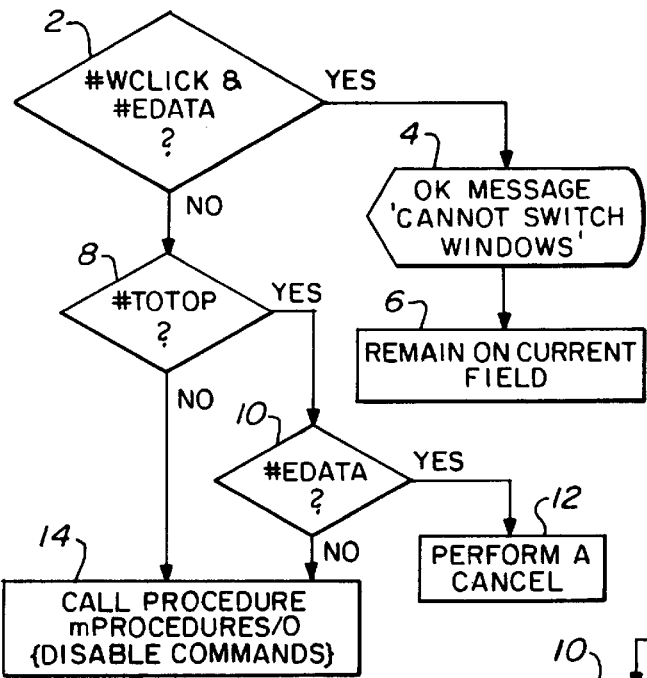
FIG. 160
FIG. 163

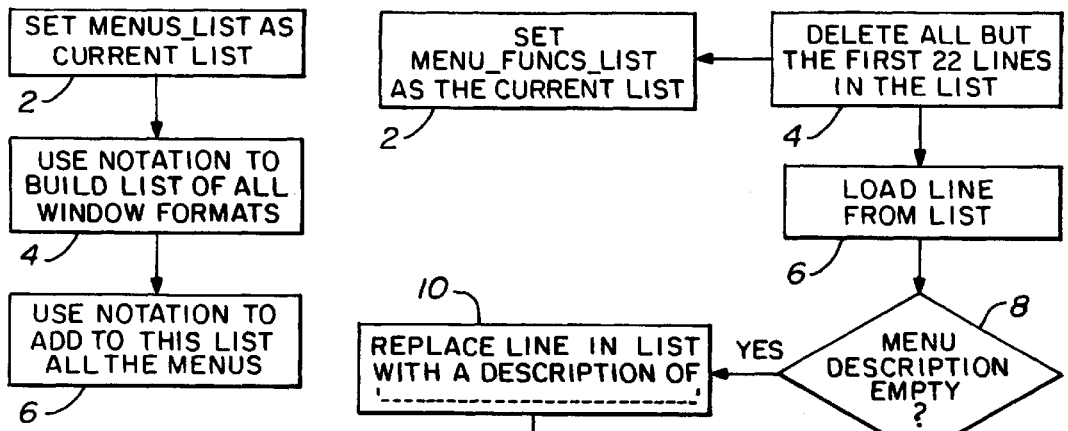
FIG. 172
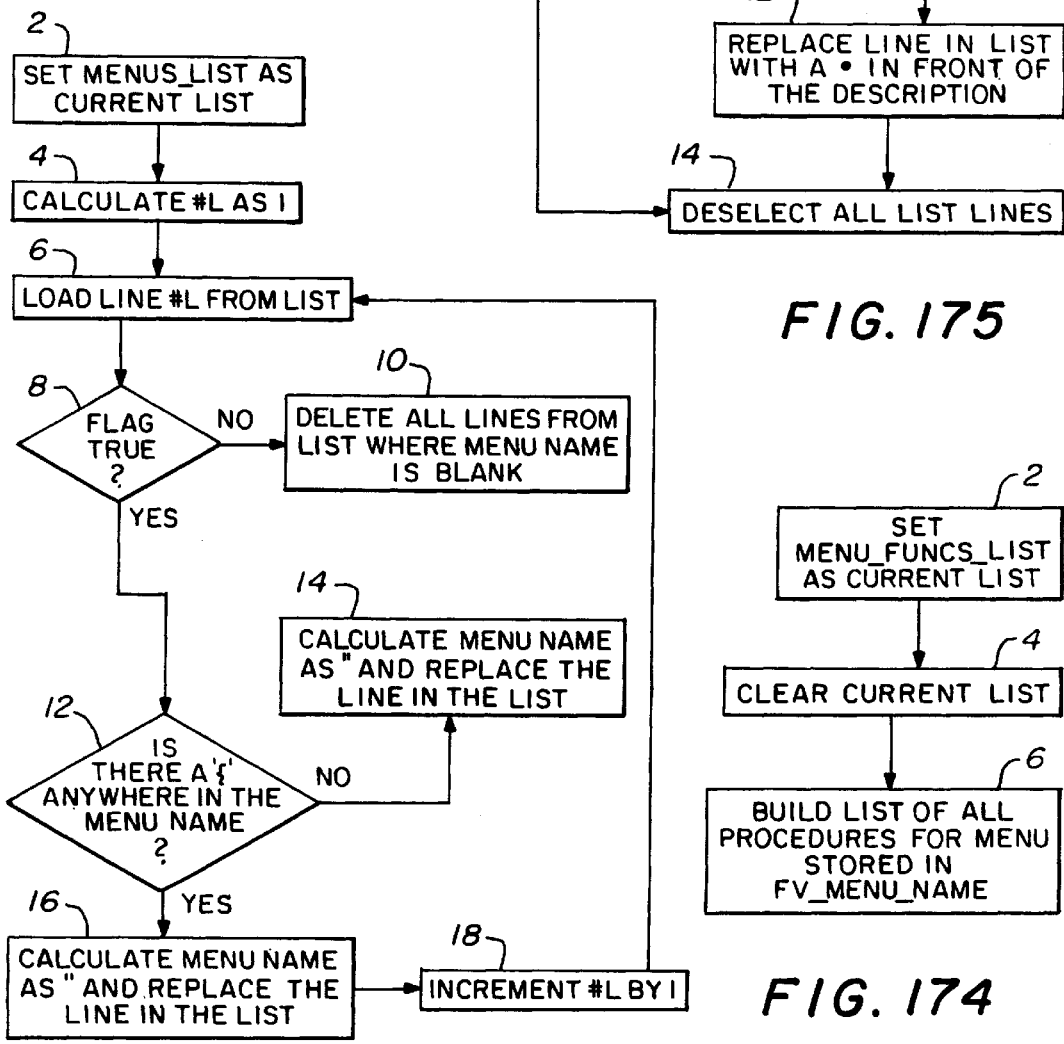
FIG. 175
FIG. 174
FIG. 173

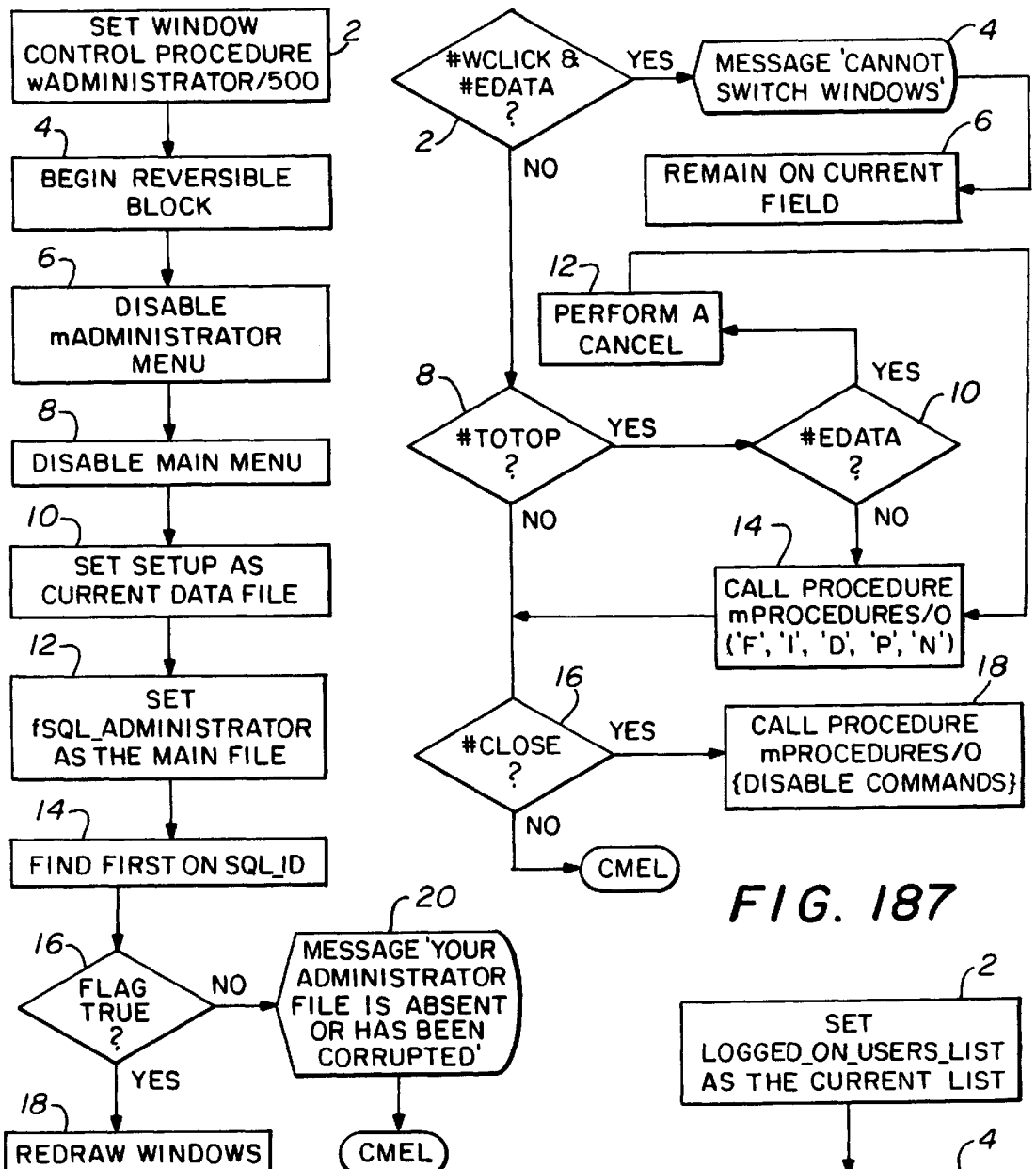
FIG. 185
FIG. 187
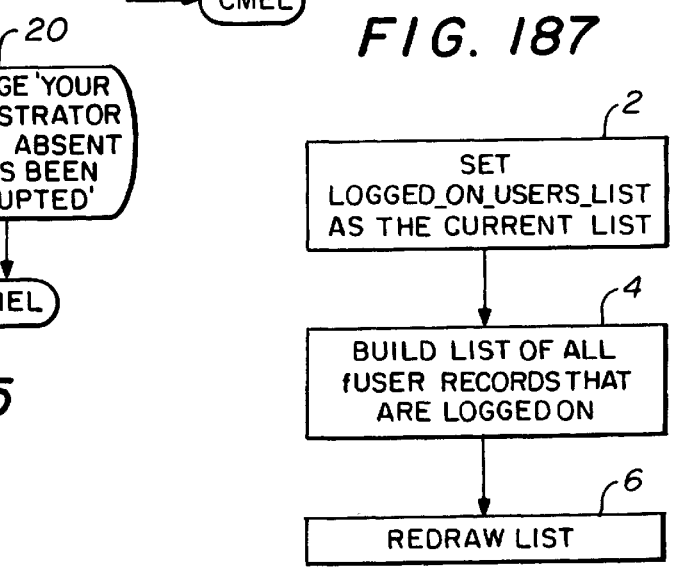
FIG. 188
FIG. 190

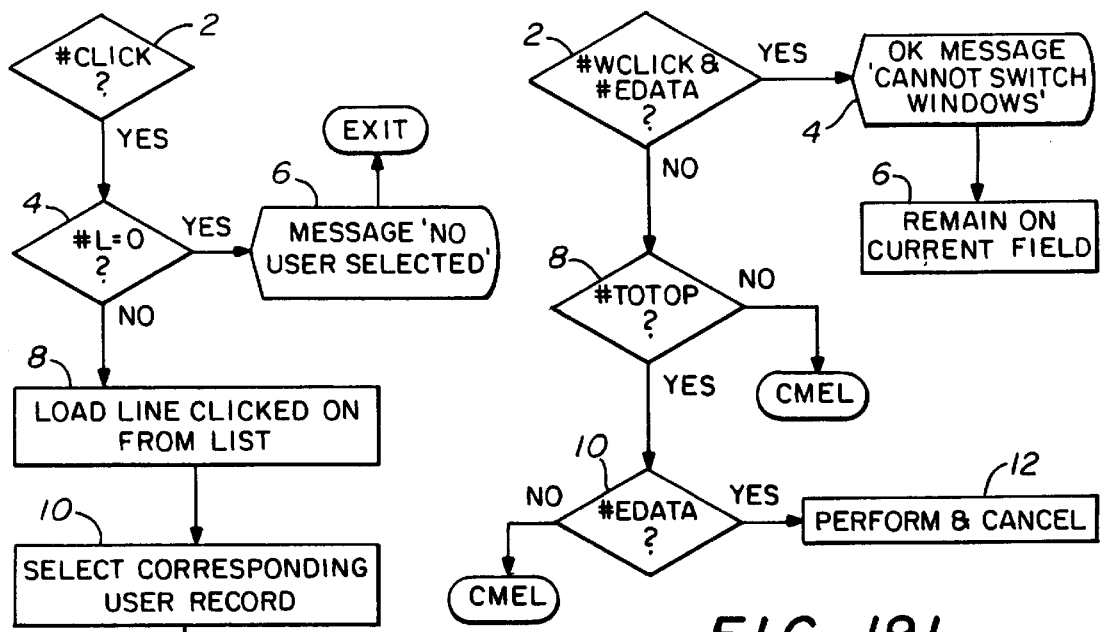
FIG. 191
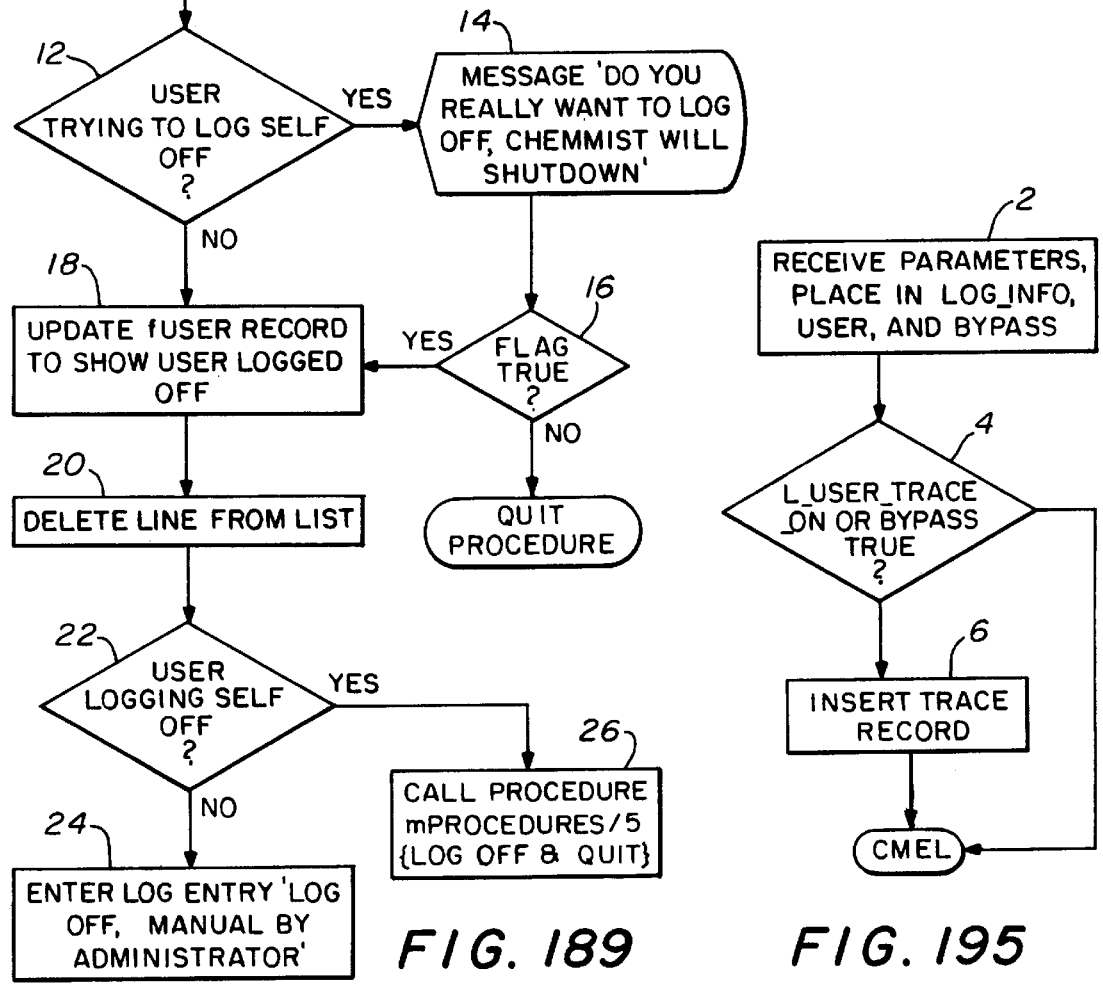
FIG. 189
FIG. 195

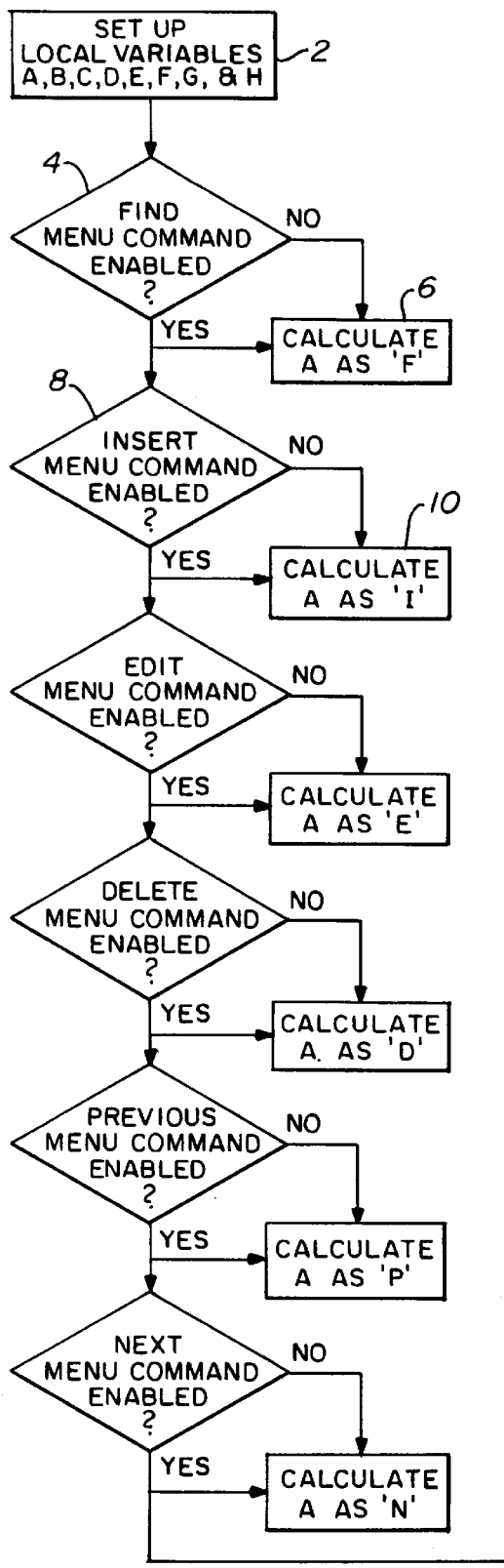
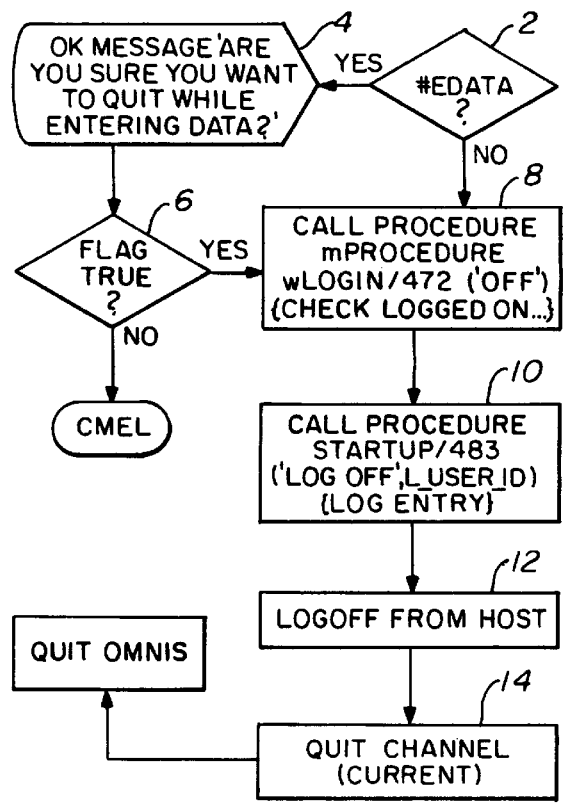
FIG. 196
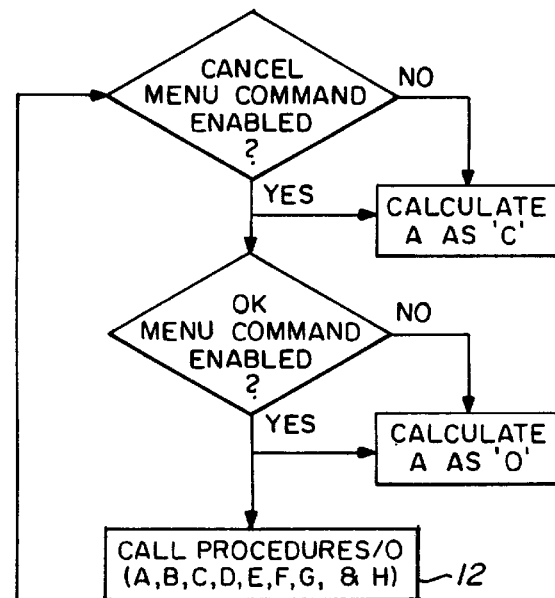
FIG. 193

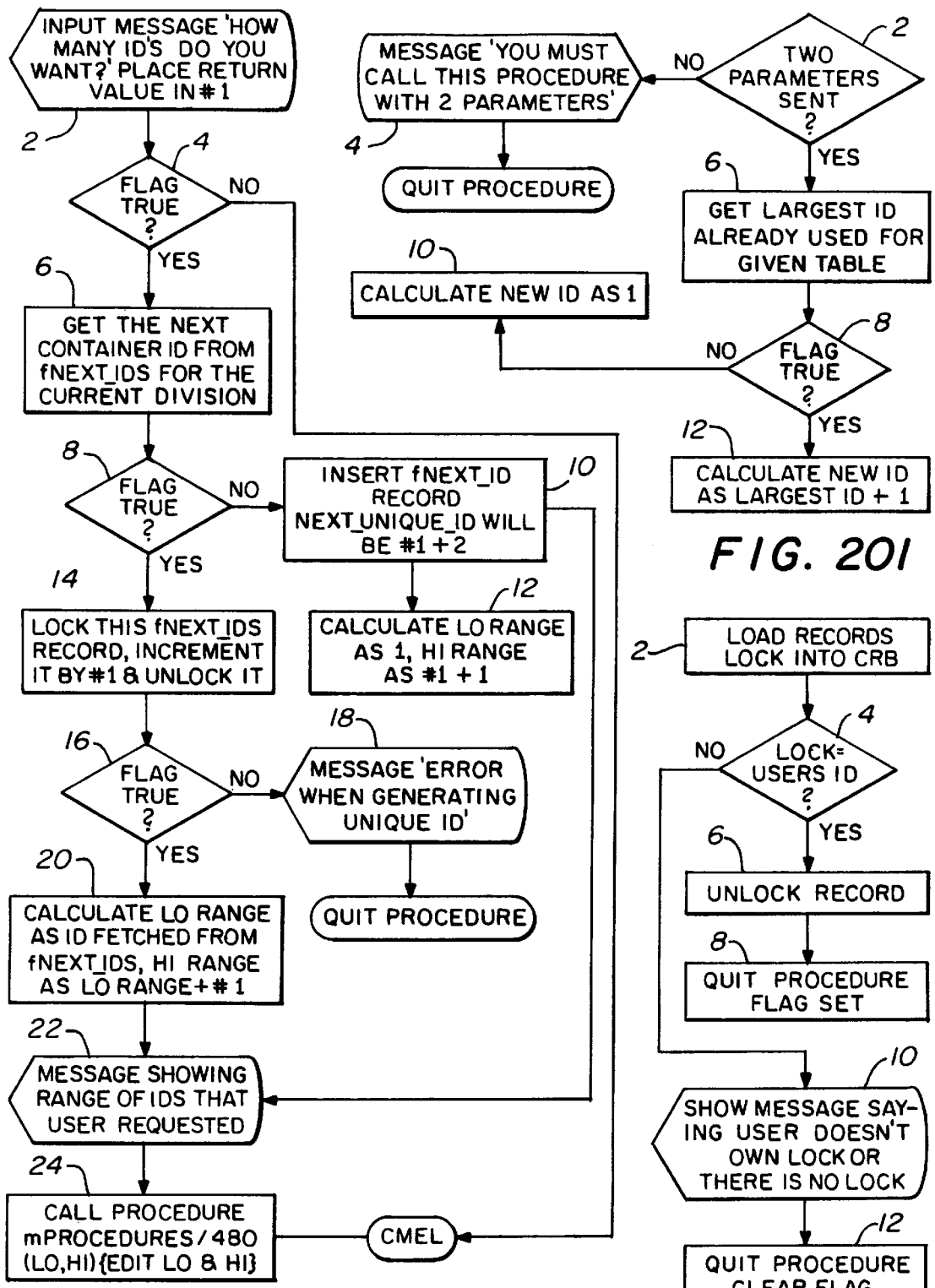
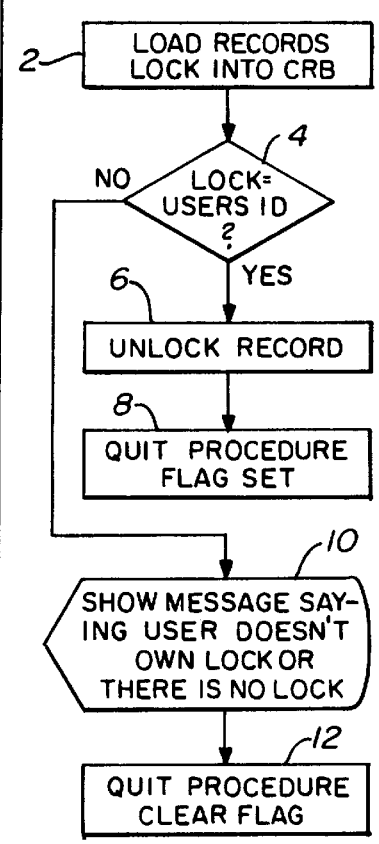
FIG. 200
FIG. 201
FIG. 199

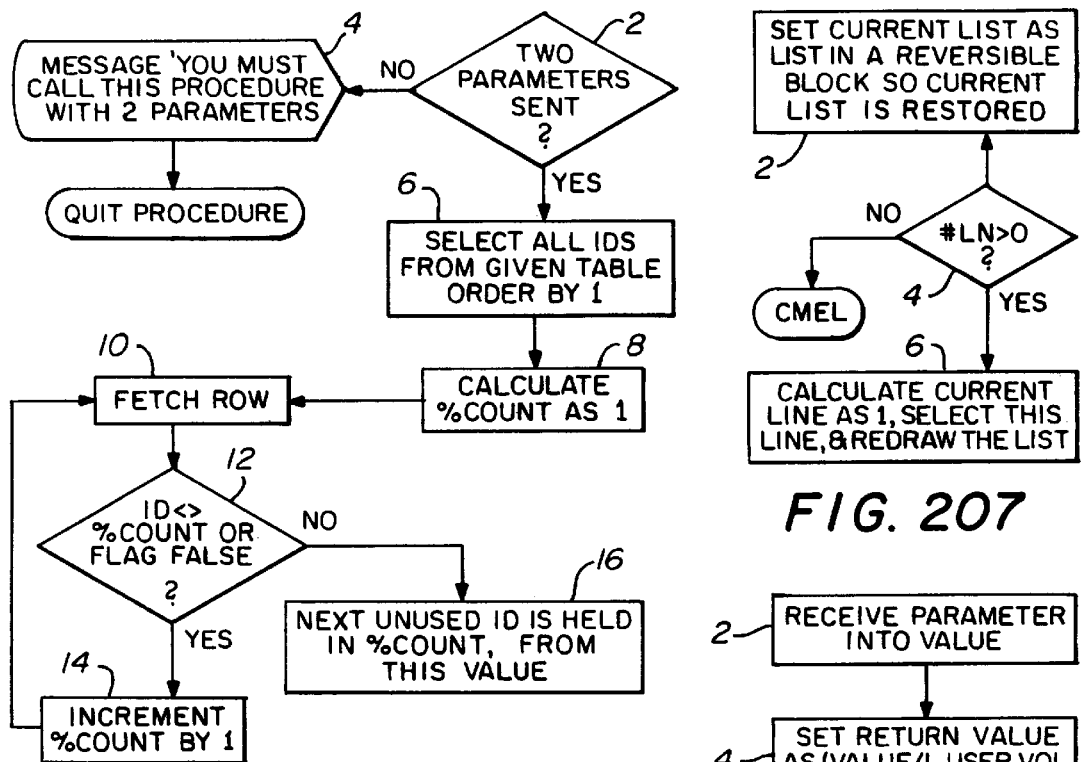
FIG. 202
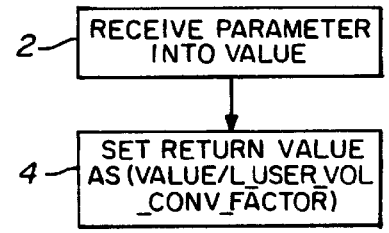
FIG. 207
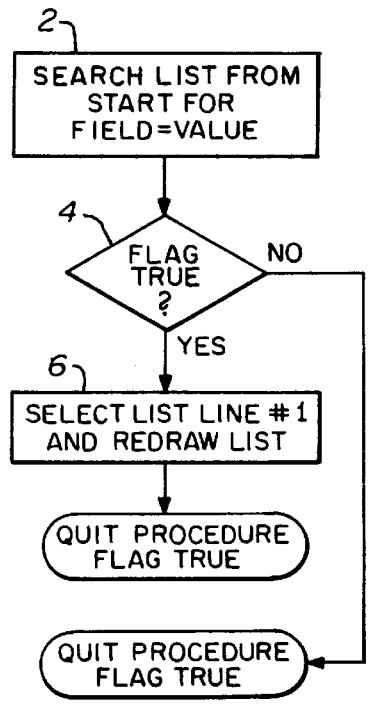
FIG. 206
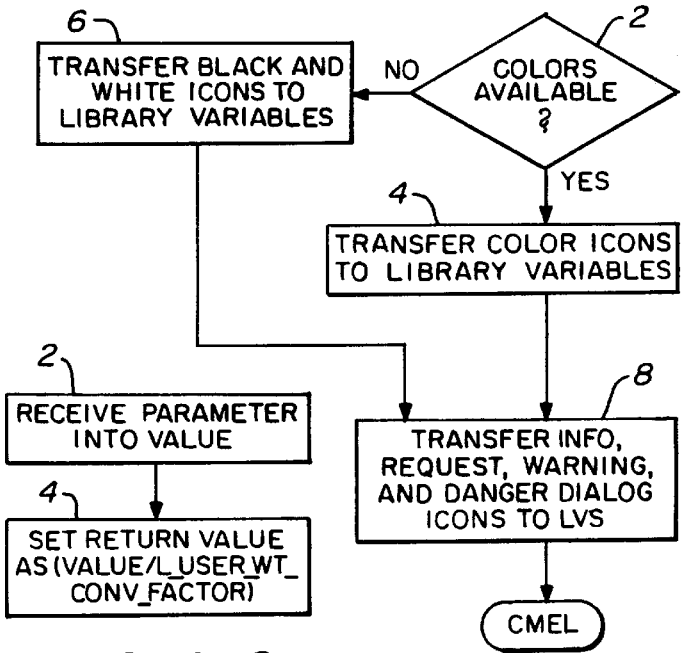
FIG. 210
FIG. 211
FIG. 209

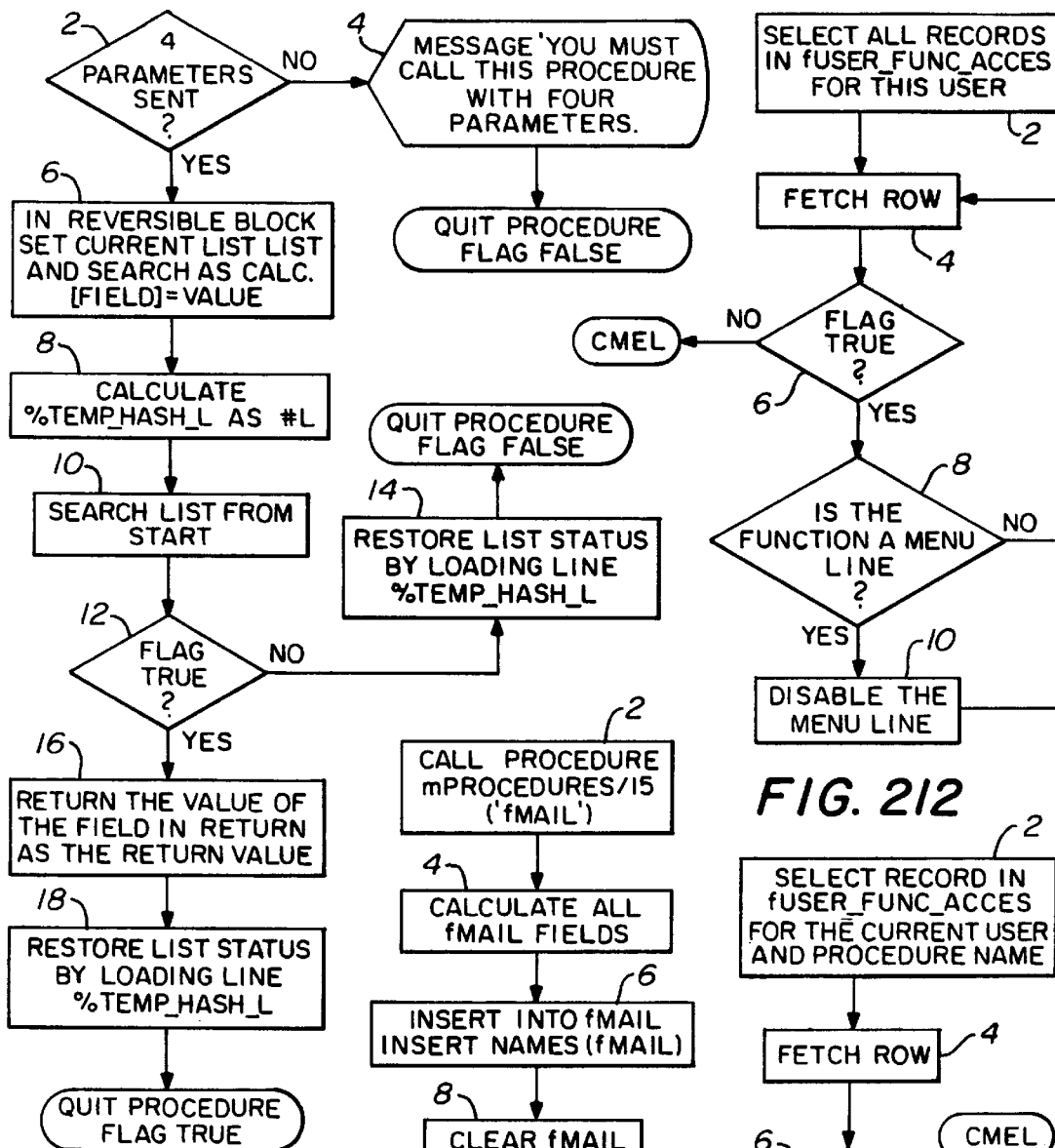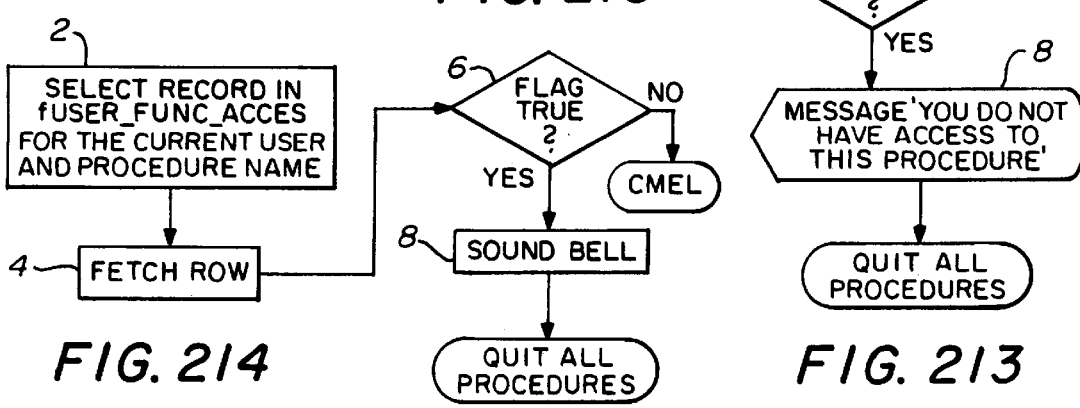

FIG. 223

1. CALL mPROCEDURES/15 ('fTRANSACTIONS') GET NEXT UNIQUE ID
2. TRANSFER fCONT INFO TO fTRANSACTION RECORD

FIG. 224

1. INSERT fTRANSACTION RECORD
2. CALL PROCEDURE mPROCEDURES/17 (CHECK SQL STATEMENT FOR ERRORS)

FIG. 225

2. RECIEVE PARAMETERS AMOUNT_ML, AMOUNT_G AND PARENT OPTIONAL
4. CALL PROCEDURE mPROCEDURES/70 (SET UP TRANSACTION FIELDS)
6. CALCULATE TRANS_TYPE AS 0
8. CALCULATE TRANS_TOT_VOL_CONSUMED AS AMOUNT_ML
10. CALCULATE TRANS_TOT_WT_CONSUMED AS AMOUNT_G
12. CALCULATE TRANS_PARENT_CONT_ID AS PARENT
14. CALCULATE ALL OTHER fTRANSACTION FIELDS AS EMPTY (THOSE NOT ALREADY SET TO SOMETHING)
16. CALL PROCEDURE mPROCEDURES/71 (INSERT TRANSACTION)

FIG. 226

2. CALL PROCEDURE mPROCEDURES/70 (SET UP TRANSACTION FIELDS)
4. CALCULATE TRANS_TYPE AS 1
6. CALCULATE ALL OTHER fTRANSACTION FIELDS AS EMPTY (THOSE NOT ALREADY SET TO SOMETHING)
8. CALL PROCEDURE mPROCEDURES/71 (INSERT TRANSACTION)

FIG. 227

2. CALL PROCEDURE mPROCEDURES/70 (SET UP TRANSACTION FIELDS)
4. CALCULATE TRANS_TYPE AS 2
6. CALCULATE ALL OTHER fTRANSACTION FIELDS AS EMPTY (THOSE NOT ALREADY SET TO SOMETHING)
8. CALL PROCEDURE mPROCEDURES/71 (INSERT TRANSACTION)

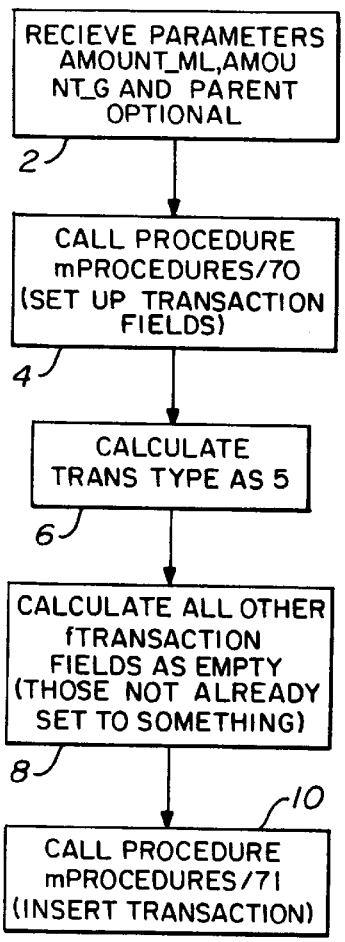
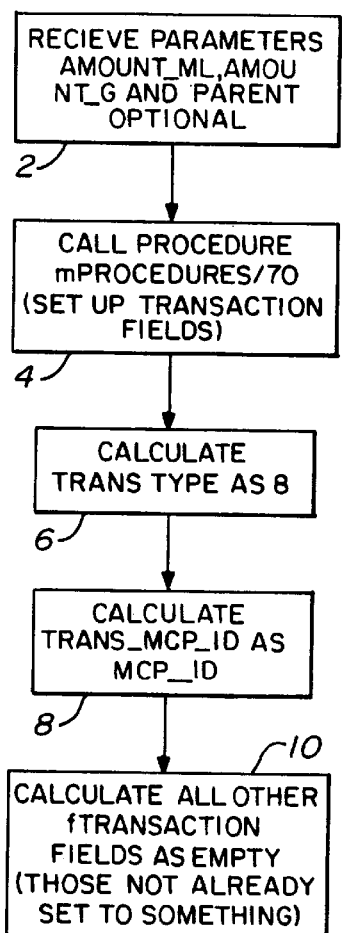
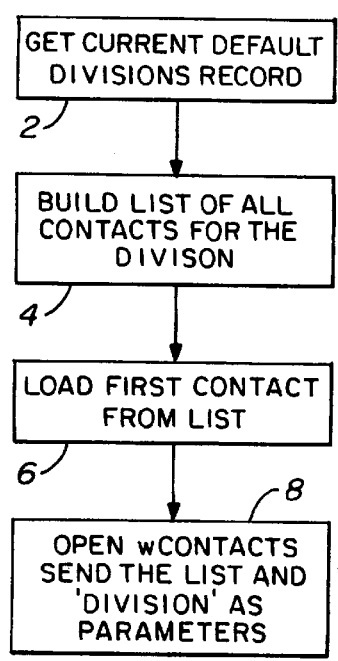
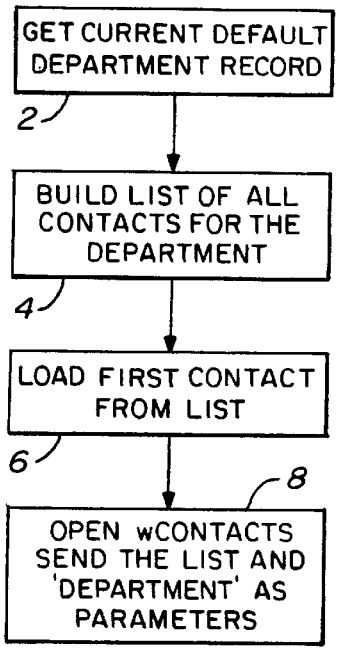
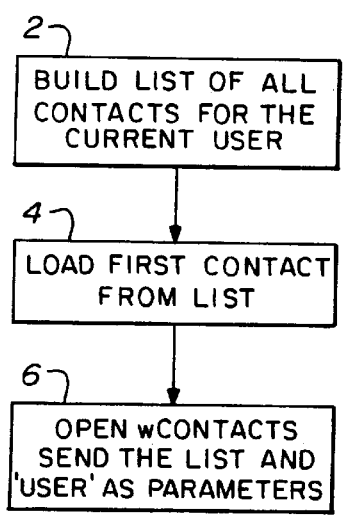
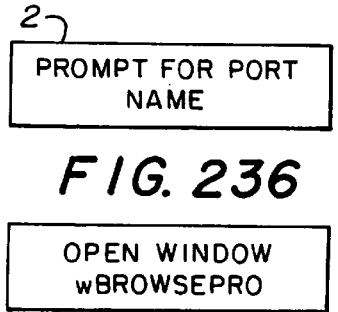
FIG. 231
FIG. 232
FIG. 233
FIG. 234
FIG. 235
FIG. 236
FIG. 237
FIG. 238

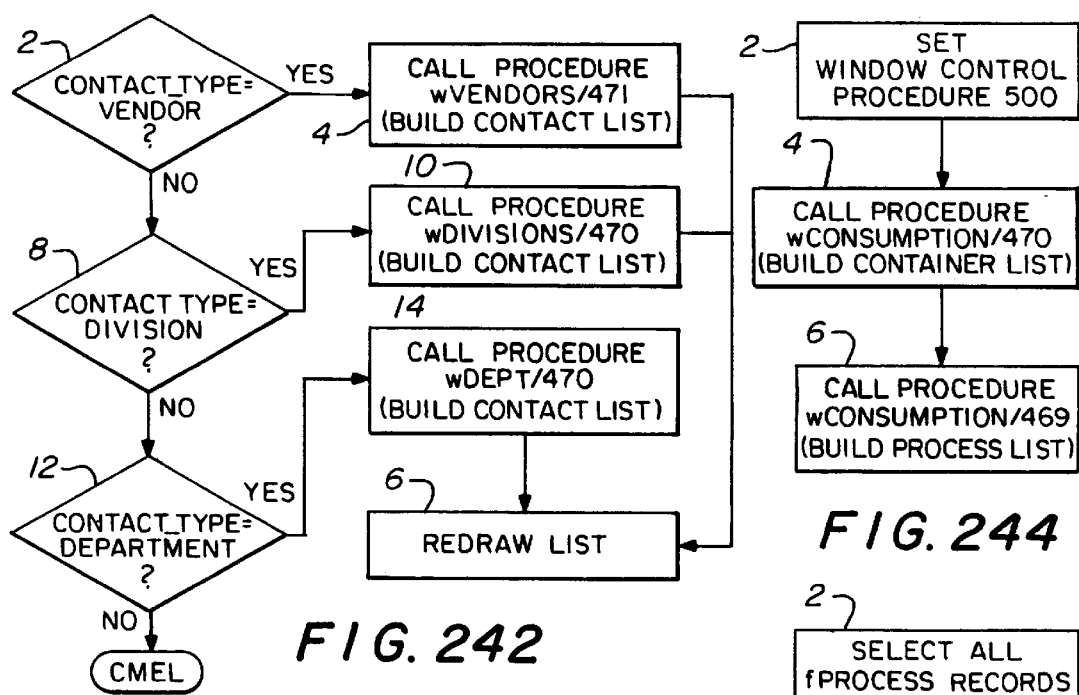
FIG. 242
FIG. 244
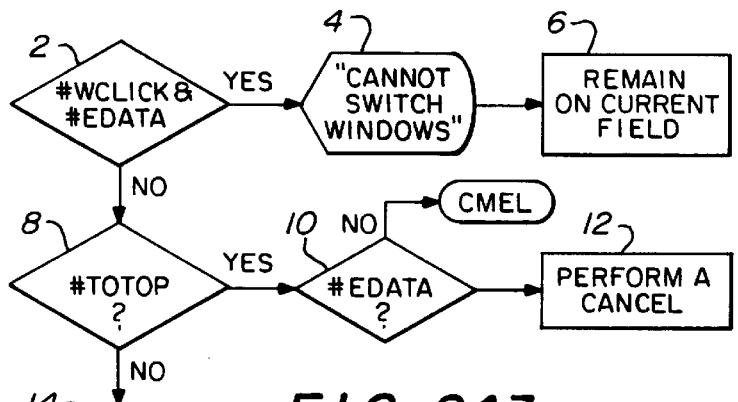
FIG. 243
FIG. 246
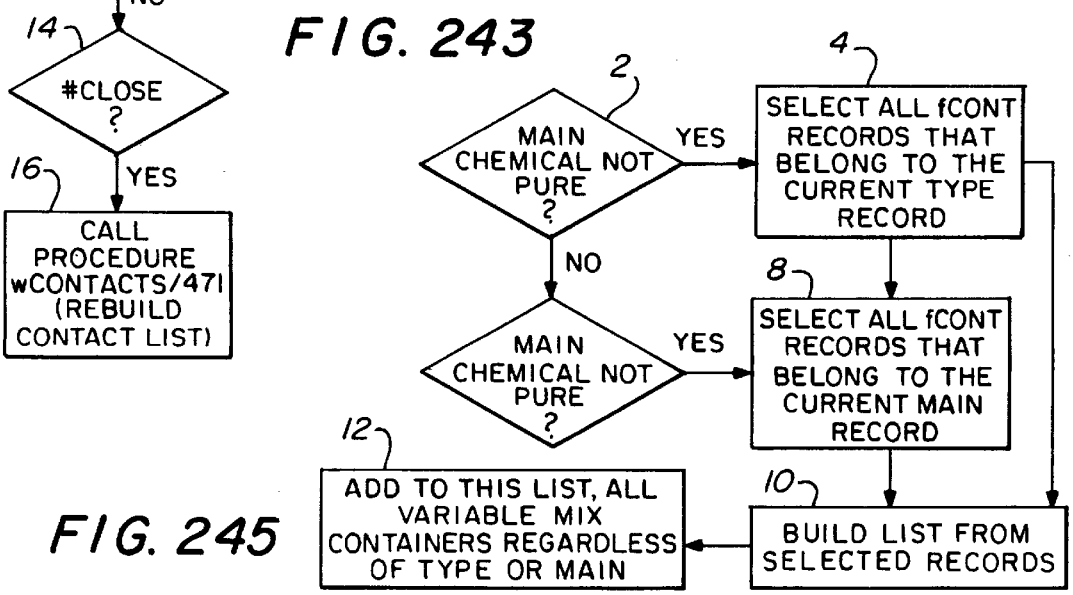
FIG. 245

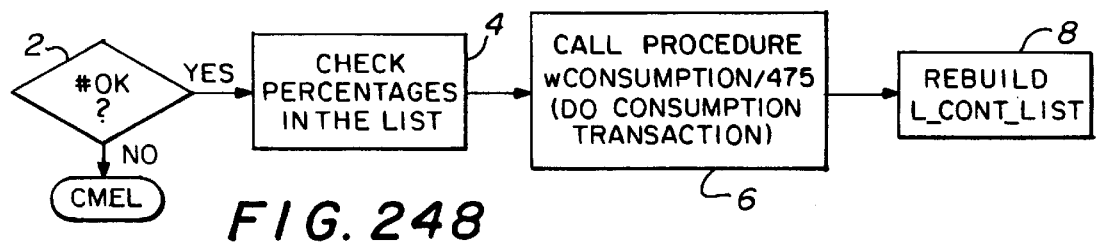
FIG. 248
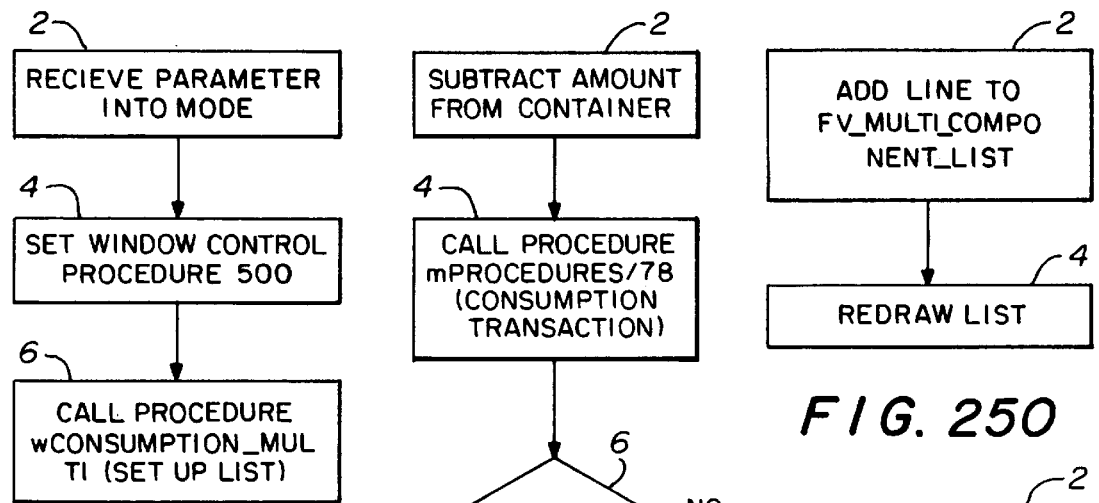
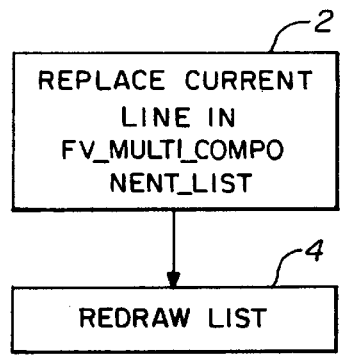
FIG. 250
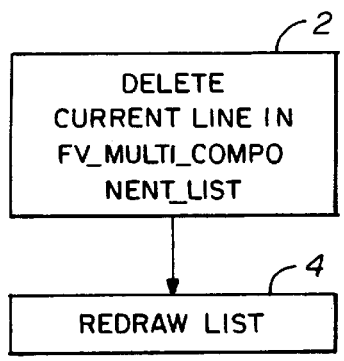
FIG. 251
FIG. 247
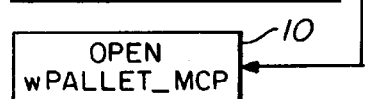
FIG. 249
FIG. 252

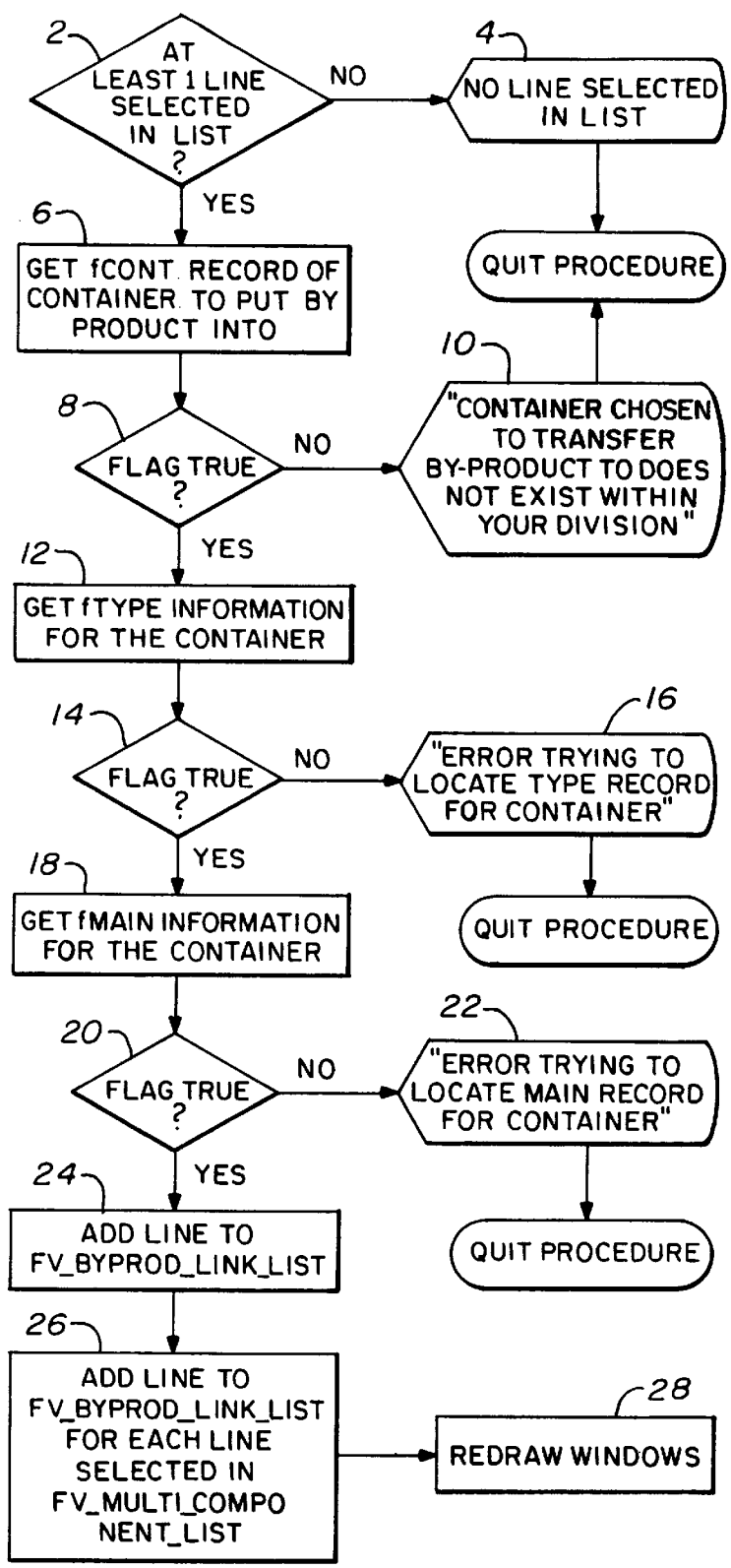
FIG. 253
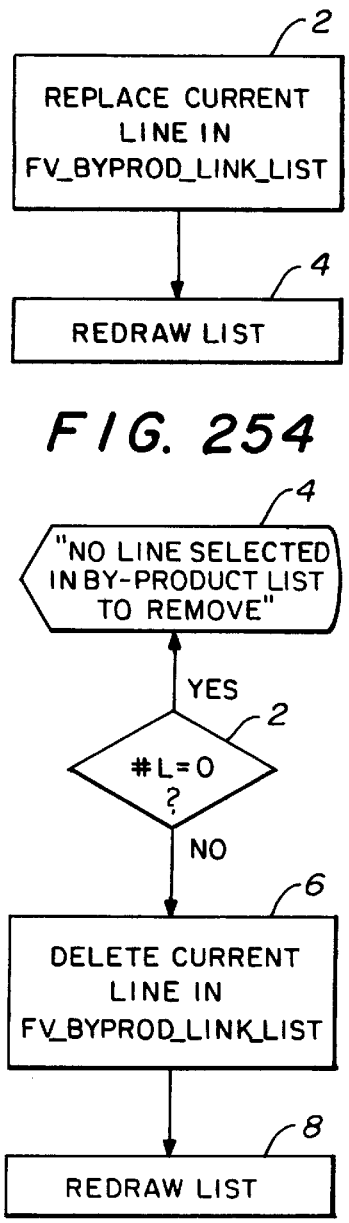
FIG. 254
FIG. 255

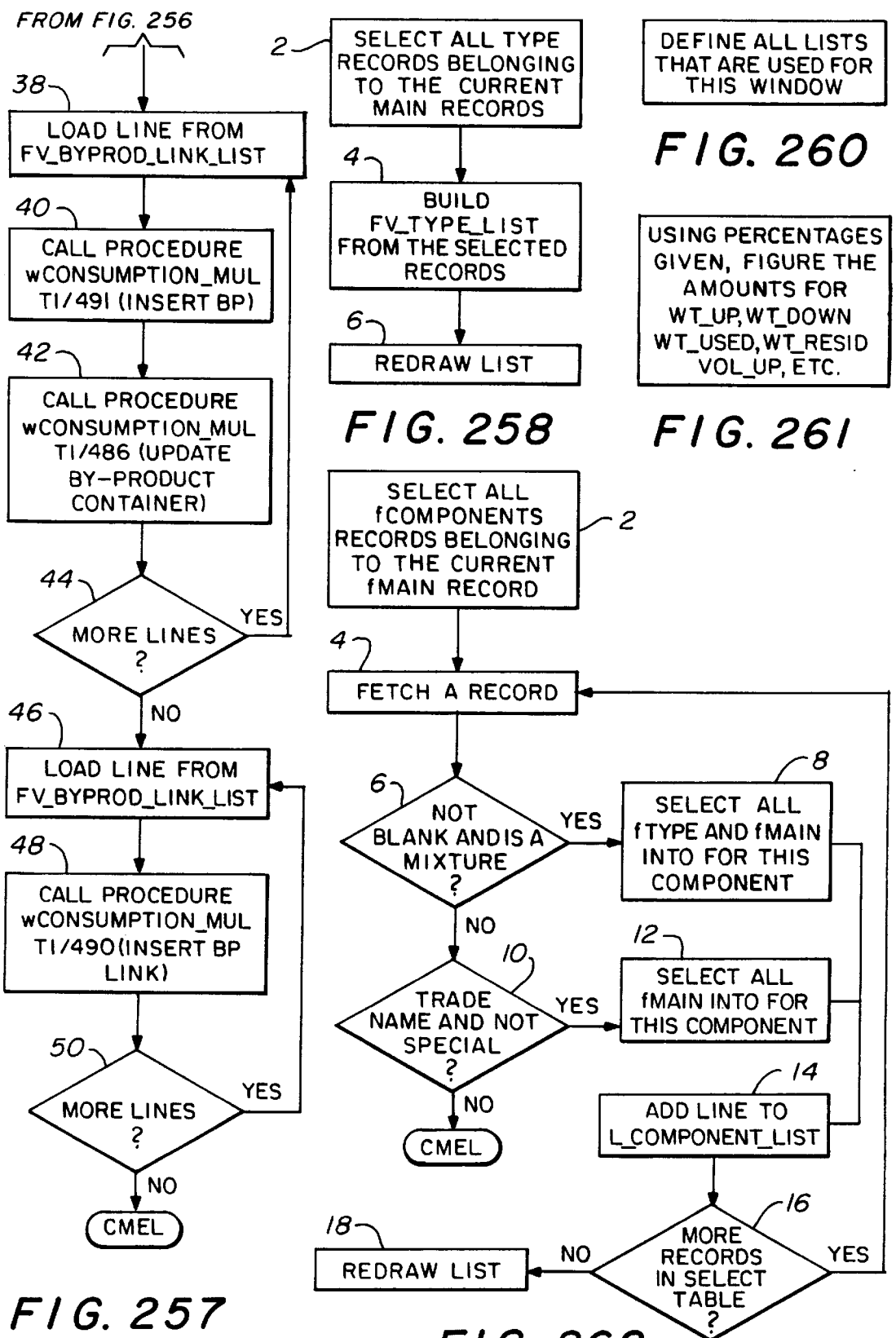

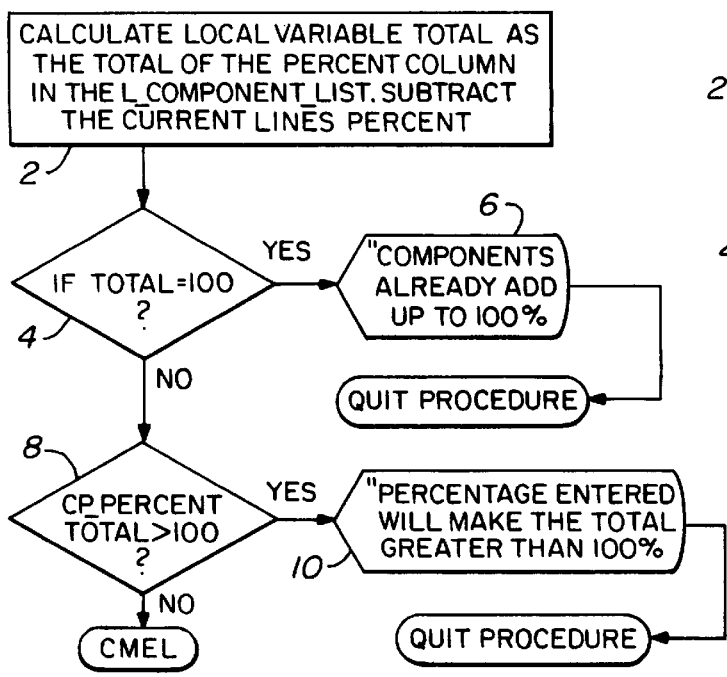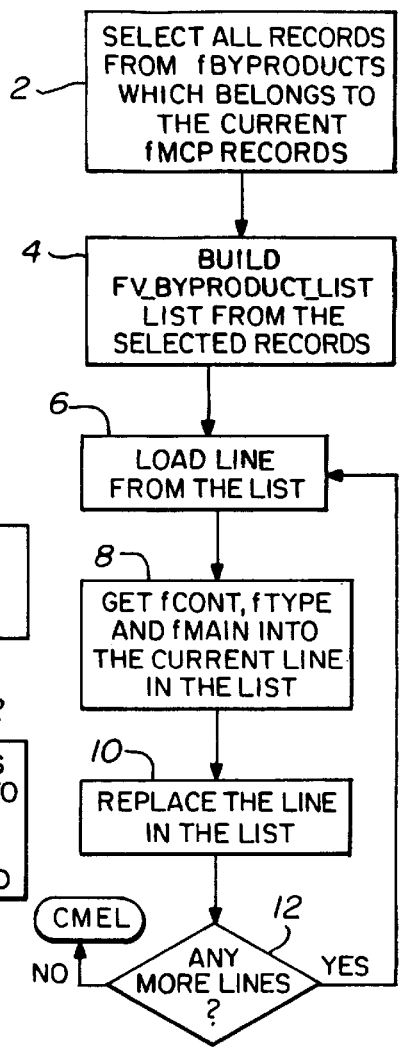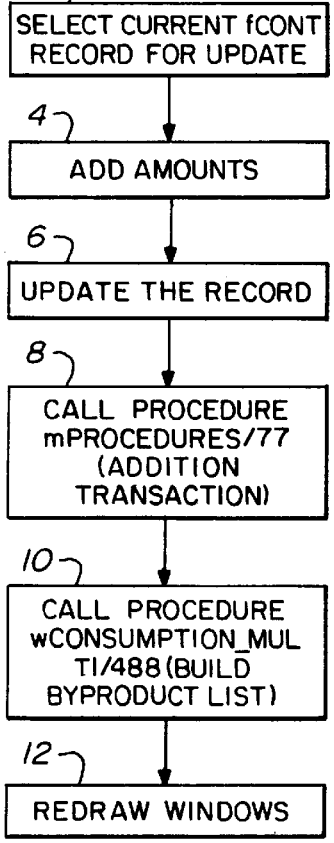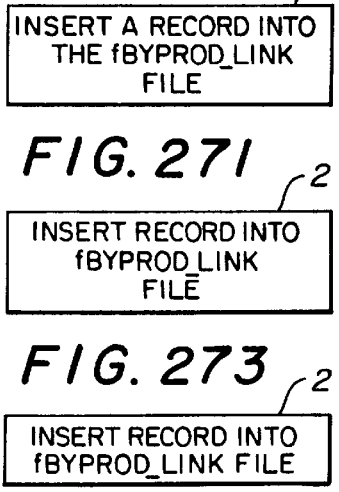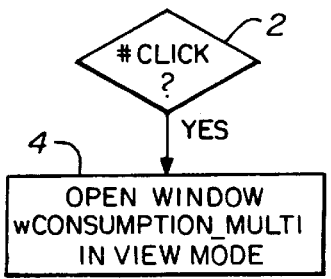

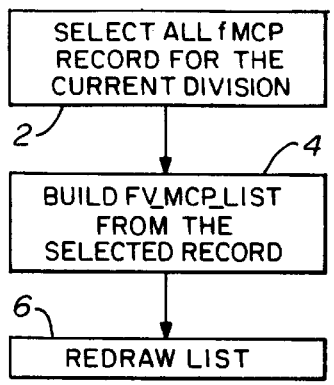
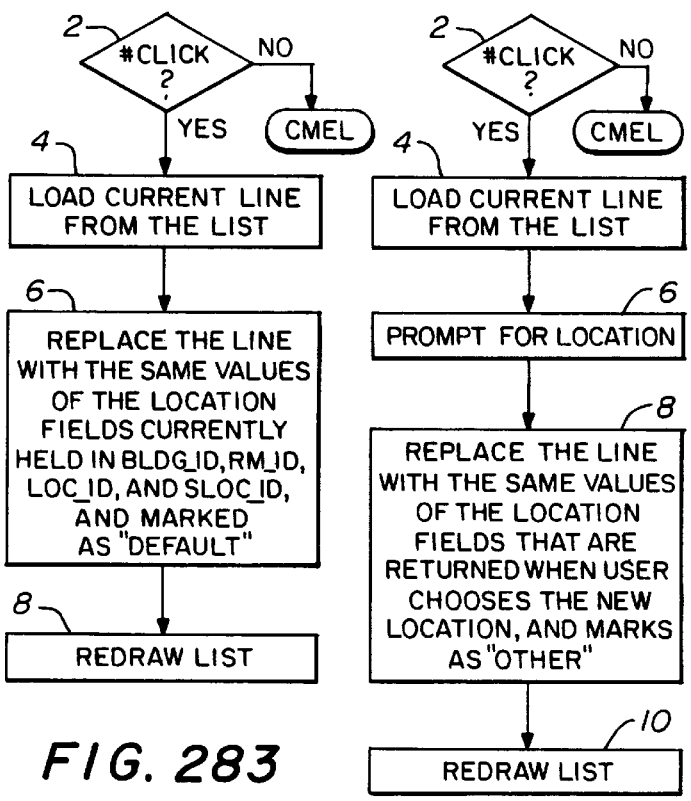
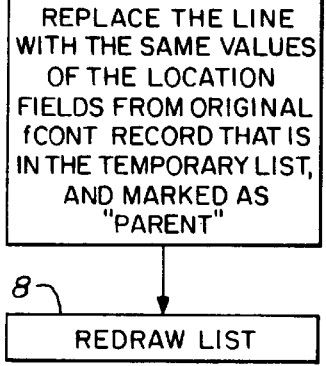
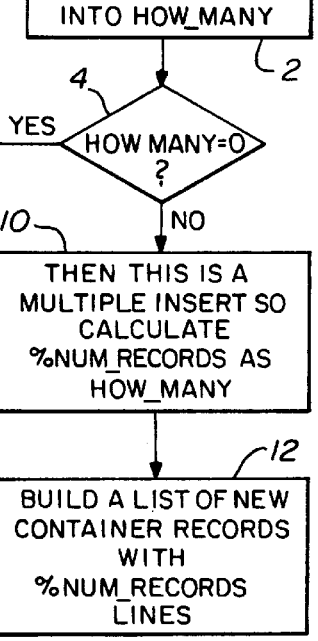
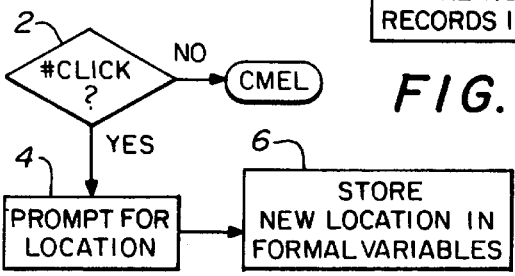

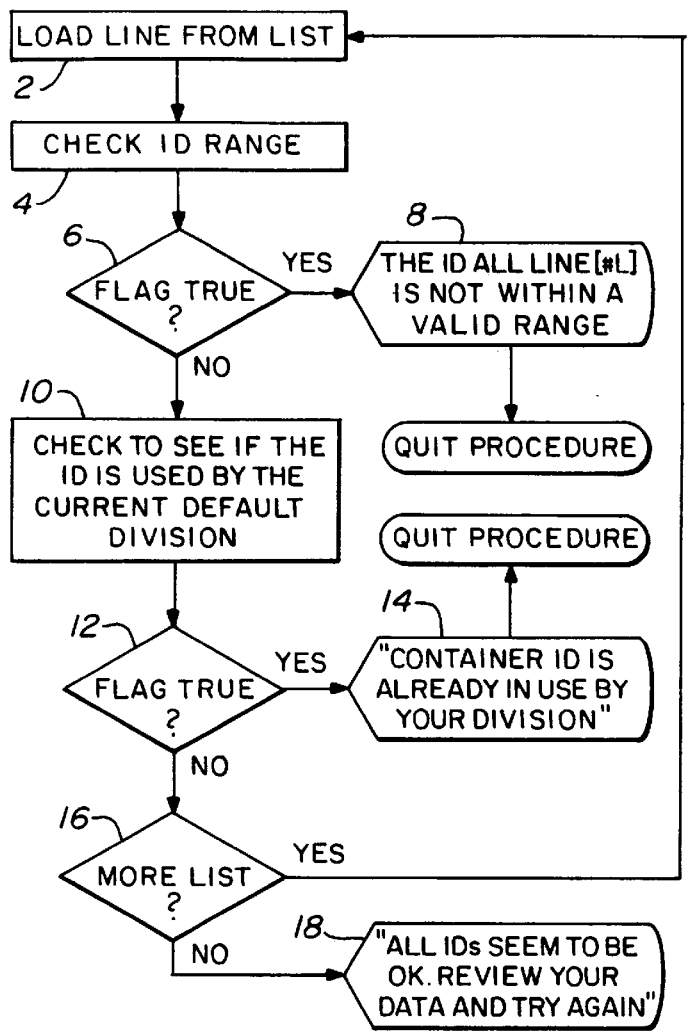
FIG. 287
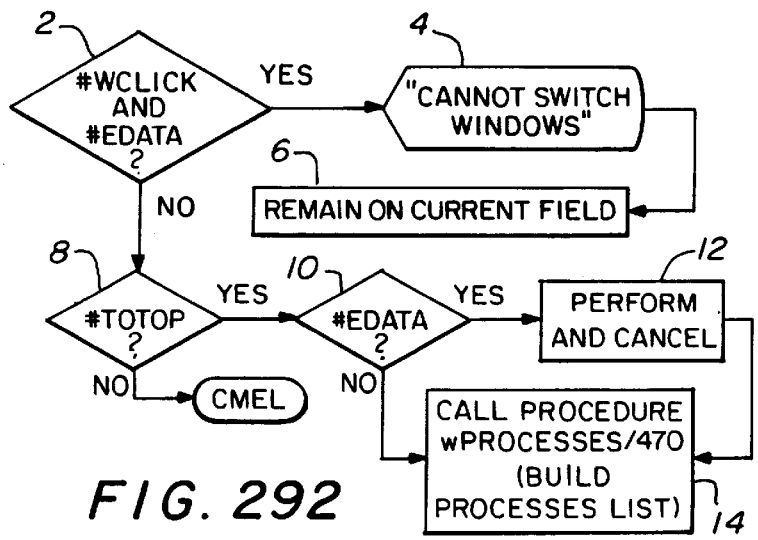
FIG. 292
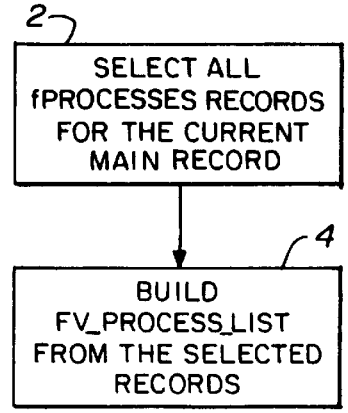
FIG. 290
FIG. 291
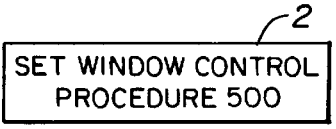
FIG. 293
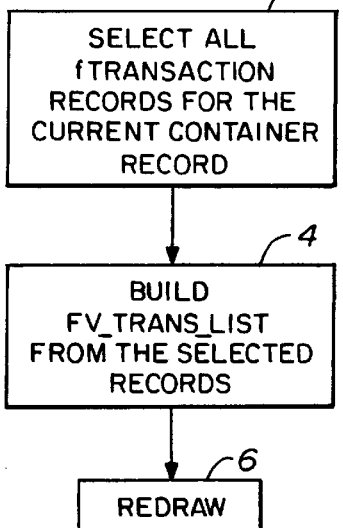
FIG. 294

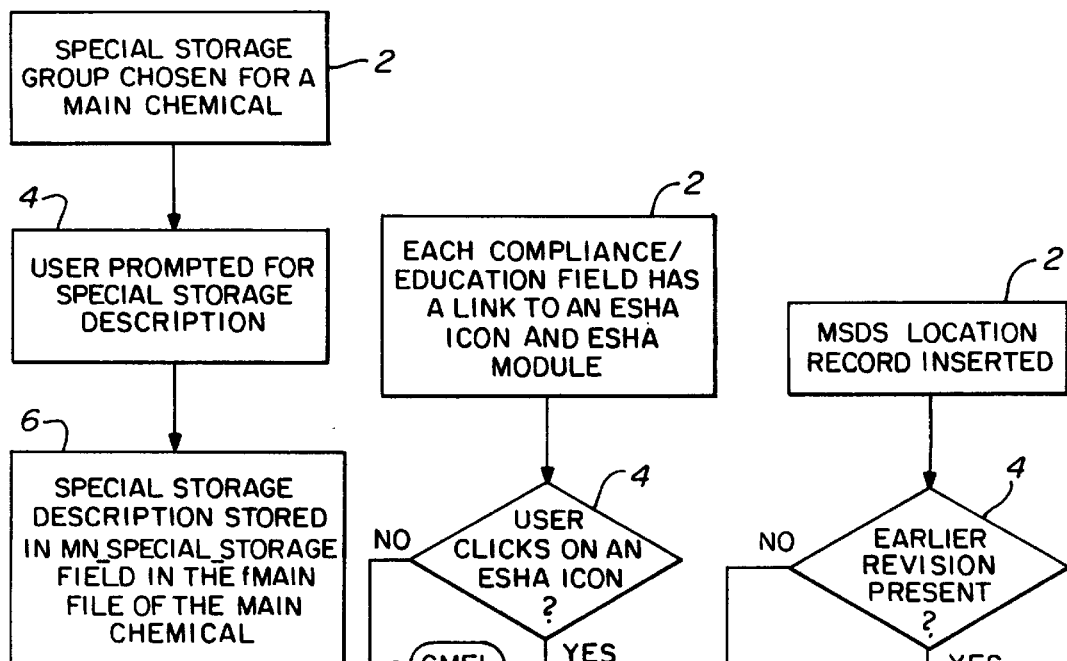
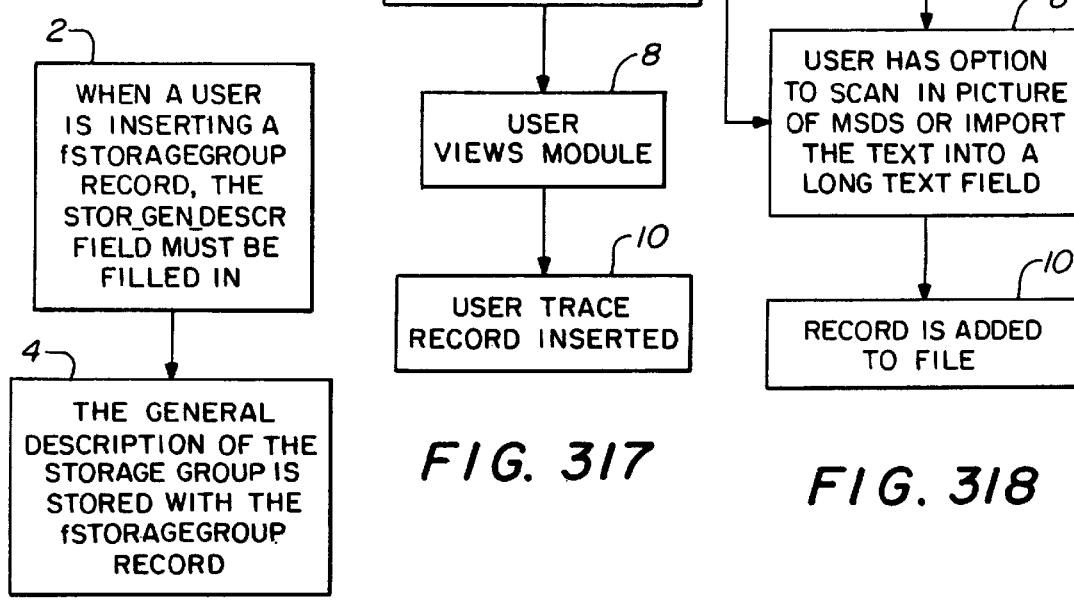

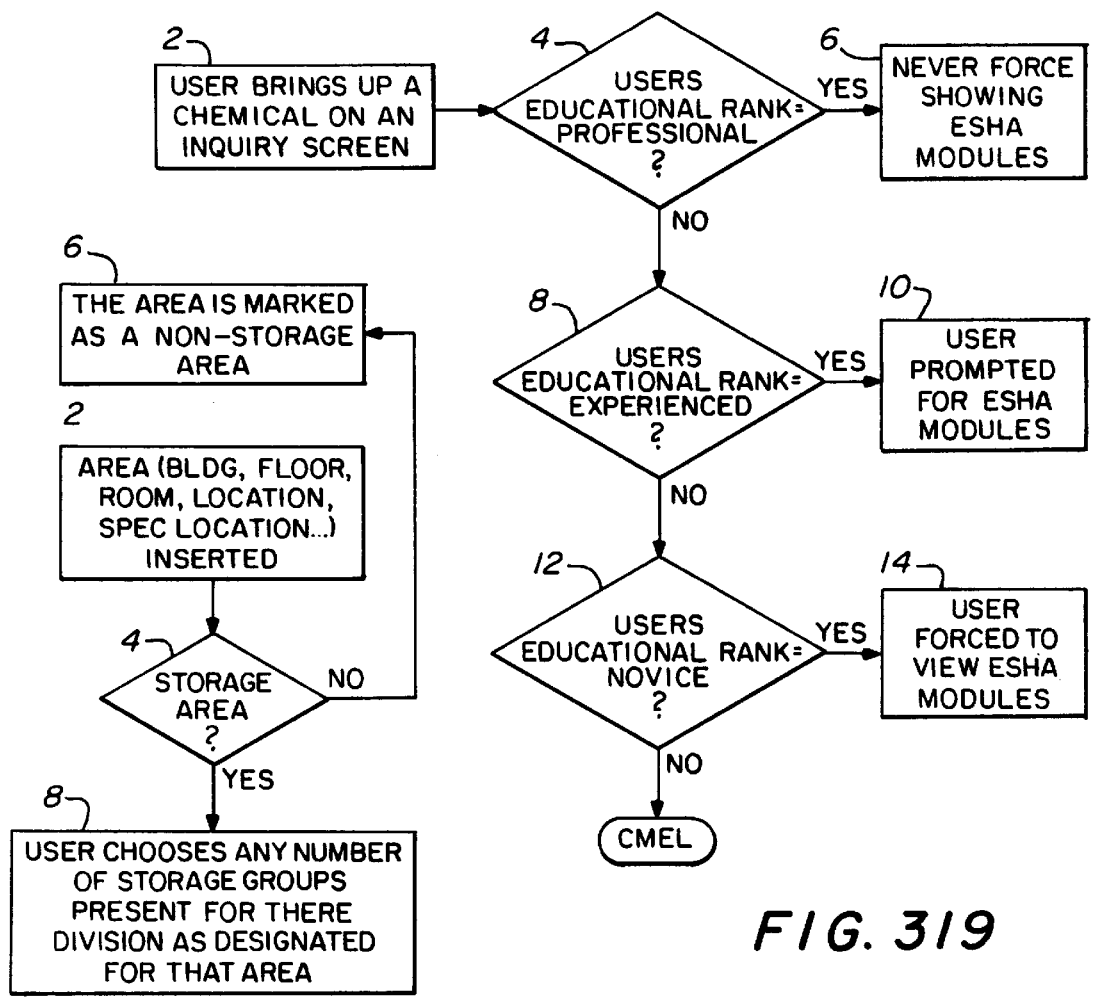
FIG. 319
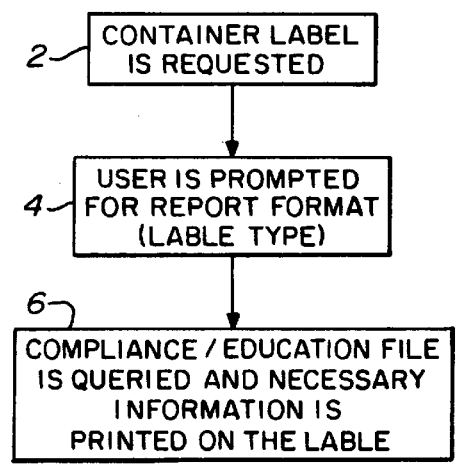
FIG. 316
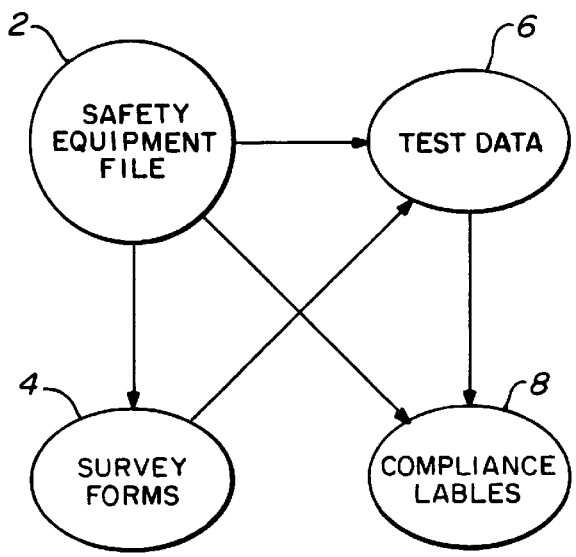
FIG. 320
FIG. 321

HAZARDOUS MATERIALS AND WASTE REDUCTION MANAGEMENT SYSTEM

BACKGROUND OF THE INVENTION

1. Field of the Invention

The present invention relates to materials management systems and more particularly to systems for the management of hazardous and toxic materials especially chemicals.

2. Description of Related Art

The regulation and control of chemicals, hazardous materials, and hazardous wastes by the government is becoming more and more restrictive to the point where institutions such as chemical labs, doctors' offices, and businesses, corporations with a need to handle chemicals, hazardous materials, and hazardous wastes cannot easily stay up to date on the current laws. As used herein the term "chemical" or "chemicals" is defined as hazardous materials, hazardous wastes, or in select cases nonhazardous materials that are but a portion of an inventory containing hazardous materials or wastes. From this point forward and in all documentation pertaining to this invention, the terms "chemical(s), hazardous material(s), hazardous waste(s)" are used interchangeably.

A typical example of problems encountered in the management of hazardous material can be seen from the perspective of an educational institution such as a college or university. Historically there has not been sufficient budgetary and management priority given to developing waste management programs at those type of institutions. Most problems in hazardous material management arise from an institution's lack of awareness about hazardous waste and applicable regulations, the lack of proper training of the employees, highly variable waste streams which contain multiple materials combined together, the high cost and location of off-site treatments, storage and disposal facilities, and the difficulties in complying with the vast and varied hazardous material regulations.

Many different systems exist for retrieving chemical inventories, transmitting chemical records electronically to other facilities, evaluating compliance with environmental and other regulations, or monitor emergency response activities. However, prior art solutions have targeted specific solutions for a specific user which makes it very expensive and difficult for many businesses and institutions to meet the comprehensive requirements involved with using toxic and hazardous materials.

Furthermore, in many organizations chemical inventory management needs vary across the organization. However, the prior art does not provide system design that can alter the inventory design structure to meet the individual needs of the divisions and departments within a multifaceted organization. The inflexibility of present system design forces organizations to do either of the following: 1) purchase, maintain, and update more than one system, which increases the overall costs and makes it more difficult to oversee, coordinate, and manage the chemical inventory management needs of the entire organization; or 2) purchase, maintain, and update one system that forces conformity, which does not address the individual needs within the organization and can cost an organization in regard to time, money, and increased legal jeopardy.

The areas addressed by the prior art are streamlined in the present system regarding specific aspects of hazardous material/chemical management. Present off-the-shelf software packages typically address only one of the following areas of hazardous material/chemical management: 1) hazardous substance information, 2) legislative and regulatory information, 3) hazardous substance inventory management, 4) risk and hazard assessment, 5) training and testing modules, and 6) integrated emergency management. A few software packages address two or at most three of the above areas. In addition, the packages that include hazardous substance inventory management can only accommodate centralized and decentralized inventory methods. None of the prior art systems do the following: 1) true unique inventory tracking methodology, 2) support both bar code and non-bar code tracking, 3) provide comprehensive hazardous/material label printing capabilities that address regulatory compliance issues, 4) incorporate an international design element (important today with the increase in international trade and transfer of information in the everevolving global community), or 5) provide a communication network for users. Furthermore, prior art systems have limited cross platform capabilities and the designs are typically not user friendly.

Therefore, there is a need to provide a comprehensive system to allow institutions the ability to address the full range of hazardous material/chemical management essential today and in the future. Providing this capability helps minimize the amount of hazardous material produced, improves management practices, provides an additional layer of protection to emergency response personnel, provides an international component needed by present institutions working in the international arena, helps train the people to use the system, and educates the individual users regarding safe handling and storage procedures that meet or exceed present regulatory standards.

Therefore there is a need for providing a system to allow institutions to minimize the amount of hazardous waste materials produced, improve the management practices, and to help train the people using the system. Further, it would be desirable to provide a system that provides information for evaluating chemical reactions, toxicity of chemicals, chemical storage and handling procedures, and chemical disposal guidelines.

In addition, the ever-increasing sensitivity to environmental and health issues and the inherent dangers of handling, storing, and disposing of chemicals are of major concern. The sheer number of chemicals readily available at a typical laboratory makes the adequate training of employees in the proper handling of these chemicals nearly impossible without some form of assistance. Also, increasing federal, state, and local environmental/health regulations pose an overwhelming information management problem which, if not addressed, could result in debilitating fines and possible crippling financial liability to the institution.

Therefore, it would be desirable to provide an information and compliance database system that provides the user with a wide variety of critical information including handling, storage, and emergency response methods and guidelines for a cradle-to-grave management of hazardous chemicals and waste.

SUMMARY OF THE INVENTION

The present invention meets the shortcomings of the prior art and provides a comprehensive chemical management system. The chemical management system of the present invention comprises a computer having an input device, a display, and a chemical inventory control system coupled to the computer. The chemical inventory control system includes user selection of the following:

1) a central control station that monitors and places a unique identification on the inflow of chemical containers to the station, monitors the storage of chemicals, monitors and places a unique identification on the new chemical containers created by transfer from an original container(s) or by the mixing of chemicals from various stored chemical containers into a new container (s), and monitors the outflow of chemicals from a central station as waste or surplus;

2) a plurality of combined chemical receiving and outflow stations wherein each station monitors and places a unique identification on the inflow of chemical containers to the stations, monitors the storage of chemicals, monitors and places a unique identification on the new chemical containers created by transfer from an original container(s), or by the mixing of chemicals from various stored chemical containers into new container(s), and the outflow of surplus and waste chemicals;

3) a plurality of combined chemical receiving and outflow stations wherein each station monitors and places a unique identification on the inflow of chemical containers to the stations, monitors the storage of chemicals, monitors and places a unique identification on the new chemical containers created by transfer from an original container(s) or by the mixing of chemicals from various stored chemical containers into a new container(s), monitors, and uniquely tracks by use of the unique identification the creation/ maintaining of a transaction file for each individual chemical container throughout the container's life from inflow to outflow, and monitors the outflow of surplus and waste chemicals; and 4) a plurality of mixtures of any of the above three defined systems.

The chemical management system further includes a unique inventory classification design structure that allows an organization to disable at the division or department level function rights for all users having access rights to the division(s) and department(s). This unique and powerful design tool will allow the organization to set different chemical inventory parameters. This will allow the organization at the highest level to alter the chemical inventory group and class structure, within the chemical inventory design, and to address the individual requirements of divisions and departments throughout the organization. For example, the chemical inventory design structure in its entirety includes the following three primary groups:

1) In-use,
2) Surplus, and
3) Waste.

Under each primary group the following four classifications:

1) Pure,
2) Trade name,
3) Preset Mix, and
4) Variable Mix.

This internal design tool will allow an organization to set up 35 different chemical inventory design structures by disabling different combinations of the above three groups and four classes, always leaving at least one group and one class operational. However, there are literally hundreds of other various combinations regarding the overall chemical management system that could be created by using the function access rights option for divisions and departments.

Furthermore, regarding chemical management, a unique password is provided for each user and the viewing of measurement data for chemical containers can be set for the user's personal preference. For example, a user's personal view preference regarding dry measurement data can be set for pounds, ounces, kilograms, or grams, and wet measurement data set for liters, milliliters, gallons, or fluid ounces. A default is set for each user's personal measurement preference but can be easily altered, by the user, when the need arises.

An environmental, safety, and health (ESH) information system is also coupled to the computer and includes user-created, unique, and customized chemical compatibility storage groups that always include one unalterable storage group. Each chemical group is preferably color-coded for a particular chemical storage area. The groups designate storage areas and nonchemical storage areas within facilities corresponding to the system. Designated chemical storage areas can be classified for the following uses: 1) hazardous material storage only, 2) hazardous material use only, or 3) a combination of hazardous material use and storage. Designated chemical storage areas, nonchemical storage areas, safety equipment placement, etc., can be viewed within the unique mapping design of the system. This design allows for the following views within a building: 1) elevation view indicating the floor(s), 2) plan view of particular floor, 3) plan view of a particular room, and 4) a plan view, or example, of shelving, cabinet, or other object where chemicals are stored. The system mapping design supports the import of numerous drawings, PICT files, scanned images, etc. In addition, various buttons can be placed in the views and be set when activated to do the following: 1) search and list chemicals located within a particular building, floor, room, general location, or specific location, and 2) indicate on the various maps, locations of chemical storage groups, designated storage areas, nonstorage areas, safety equipment, etc.

The system also includes a compliance/education file into which once pertinent information is inserted, allows the printing of compliance labels to meet government environment and health regulations for both new containers generated on site and for old containers that need replacement labels. The compliance/education file also links to ESH icons that display visual representation of hazard warning relating to each particular hazardous material. Training and education data can be created by the user or downloaded/ accessed from other systems and linked to each icon and information displayed by clicking on said icon. Users can be designated as one of the following within the system and are prompted regarding ESH: 1) professional: icon prompts, 2) experienced: icon prompts and warning material review required, and 3) novice: icon prompts warning material review is required, and specific responses documenting that material review and understanding has occurred.

A safety equipment management system is coupled to the computer and generates an accurate record according to government standards. Safety equipment covered under the system includes exhaust systems and eyewash and safety showers, as well as generic safety equipment that does not fall under required or defined safety equipment.

An international chemical compatibility system is coupled to the computer system to include a multi-tiered compliance and education design. This includes a system to create compliance/education files for any country in the world with means for enabling text conversions to the foreign language of a selected country.

An integrated emergency response system is coupled to the computer system to include an ability for emergency organizations such as the fire departments, hazardous waste teams, emergency medical services, and the like to access pertinent data regarding ESH, fire ingress and egress, and integrated emergency management. The outside emergency organization, once provided both access and linkage by a computer to the chemical management system of an organization, has both view and report printing function rights in all but sensitive areas. The option to search, view, and print various chemical lists and various maps, for example, that pinpoint dangerous chemical storage areas, nonstorage areas, and fire ingress and egress routes provide both powerful and invaluable tools for integrated emergency planning and support of emergency operations that occur at the organization's site.

Finally, the overall system is designed to operate on a plurality of host platforms, each at a plurality of different locations within an organization. These platforms include, but are not limited to, Macintosh, Microsoft Windows, OS/2, Windows NT, and the like.

BRIEF DESCRIPTION OF THE DRAWINGS

These and other features of the present invention will be more fully disclosed in the following DESCRIPTION OF THE PREFERRED EMBODIMENT in which like numerals represent like elements and in which:

FIG. 2C is yet another alternative method of using the present system;

FIG. 3 is a flow chart of a single stand alone version of the present system;

FIG. 4 is a flow chart of a centralized version of the present system;

FIG. 5A is a block diagram representing an example of using a central database server;

FIG. 5B is another example of using a central database server;

FIG. 6 is a window or screen for the administrative set-up of the present invention;

FIG. 7 is an example of a user window according to the present invention;

FIG. 8 is an example of a user preferences window;

FIG. 10 is an example of a department rights window;

FIG. 11 is an example of a logon window;

FIG. 12 is an example of a trace log for the a user;

FIG. 13 is an example of a window indicating all logged on users;

FIG. 14 is a block diagram of the system division/department hierarchy;

FIG. 15 is an example of a division records window;

FIG. 16 is an example of a department records window;

FIG. 17 is a example of a department access list window;

FIG. 18A is a block diagram of an example of a simple small institution;

FIG. 18B is another block diagram of a small institution;

FIG. 19A is an example of a large institution using the hierarchy of FIG. 14;

FIG. 19B is another example of a large industry using the hierarchy of FIG. 14;

FIG. 21A is an example of an in-use inquiry window for multiple departments;

FIG. 21B is an example of an in-use inquiry window for a particular department;

FIG. 25A is an example of an in-use inquiry window for multiple departments indicating the availability of surplus;

FIG. 25B is an example of an in-use inquiry window for multiple departments for a specific preset mix substance;

FIG. 25C is an in-use inquiry window for multiple departments for a specific trade name product;

FIG. 25D is an example of an in-use inquiry window for a variable mix product;

FIG. 26 is an example of a components window;

FIG. 28A is an example of a surplus inquiry window for a trade name;

FIG. 28B is an example of a surplus inquiry window for a preset mix substance;

FIG. 28C is an example of a surplus inquiry window for a pure substance;

FIG. 28D is an example of a surplus inquiry window for a variable mix substance;

FIG. 29A is an example of a waste inquiry window for a pure substance;

FIG. 29B is an example of a waste inquiry window for a preset mix substance;

FIG. 29C is an example of a waste inquiry window for a trade name substance;

FIG. 29D is an example of a waste inquiry window for a variable mix substance;

FIG. 32 is an example of a main chemical records window;

FIG. 33 is an example of a list of synonyms window;

FIG. 34 is an example of a groupings window;

FIG. 35 is an example of a main chemical records window showing the grouping field expanded;

FIG. 38 is an example of an in-use inquiry window;

FIG. 40 is an example of grade codes window;

FIG. 41 is an example of a description codes window;

FIG. 42 is an example of a chemical type/vendor records window for a trade name chemical;

FIG. 43 is an example of a in-use container records window;

FIG. 44 is an example of a in-use container records window with the departments field expanded;

FIG. 45 is an example of an in-use container records window with the container type field expanded;

FIG. 46 is an example of a container types window;

FIG. 47 is an example of a open multicontainer window;

FIGS. 48A, 48B, and 48C are examples of windows showing the insertion of a substance amount into a container using a visual graphical image to insert the amount;

FIG. 49 is an example of an in-use inquiry window showing the weight and volumes in grams and milliliters;

FIG. 50 is an example of an in-use inquiry window showing the weight and volume in pounds and gallons;

FIG. 51 is an example of a conversions window;

FIG. 52 is an example of an in-use containers record window showing the manufacturer field expanded;

FIG. 57 is an example of in-use container records window showing the floor field expanded;

FIG. 59 is an example of an in-use container records window showing the room field expanded;

FIG. 62 is an example of a location set-up window;

FIG. 63 is an example of in-use container records window showing the specific location field expanded;

FIG. 64A is a partial view of the window of FIG. 64C;

FIG. 64B is a partial view of the window of FIG. 64C;

FIG. 64C is an example of in-use inquiry window;

FIG. 64D is an example of an in-use container records window;

FIG. 65 is an example of an in-use inquiry window;

FIG. 68 is an example of a user define report window;

FIG. 69 is an example of a screen report window;

FIG. 70 is an example of a bar code reader program editor window;

FIG. 71 is an example of a bar code interface window;

FIG. 72 is a modified block diagram with a procedure for using a bar code reader;

FIG. 72' is an example of a transfer to other department window;

FIG. 73 is a modified block diagram of an alternative method of using a bar code reader;

FIG. 73' is an example of a transfer to new container window;

FIG. 74 is an example of a transfer to existing container window;

FIG. 75 is an example of a transfer to new location window;

FIG. 76 is an example of a transactions window for a particular container;

FIG. 77 is an example of a single process for container window;

FIG. 78 is an example of a processes window;

FIG. 79 is an example of a multiple consumption process components window;

FIG. 80 is an example of a multiple consumption processes window;

FIG. 86 is an example of a personal notes window;

FIG. 87 is an example of a chemical vendors window;

FIG. 89A is an example of a storage group records window;

FIG. 91 is an example of trace log window for a particular user;

FIG. 92 is an example of an in-use inquiry window;

FIG. 93 is an example of the safety and information window;

FIG. 94 is a block diagram showing the system receiving data from regulatory agency data bases;

FIG. 95 is a block diagram representing the entry of data into the system from compliance data books;

FIG. 96 sets forth the various environmental, health, and safety icons used in the present system;

FIG. 97 is an example of a user educational window;

FIG. 98 is an example of a training session window;

FIG. 99 is an example of a MSDS location records window;

FIG. 100 is an example of a chemical compliance label;

FIG. 101 is an example of a hood certification label;

FIG. 102 is an example of a partial view of an inspection form;

FIG. 103 is a systems functional operations chart;

FIG. 104 is an administrator's menu;

Figure 109:
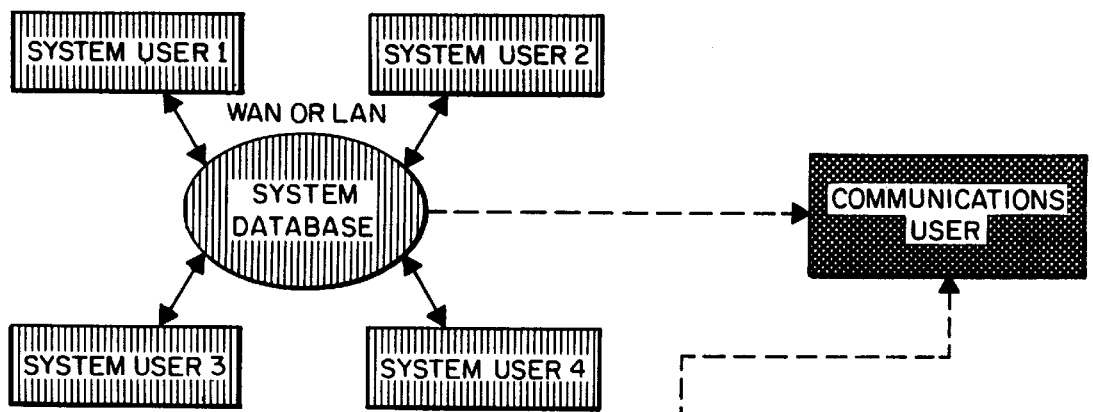
Figure 110:
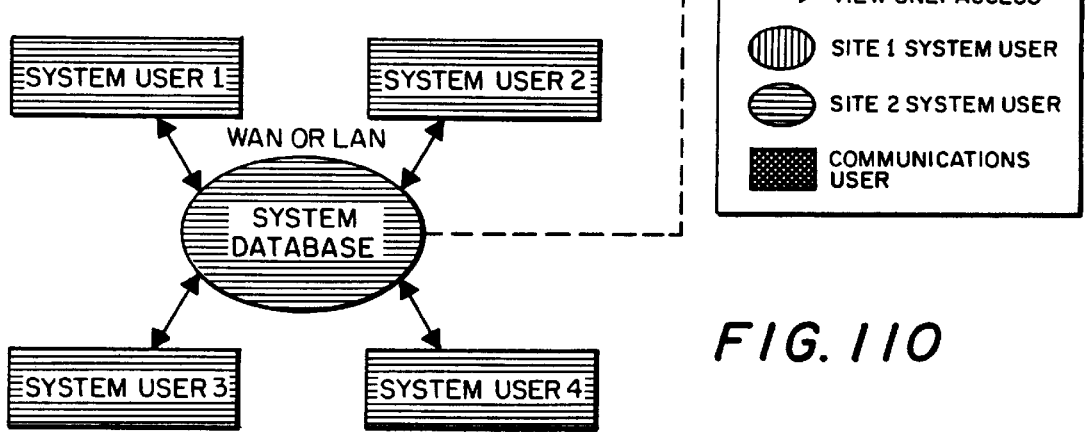
Figures 111, 112, 113:
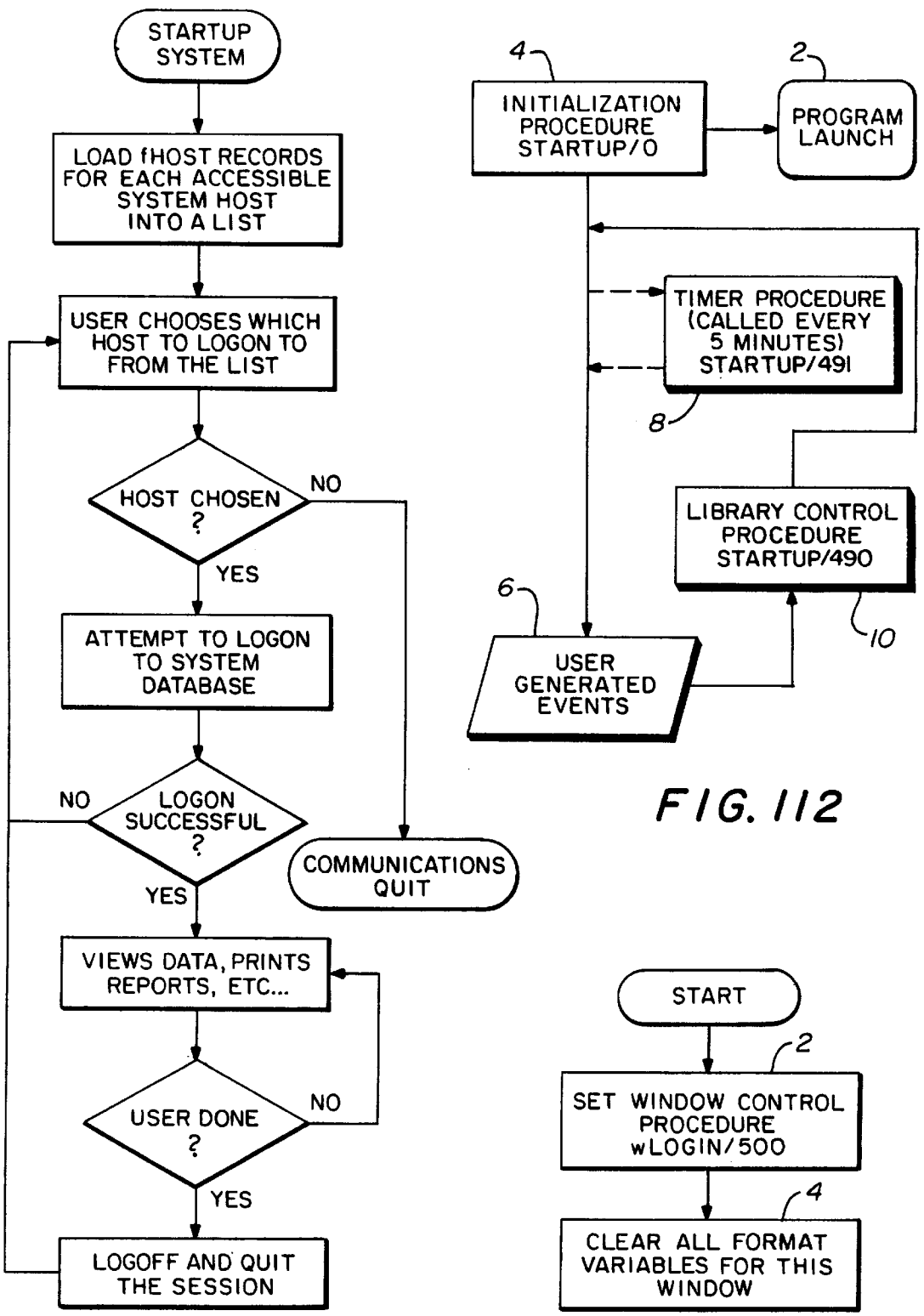
Figure 114:
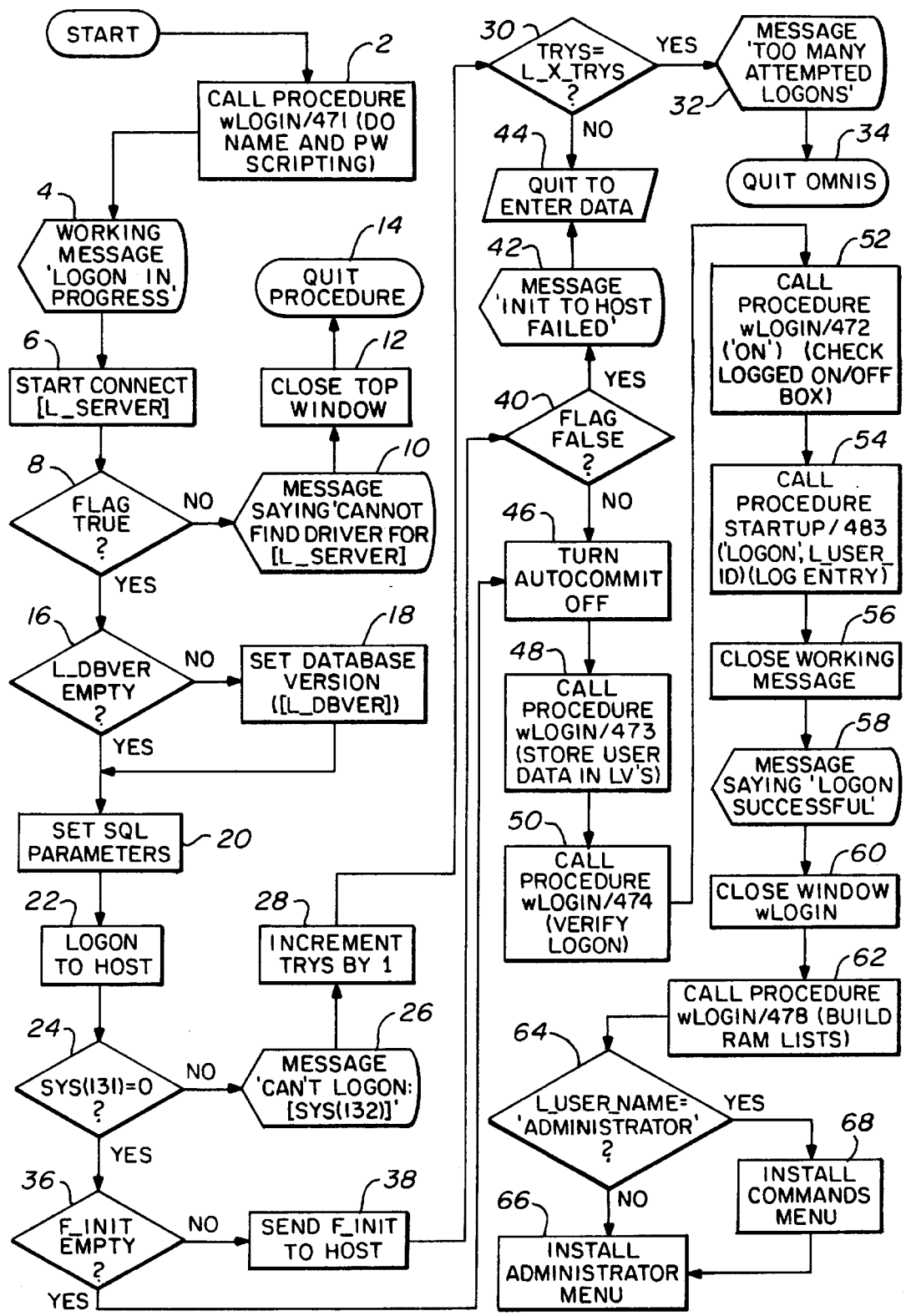
Figure 115:
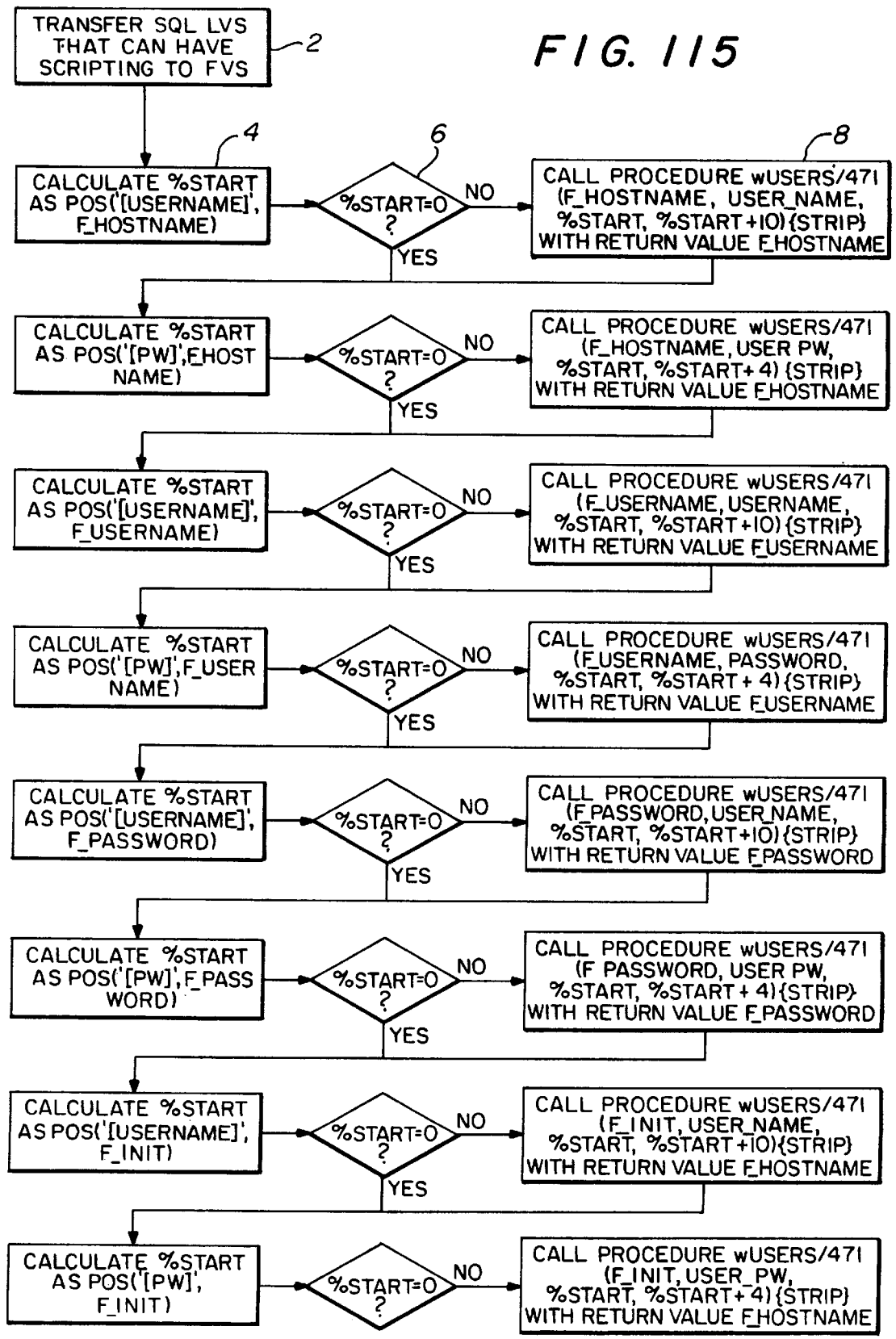
Figure 116:
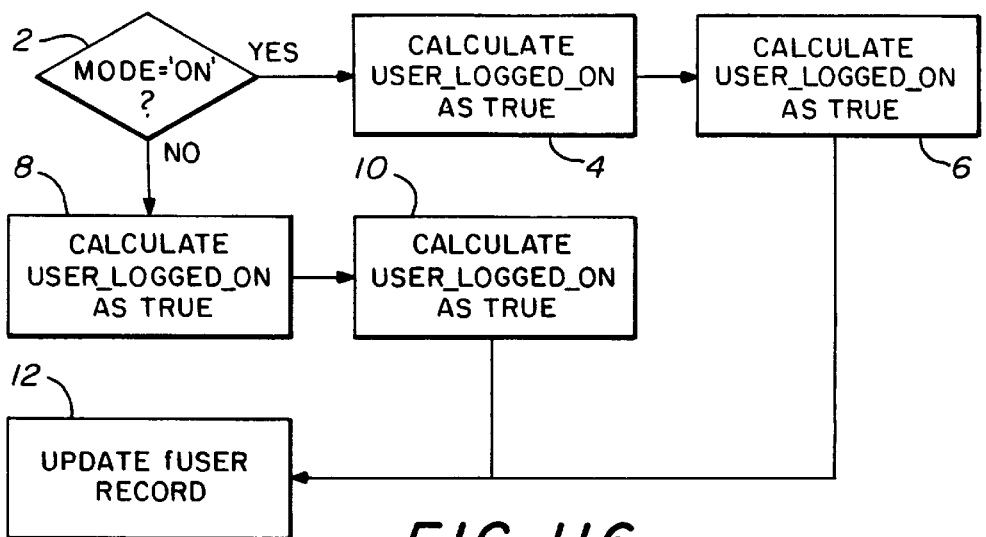
Figure 117:
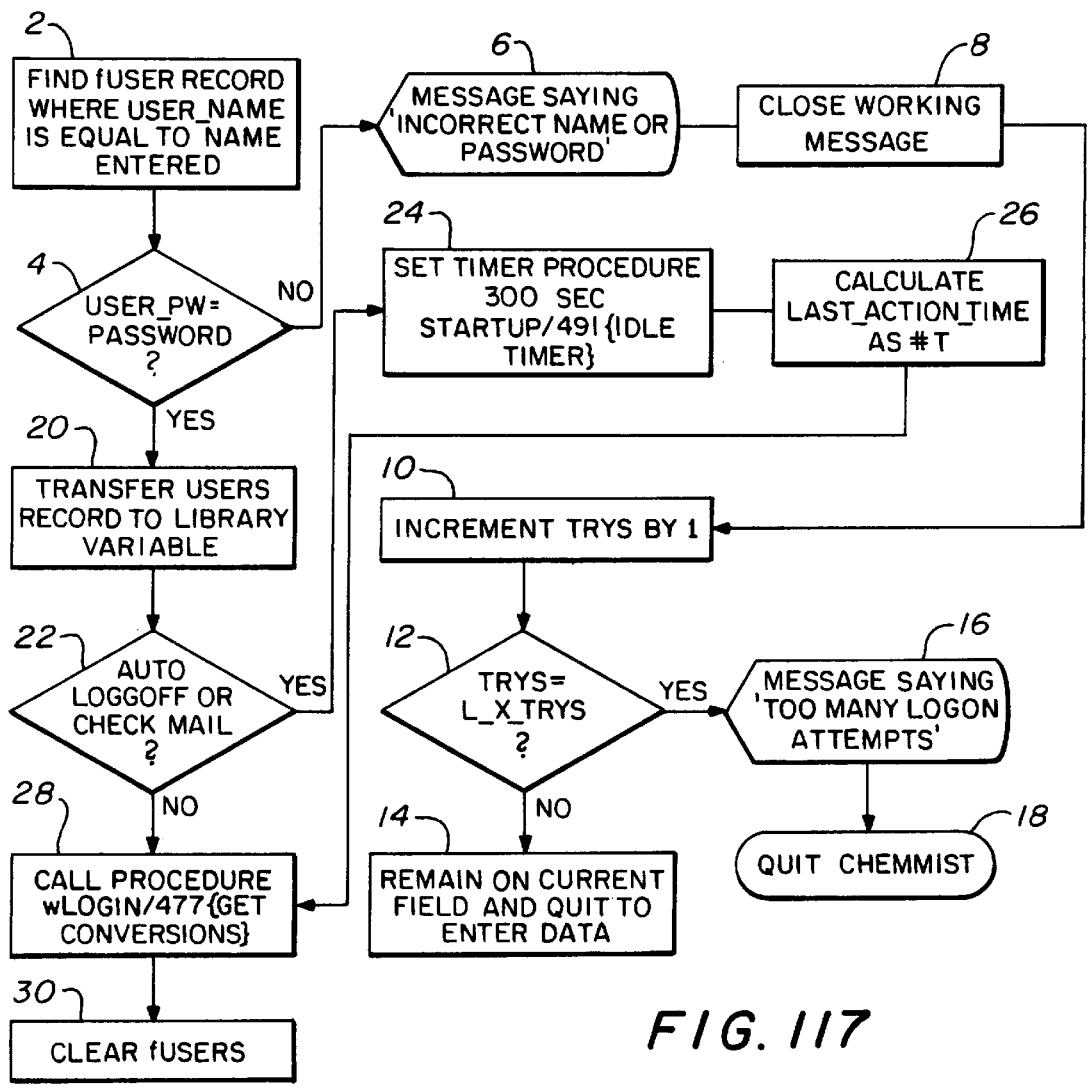
Figure 118:
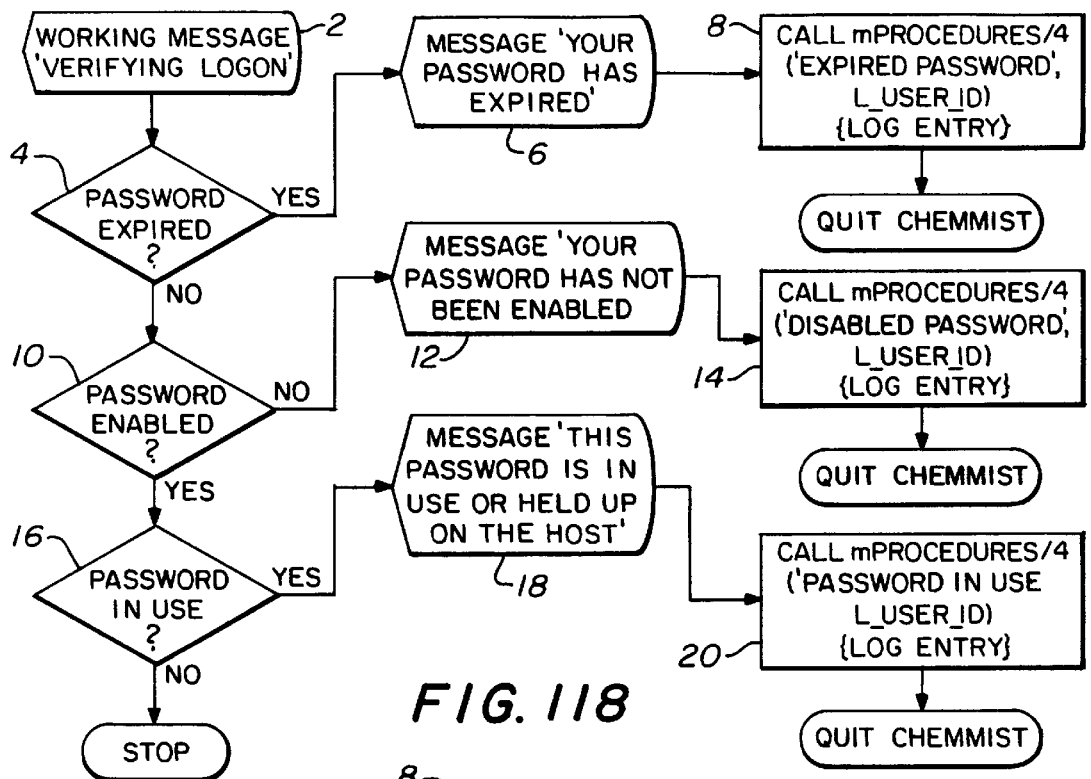
Figure 119:
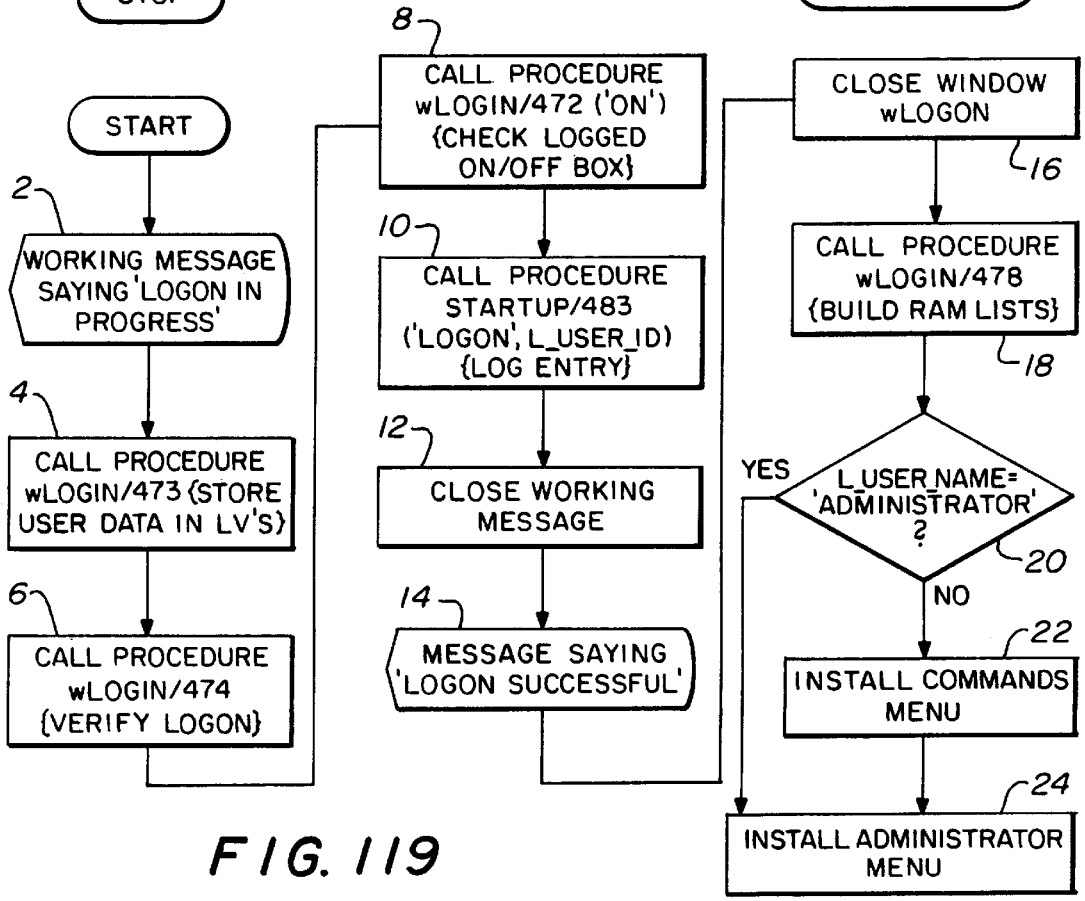
Figure 120:
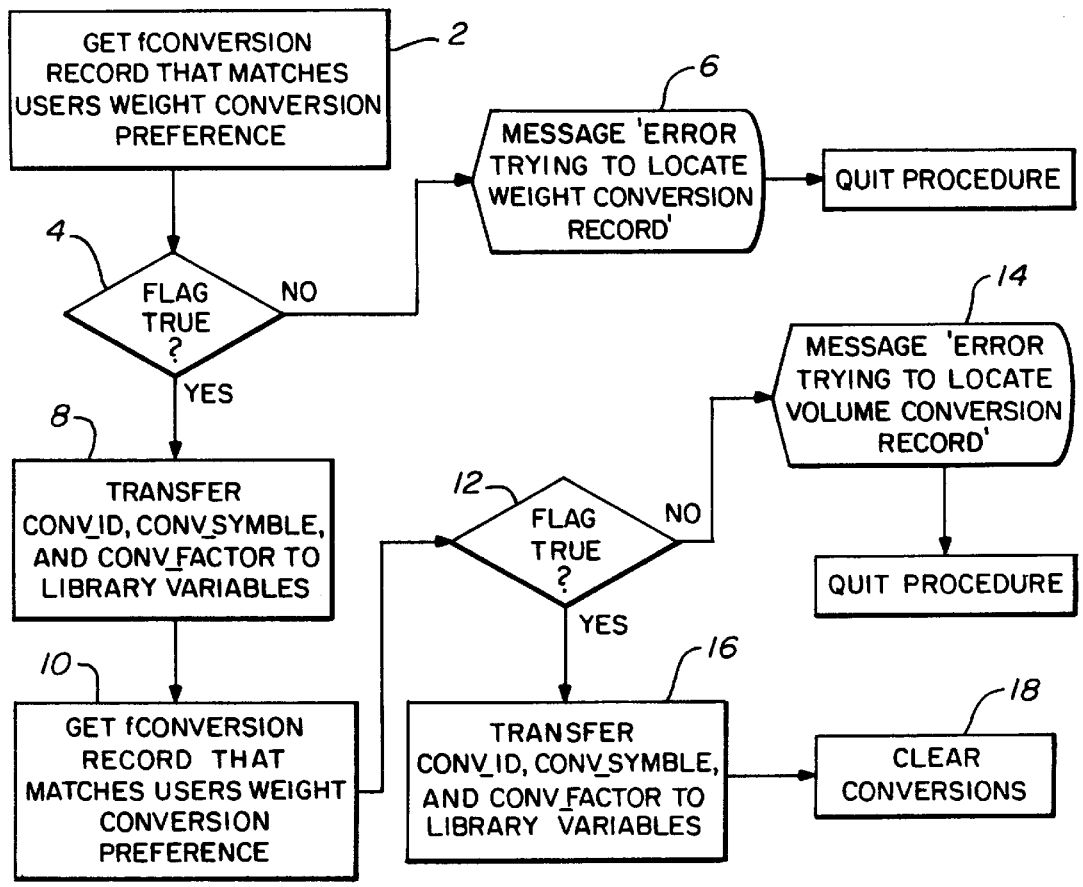
Figure 122:
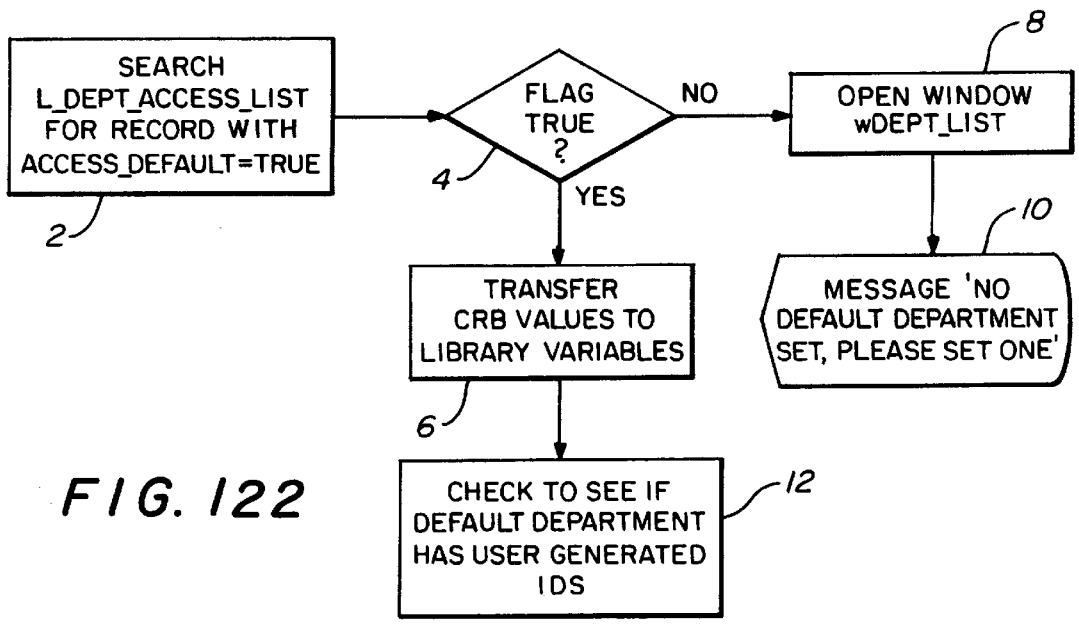
Figure 121:
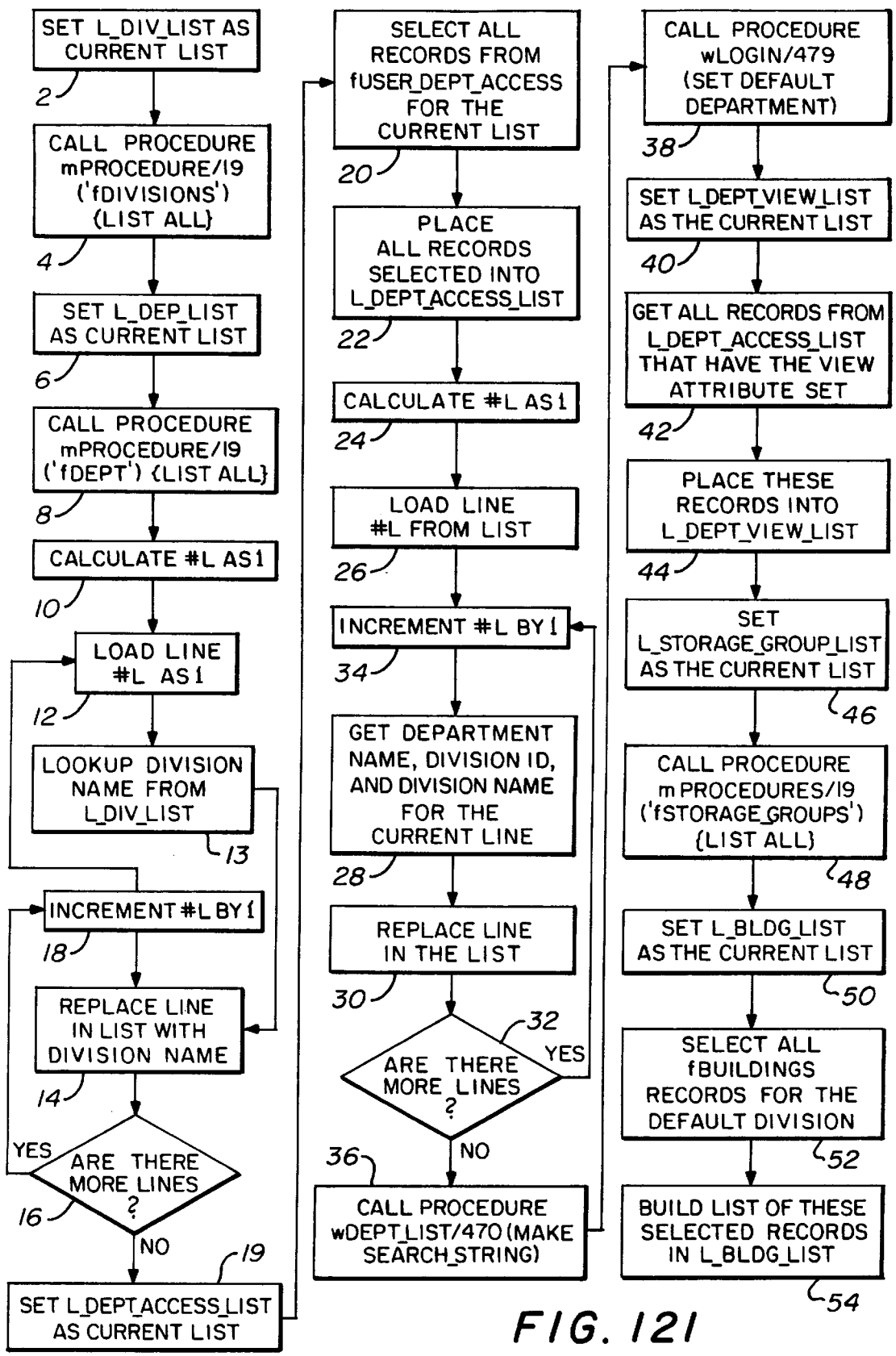
Figures 138, 139, 140, 141:
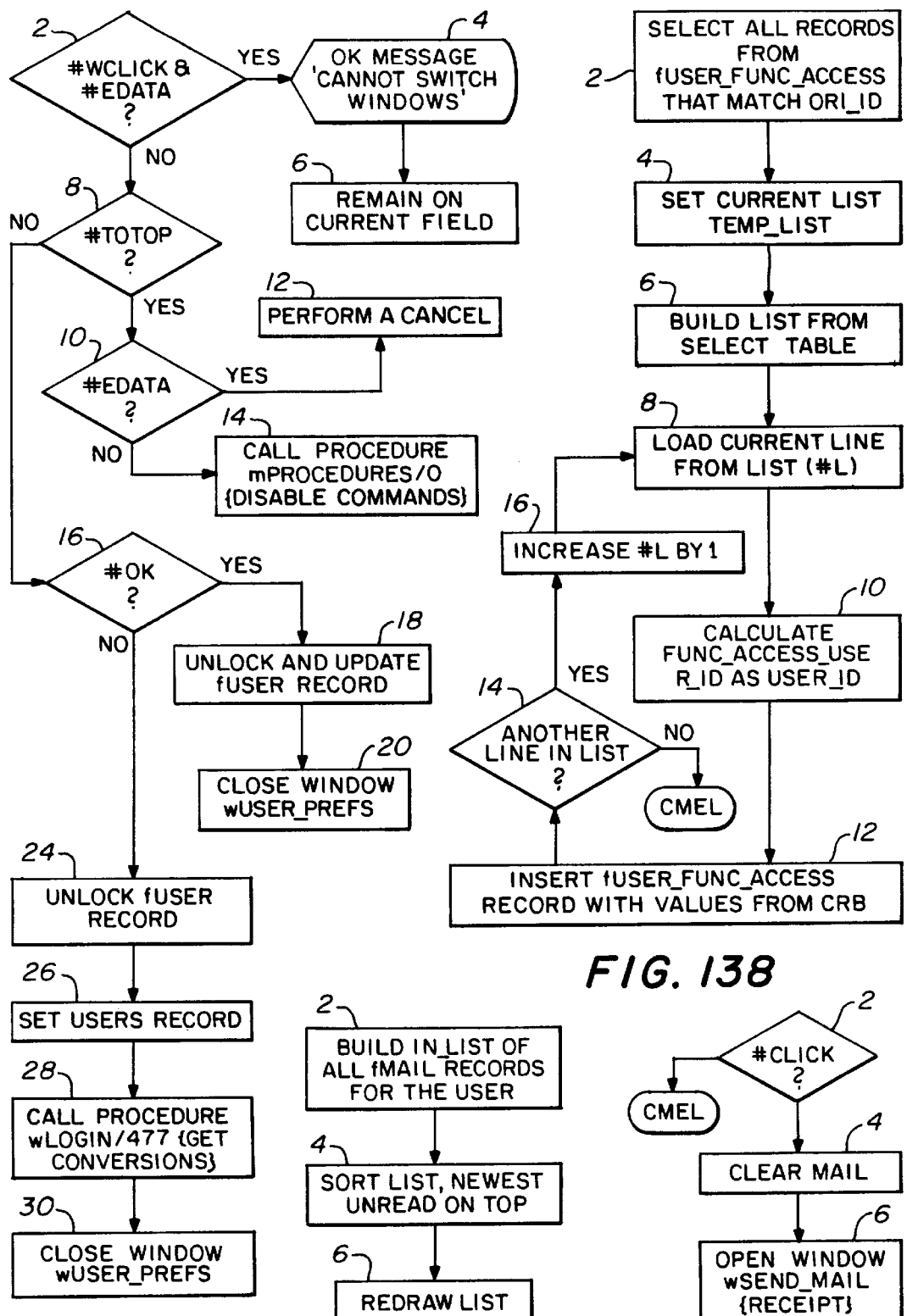
Figure 147:
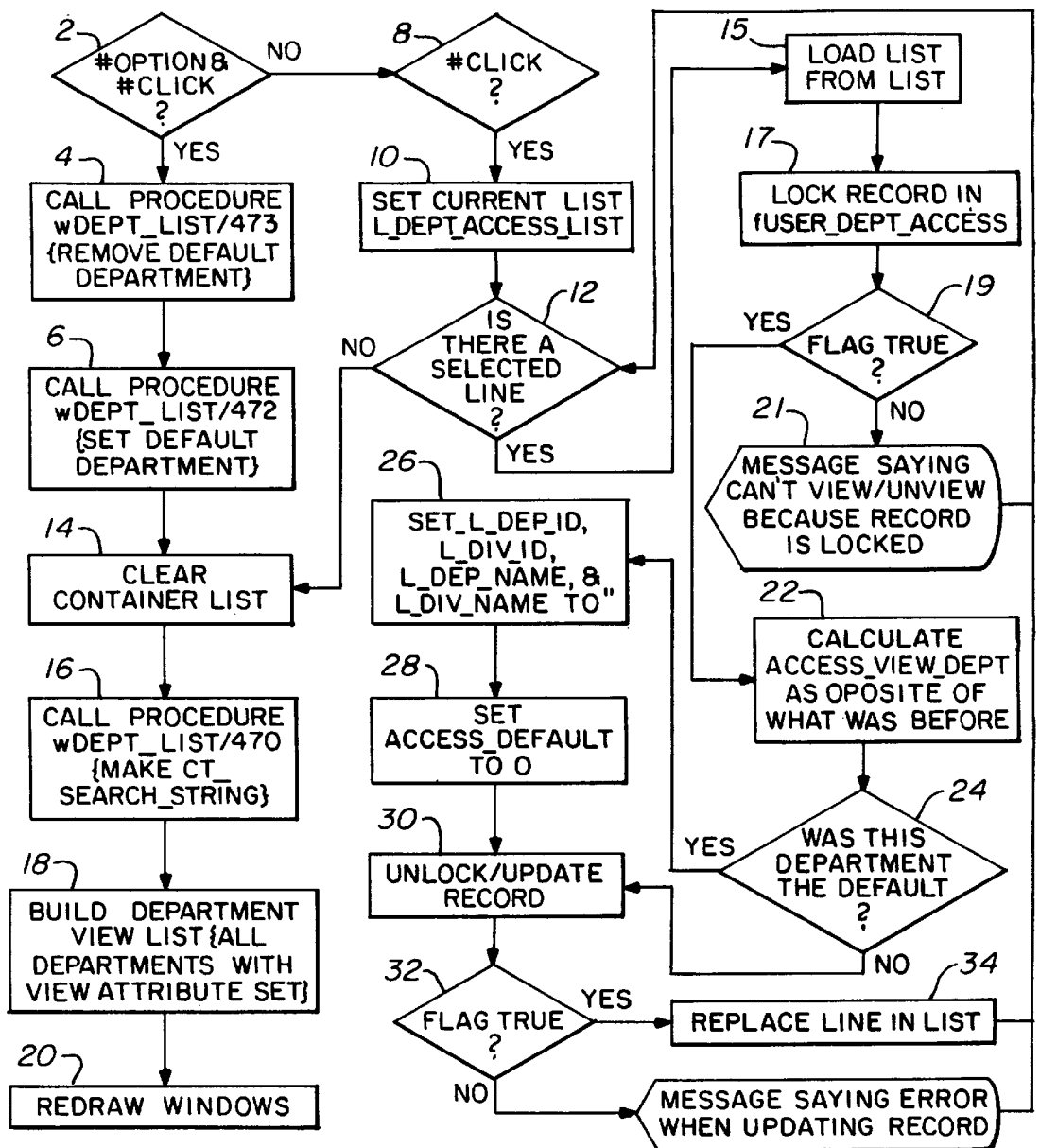
Figure 152:
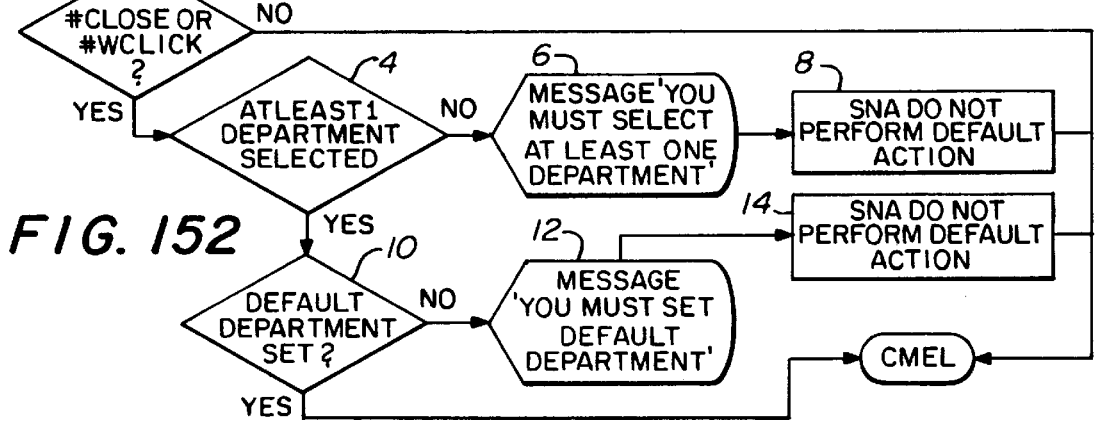
Figure 150:
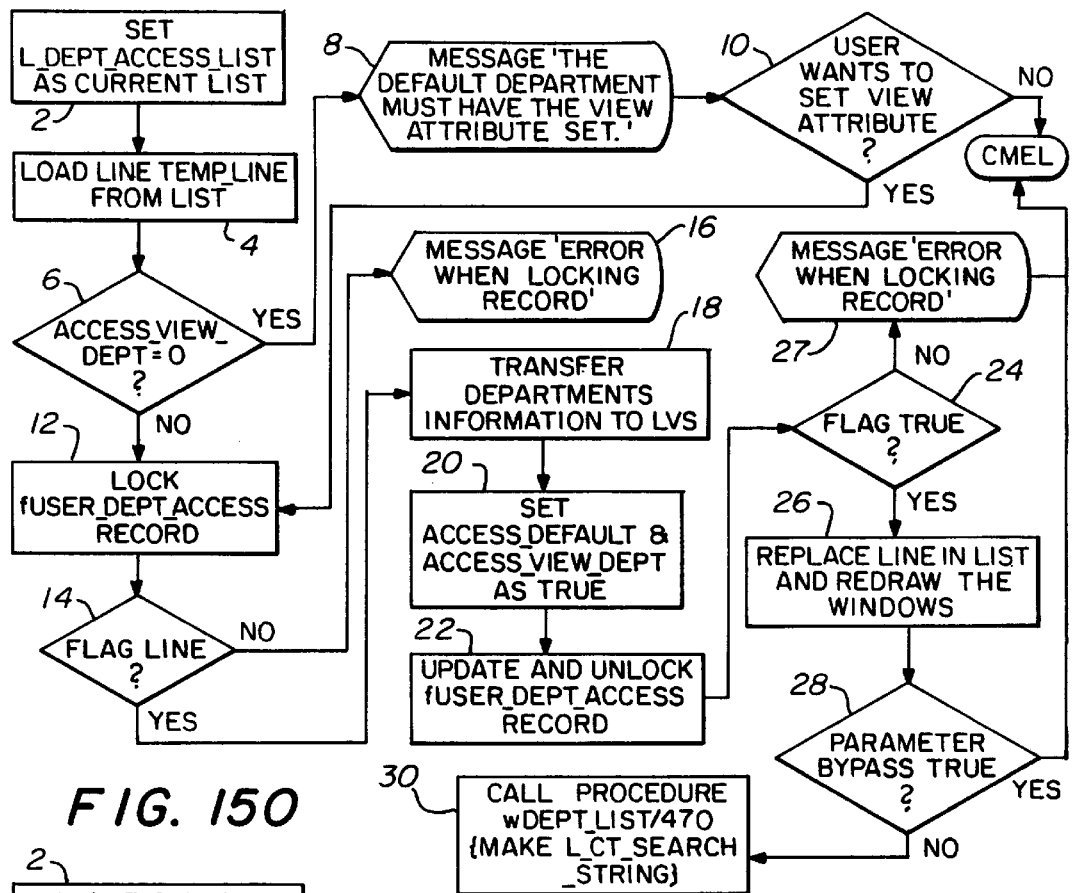
Figure 151:
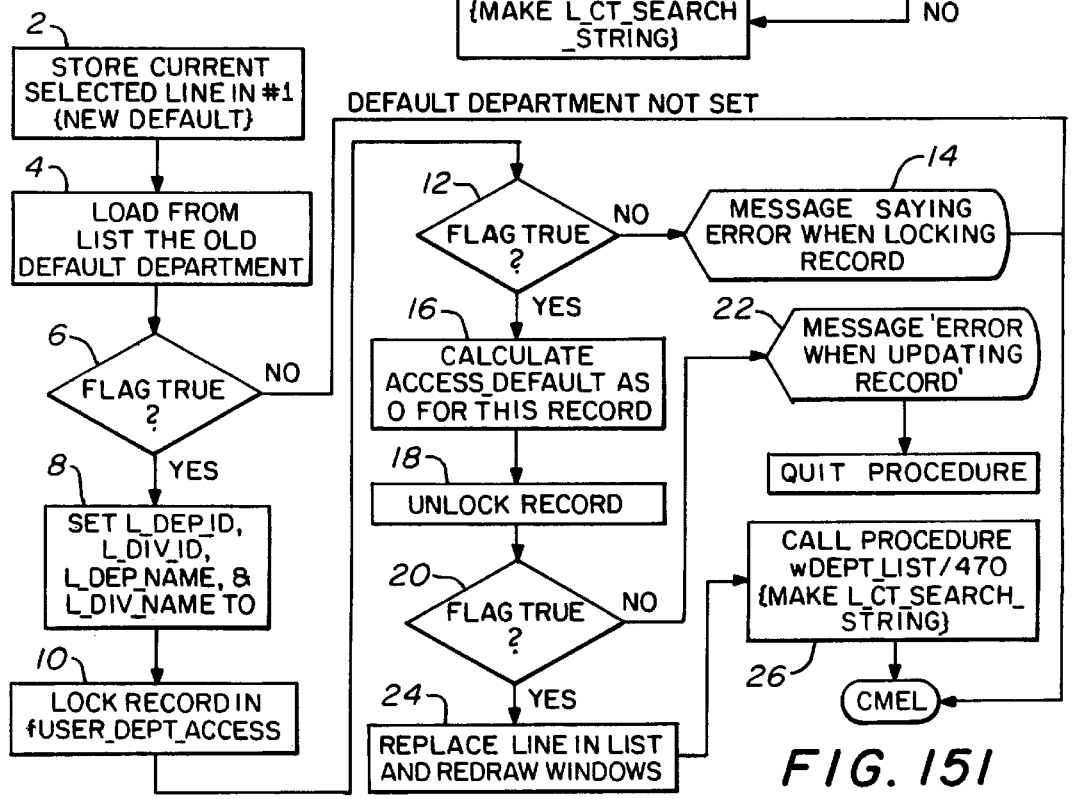
Figure 153:
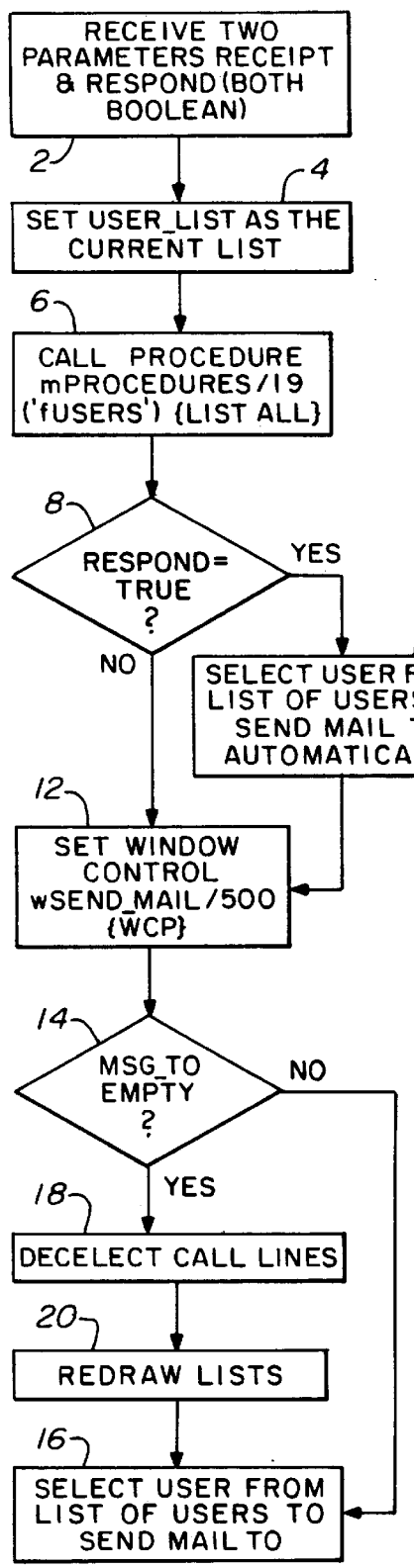
Figure 154:
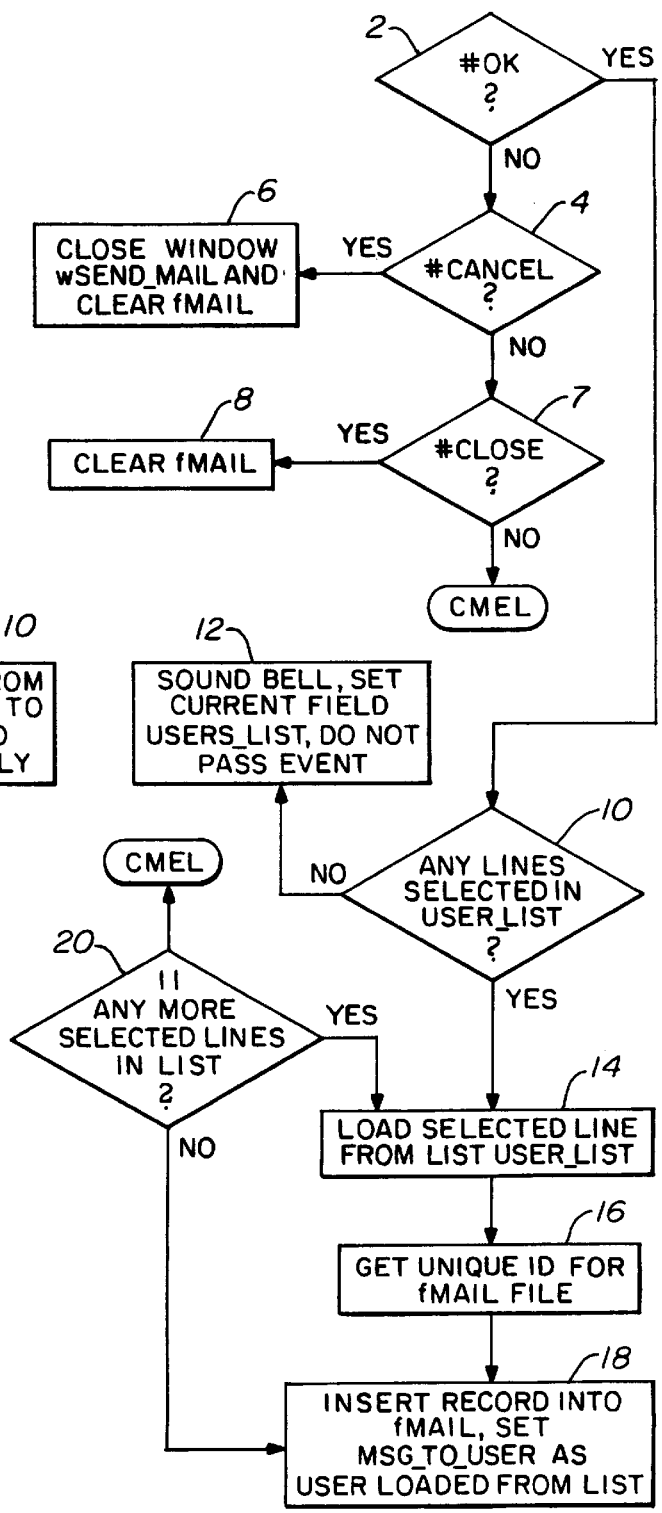
Figures 161, 164, 165, 167, 170:
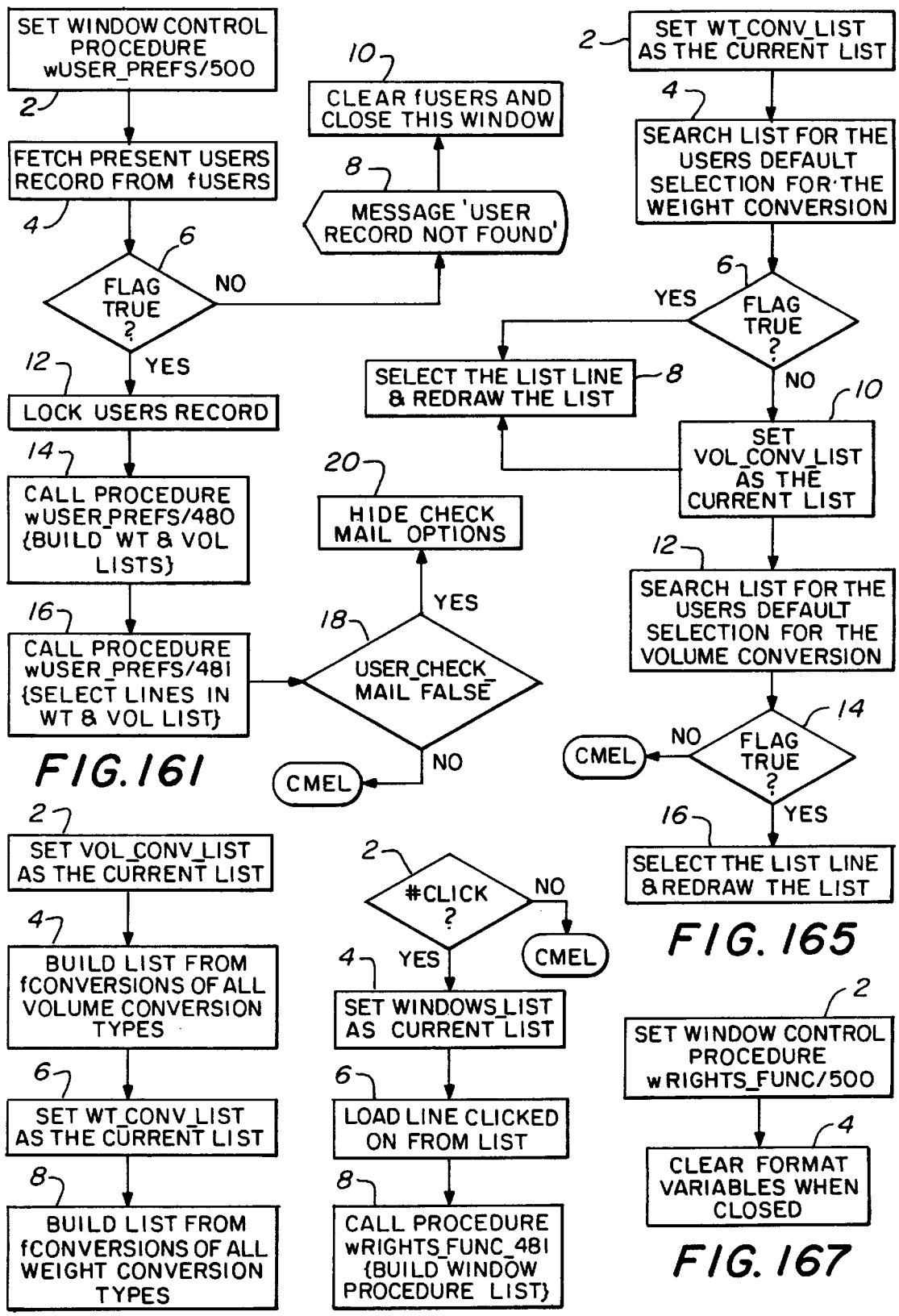
Figures 166, 168:
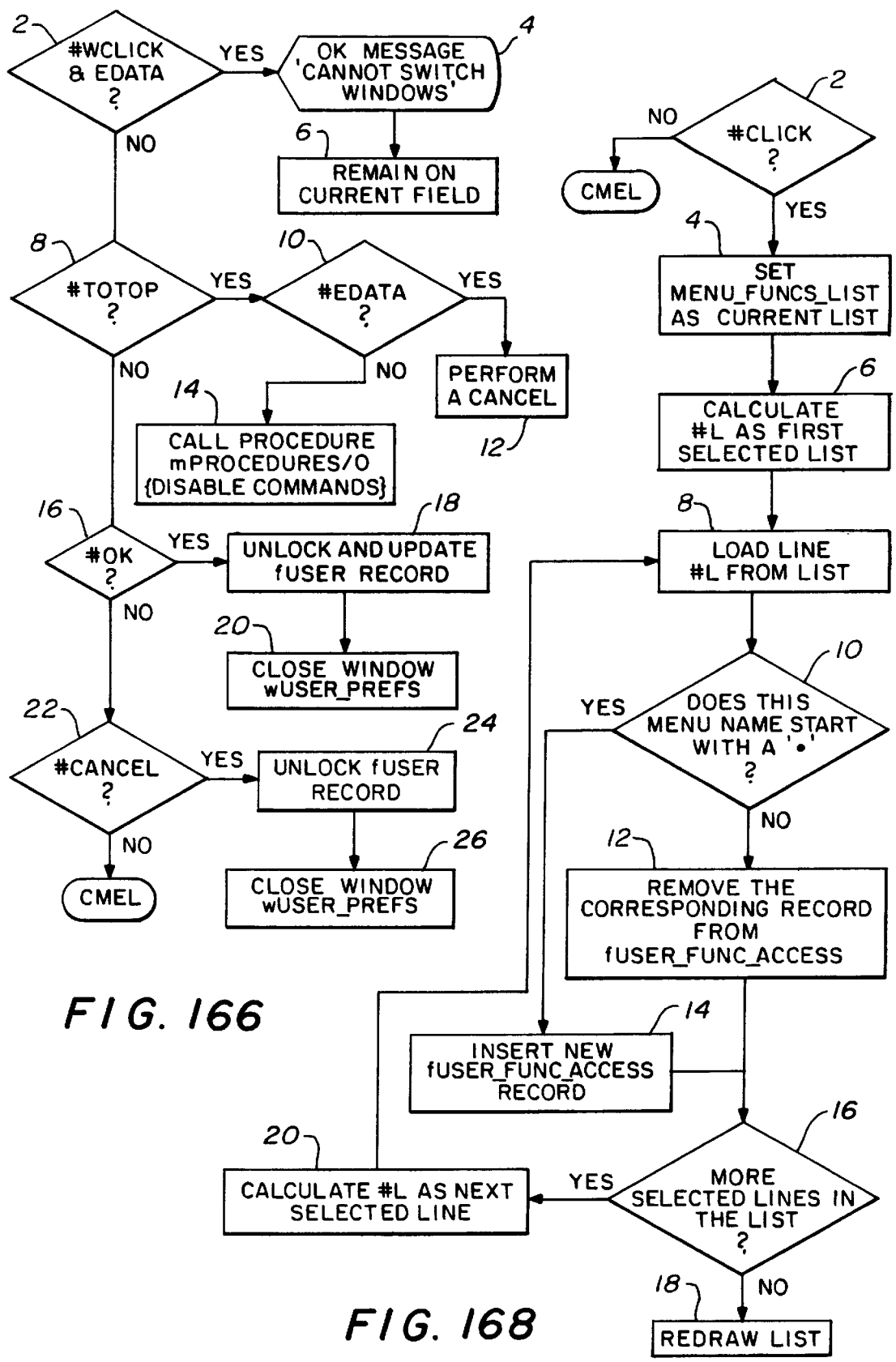
Figures 169, 171:
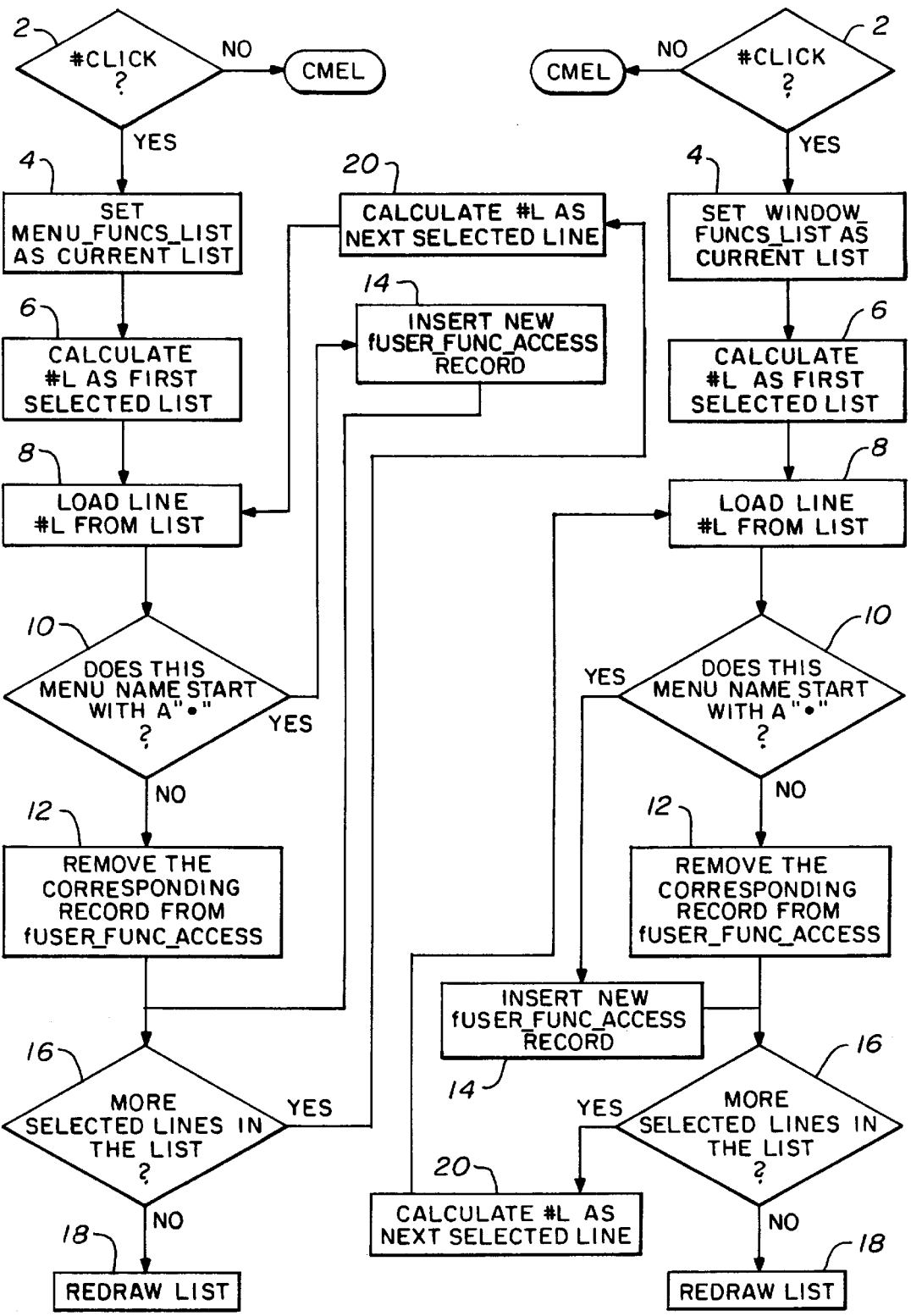
Figure 176:
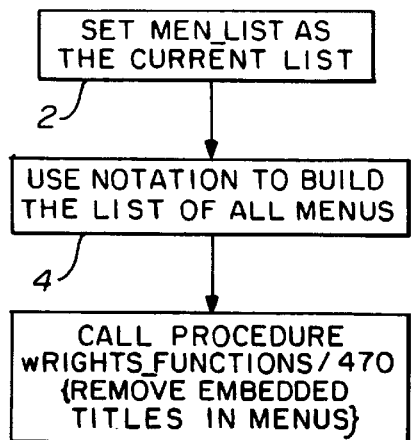
Figure 179:
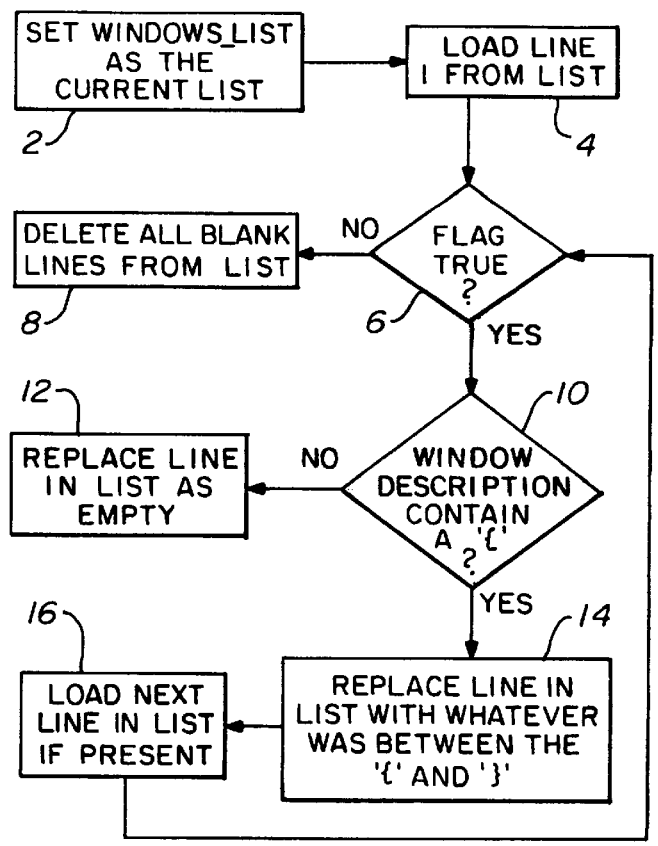
Figure 177:
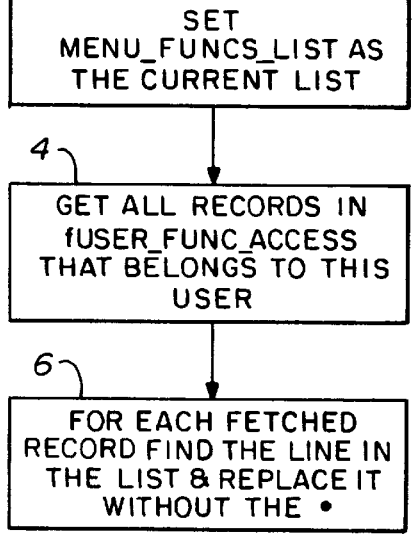
Figure 178:
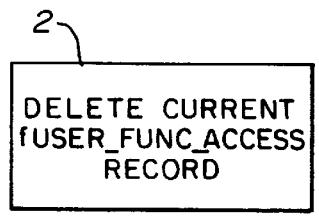
Figure 180:
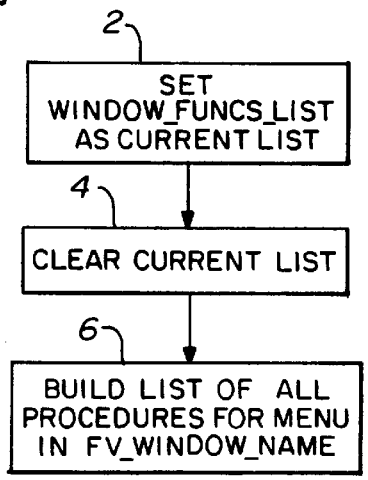
Figure 182:
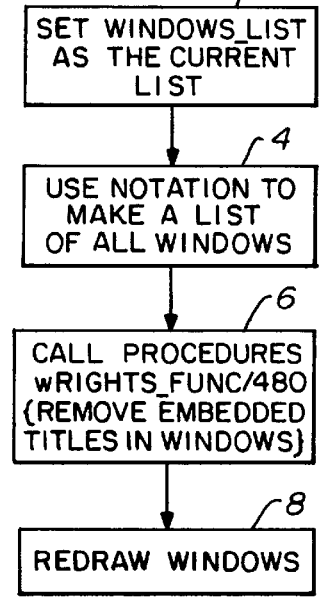
Figure 181:
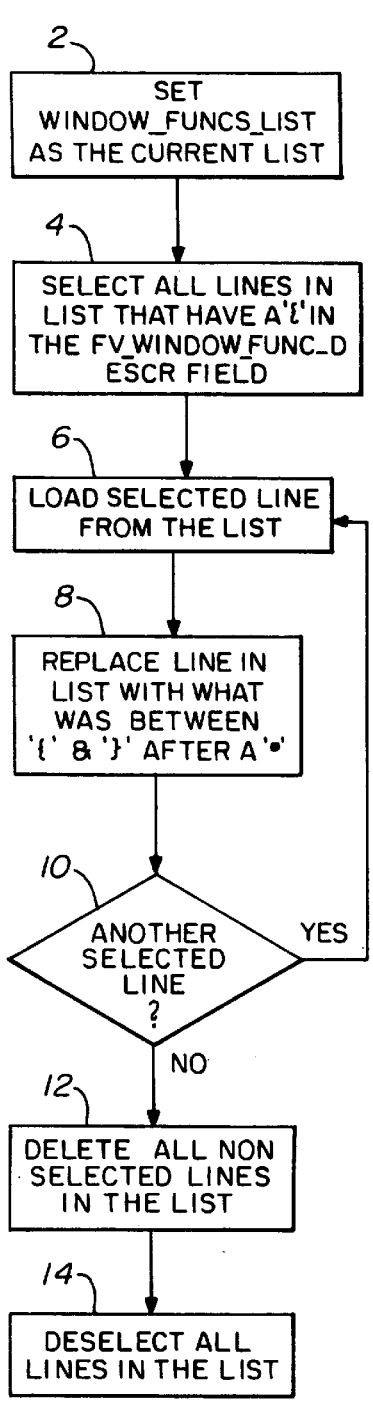
Figure 184:
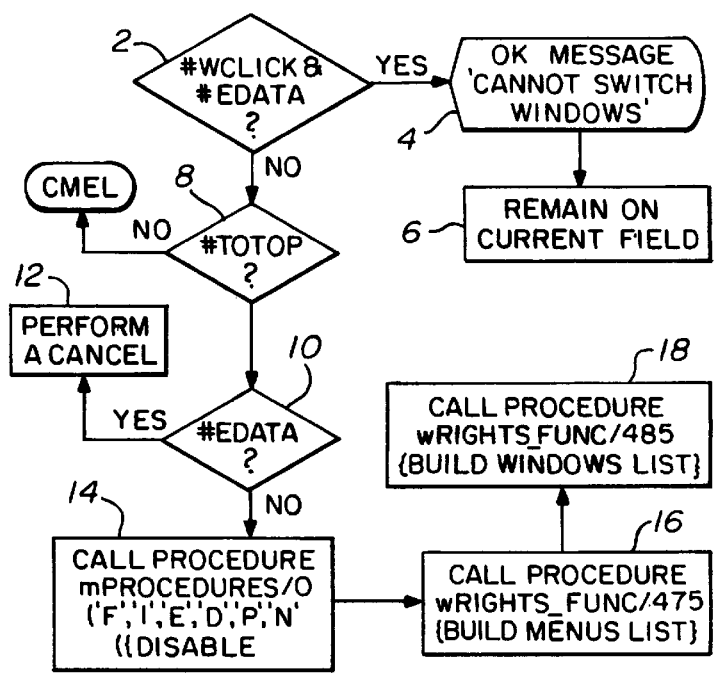
Figure 183:
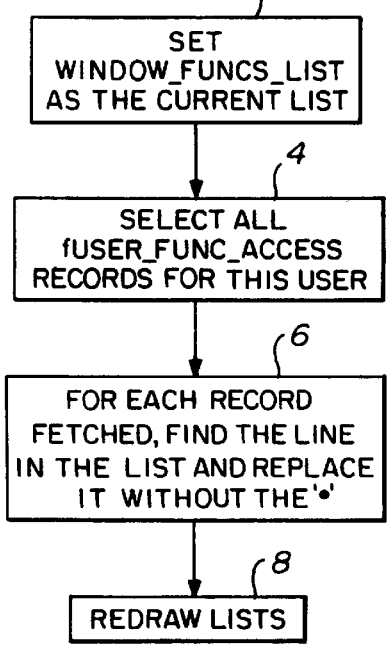
Figure 186:
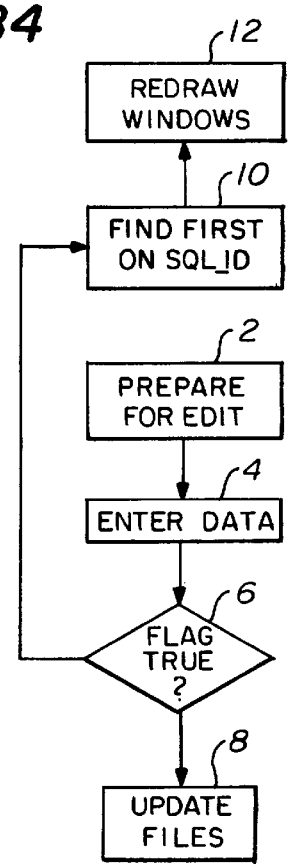
Figure 192A:
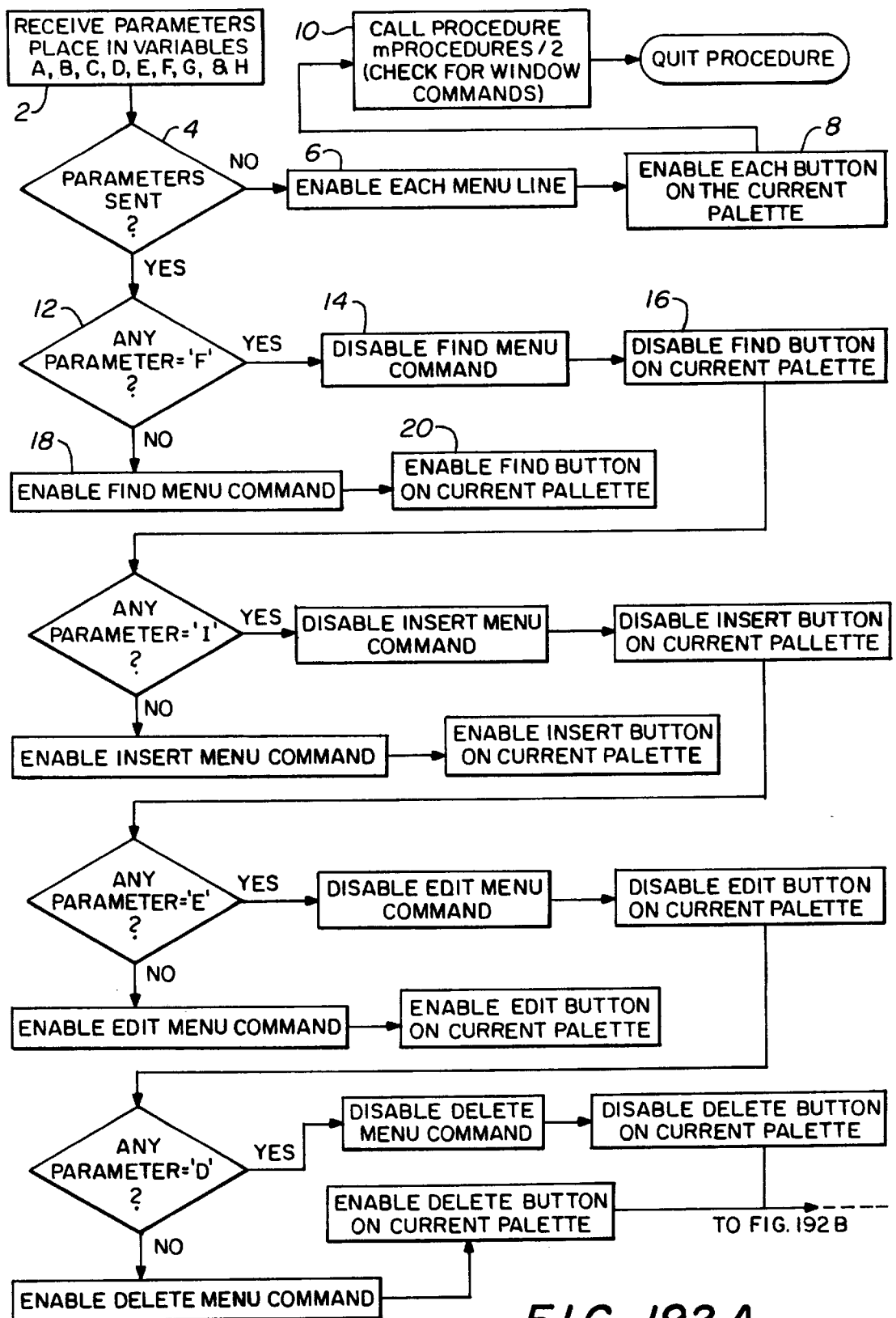
Figure 192B:
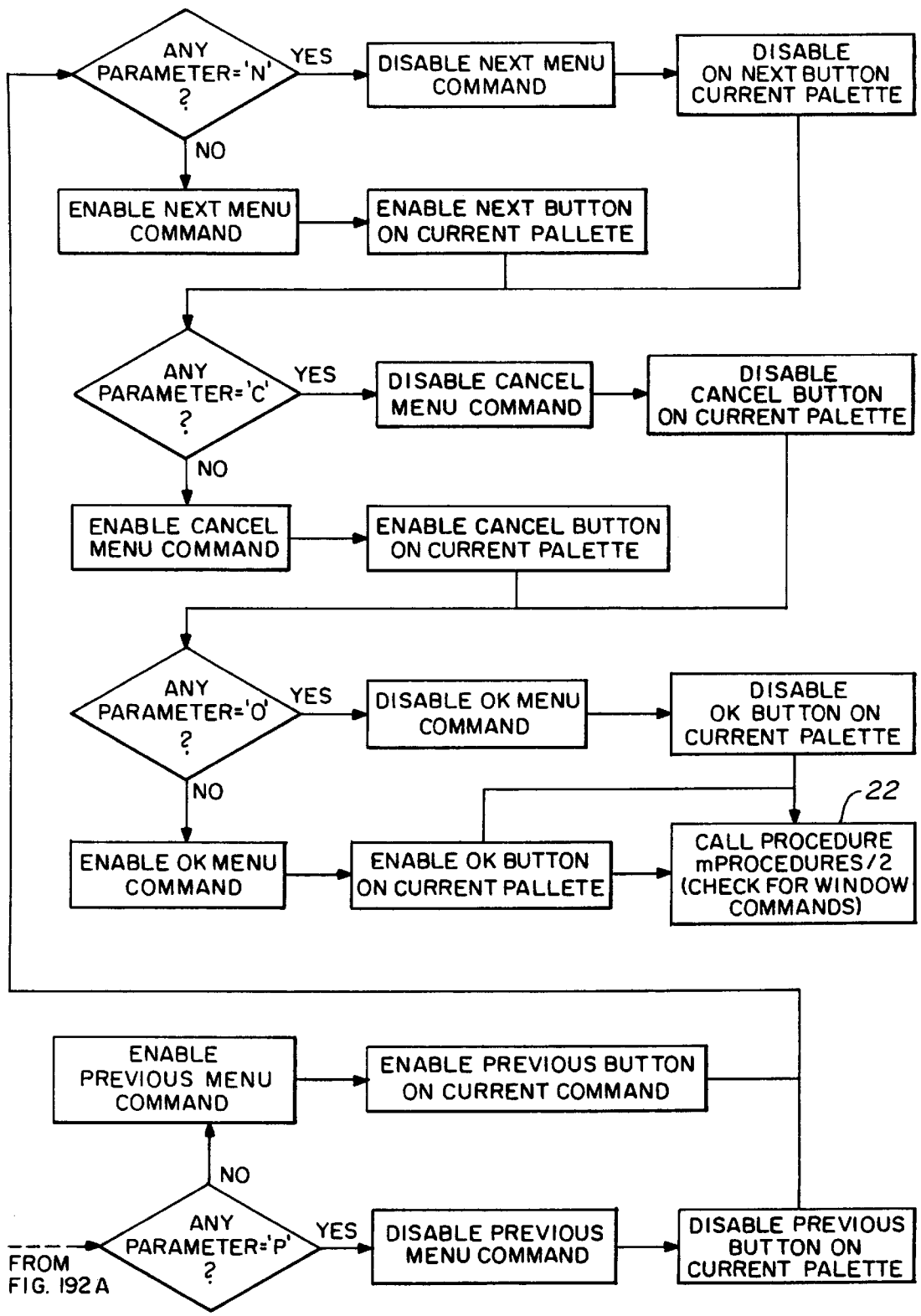
Figure 194:
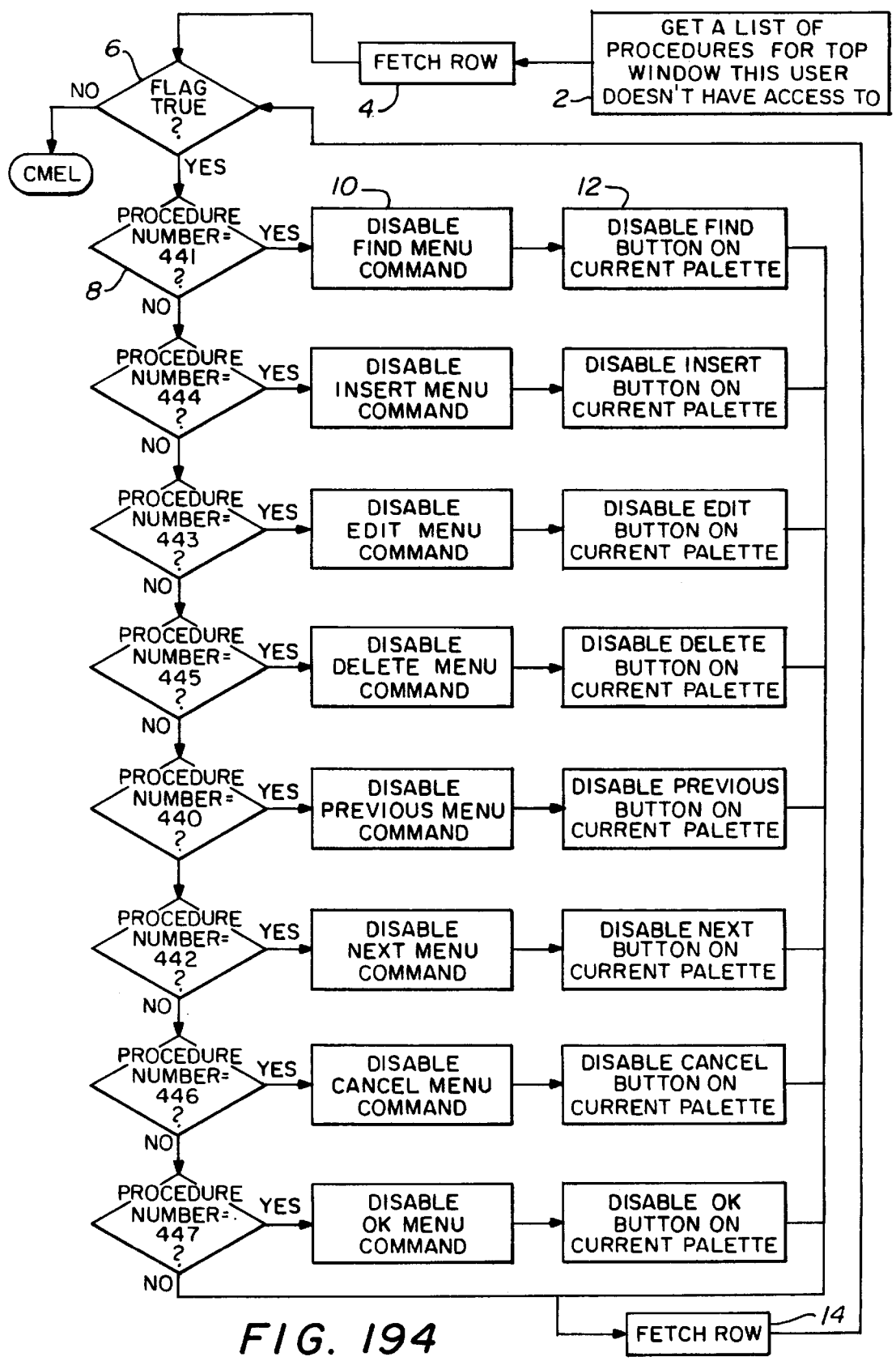
Figures 197, 198:
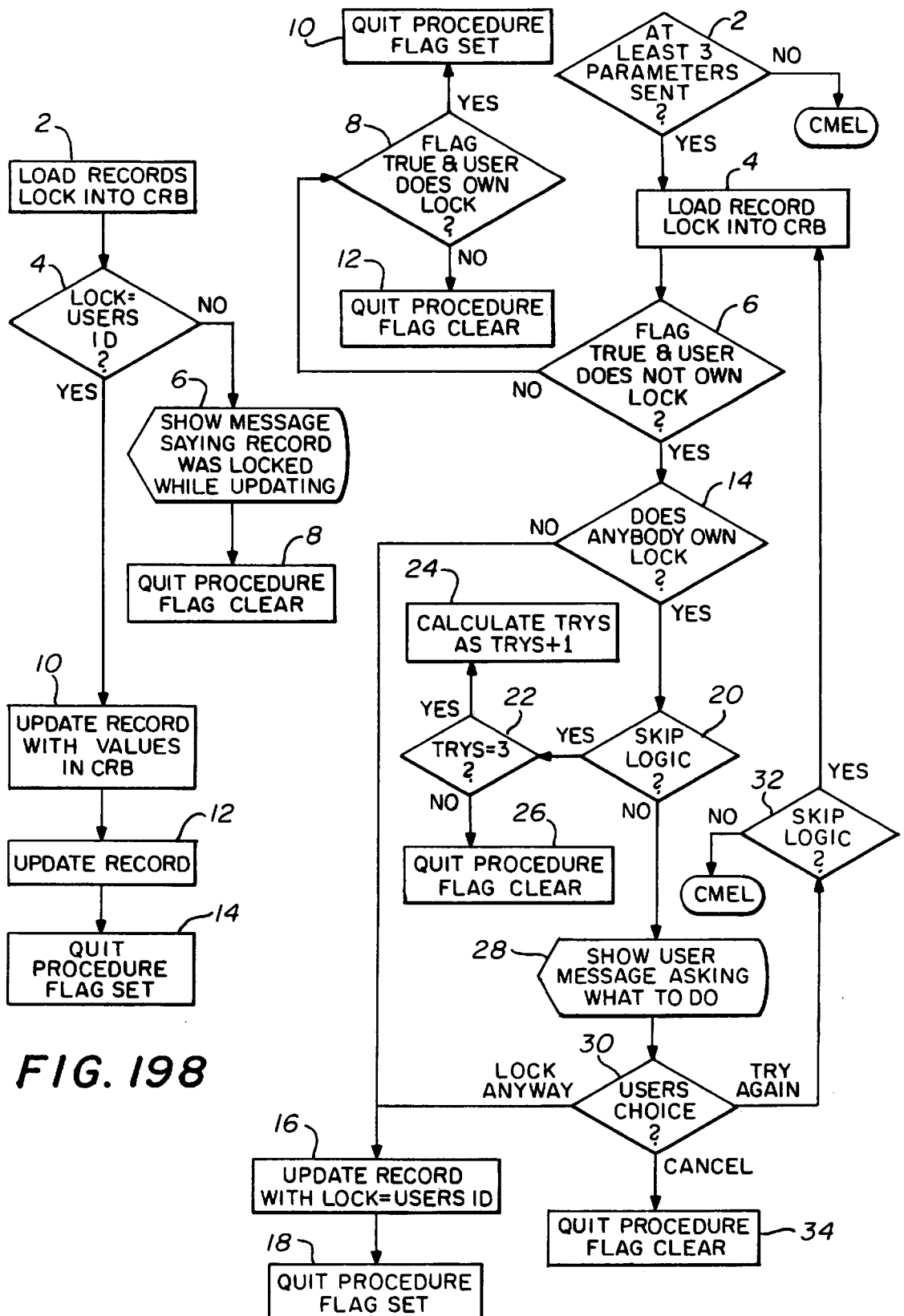
Figure 203:
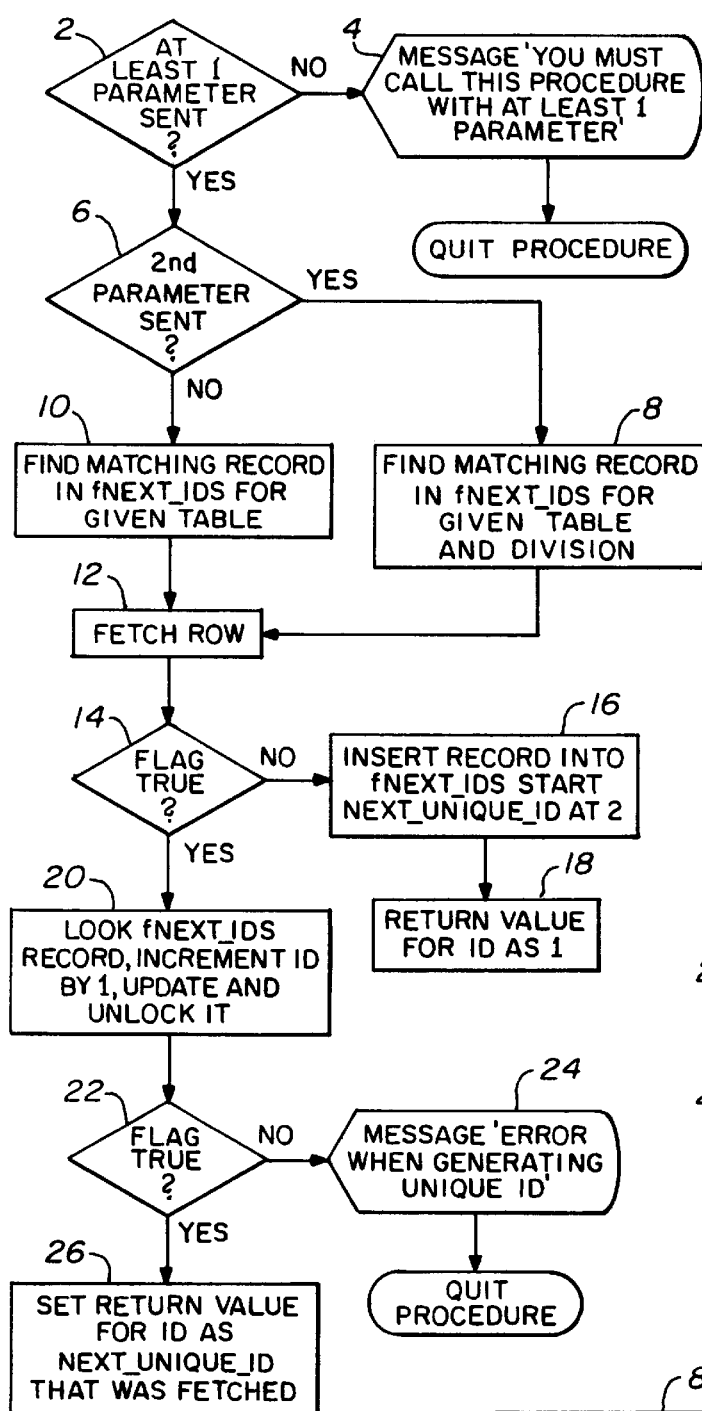
Figure 204:
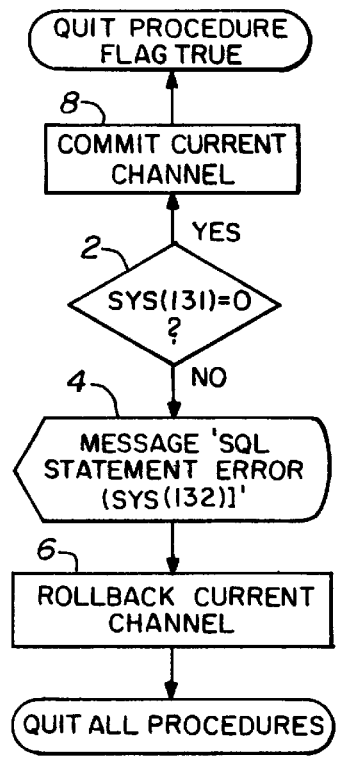
Figure 205:
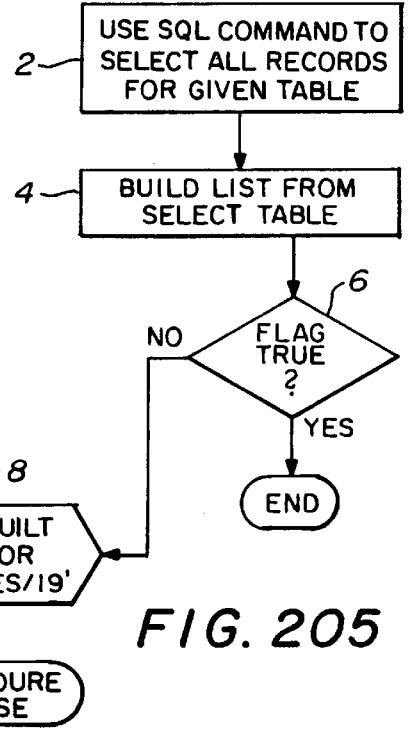
Figure 216:
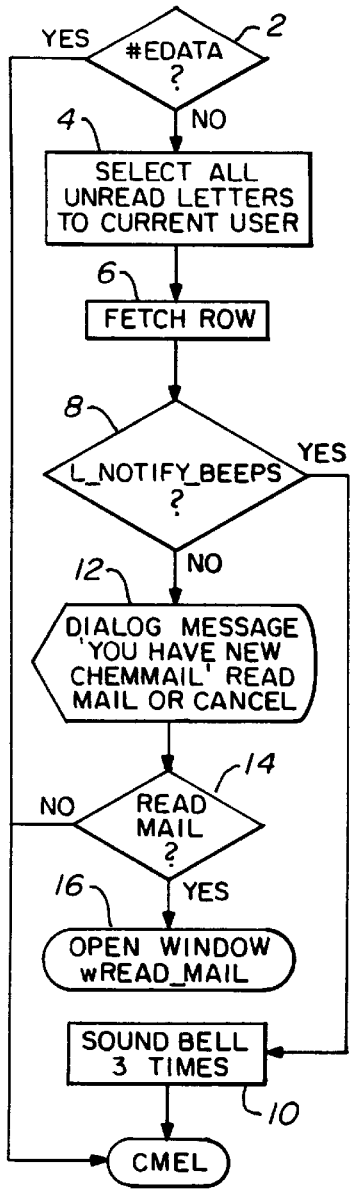
Figure 218:
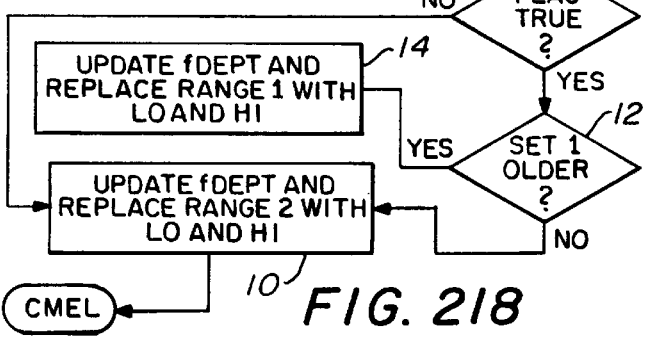
Figure 219:
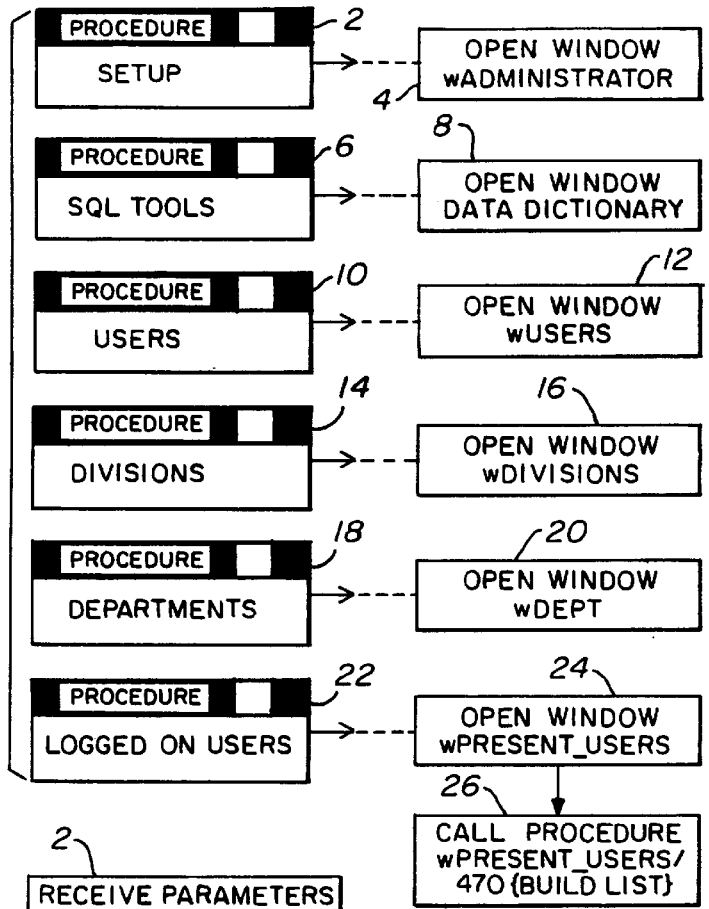
Figure 217:
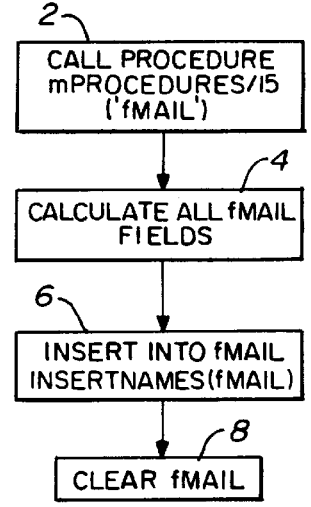
Figures 220, 221, 222:
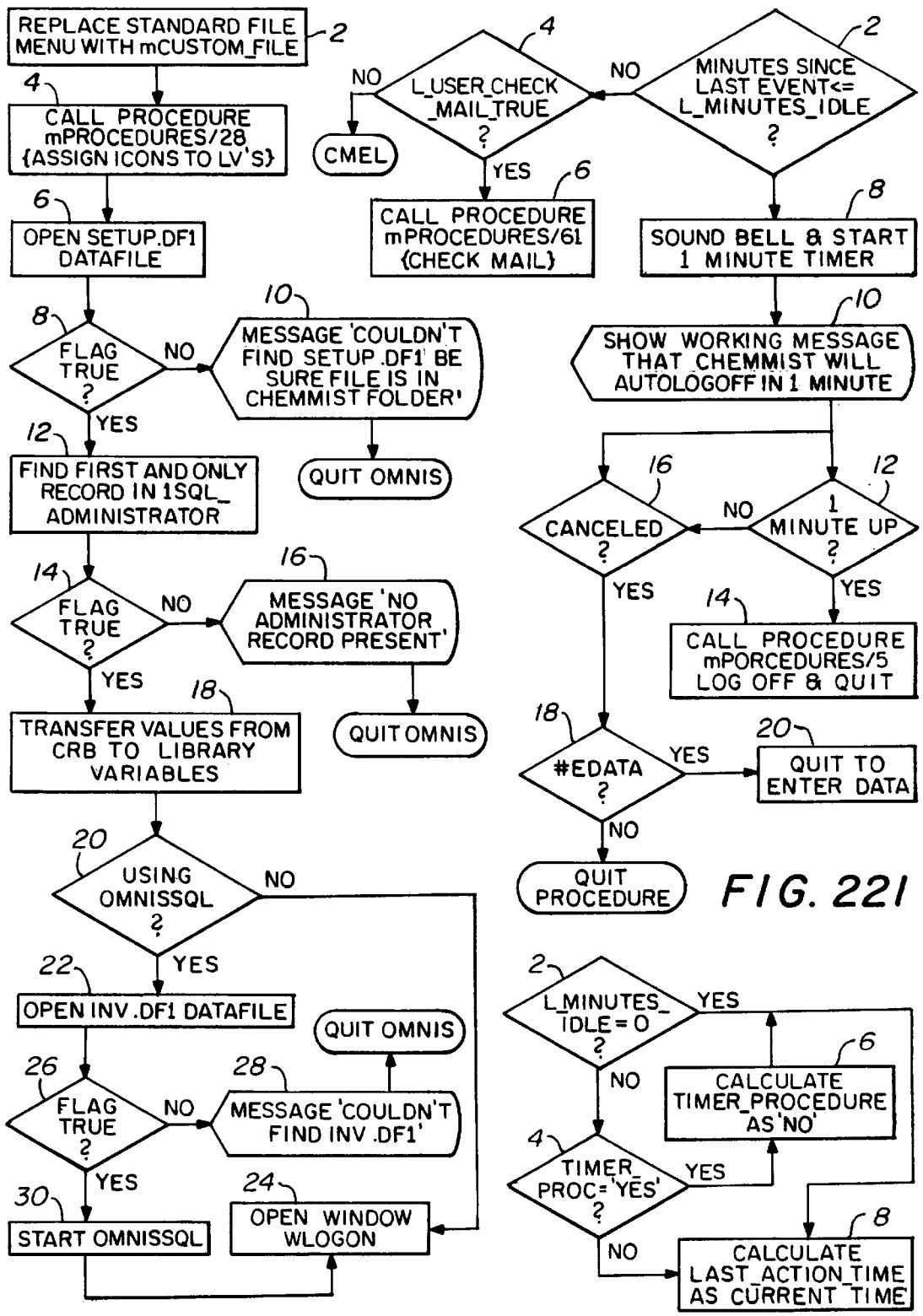
Figure 228:
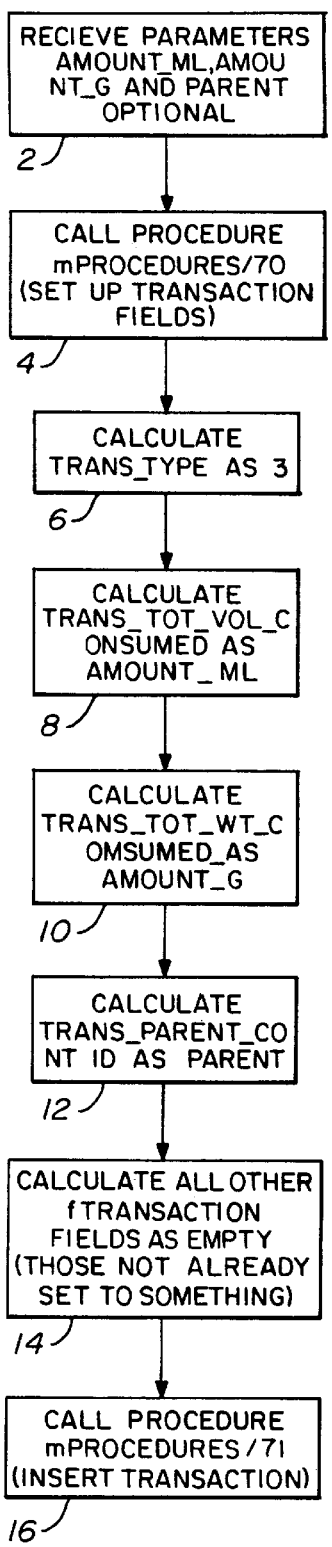
Figure 229:
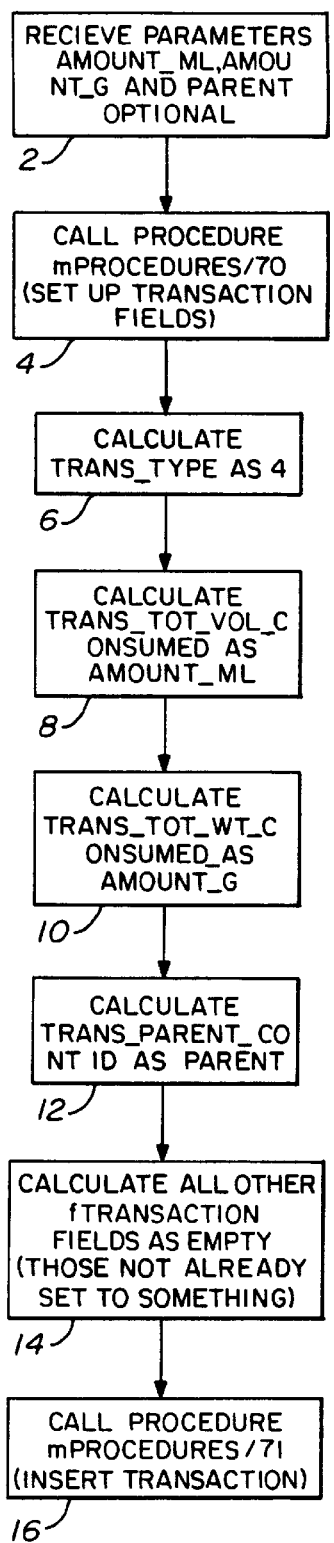
Figure 230:
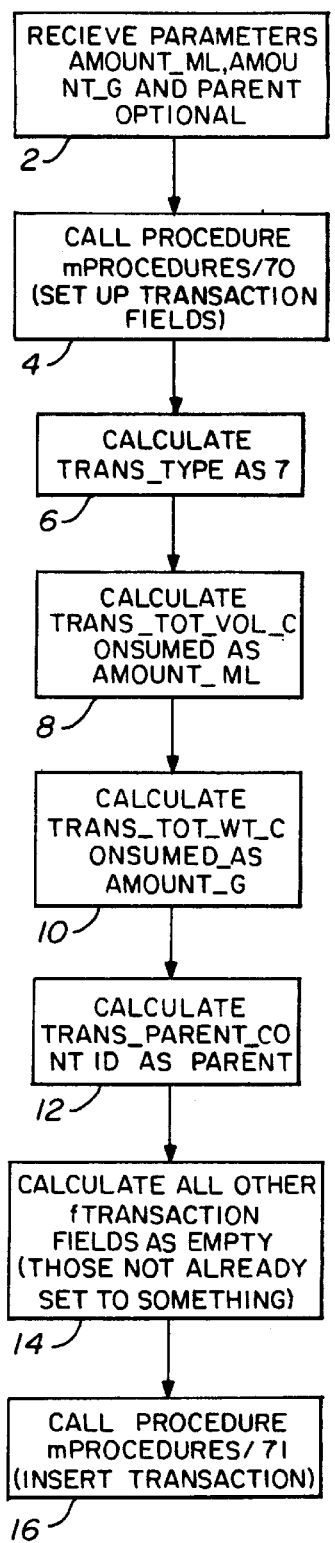
Figures 239, 240, 241:
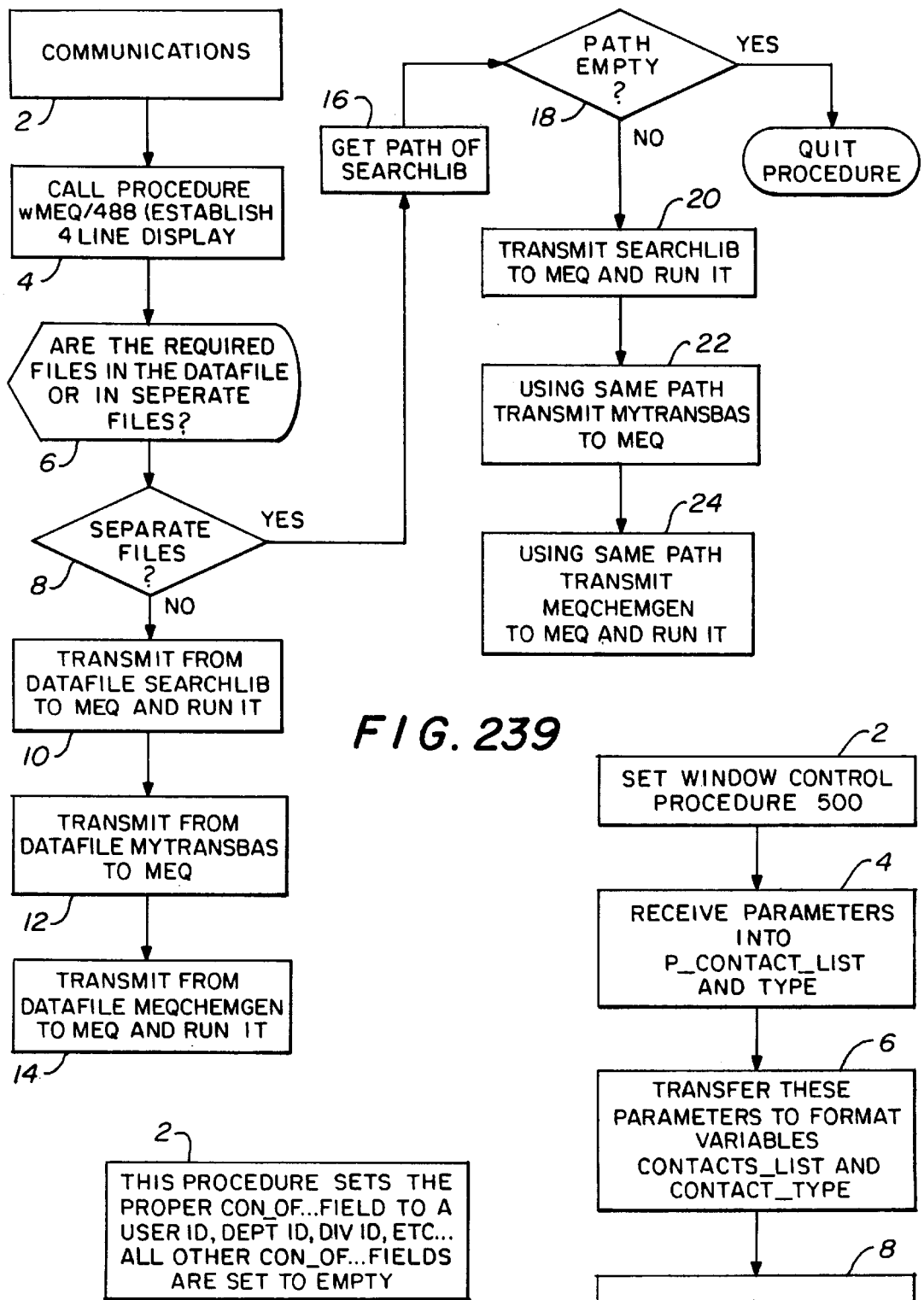
Figure 256:
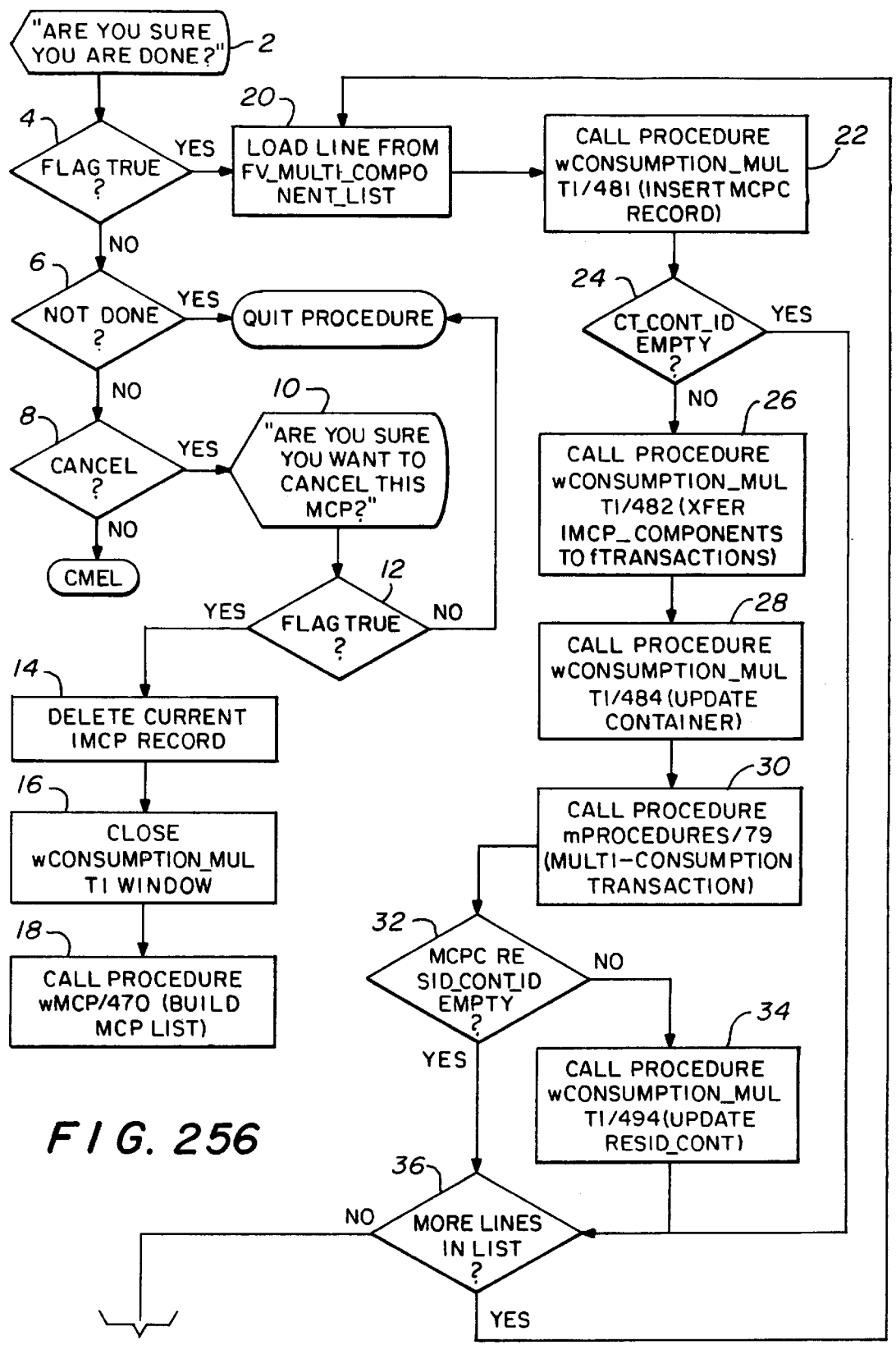
Figure 259:
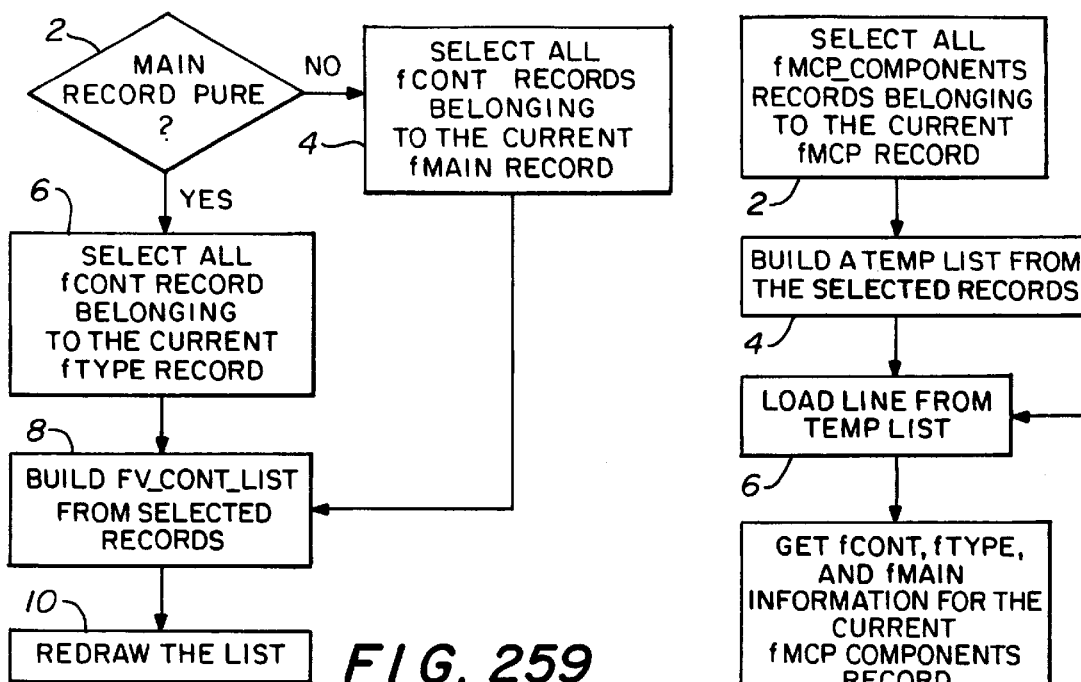
Figure 265:
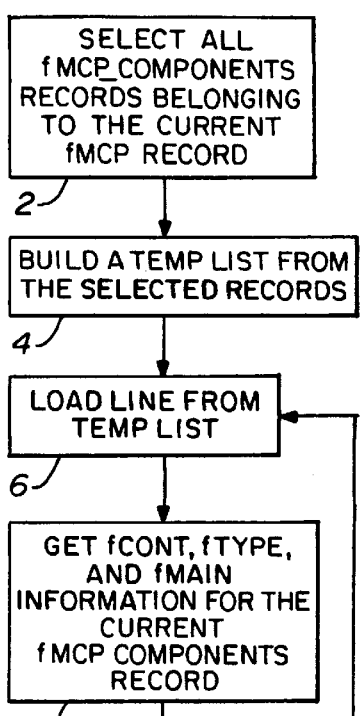
Figure 263:
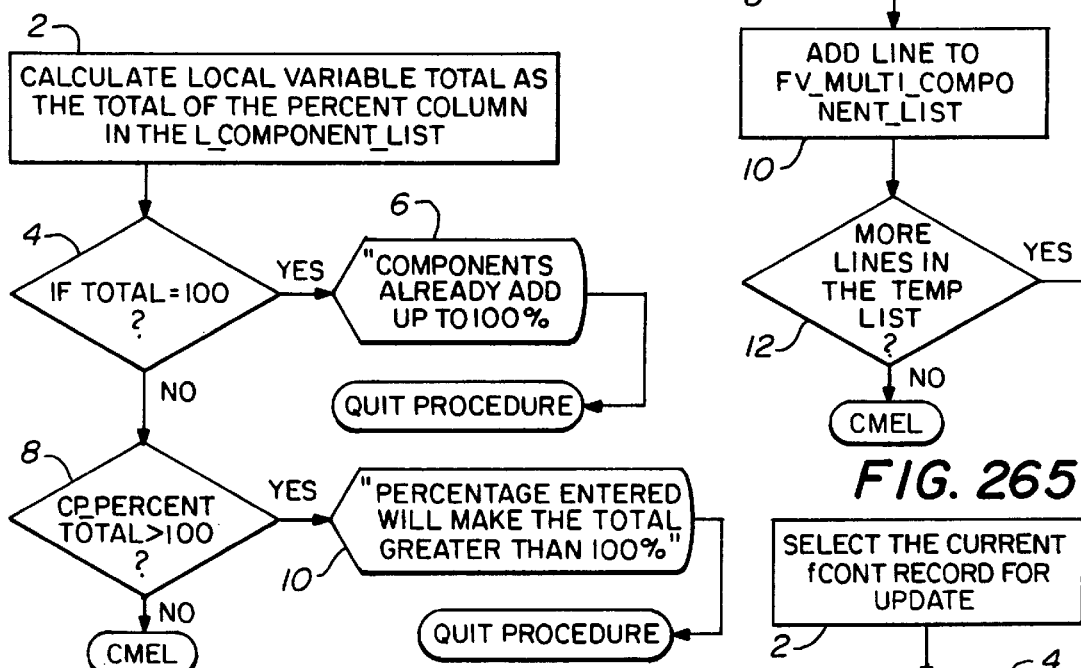
Figure 268:
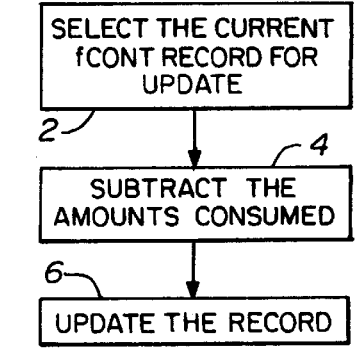
Figures 266, 267:
Figure 275:
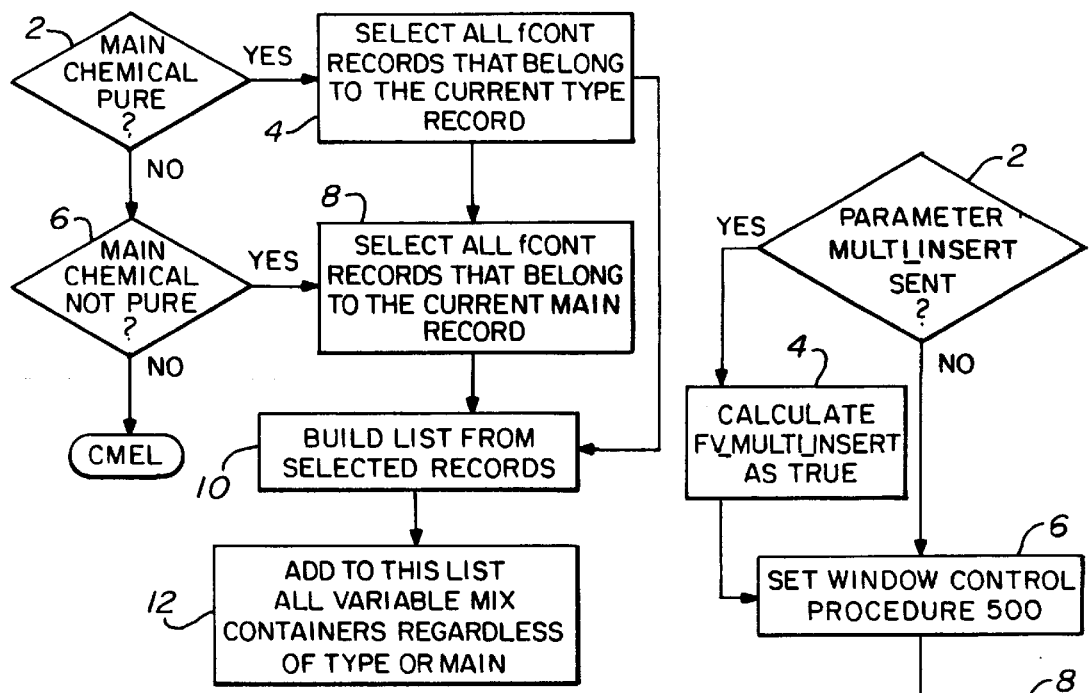
Figure 276:
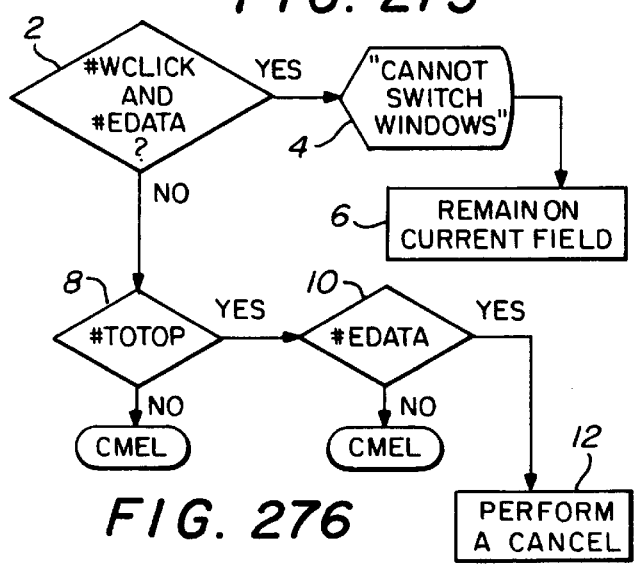
Figure 280:
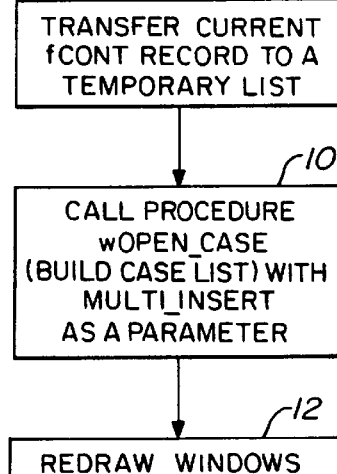
Figure 281:
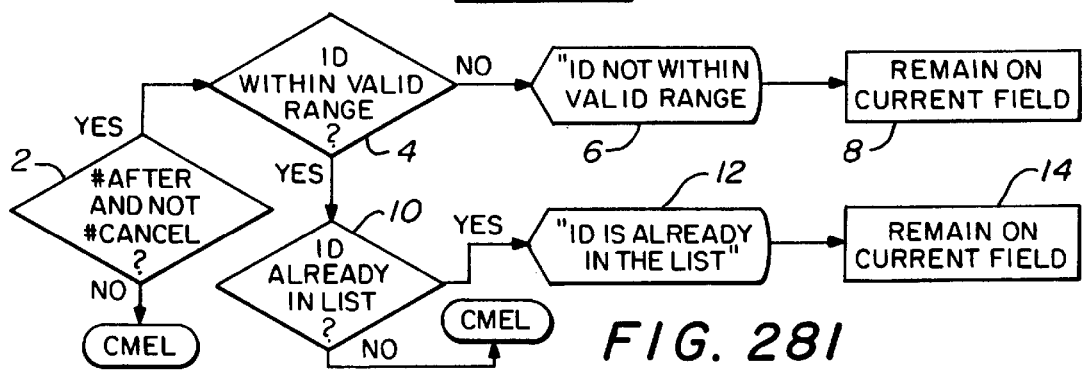
Figure 288:
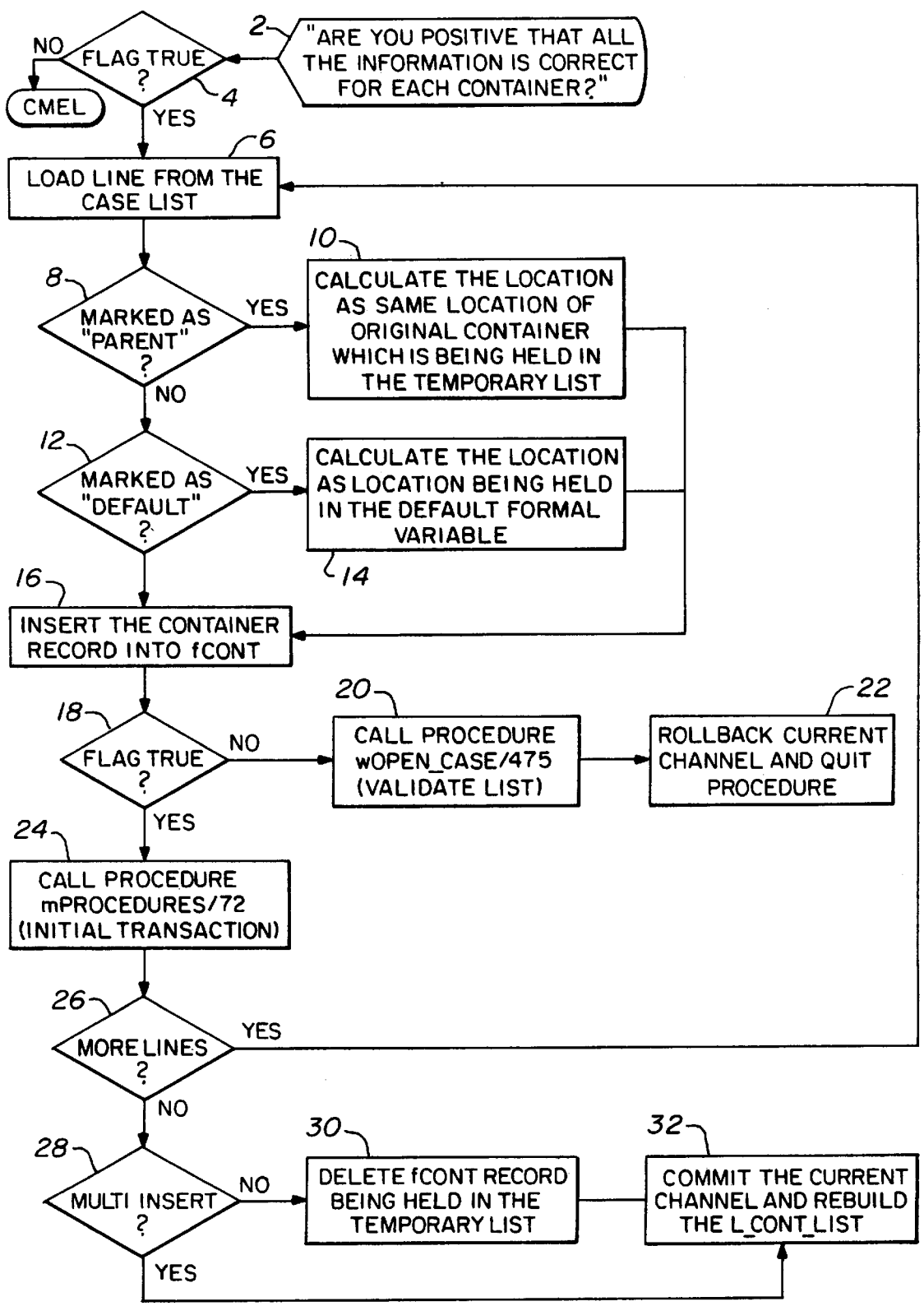
Figure 289:
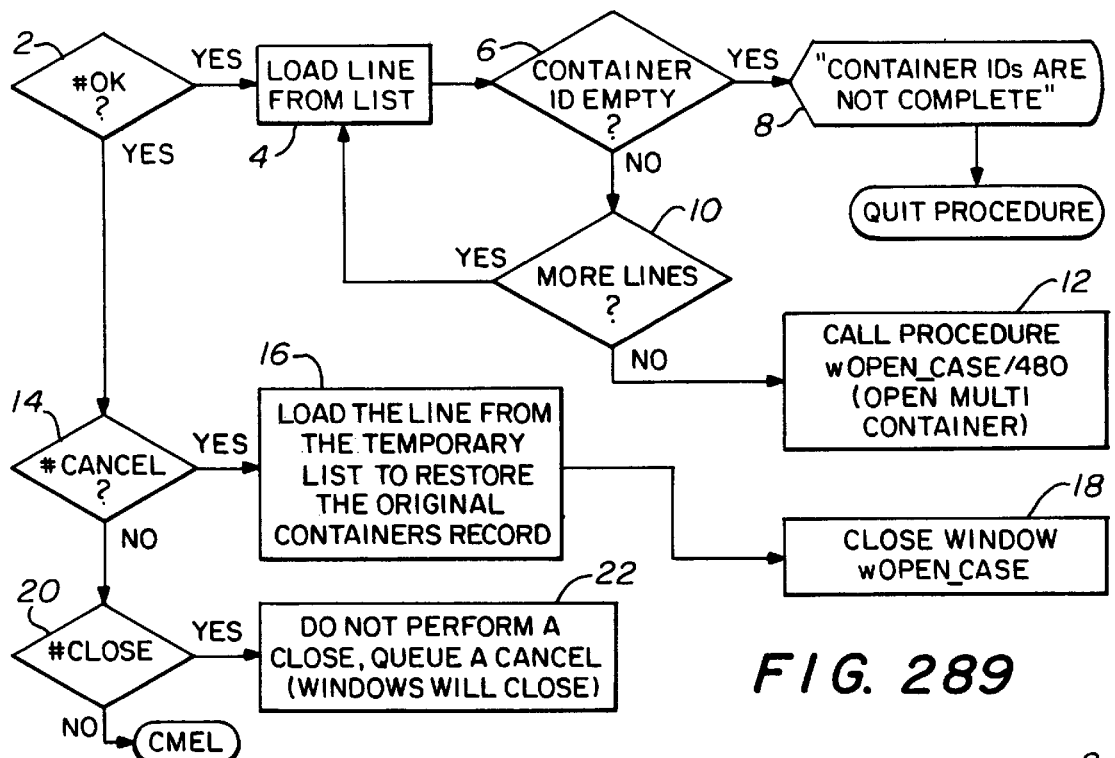
Figure 295:
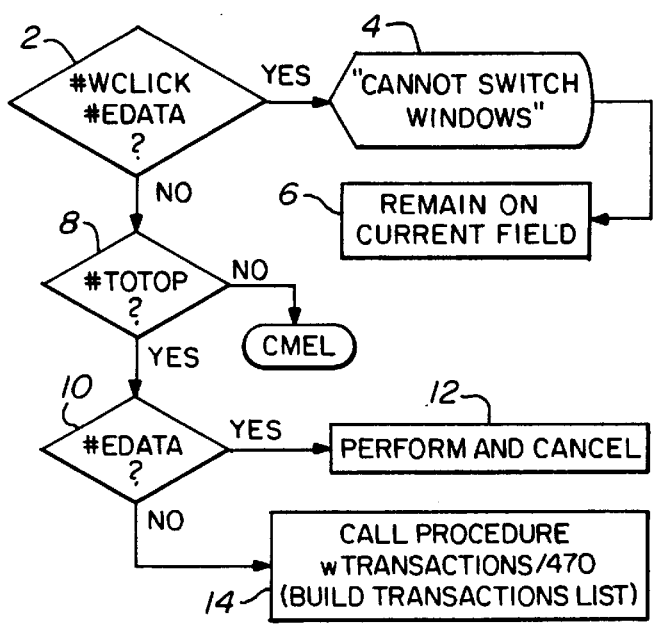
Figure 296:
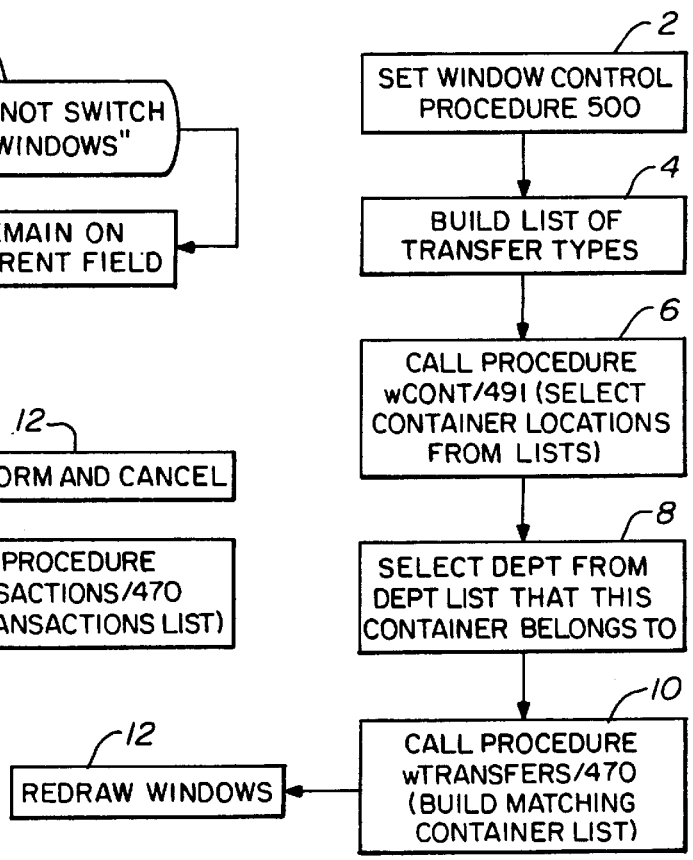
Figure 297:
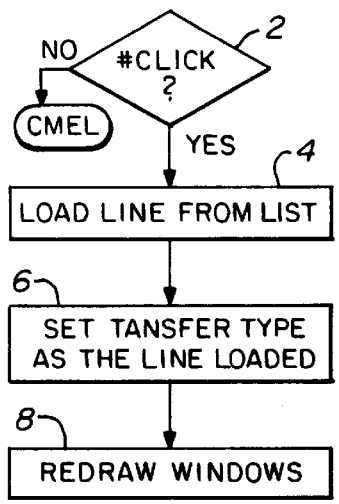
Figure 300:
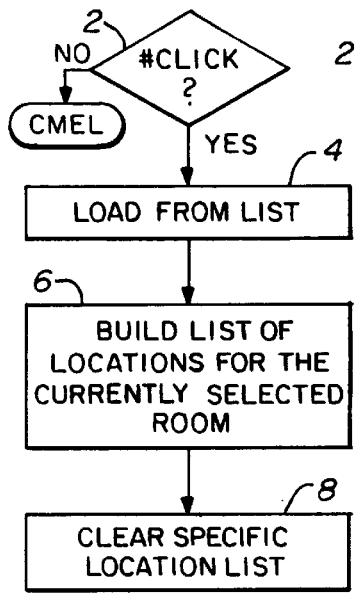
Figure 303:
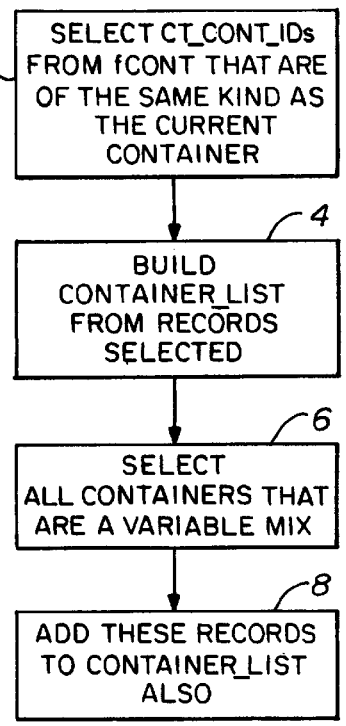
Figure 298:
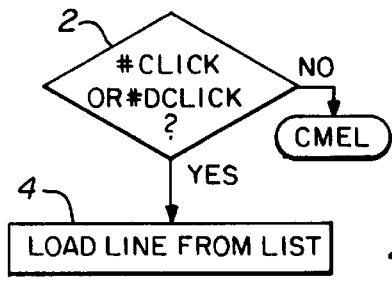
Figure 301:
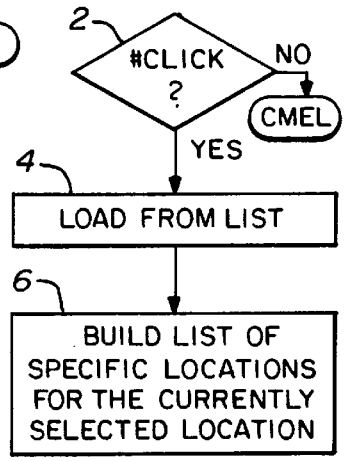
Figure 299:
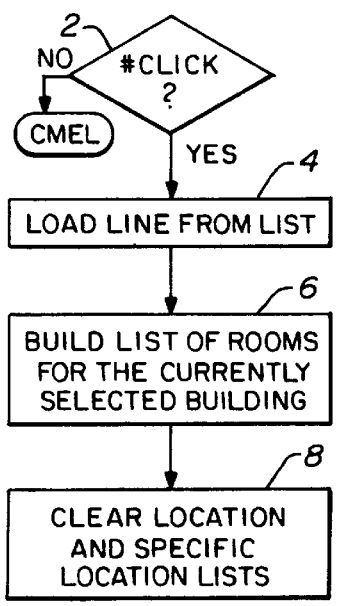
Figure 302:
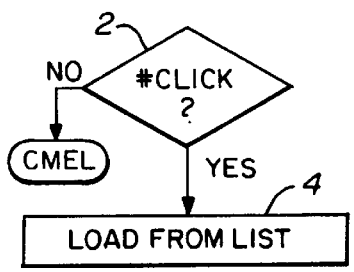
Figure 304:
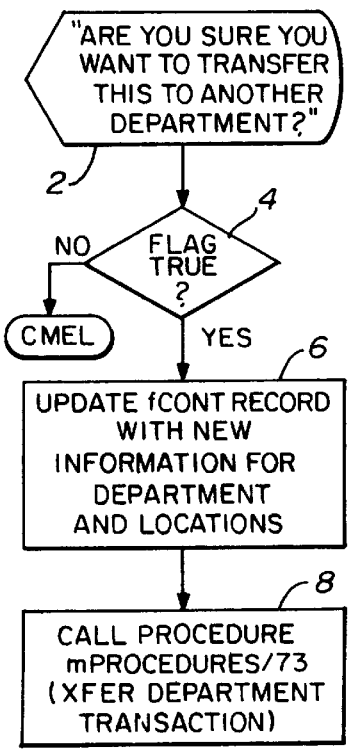
Figures 305, 306, 307:
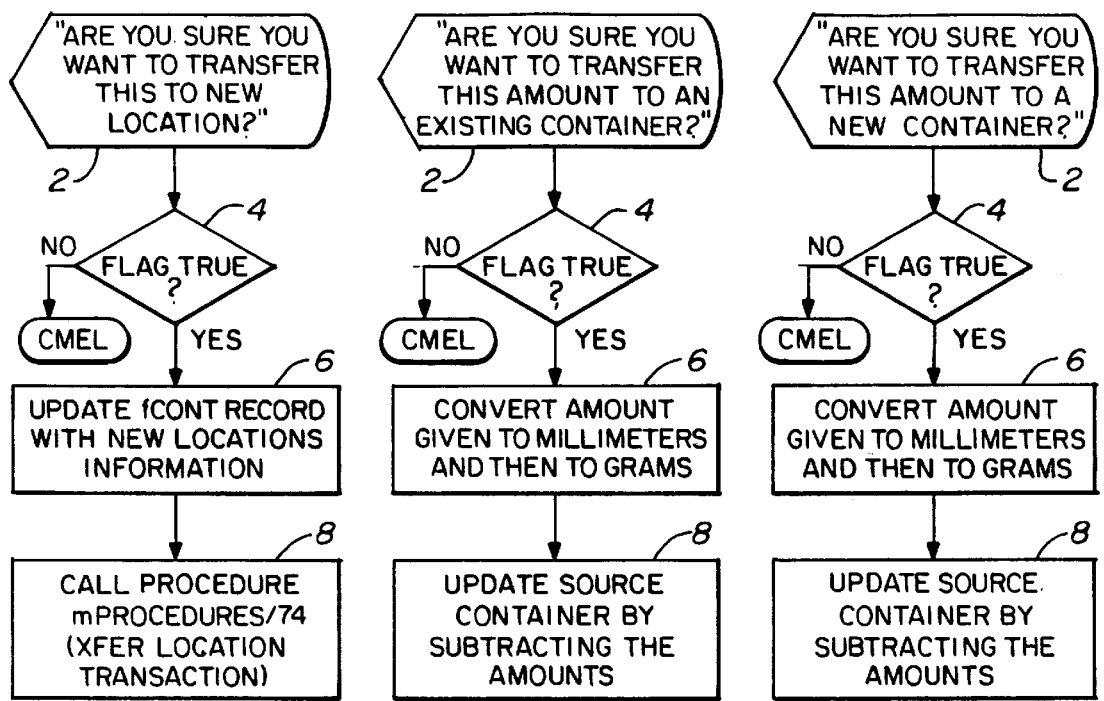
Figure 308:
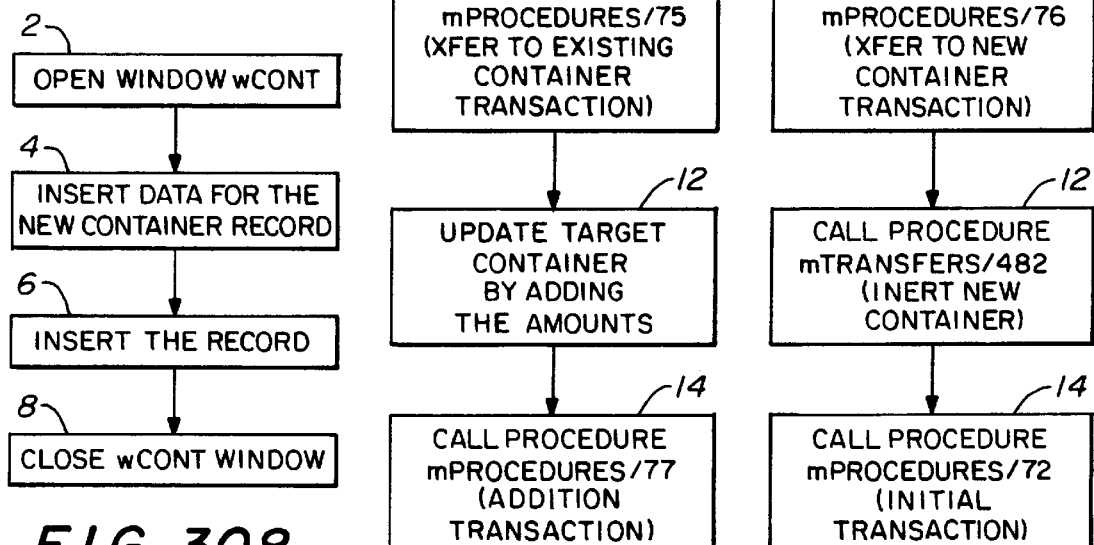
Figure 310:
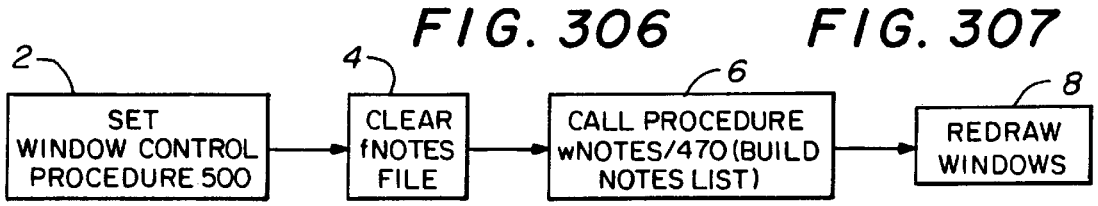
Figure 309:
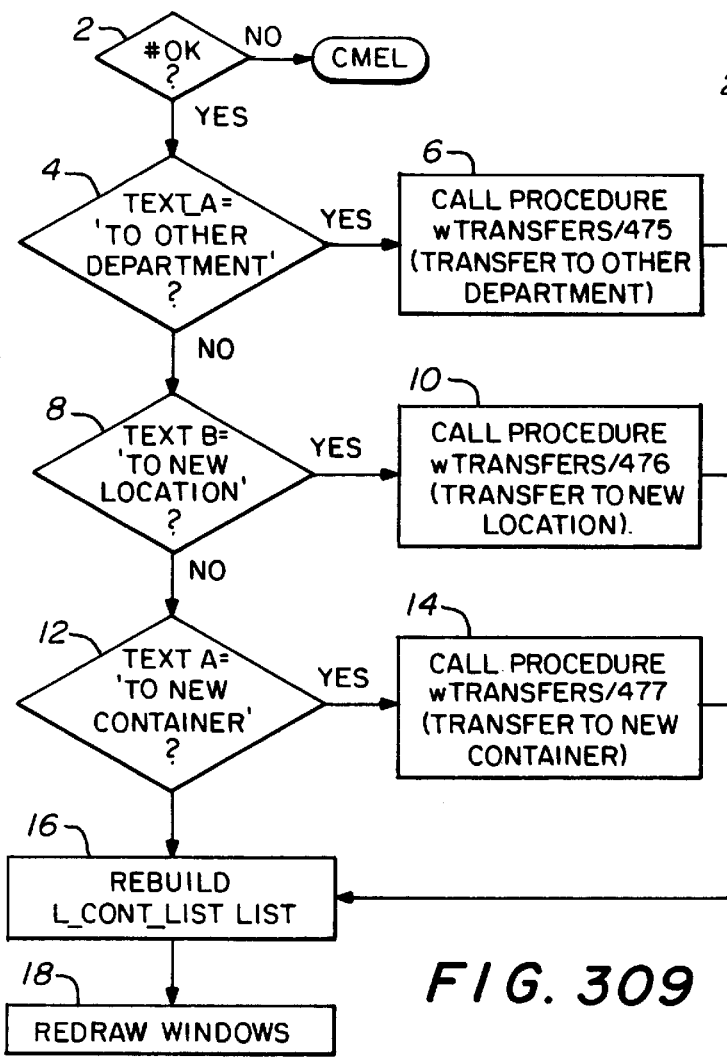
Figure 313:
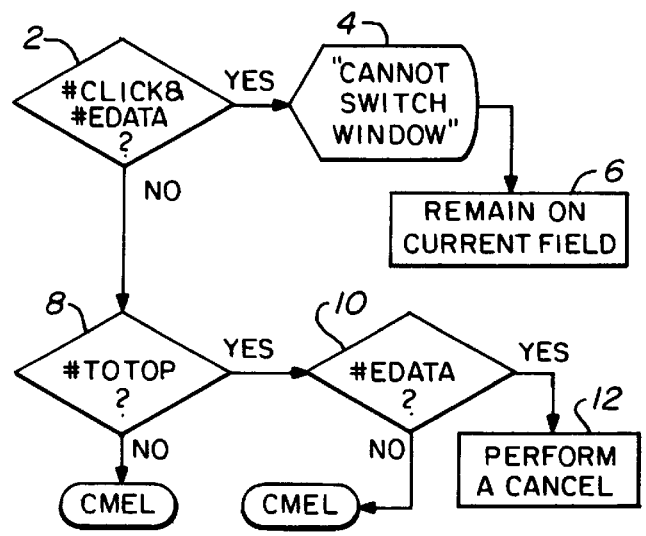
Figure 312:
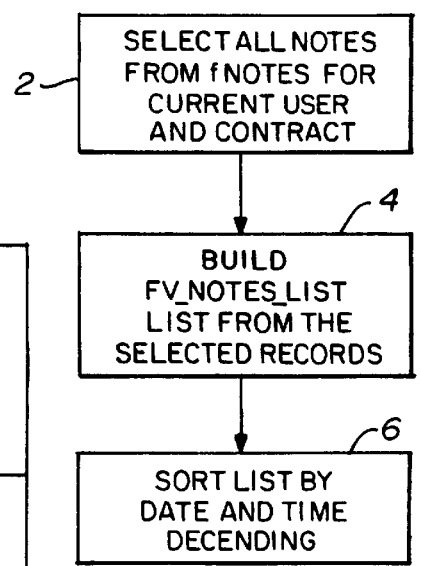
Figure 311:
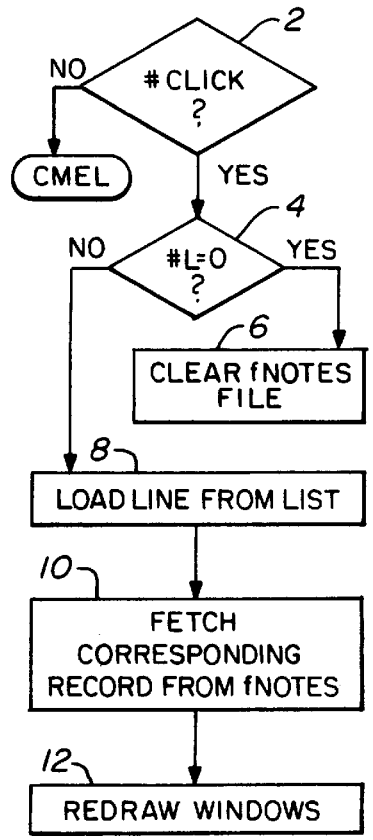

FIG. 105 relates commands to icons;

FIG. 106 is a File menu;

FIG. 107 is a Bar Code menu;

FIG. 108 illustrates the relationship of the system with the archive interface;

FIG. 109 illustrates an SQL Searcher window;

FIG. 110 is a diagram illustrating how the Integrated Emergency Response Design Element is integrated within the system;

FIG. 111 is a flow chart illustrating the use of the Integrated Emergency Response Design Element;

FIG. 112 is a flow chart setting forth the system main event processing loop;

FIG. 113 is a flow chart for the logon ICP;

FIG. 114 is a flow chart for the logon to the SQL host;

FIG. 115 is a flow chart for the name and password scripting;

FIG. 116 is a flow chart for updating the user logon and logoff record;

FIG. 117 is a flow chart for storing user data in library variables;

FIG. 118 is a flow chart for verifying logon;

FIG. 119 is a flow chart for logging on to the system host;

FIG. 120 is a flow chart for obtaining the user conversion preferences;

FIG. 121 is a flow chart for building lists in random access memory;

FIG. 122 is a flow chart for setting the user default department;

FIG. 123 is a flow chart for the logon WCP;

FIG. 124 is a flow chart for a user trace log ICP;

FIG. 125 is a flow chart for the user trace log clear routine;

FIG. 126 is the user trace log WCP;

FIG. 127 is the user window ICP;

FIG. 128 is a flow chart for opening the user trace log window from the users window;

FIG. 129 is a flow chart for copying of present user record to create a new user record;

FIG. 130 is a flow chart for creating a weight conversion list;

FIG. 131 is a flow chart for creating a volume conversion list;

FIG. 132 is a flow chart for deleting a user record;

FIG. 133 is a flow chart for window clean up for the user window;

FIG. 134 is a flow chart for deleting the user access rights to the system;

FIG. 135 is a flow chart for building weight and volume conversion lists in the user window;

FIG. 136 is a flow chart for selecting lines in the list of FIG. 135;

FIG. 137 is a flow chart for copying the current user department access record when creating a new record;

FIG. 138 is a flow chart for copying a current user function access record when creating a new user record;

FIG. 139 is WCP for the user window;

FIG. 140 is the flow chart for the read mail ICP window;

FIG. 141 is a flow chart for the send mail procedure of the read mail window;

FIG. 142 is a flow chart for obtaining a list of all unread and undeleted mail;

FIG. 143 is a flow chart for responding to receive mail;

FIG. 144 is a flow chart for setting the receipt acknowledged button;

FIG. 145 is a flow chart for deleting mail;

FIG. 146 is the department window ICP;

FIG. 147 is the flow chart for the department access list for a particular user;

FIG. 148 is the flow chart for creating a SQL search string for containers;

FIG. 149 is flow chart for building a department view list;

FIG. 150 is a flow chart for setting the default department for a particular user;

FIG. 151 is a flow chart for removing the default department;

FIG. 152 is a WCP for the department list window;

FIG. 153 is a flow chart for the ICP for the send mail window;

FIG. 154 is a flow chart for the WCP as a send mail window;

FIG. 155 is the flow chart for the ICP for the users rights window;

FIG. 156 is a flow chart for creating a list of all departments within the system;

FIG. 157 is a flow chart for building a list of all the departments within the system;

FIG. 158 is a flow chart for checking the user accessible departments;

FIG. 159 is a flow chart for deleting a users access to departments;

FIG. 160 is a flow chart for a WCP of the user rights window;

FIG. 161 is the flow chart for the ICP of the user preference window;

FIG. 162 is the flow chart for bringing up the weight conversion list;

FIG. 163 is a flow chart for bringing up the volume conversion list;

FIG. 164 is a flow chart for building weight and volume conversion list;

FIG. 165 is a flow chart for selecting preferences in the weight and volume conversion list;

FIG. 166 is a flow chart for the WCP of the user preference window;

FIG. 167 is the flow chart for the ICP of the users rights function window;

FIG. 168 is a flow chart for the menu list for the rights function window;

FIG. 169 is a flow chart for creating a list of menu functions;

FIG. 170 is a flow chart for creating a list of windows for users right function;

FIG. 171 is a flow chart for creating a list of window functions;

FIG. 172 is a flow chart for building a function list;

FIG. 173 is a flow chart for removing embedded titles in menus;

FIG. 174 is a flow chart for building a menu procedure list;

FIG. 175 is a flow chart for creating a format menu procedure list;

FIG. 176 is a flow chart for building a menus list;

FIG. 177 is a flow chart for checking the users accessible functions;

FIG. 178 is a flow chart for giving access to a user;

FIG. 179 is a flow chart for removing embedded titles in windows;

FIG. 180 is a flow chart for building a window procedure list;

FIG. 181 is a flow chart for creating a format window procedure list;

FIG. 182 is a flow chart for building a windows list;

FIG. 183 is a flow chart for checking accessible window functions;

FIG. 184 is a flow chart for the WCP of the rights function window;

FIG. 185 is a flow chart for the ICP of the administrator window;

FIG. 186 is a flow chart for the administrator edit function;

FIG. 187 is a flow chart for the WCP of the administrator window;

FIG. 188 is a flow chart for the ICP of the present users window;

FIG. 189 is a flow chart for logging off a present user;

FIG. 190 is a flow chart for building list of present user;

FIG. 191 is the flow chart for the WCP of the present user window;

FIG. 192 is the flow chart for the procedure to disable and enable menu commands;

FIG. 193 is the flow chart for checking disabled commands;

FIG. 194 is a flow chart for checking for window commands;

FIG. 195 is the flow chart for the procedure to insert a log entry into the trace log of a user;

FIG. 196 is the flow chart for logging off and quitting a system session;

FIG. 197 is the flow chart for locking a record;

FIG. 198 is a flow chart for unlocking and updating a record;

FIG. 199 is the flow chart for unlocking a record;

FIG. 200 is a flow chart for obtaining a block of container ID numbers;

FIG. 201 is a flow chart for obtaining the next sequential ID number;

FIG. 202 is a flow chart for obtaining the next unused ID number;

FIG. 203 is a flow chart for obtaining the next unique ID number;

FIG. 204 is a flow chart for checking the SQL statement for errors;

FIG. 205 is a flow chart for building a list;

FIG. 206 is a flow chart for selecting a line in a list;

FIG. 207 is a flow chart for selecting the first line in a list;

FIG. 208 is a flow chart for looking up a list;

FIG. 209 is a flow chart for assigning icons to library variables;

FIG. 210 is a flow chart for converting a parameter value to grams;

FIG. 211 is a flow chart for converting a parameter value to milligrams;

FIG. 212 is a flow chart for disabling certain function accesses depending on the user ID;

FIG. 213 is a flow chart for checking access for a particular user in displaying a message;

FIG. 214 is a flow chart for checking access for a particular user in sending an audible alarm;

FIG. 215 is a flow chart for a user to send electronic mail to the systems administrator;

FIG. 216 is a flow chart for checking electronic mail;

FIG. 217 is a flow chart for sending a confirmation of receipt of electronic mail;

FIG. 218 is a flow chart for updating a departments records for container ID numbers;

FIG. 219 is a flow chart for the administrator menu;

FIG. 220 is a flow chart for the ICP as a start up of the system;

FIG. 221 is a flow chart of the library control procedure for the start up of the system;

FIG. 222 is a flow chart for the timer control procedure idle timer;

FIG. 223 is a flow chart of the ICP for setting up a new transaction record;

FIG. 224 is a flow chart for inserting a transaction;

FIG. 225 is a flow chart for the initial transaction of a container;

FIG. 226 is a flow chart of a department transfer transaction;

FIG. 227 is a flow chart of a local transfer transaction;

FIG. 228 is a flow chart of a transfer to an existing container transaction;

FIG. 229 is a transfer to a new container transaction;

FIG. 230 is the flow chart of adding a substance to a container;

FIG. 231 is a flow chart of a consumption transaction;

FIG. 232 is a flow chart of a multiconsumption transaction;

FIG. 233 is a flow chart of bringing up the context windows for the current division;

FIG. 234 is a flow chart of the context for the default department;

FIG. 235 is a flow chart for personal contacts window for the present user;

FIG. 236 is a flow chart for setting port parameters for the bar code unit;

FIG. 237 is a flow chart for the bar code program editor;

FIG. 238 is the flow chart for the bar code interface;

FIG. 239 is a flow chart for loading the bar code unit with the necessary system information;

FIG. 240 is the flow chart for the ICP for the contacts window;

FIG. 241 is the flow chart to set the contact type for the contacts window;

FIG. 242 is the flow chart for rebuilding contact list;

FIG. 243 is a flow chart for the WCP of the contacts window;

FIG. 244 is a flow chart of the ICP of the consumption window;

FIG. 245 is a flow chart to building a residual container list;

FIG. 246 is a flow chart to build a process list;

FIG. 247 is a flow chart to do a consumption transaction;

FIG. 248 is a flow chart for the WCP of the consumption window;

FIG. 249 is the flow chart for the ICP for the multiconsumption window;

FIG. 250 is the flow chart for adding to a multiconsumption list;

FIG. 251 is a flow chart for replacing a line in a multiconsumption list;

FIG. 252 is a flow chart for removing a line from the multiconsumption list;

FIG. 253 is a flow chart for adding a by product;

FIG. 254 is a flow chart for replacing a by product;

FIG. 255 is a flow chart for removing a by product;

FIGS. 256 and 257 are flow chart for the procedure run after the multiconsumption process is done;

FIG. 258 is a flow chart for building a type list;

FIG. 259 is a flow chart for building a container list;

FIG. 260 is a flow chart for setting up lists for the multiconsumption window;

FIG. 261 is a flow chart for refiguring amounts;

FIG. 262 is a flow chart for building a component list;

FIG. 263 is a flow chart for checking the inserted percentages;

FIG. 264 is a flow chart for checking edited percentages;

FIG. 265 is a flow chart for obtaining MCP components;

FIG. 266 is a flow chart for inserting a MCPC record;

FIG. 267 is a flow chart for copying MCP components to the transaction file;

FIG. 268 is a flow chart for updating container record;

FIG. 269 is a flow chart for inserting a by product record;

FIG. 270 is a flow chart for updating a by product container record;

FIG. 271 is a flow chart for inserting a by product link;

FIG. 272 is a flow chart for building a by product list;

FIG. 273 is a flow chart for inserting by product link;

FIG. 274 is a flow chart for inserting a by product;

FIG. 275 is a flow chart for building a residual container list;

FIG. 276 is a flow chart for the WCP of the multiconsumption window;

FIG. 277 is a flow chart for the ICP of the MCP window;

FIG. 278 is a flow chart for the MCP components button;

FIG. 279 is a flow chart to build the MCP list;

FIG. 280 is a flow chart for the ICP of the open case window;

FIG. 281 is a flow chart for the current container ID of the open case window;

FIG. 282 is a flow chart for selecting the parent container;

FIG. 283 is a flow chart for designating a default location;

FIG. 284 is a flow chart for establishing a new location;

FIG. 285 is a flow chart for setting a default location;

FIG. 286 is a flow chart for building a case list;

FIG. 287 is a flow chart for validating a list;

FIG. 288 is a flow chart for opening a multicontainer case;

FIG. 289 is a flow chart for the WCP of the open case window;

FIG. 290 is the ICP of the processes window;

FIG. 291 is the flow chart to build a process list;

FIG. 292 is the WCP of the processes window;

FIG. 293 is the flow chart for the ICP of the transactions window;

FIG. 294 is a flow chart of a build transaction list;

FIG. 295 is a flow chart of the WCP of the transactions window;

FIG. 296 is a flow chart of the ICP of the transfers window;

FIG. 297 is a flow chart to select a transfer type;

FIG. 298 is a flow chart containing a list of all departments user has access rights to;

FIG. 299 is a flow chart of the buildings for the division to which the user has access;

FIG. 300 is a flow chart of a list of all rooms to which the user has access;

FIG. 301 is a flow chart of the location list to which the user has access;

FIG. 302 is a flow chart of the specific location to which the user has access;

FIG. 303 is a flow chart of a list containing containers that may receive residual materials for the current container;

FIG. 304 is a flow chart for the transfer to another department;

FIG. 305 is a flow chart for a transfer to a new location;

FIG. 306 is a flow chart for a transfer to an existing container;

FIG. 307 is a flow chart for a transfer to a new container;

FIG. 308 is flow chart for adding a new container to the system;

FIG. 309 is the WCP for the transfers window;

FIG. 310 is a flow chart for the ICP of the notes window;

FIG. 311 is a flow chart for the list of notes for particular user;

FIG. 312 is a flow chart for building a notes list;

FIG. 313 is a flow chart for the WCP of the notes window;

FIG. 314 is a flow chart for designating a special chemical storage group;

FIG. 315 is a flow chart for a general description window;

FIG. 316 is a flow chart for assigning storage and nonstorage areas within buildings;

FIG. 317 is a flow chart for the compliance/education file;

FIG. 318 is a flow chart for tracking MSDS;

FIG. 319 is a flow chart for designating a user with a given rank;

FIG. 320 is a flow chart for printing labels; and

FIG. 321 is a block diagram representing the safety equipment management.

DESCRIPTION OF THE PREFERRED EMBODIMENT

Figure 1:
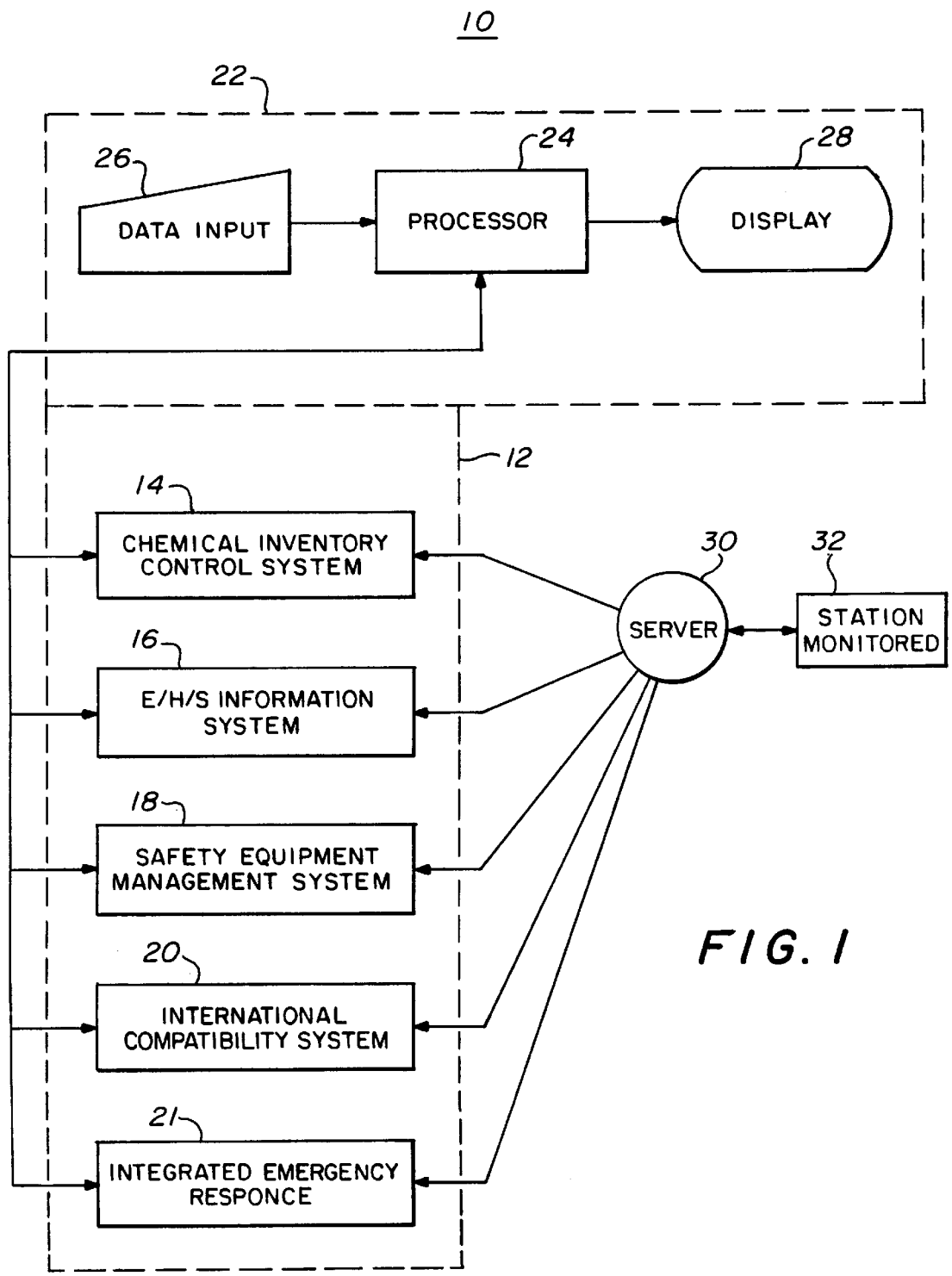
FIG. 1 is an overview of the system according to the present invention.

The present invention is a system 10, as shown in FIG. 1, which incorporates five basic design elements into one comprehensive application 12. The five elements of application 12 are a chemical inventory control system 14, an environmental/health/safety information system 16, a safety equipment management system 18, an international compatibility system 20 and an integrated emergency response system 21. The application 12 is coupled to the user interface 22 such as a personal computer that contains a processor 24 and a data input device 26 (such as a keyboard) and a display 28 for displaying the inputted data and/or the information supplied by application 12 to the user. Preferably, a server 30 is coupled to application 12 to allow multiple stations 32 to be monitored from a central location.

Each aspect of the invention shall be discussed in detail below under the following section headings:

Section 1—Chemical Inventory Control System

Section 2—Environmental/Health/Safety Information System

Section 3—Safety Equipment Management System

Section 4—International Compatibility System

Section 5—Integrated Emergency Response System

Listed below is an outline of the Chemical Management System of the present invention. Each of the structures outlined below will be discussed in detail in various sections as indicated. Multiple structures are used for each of the five sections indicated above and specific reference will be made to the discussion appropriate for each section. It is noted that all headings in the following description follow the outline to allow for easy reference to a particular aspect of the system.

The portions of the outline that specifically concern the five design structures of the system have been set forth separately under the corresponding headings. However, these portions also maintain the outline headings to make it easy to see where each structure fits within the overall system. In addition, when reviewing the system outline below, it is essential to note that all portions of the outline are covered under section 1 unless noted "in italics" to be covered under either section 2, 3, 4, or 5.

SYSTEM OUTLINE

I. Administrative
   A. Host set-up
   B. User set-up
   C. Function access
   D. Department/Division access
   E. System Electronic Mail
II. Table/Set-up Maintenance (administrator access only)
III. Chemical Management
   A. Inventory classification
      1. In-use
         a. Pure
         b. Trade name
         c. Preset Mix
         d. Variable Mix
      2. Surplus
      3. Waste
   B. Inventory File Structure
      1. Main
         a. ID/CAS (or NO CAS)
         b. Prefix
         c. Name and Synonym
         d. Grouping
         e. Density
         f. Type
         g. Chemical Molecular Formula
         h. Chemical Structural Formula
         i. Molecular Structure Drawing
         j. Molecular Weight
         k. Physical State
         l. Minimum & Maximum Volumes
         m. Storage Group covered under section 2
            i. Special covered under section 2
            ii. General Description Window covered under section 2
            iii. Designated Area covered under section 2
               (a) Designated Storage Area and Designated Nonstorage Area covered under section 2
               (b) Storage/Use Designation covered under section 2
         n. Color Code covered under section 2
      2. Type
         a. Pure
            i. Purity
            ii. Grade
            iii. Description
         b. Trade name
         c. Preset Mix
         d. Variable Mix
      3. Container
         a. Container ID
         b. Division/Department
         c. Chemical Amount
            i. Weight (Dry)
               (a) Left
               (b) Original
            ii. Volume (Wet)
               (a) Left
               (b) Original
            iii. Container Size
            iv. Container Traits
               (a) Container Type
               (b) Single or Multiple Container
            v. Visual Container Depiction
            vi. Measurement Setting
         d. Received (Date Received)
         e. Inventory (Last Inventory Date)
         f. Expiration (Expiration Date)
         g. Waste (Date Converted to Waste)
         h. Manufacturer
            i. Product Number
            ii. Lot Number
         i. Retailer
            i. Product Number
         j. PO Number
         k. Project
            i. Controller
         1. Mapping
            i. Building
            ii. Floor
            iii. Room
            iv. Location
            v. Specific location
   C. Lists
      1. Consolidated Lists
      2. Data Defined Entry Lists
         a. Synonym—Alterable
         b. Type—Alterable
         c. Physical State—Nonalterable
         d. Grade—Alterable
         e. Description—Alterable
         f. Container Type—Alterable
         g. Manufacturer—Alterable
         h. Retailer'Alterable
         i. Building—Alterable
         j. Room—Alterable
         k. Location—Alterable
         l. Specific Location—Alterable
         m. Deterioration Category—Alterable
   D. Searches & Reports
      1. Searches
         a. Preset searches
            i. Type Lists
               (a) Purity, Grade, and Description for Pure Chemicals
               (b) Vendors for Trade name Chemicals
            ii. Individual Container Lists
               (a) Pure Chemicals
               (b) Trade name Chemicals
               (c) Preset Mix Chemicals
               (d) Variable Mix Chemicals
         b. User Defined Searches
            i. Components of a Preset Mix
            ii. Multiple Consumption Process
            iii. SQL Searcher
      2. Reporting
         a. Ad Hoc Reporting b. Preset Reports
E. Inventory
 1. Division specific
  a. Bar code
   i. Method One
   ii. Method Two
  b. Nonbar Code
 2. Department Specific
 3. Site Specific
F. Transactions
 1. Container
  a. Single Consumption Process (SCP)
  b. Multiple Consumption Process (MCP)
 2. MSDS covered under section 2
IV. Safety Equipment Management all of IV covered under section 3
 A. Fume/Exhaust Systems
 B. Chemical Eyewash and Safety Showers
 C. Generic Category
V. Compliance and Education all of V covered under section 2
 A. Compliance/Education File
  1. Boolean Check Boxes
  2. Data Defined Entry Lists
  3. Inserting Text
  4. Insertion of Information
  5. Automatic Threshold Analysis
 B. Environmental/Safety/Health Awareness Icons
 C. Interactive Educational Multimedia
  1. Development Tools Provided for On Site Development of Systems
  2. Professionally Developed Multimedia Modules
 D. Information Gathering
 E. MSDS Scan and Text Import
  1. Cataloging
  2. Scan and Text Import
VI. Archiving
 A. Transactions
  1. Users
   a. Normal System Functions
   b. Compliance/Education Functions covered under section 2
    i. Education Rank covered under section 2
     (a) Professional covered under section 2
     (b) Experienced covered under section 2
     (c) Novice covered under section 2
     (d) Automatically Updating of the Rank from Novice to Experienced covered under section 2
  2. Containers
 B. MSDS covered under section 2
 C. Users
VII. Labels
 A. Hazardous Materials
  1. Tracking
   a. Bar Code
   b. Nonbar Code
    i. Hand Written
    ii. Printer Generated
  2. Chemical Name/Compliance covered under section 2
   a. Secondary Containers covered under section 2
   b. Mixed Containers covered under section 2
   c. Surplus Containers covered under section 2
   d. Waste Containers covered under section 2
   e. Replacement for Labels for the Original Containers covered under section 2
 B. Fume Hoods covered under section 3
 C. Eyewash and Safety Showers covered under section 3
VIII. Requisition System
IX. Contact Manager
 A. Vendors
 B. Department Personnel
 C. Division Personnel
 D. Personal Contacts
 E. Government Agencies
 F. Professional Support
 G. Hazardous Waste Companies
 H. Emergency Phone Contacts and Numbers
X. International Design Elements all of X covered under section 4
 A. Multi-tiered Compliance/Education File
 B. Text Translator
XI. Integrated Emergency Response all of XI. covered under section 5

Section 1—Chemical Inventory Control System

Chemical inventory management is increasingly mandated and controlled by local, state and federal regulations. These regulations have increasingly become more stringent in order to minimize the use of chemicals and develop suitable cradle-to-grave management systems for tracking hazardous materials. There are three essential ways of managing the chemical inventories and they are centralized, decentralized, and uniquely identified methods. Shown in FIGS. 2A–2C are three chemical management methods that can be used with the present system.

Figure 2A:
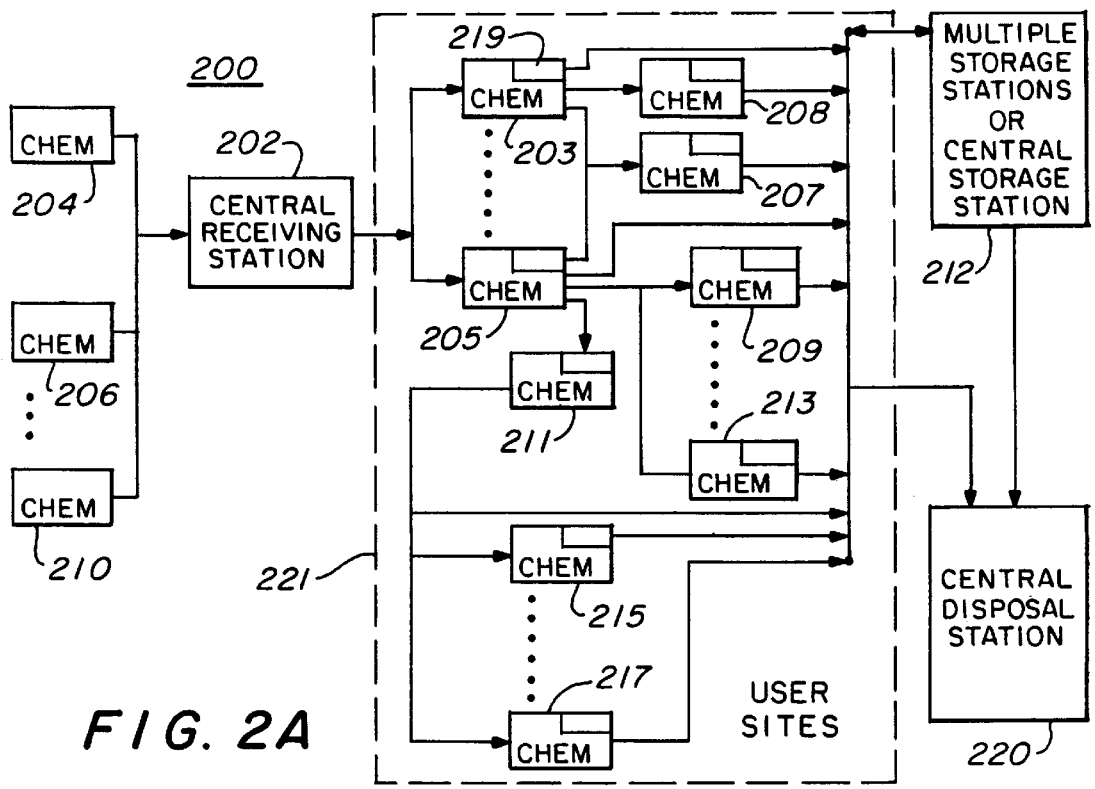
FIG. 2A is a general block diagram of one mode of operating the present system.

FIG. 2A discloses the centralized method 200, which is the least complicated design. A central receiving station 202 is used to record all incoming chemicals 204–210 and categorize pertinent information for each of the chemicals. Centralized method 200 requires the close monitoring of the inflow of chemicals 204–210 at the central station 202 and the subsequent non-monitored outflow of chemicals at users sites 221, and either one of the following: 1) non-monitored movement of chemicals to and from multiple storage areas 212, 2) a non-monitored movement of chemicals to and from a central storage station 212, or 3) a monitored movement of chemicals from a centralized storage station 212 leading to the eventual close monitored disposal of waste chemicals at a centralized disposal station 220. In addition, the central storage receiving station 202, central storage station 212, and the central disposal station 220 can either be: 1) singular/separate units; 2) two combined units and one separate unit; or 3) one combined unit. Furthermore, a periodic inventory of the volume of each container holding chemicals can be performed, depending on the centralized inventory approach, at the centralized stations 202, 212, or 220. As can be seen in FIG. 2A, all chemicals received at stations 202 are labeled as indicated at 219. If chemicals 203 and 205 are combined to form a new chemical 207, the new chemical 207 is recorded in computer memory and labeled at the central receiving station 202. In like manner, if a part of chemical 203 is placed in a separate container 208, part of chemical 205 is placed in separate containers 209–213 or part of chemical 211 is further placed in containers 215 and 217, at user sites 221, all of the new containers are recorded in computer memory and are labeled individually at the central receiving station 202.

Figure 2B:
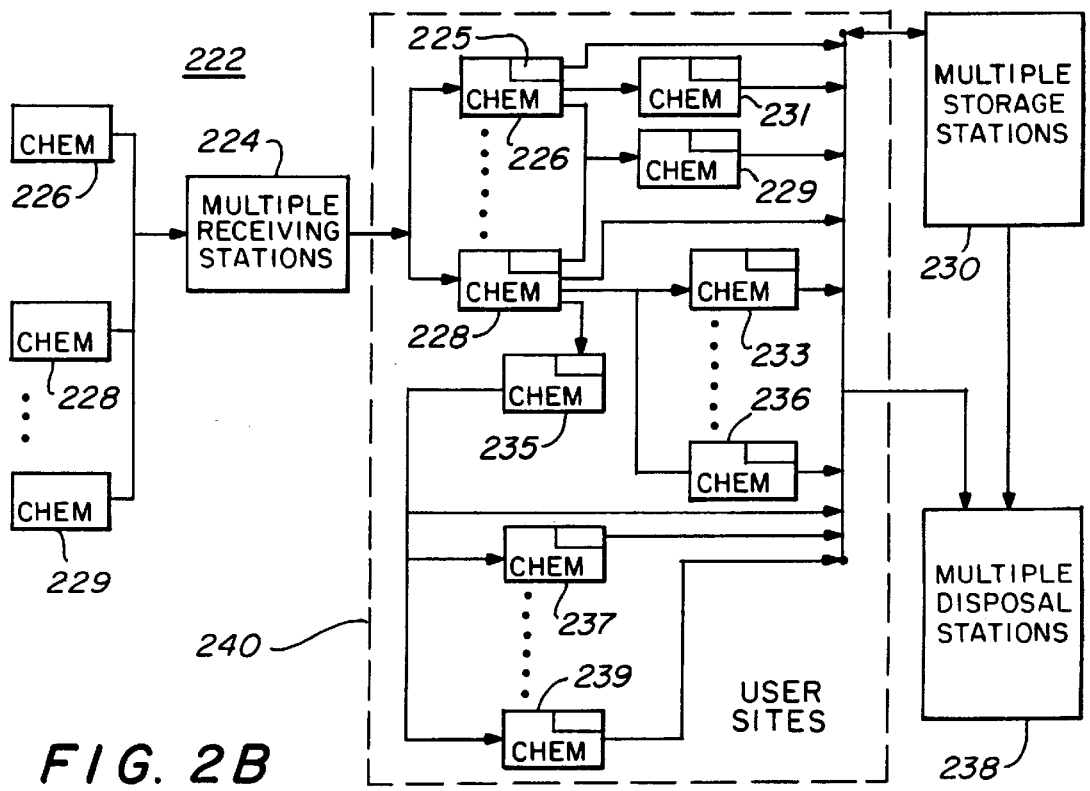
FIG. 2B is a general block diagram of an alternative method of using the present system.

FIG. 2B discloses a decentralized method 222 that incorporates several combined receiving and disposal stations 224 strategically located throughout an academic institution, a corporation, or a small business. Each station 224 is responsible for maintaining an up-to-date chemical inventory at its respective place. The maintenance of chemical inventories is accomplished by recording the inflow of chemicals 226, 228, and 229 and labeling them as indicated at 225 and the subsequent non-monitored outflow of chemicals at users sites 240, and the monitored or non-monitored movement of chemicals to and from multiple storage areas 230 leading to the eventual close monitored disposal of waste chemicals at multiple disposal stations 238. In addition, the multiple receiving stations 224, multiple storage stations 230, and multiple disposal stations 238 can be: 1) singular/separate units or 2) various combinations of receiving, storage, and/or disposal stations. However, both receiving and disposal stations closely monitor chemicals while storage stations may or may not monitor storage depending on the decentralized inventory approach followed. Furthermore, this inventory control method supports the periodic inventory of the volume of each container holding chemicals at the multiple stations 224, 230, and 238.

Next, FIG. 2C discloses the third approach to chemical inventory management, the uniquely identified method 246. This method requires that each individual chemical container 248, 249, and 250 be uniquely identified, preferably by use of a bar code 259 and tracked throughout the container's useful life, i.e., until all the chemical within a given container is used or finally disposed of as a waste. This is accomplished by maintaining a transaction file, or T file, 257 of the particular container. This methods incorporates a real time approach to chemical management and can provide the ability to update information daily regarding quantity, location, container volume, container transfer, container consumption, and eventual container disposal. This is done by uniquely marking chemicals 248, 249, and 250 at a receiving station 254 and continuously tracking the containers during the following operations: 1) use at user sites 268, 2) movement of chemicals to and from multiple storage areas 256, and 3) eventual disposal of containers at multiple disposal stations 258. This system is the most thorough and rigorous form of chemical inventory management and enables one to know how much of a chemical went down the drain (into the waste water or sewage system), up a stack (into the atmosphere), was transferred to another container, was transformed into a by-product, or became waste.

The present invention incorporates the ability to easily accommodate any of the three chemical management methods or any combination of these management systems. This is accomplished through the following design structures within a system as set forth in the outline above.

I. ADMINISTRATIVE

The administrative set-up of the present invention has structure allowing it to operate in very dissimilar environments such as a small business with one computer, a large university with disparate environments, or a large industry with multiple plants remotely located from each other. As those skilled in the art will realize it is preferable that the cross-platform capabilities of such a system to work in various environments such as Microsoft Windows™, Unix™, OS-2™, or Macintosh™ relies heavily on a programming language such as Omnis 7™³ to support such a system design.

A. Host Set-Up

Preferably the host set-up uses the same format to create a connection from the present invention to a host such as those available from Oracle™, Sybase™, or Ingres™. This allows the present invention to operate in different host and cross-platform environments. Three examples of such environments are shown in FIGS. 3, 4, 5A, and 5B.

FIG. 3 illustrates a standard computer platform 300 such as Macintosh™, Windows™, Unix™, etc. in a stand alone set-up. In this configuration a standard computer platform 300 has the application 302 installed within the computer and the application 302 connects to a sequel query language ("SQL") data file 304 via an SQL connect routine 306.

FIG. 4 illustrates an array of SQL servers 400 access through various platforms 402, 404, and 406 that all could be different native platforms. The SQL server or data file 400 is accessed by the platforms 402–406 via similar application and connect routines 410, 414, and 418 as described above in FIG. 3.

The third example of the system operating in host and cross-platform environments is shown in FIGS. 5A and 5B. In FIGS. 5A and 5B the central SQL database server 500 is accessed through various platforms 502–514 as shown. It is possible to connect a large number of SQL servers to various platforms simply by using the proper connects provided for in the programming language used in the present invention such as the preferred Omnis 7™³. Each connect routine 306, 410, 414, and 418 enables the present invention to interact with the SQL server 304, 400, or 500. Once the host set-up is completed it is likely that it will not be used again unless the data is moved to a different host. The host set-up creates the ability to communicate to the present inventive system the host type, location, which particular connect to use, and sets up password protection for each user.

Password protection includes unique passwords for each user, expiration of passwords after a preset time, and disabling passwords after a preset number of invalid log-in attempts. A typical set-up window 600 is shown in FIG. 6 which allows the system administrator to set up the defaults and supply the necessary information as indicated in FIG. 6.

Specific, detailed flow charts of preferred procedures within the present system that correspond to the last set-up are set forth at FIGS. 114–119, 185–187, 196, and 220

B. User Set-Up

The novel user set-up of the present invention allows every individual, including the administrator, to have their own user record 700 that is displayed to the administrator such as in FIG. 7. The user record defines the extent of access that a particular user has to the inventive system and includes an automatic logoff field 702. For example, the record defines personal user preferences, which were set by the user as seen in FIG. 8 at window 800. Window 800 includes allowing the user to establish a desired weight conversion 802 and a desired volume conversion 804 into a preferred set of units. In addition, the system allows the user to check a series of boxes 806 to set-up the various default conditions for displaying vendors, check E-Mail, or initially displaying the first type of a found main chemical record. The user record also defines the access level of a particular user. This access level is set by the system administrator and includes function access and division, department and user access as explained below at headings C and D, in connection with windows 900 and 1000 shown in FIGS. 9A, B, and C and 10, respectively.

Also, the user set-up portion of the system preferably tracks certain defined functions allowed by each user's access level and places these functions in a user's trace log. For example, when a user logs on, such as shown in FIG. 11, by entering his name at numeral 1100 and his password at 1102, logs out, inserts, edits, deletes data, or if the user makes an ID block request, etc., the system hereof preferably automatically places this information in the individual user's trace log such as shown in FIG. 12 at window 1200. In order to eliminate the problem with users logging on to the system but not actively using the system, which can tie up and significantly slow down the effectiveness of the system, the present system preferably allows the administrator to preset an auto logoff time for each individual user, such as shown in FIG. 7 at 702. In addition, the administrator preferably has the ability to check to see which users are logged-On to the system at any given time such as shown in the example of FIG. 13 at window 1300.

The flow charts that specifically concern the user set-up portion of the present system are set forth at FIGS. 124, and 127–139.

C. Function Access

As used herein the term "function" is defined as any button, menu, menu item, list, field, or any object the user can click or double-click on to make an action occur. Preferably, the system hereof is set to default to a state such as when a user record is initially created the user has access to all functions within the system except for administrative functions. The administrative function then preferably allows the administrator to restrict at the top level the division access of all users within the division, at the mid level the department access of all users in the department, and finally at the bottom level the individual user access to any of the functions within the system. The present system incorporates a three-tier hierarchy function access design that supports different restriction of function access from the top (division level) to the mid (department level) to the bottom (user level). Further stated, the restriction of function access at the division level restricts the function access of all the departments under the division and all users with access to any department within the division. Next, the further restriction of function access at the individual department level (within the above division) will further restrict the function access of all users within the department. Finally, the administrator can further restrict function access at the individual user level.

Function access is controlled by building the L_ACCESS_LIST shown in TABLE I LOGON. This list will contain a record for every function to which a user, department, or division does not have access.

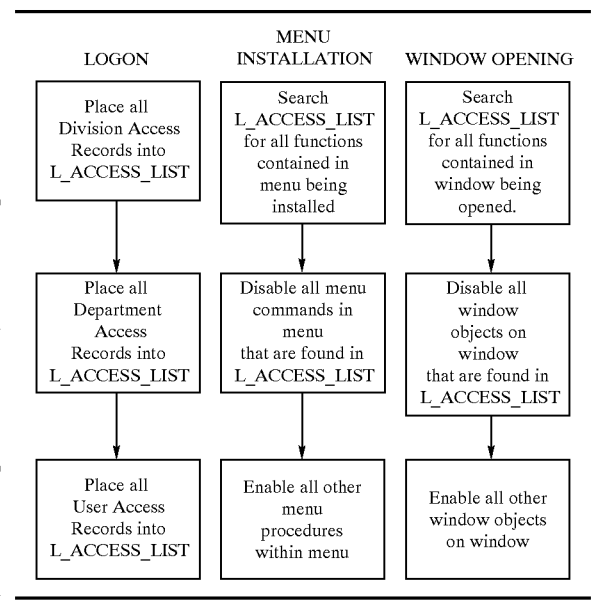

TABLE I

| LOGON | MENU INSTALLATION | WINDOW OPENING |
|---|---|---|
| Place all Division Access Records into L_ACCESS_LIST | Search L_ACCESS_LIST for all functions contained in menu being installed | Search L_ACCESS_LIST for all functions contained in window being opened. |
| Place all Department Access Records into L_ACCESS_LIST | Disable all menu commands in menu that are found in L_ACCESS_LIST | Disable all window objects on window that are found in L_ACCESS_LIST |
| Place all User Access Records into L_ACCESS_LIST | Enable all other menu procedures within menu | Enable all other window objects on window |

Figure 24A:
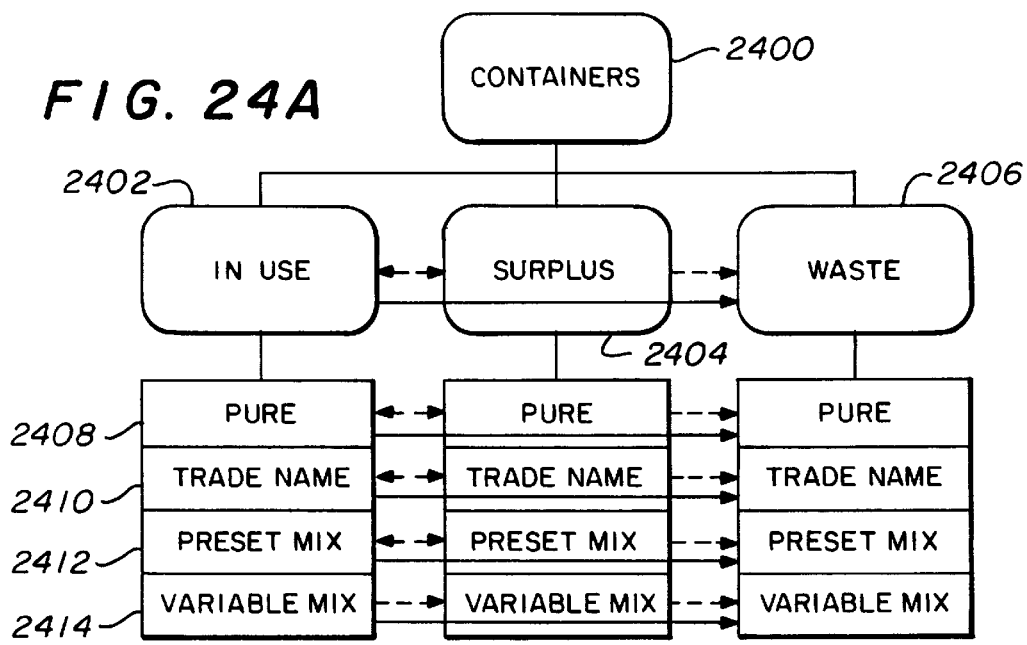
FIGS. 24A, B, and C are block diagrams representing three of the possible many categorizations of chemical containers in the present system.
Figure 24B:
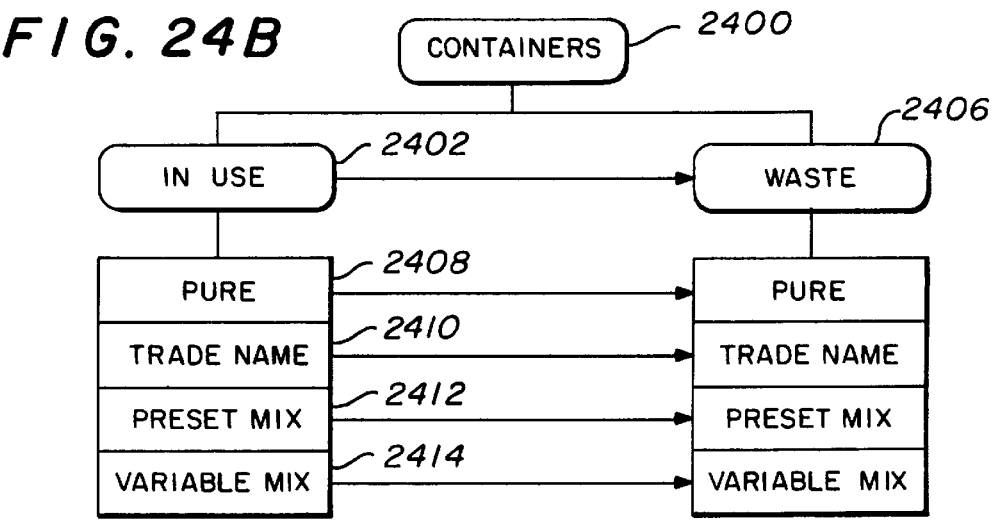
Figure 24C:
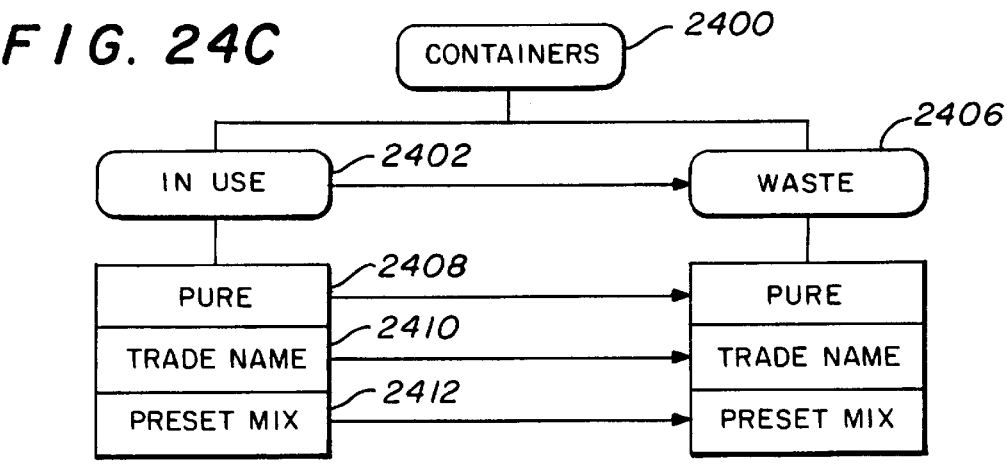

Then whenever a menu is installed, a check is made for any functions that need to be disabled (see TABLE I MENU INSTALLATION). A similar check is carried whenever a window is opened (see TABLE I WINDOW OPENING). For example, referring to FIG. 24A, in regard to a division and department, the administrator can restrict access in various ways in regard to the three primary inventory groups of chemical containers and the four classes that further define those groups (see III. A. and III. A. 1. for explanation regarding chemical container groups and classes). A more indepth example of the above is where an administrator restricts function access to the SURPLUS GROUP at the division level. All users (with or without user function access to the SURPLUS GROUP) upon accessing any department within that division would not have the function access to the SURPLUS GROUP functions, as shown in FIG. 24B. The restricted function would either be grayed or become invisible to the user in the menu, window, or etc . . . by the administrator pushing the button "INVISIBLE" or "GRAYED" in the "Division Function Rights" administrative window, see FIG. 9A, window 900, bottom of window. This same procedure is used regarding both department and user function rights, see FIGS. 9B and 9C. In addition, an administrator could further restrict at the department level, in said division, the function access to the VARIABLE MIX class. Any user (with or without user function access to the VARIABLE MIX class) who accessed the said department would be restricted at the department level to accessing the VARIABLE MIX class functions, as shown in FIG. 24C where VARIABLE MIX is removed. The administrative function also allows the administrator to restrict particular users' access to any number of other functions within the system. At the user level the user may have function access (for example, VARIABLE MIX functions) but access is denied within certain division and departments because of the restricted function access set for that particular division and/or department at a higher access level in the system. Further, a user may be denied function access at the user level which therefore restricts such access within all departments/divisions within the system.

Figure 9B:
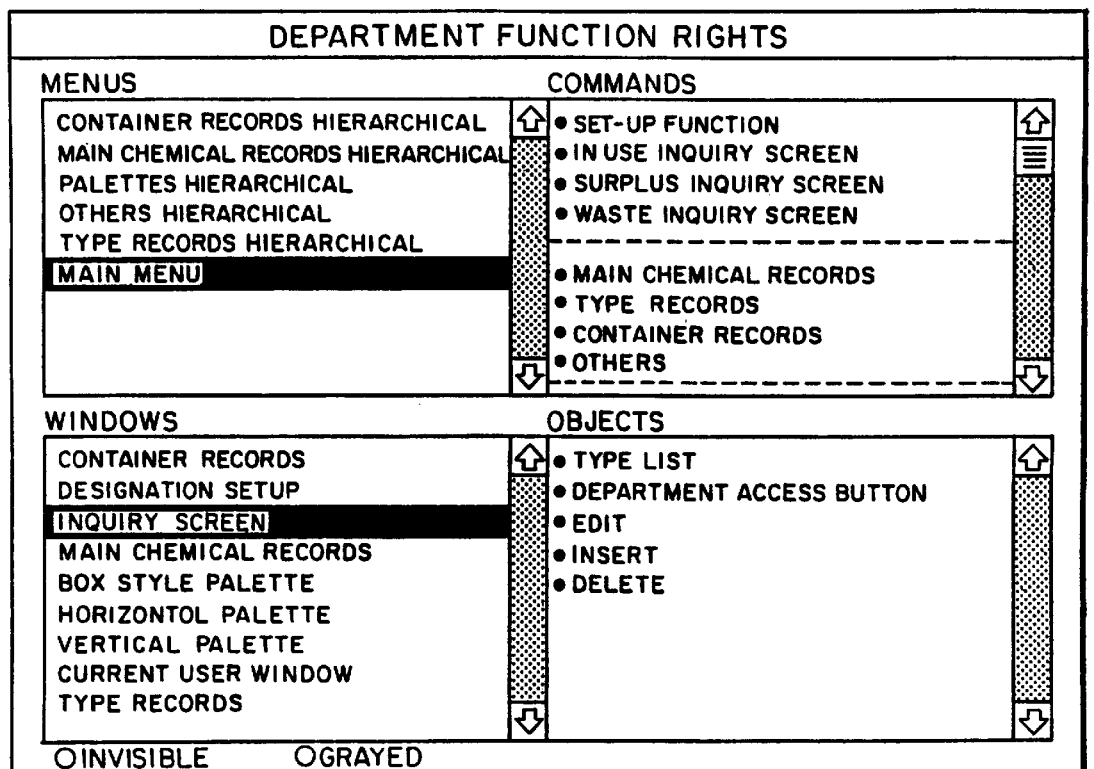
FIGS. 9A, B, and C are examples of function rights windows.
Figure 9C:
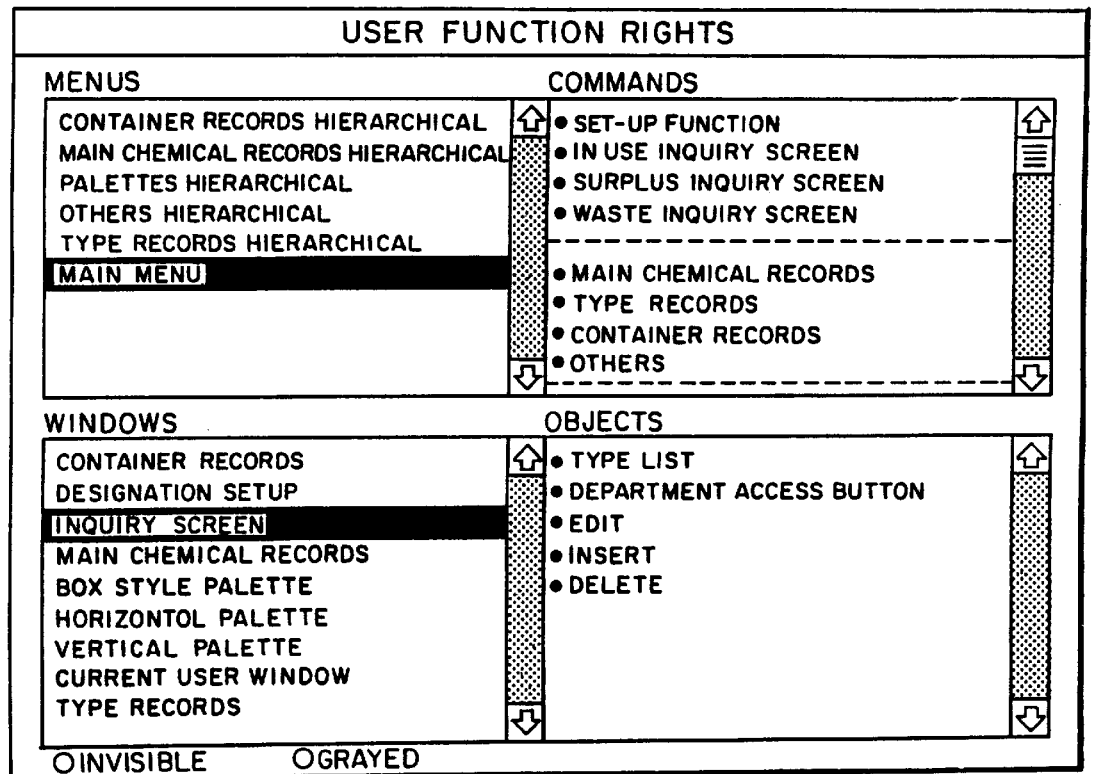
Figure 20A:
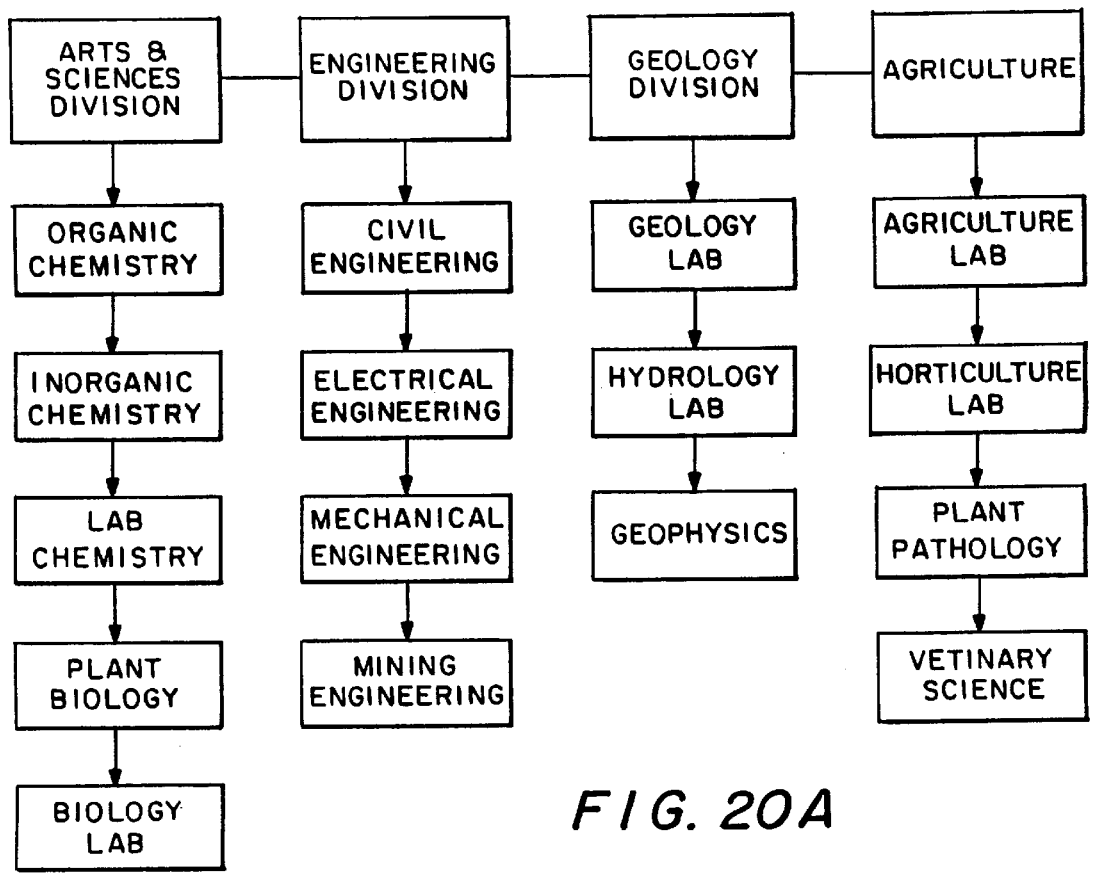
FIG. 20A is still another block diagram representing the use of the system in a large university atmosphere.
Figure 20B:
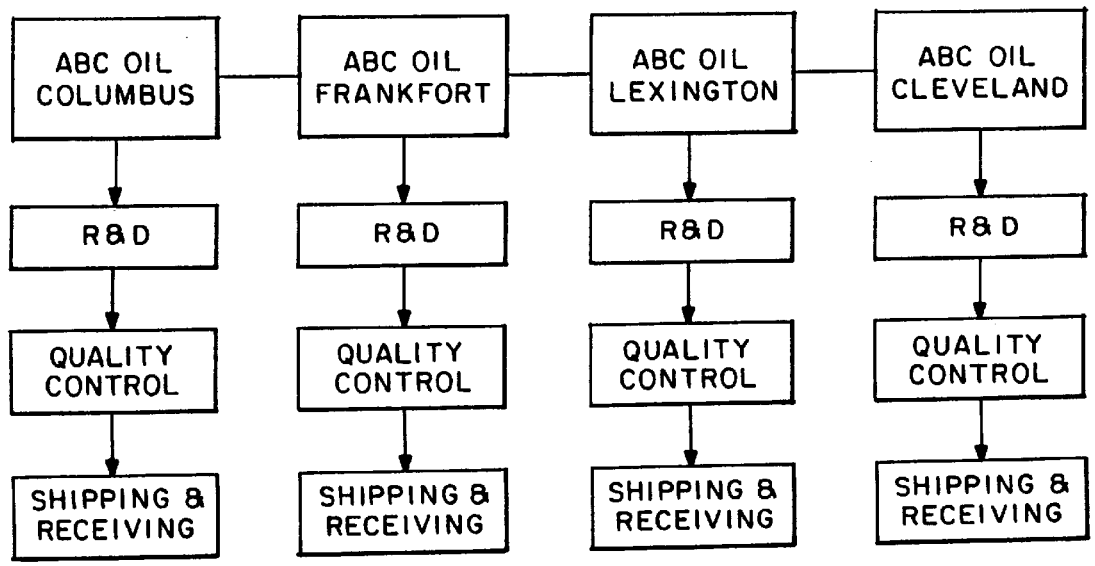
FIG. 20B is a block diagram of a large corporation using the present system.

As shown at FIG. 9A, window 900, the administrator sets up and inserts the level of access any user can have to a particular division in the system. In the example shown in window 900, all users having access to the division have the right to edit, insert, and delete chemicals shown under the heading "Objects" in FIG. 9A, as long as their access rights within both the department(s) under the said division (as shown in FIG. 9B) and their individual user rights (as shown in FIG. 9C) allow such access. Therefore, as those skilled in the art will appreciate, the present system incorporates a design that supports restriction of function access even to the field level through either the "Division", "Department", or "User Function Rights" windows as shown in FIGS. 9A–C. This allows the system administrator to protect both the acquisition, removal, and dissemination of data as well as to alter the design structure to meet the individual needs of various divisions and departments within the system. The examples shown in FIGS. 24A–C clearly show the versatility of the design to be restructured/altered and in doing so to adjust to the various needs of the company/organization using the system. This would be especially advantageous in a company/organization where needs varied within both individual divisions, and departments within those divisions, as well as users working within various divisions/departments.

The function access flow charts of the present system include FIGS. 134, 167–184, 192–194, 212–214 and the flow indicated above in the description of TABLE I.

D. Department/Division Access

The present system preferably has a hierarchy divided into divisions and departments. The department rights of a particular user are shown in FIG. 10 at window 1000 and in this case the user has access rights to a university's Biology and Chemistry department under the Arts and Sciences Division; Biology, Physics, and Geology departments under the Berea College Division; and Garage 1 under the District 2 Division. The present system allows for the entry of an unlimited number of divisions 1400 wherein each division 1400 can have an unlimited number of departments 1402, as shown in FIG. 14. The type of set-up in FIG. 14 allows the system administrator to set up departments and divisions tailored to the organization, structure, and specifications which are needed and required in a particular application. In order to meet these needs, the system hereof preferably provides a division window 1500, such as shown in FIG. 15, and also provides a department window 1600, as shown in FIG. 16.

Window 1700 of FIG. 17 shows a list of all departments that a particular user has access to and also indicates the user's default department. This type of design structure allows the system to operate in a wide variety of environments such as a small school or a small company as depicted in FIGS. 18A and 18B, where there is essentially only one division 1800 and two departments under that division 1802 and 1804. The system hereof also allows for the operation of the system in environments from a small college or industry to a large university or international conglomerate, as shown in FIGS. 19A, 19B, 20A, and 20B.

Depending on the priorities established, each user's access level can be set to include the viewing and printing of reports for any or all divisions and departments within a given system. This feature includes the ability for the user to view each division/department separately or combined under a system wide perspective. This is best seen by contrasting FIG. 21A with FIG. 21B. FIG. 21A shows window 2100 as disclosing a multiple department inquiry at 2102 for a particular substance, in this case, acetone. This is contrasted with, but very similar to window 2104 of FIG. 21B which discloses the use of acetone in a specific department as indicated at 2106.

However, preferably each user can only have one default division, which is set by the user. The default division tells the system which division the user "belongs" to. This is necessary, for example, when inserting container records. The container needs a unique ID, and since each division has its own set of unique IDS it is a must to know which division the container is being inserted into before an ID can be assigned. Rather than have the user select a division each time, which would normally be the same division every time, the default division function was added. There is a diagram showing default divisions at Table IV under Administrative Subsystem Flowcharts. If the user so chooses, he may change his default division allowing the user to insert data into another division, if his access rights so allow. The division default specifies the division and any applicable departments to which a particular user has access to. If the system administrator so desires, a particular user may be entitled to have full, unrestricted function access to the specific division default which, for example, allows the user to view, print reports, and alter data within that division and/or departments. Of course, it is also within the system administrator's capability to restrict a user from exercising access to one or more of the functions mentioned.

The flow charts corresponding to the operation and control of access to departments and division of the present system include FIGS. 122, 134, 137, 138, and 146–160.

E. System Electronic Mail

Figure 22:
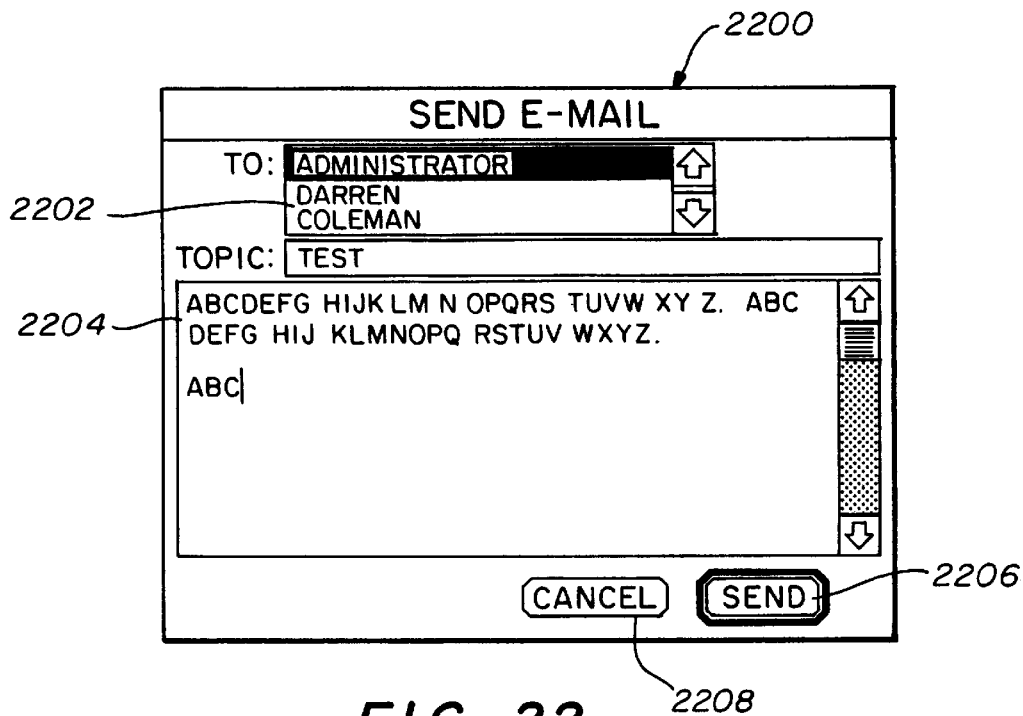
FIG. 22 is an example of a send e-mail window.
Figure 23:
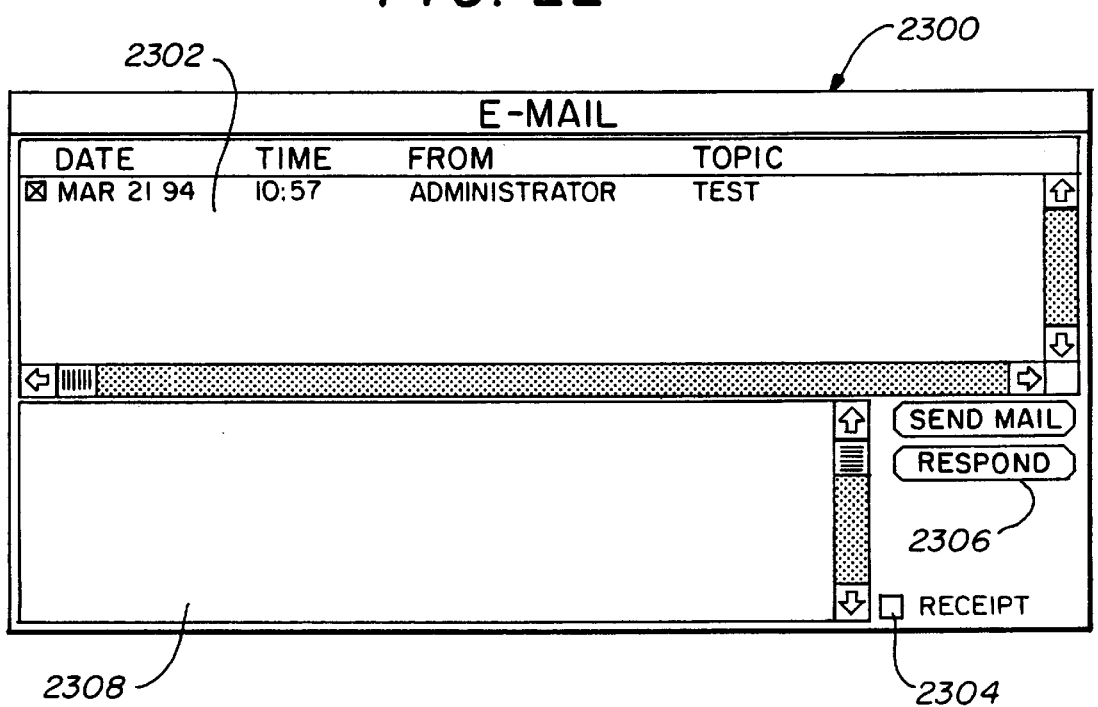
FIG. 23 is an example of a read e-mail window.

The system hereof also has the capability to electronically send and receive messages between users across the entire system, such as shown in windows 2200 and 2300 of FIGS. 22 and 23, respectively. The electronic mail system of the present invention works similarly to most common e-Mail systems widely available on the market today. There is a list of persons to whom a particular user can send messages, as shown at 2202. The user then types in his message in field 2204 and clicks on icon 2206 to send his message to the indicated person or persons in 2202 or he moves the cursor to click on cancel at 2208 to cancel the message. When electronic messages have been received, such is indicated in field 2302 and the receipt of messages is indicated at 2304. To respond to a particular message the user clicks-on button 2306 to respond to the chosen message at 2302 and types his message in at field 2308. This electronic mail messaging service is an important feature of the system in that it allows users an easy and efficient way to communicate with each other. Users can access surplus chemical lists, transferring information, and make the most efficient use of the available chemicals and keep the amount of chemicals on hand to a minimum.

The system flow charts corresponding to the e-mail portion of the system include FIGS. 140–145, 153, 154, and 215–217.

II. TABLE SET-UP MAINTENANCE

This particular portion of the inventive system is for access by the system administrator only. The host database server used by the system, such as the preferred Omnis™ database, must have the capability to set up tables in order to store the necessary chemical data in the system. The table set-up maintenance component of the system supplies an easy means for the system operator to set up these tables. It also allows the system administrator to copy data from a data file to the host or vice-versa and execute SQL queries on the host data, or add or remove tables.

The overall operation of the administration venue is discussed hereafter and is shown at FIG. 219. Other flow charts that correspond to this portion of the system include FIGS. 197–199.

III. CHEMICAL MANAGEMENT

The chemical management structure is the critical element to the overall management of the chemicals used throughout a given organization. The present system incorporates various new terminology and chemical inventory structures and each new term or structure will be explained and reviewed in detail below.

A. Inventory Classification Design Structure

The unique inventory classification design structure of the present system allows for simple and easy classification of any given chemical in an organization. The inventory classification design structure of the present system divides the chemical inventory of an organization into three primary groups of chemical containers. The inventory design structure is shown in FIG. 24A and divides containers 2400 into one of the three groups of in-use 2402, surplus 2404, and waste 2406.

The term "in-use" is defined as a grouping of chemical containers to be maintained in inventory. The term "surplus" is defined as a grouping of chemical containers containing usable chemical stock that needs to be given away or otherwise removed from the inventory control system. The term "waste" as used herein is defined as a grouping of chemical containers of chemical stock waiting to be disposed of and removed from the inventory systems. A user selects the inventory group to be viewed and the system sets the corresponding defaults and access limits to allow the user to view, edit, insert, etc. only those containers in the chosen chemical inventory group. The system hereof incorporates a design that allows the operator to easily move between each of the three inventory groups.

1. In-Use

Figure 25B:
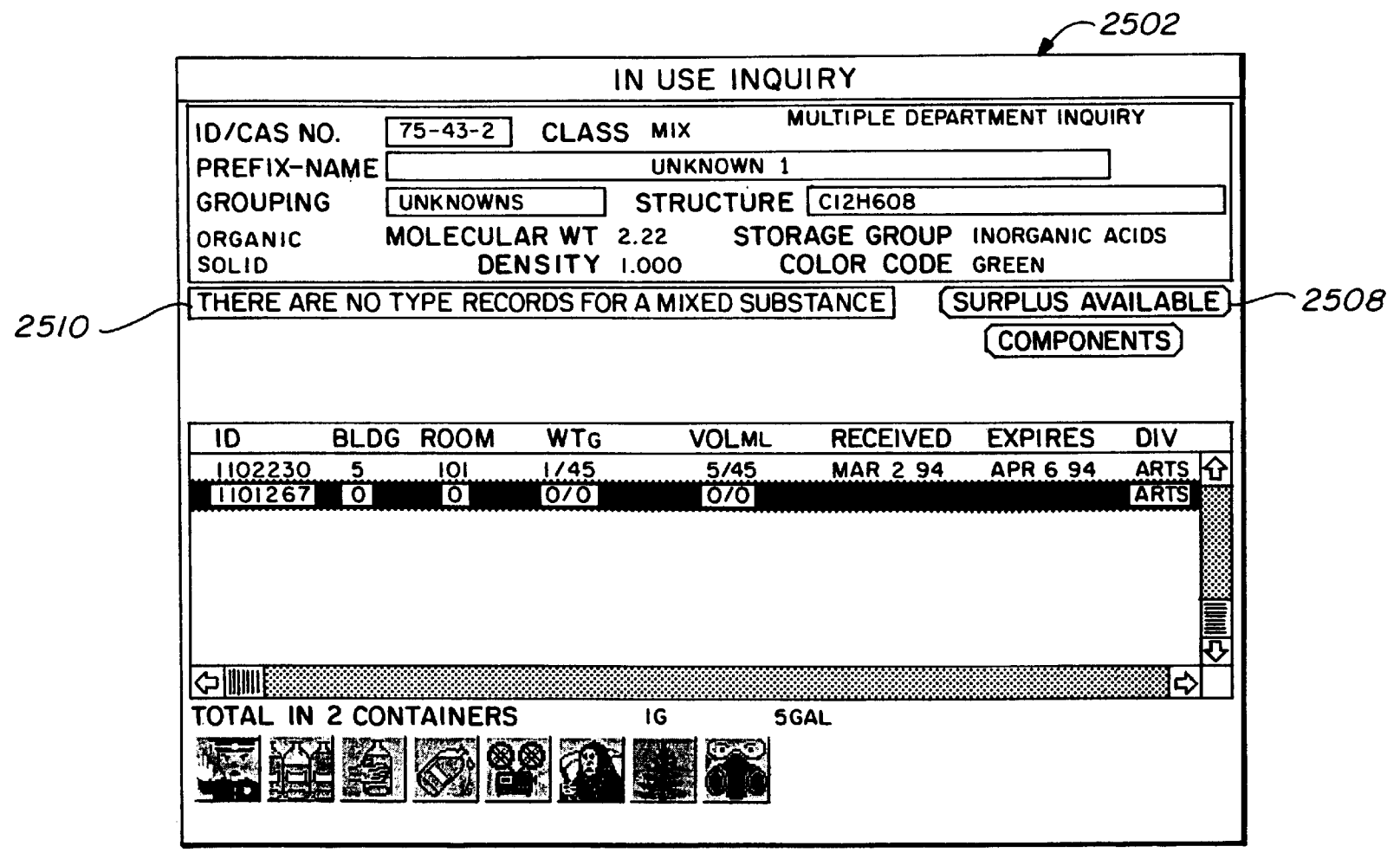

As stated above, the term in-use is used to define a group of chemical containers that are maintained in inventory and are presently being used. Of the three inventory groups this is the most frequently used classification. In addition to the three inventory groups, the chemical management structure of the present system divides each inventory group into four classes of chemical containers between those labelled pure, preset mix, trade name, and variable mix as indicated in FIG. 24A at 2408, 2410, 2412, and 2414, respectively. FIGS. 25A and 25B show windows 2500 and 2502 that show two different windows for different classes of chemical containers. Window 2500 shows a pure class of chemical with a selection bar 2501 at the top and window 2502 shows a preset mix class of chemicals. FIGS. 25C and 25 D at windows 2504 and 2506 respectively, disclose examples of windows displaying in-use chemical containers of trade name and variable mix, respectively. It is noted that the term "variable mix" is abbreviated in the present system as "Var. Mix", as shown in FIG. 25D.

a. Pure

The term "pure" is defined as a chemical container that has chemicals labeled with a conventional recognized scientific chemical name, and where the chemical originates from an outside vendor or supplier. This class of chemical is used most frequently in a laboratory environment.

b. Trade name

The term "trade name" is defined as any chemical container having chemicals that are labeled with a commercially known trade name, and originates from an outside vendor or supplier. This class of chemicals is used most frequently in an industrial or physical plant environment.

c. Preset Mix

The term "preset mix" is defined as a chemical container with components originating from a mixture of in-house chemicals. Each container having a mix class of chemicals can be formed from various mixtures of pure, trade name, and preset mix chemicals. For example, referring to window 2600 of FIG. 26 it can be seen that the example includes 4 separate components in the chemical container. 50% of the container is acetone from container ID No. 1099226, as shown at 2602, 32% of the container is water as shown at 2604, 15% is benzene from container ID 1101248 as shown at 2606, and the remaining 3% is termed inert ingredients as shown at 2608. Therefore, those skilled in the art will appreciate that the system can accommodate an unlimited array of mixed chemicals in a particular container. In addition, each separate chemical can be identified once the mix container is inventoried into the system.

The preset mix is not easily altered because the system requires a breakdown of the chemical components to be entered into the system. When a mixed main chemical is inserted into inventory the components of that preset mix are also inserted. Containers of this preset mix are then inserted into inventory. Each of these containers are made up of the same percentage of components as the main chemical record. All transactions with these containers are recorded as involving the components in those percentages. If the components of the main chemical change, the components in the transaction records of each of the containers must also be changed.

This class of chemicals was included in the present system to meet the need of various entities to mix and maintain their own on-site mixtures that are used and prepared for repeated use by the particular entity. Academic laboratories mix chemicals for the students to identify, industrial and academic laboratories also constantly mix chemicals: to make reagents, to create mixtures for standardizing chemicals, for titration, for calorimetric determination, for calibrating instruments, to create buffers, to manipulate chemicals for various chemical reactions, for creating cleaning solutions, and to make dilutions of chemicals for various reasons. In addition, industries and businesses mix up various cleaner solutions, paints, varnishes, and other concoctions necessary in everyday operations.

Figure 27:
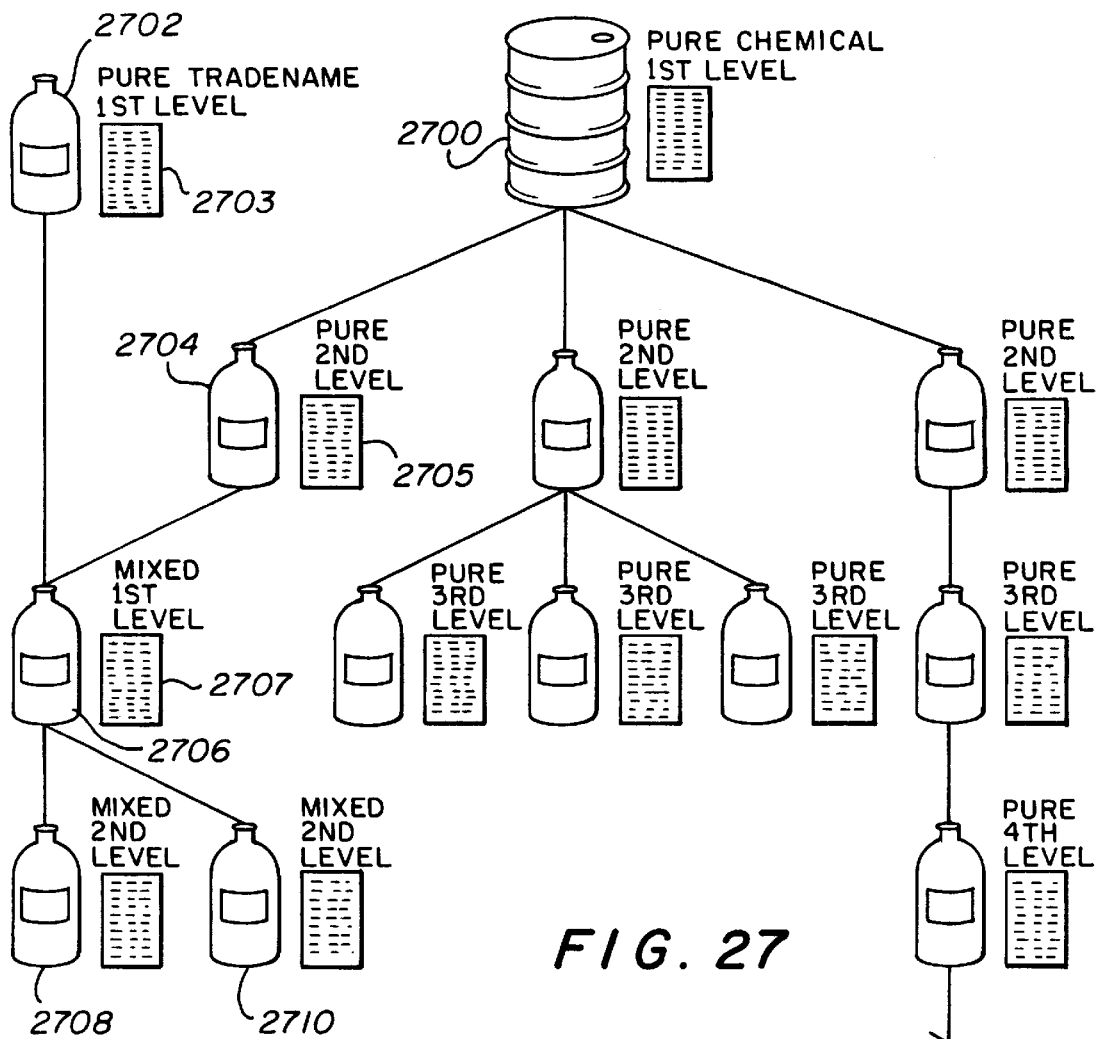
FIG. 27 is a graphical representation of various levels of chemical containers.

As shown in the FIG. 27, three groups of pure, trade name, and preset mix can also include multiple levels of combinations of the pure, trade name, and preset mix chemical containers. However, the system requires that all chemicals originate from one first level pure, trade name, or preset mix chemical container as shown in FIG. 27 at 2700 and 2702. As indicated in FIG. 27 the system is capable of handling an unlimited number of levels of varying mixes of chemicals. For example, second level pure container 2704 is mixed with a first level trade name container 2702 to form a mixed first level container 2706. Container 2706 can then be broken off into multiple mix second level containers 2708 and 2710 as shown. A similar breakdown in levels is shown in FIG. 27 with regard to various levels of pure chemicals. It is also noted that each container of FIG. 27 has a transaction file log, as shown at 2703, 2705, and 2707, that forms a record of every transaction involving each log's corresponding container. This manner of categorizing the chemicals into first, second, third, etc. levels allows the present system to maintain a grandparent, parent, child relationship all the way back to when the chemical first entered the system from being purchased from a vendor, etc. In this way, the origin and history of every chemical is always known.

d. Variable Mix

The term "variable mix" is defined as a chemical container whose components originated from a mixture of in-house chemicals that may be in their original state or have been altered by a chemical process. The variable mix classification is different from the preset mix class in that variable mix is a temporary or singular concoction and is not maintained as an in-stock chemical and can be easily altered at any time by adding additional components to the container. The main purpose of this class is to meet the needs of laboratories that have special mixes of chemicals made at any given time.

2. Surplus

As stated previously the term "surplus" is defined as a grouping of chemical containers having useable chemical stock that needs to be given away, traded, reprocessed, or sold and removed from the inventory system. Windows 2800–2806 of FIGS. 28A–28D, respectively, are four examples of surplus inquiry windows respectively showing the four classes trade name, preset mix, pure, and variable mix. Anytime a chemical container is placed within the surplus group under any of the four classes the information regarding that container is universally accessible by any user/operator of the system. In this way, an operator in a particular department in need of a particular chemical, such as the "Expo Dry Erase Cleaner" shown in window 2504 of FIG. 25C, can inquire as to what other department may have a surplus of this chemical, and therefore cut down on the amount of inventory that needs to be maintained by the university or business and also allow for the most efficient use of the chemicals throughout the system.

In addition, a surplus chemical button has been placed on the in-use inquiry windows as shown in FIG. 25A–25D at 2508. When an operator opens a file under in-use, the surplus button appears, and if there are chemicals of the same type within the universal surplus grouping, the button will be highlighted and a simple click on the button will bring up a list for that particular surplus chemical and where it may be found. If no surplus chemicals exist in the system, then the button is shadowed and is held inoperative. A surplus chemical group uses the same classification of chemical containers as explained above with regard to the in-use inventory group.

3. Waste

As stated above, "waste" is defined as a group of chemical containers classified as chemical stock waiting to be disposed of and removed from the inventory system. Windows 2900–2906 of FIGS. 29A–29D are four examples of waste inquiry windows respectively showing the four classes pure, preset mix, trade name, and variable mix. This category enables the system hereof to provide cradle-to-grave management of chemicals. As with the other primary inventory groups, the waste grouping of chemical containers uses the same classes of pure, preset mix, trade name, and variable mix chemicals.

B. Inventory File Structure

Figure 30:
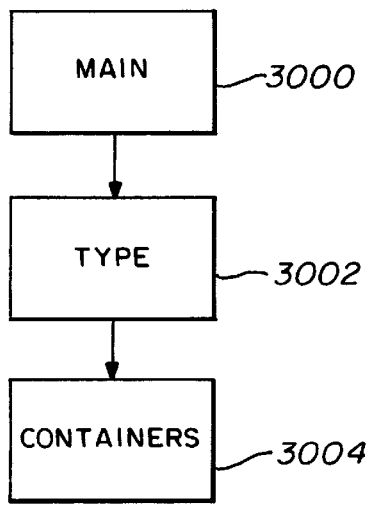
FIG. 30 is a block diagram of the pure chemical structure of the present system.
Figure 31:
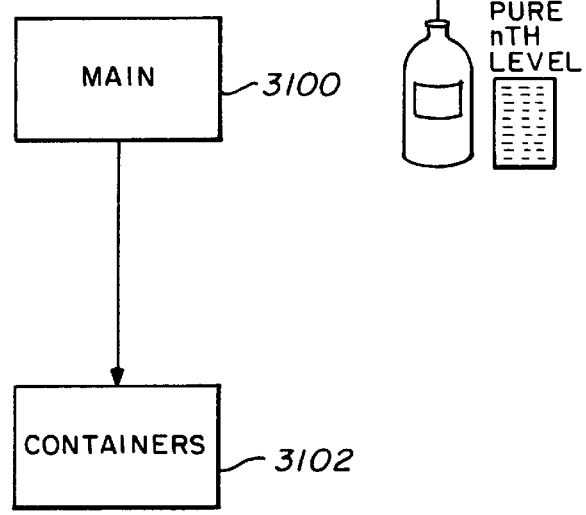
FIG. 31 is a block diagram of the chemical structure for trade name, preset mix, and variable mix chemicals.

A novel inventory file structure of the present system for the pure chemical class uses a grandparent-parent-child file structure. This structure is shown in FIG. 30 as main-type-containers. The main block 3000 is equivalent to the grandparent, the type block 3002 is equivalent to the parent, and the containers block 3004 is defined as the child. In contrast with the pure chemical class file structure, the inventory file structure for the trade name, preset mix, and variable mix classes uses only a parent-child file structure. This file structure is shown in FIG. 31 as main-container file structure where the type block has been deleted from FIG. 30. In FIG. 31, main block 3100 is the parent and containers block 3102 is the child in this particular structure.

1. Main

Referring to FIG. 32, the main chemical insert screen 3200 is shown. This main file represents a grandparent file with respect to a pure class chemical and a parent file with respect to the trade name, preset mix, and variable mix classes. This file contains files that are universal to both the parent (in regard to the pure class) and the child (in regard to the pure, trade name, preset mix, and variable mix classes) file structures of the present system. The following universal fields are preferably contained in the main file:

a. ID/CAS (or NO CAS)

This provides each chemical with a unique number field. It is shown in FIG. 32 under the heading Main ID at 3202. This number is set up to use the standard CAS (Chemical Abstract Service) number of the chemical, if known, and, if not known, to generate a NO CAS number that will be used to uniquely identify the chemical within the system.

b. Prefix

This field, shown at 3204, is used for scientific names of chemicals to separate attached prefixes from the chemical name to allow proper alphabetizing for accurate finds and searches for a given chemical within the system.

C. Name and Synonym

The name that appears in window 3200 at 3206 for the chemical is dependent on the class selected. For example, under the pure class, the name would be a scientific name, whereas under a trade name, it would be the commercial name by which the chemical is known. In addition, as shown in FIG. 33 at window 3300, linked to the name field is a synonym file which contains both the name inserted in the name field (indicated by the asterisk "*" at 3302) and a list of other names by which a particular chemical may be known (as seen, i.e., at 3304 through 3314). In this way, for example, benzene can be called by any of its varied names and spellings and still be tracked throughout the system regardless of the particular name used. If a synonym is in the prepared list and used by an operator in the search, the program will automatically bring up the main file record with the corresponding chemical name. This file is normally used for chemicals under the pure class but is an available option under all classes.

d. Grouping

This field allows for additional special chemical groups to be devised within a division. An example of some groups within a division is shown in window 3400 of FIG. 34. FIG. 34 is an expanded version of field 3208 of FIG. 32. To select a group, it must be contained in the groupings list of window 3400. These lists are universally accessible across the division. This capability is extremely advantageous in a physical plant where cleaning products such as window cleaners are put out for bid every year and the products' trade names constantly change. In this way, all window cleaners can be grouped under a common heading and tracked accordingly. For example FIG. 35 shows window 3500 which is identical to window 3200 of FIG. 32, except that the operator has click at 3504 expanding the pop down groupings list shown at 3508. This list is accessed from the groupings file shown in window 3400. In this way, i.e., the main chemical file shown in window 3500 containing the chemical field name acetone at 3506 allows the user to group this particular main chemical record by selecting and clicking on the appropriate grouping in the pop down list at 3508 which in turn inserts the name selected into the grouping field at 3510. In this case the chemical "acetone" would be appropriately grouped under the name "carbonyl" displayed in the list. An operator can execute, at any time, a preset search by using the SQL searcher (see III. Chemical Management, D. Searches and Reports, b. User Defined Searches, iii. SQL Searcher in the body of this text) to view all main chemicals in a particular selected group.

e. Density

This field shown in window 3200 at 3210 is mainly used for pure chemicals where the density has been defined and is easily obtainable. If inserted, the system will automatically convert a container's wet weight to dry or vise versa and displays both measurements under the container file.

f. Type

The user at 3212 must designate the chemical as inorganic, organic or leave this field blank.

g. Chemical Molecular Formula

Figures 36, 37, 39:
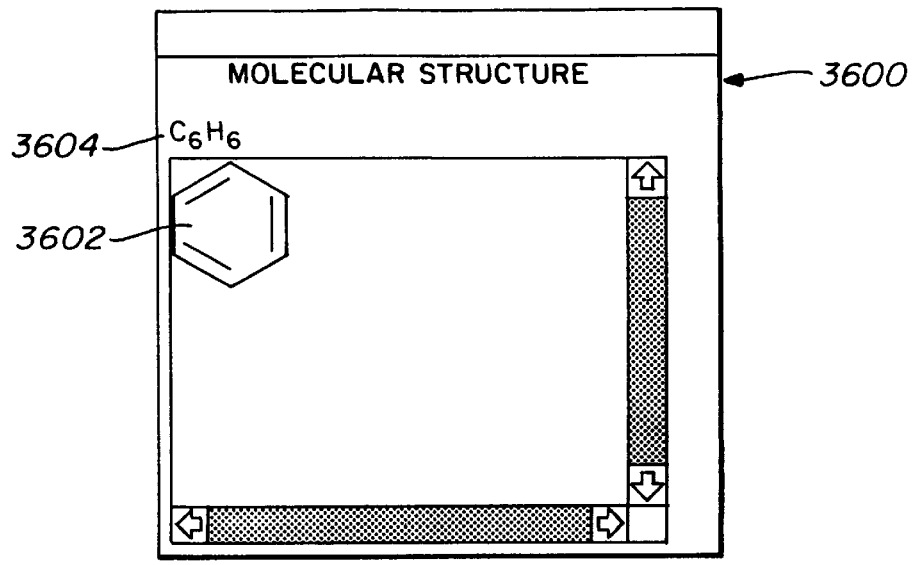
FIG. 36 is an example of the molecular structure window.
FIG. 37 is an example of the minimum and maximum amounts window.
FIG. 39 is an example of a chemical type/vendor records window for a pure chemical.

The chemical molecular formula is inserted in window 3600 of FIG. 36 at 3604. This window is accessed by clicking at 3220 in window 3200 of FIG. 32. In addition, if the chemical structural formula is inserted first (see below h. Chemical Structural Formula) then the chemical molecular formula will be automatically inserted in the field displayed at 3604 (presently displaying the chemical molecular formula $C_6 H_6$). Furthermore, once inserted, this field information is automatically displayed in the window 3200 of FIG. 32 at 3220.

h. Chemical Structure Formula

As stated, if the chemical structural formula is inserted in window 3200 of FIG. 32 at 3214 it will automatically insert the chemical molecular formula at 3604 of window 3600.

i. Molecular Structure Drawing

FIG. 36 shows a picture of the chemical structure at 3602 that has been inserted in the field displayed in window 3600. This window is accessed by clicking at 3220 in window 3200 of FIG. 32. In addition, once inserted, this field information is automatically displayed in window 3200 of FIG. 32 at 3220. As those skilled in the art will appreciate, any standard drawing program can be used to create the drawing that is then imported into the system.

j. Molecular Weight

Molecular weight of any given chemical can be inserted and displayed in window 3200 of FIG. 32 under the heading Mole Wt at 3216.

k. Physical State

When adding a new chemical to the system an operator must select either solid, liquid, or gas as the physical state of the chemical being added and the selection is displayed as indicated at 3218 on window 3200.

l. Minimum and Maximum Amounts

If a system user has been given access to this file, the individual can set a minimum and/or maximum amount (in either volume or dry weight) of chemical inventory for a particular chemical to be maintained and stored in a department, as shown in window "Min. & Max. Amounts" 3700 of FIG. 37. The Min. & Max. Amounts window is accessed by choosing under the Main Menu (10302 of FIG. 103) the Type Records at 10322 and then selecting by clicking on Min. & Max. Amounts at 10352.

m. Storage Group

This particular field is discussed in detail below under Section 2 regarding environmental/health/safety information.

n. Color Code

This section is also discussed in detail below under Section 2.

2. Type

As stated previously at B. Inventory File Structure, the type file represents a parent file with respect to the pure class and is not used in the inventory file structure for the preset mix or variable mix classes. However, the trade name class uses the type file as an additional child file to the main file. Because of this selection of the class: pure, preset mix, trade name, or variable mix by the clicking of the operator in the window 3200 of FIG. 32 at 3222 sets the file structure in relation to the class selected.

a. Pure

Referring to FIG. 38 at window 3800, the system allows the pure class to be further defined under the three subgroups purity, grade, and description as seen at 3804 under the identical subgroup headings. When inventorying a particular chemical, the user chooses whether or not to further define a chemical. If the user chooses not to define any particular subgroup than a "?" appears under each of the three subgroups as, i.e., shown in window 6500 of FIG. 65 at 6506. This only occurs when all three of the subgroups are left undefined by the user. Anytime a subgroup is defined such as in window 6500 at 6508 or 6510 then the "?" does not appear under the undefined subgroup or subgroups of the particular main chemical. The ability to define the pure class by subgroups under type provides a compensate system for meeting the various needs of potential users of the system. For example, this system can support various levels of users such as a research chemist who requires a system that is capable of defining pure chemicals within each of the respective subgroups or a technician in a physical plant operation who requires a less stringent/defined system. The system hereof then, as those skilled in the art realize, will allow numerous chemicals of varying purity, grades, and descriptions to be inventoried and maintained. For example, under the main chemical file for sodium chloride, the following different purity, grade, and description types of sodium chloride could exist:

1) Sodium Chloride—Purity: 99.5%, Grade: biological, Description: crystalline;

2) Sodium Chloride—Purity: 99.8%, Grade: certificated ACS, Description: crystalline;

3) Sodium Chloride—Purity: 99%, Grade: USP/FCC, Description: granular; or

4) Sodium Chloride—Purity: ?, Grade: ?, Description, ?.

All this information regarding the purity, grade, and description fields (further defined in i., ii., and iii. below) can be inserted into the system by a user at window 3900 of FIG. 39, as indicated by the various fields at 3902, 3904, and 3906. Window 3900 also allows a user to view or insert the recommended vendor at 3908 for this particular chemical and that vendor's corresponding product number at 3910. In addition, window 3900 indicates whether the particular vendor is the only source of this product by clicking on the Boolean box at 3912. The Chemical Type/Vendor Records window is accessed by either choosing the Open Record Window option (10344 of FIG. 103) under the Type Records hierarchial menu (10322 of FIG. 103) in the main menu (10302 of FIG. 103) or double clicking on a line in the type list at 2108 on the wINQUIRY window (2104 of FIG. 21A).

i. Purity

The purity type allows the system to define the purity of a chemical if known in a percent, as shown in window 3800 of FIG. 38 at 3804.

ii. Grade

Figure 103:
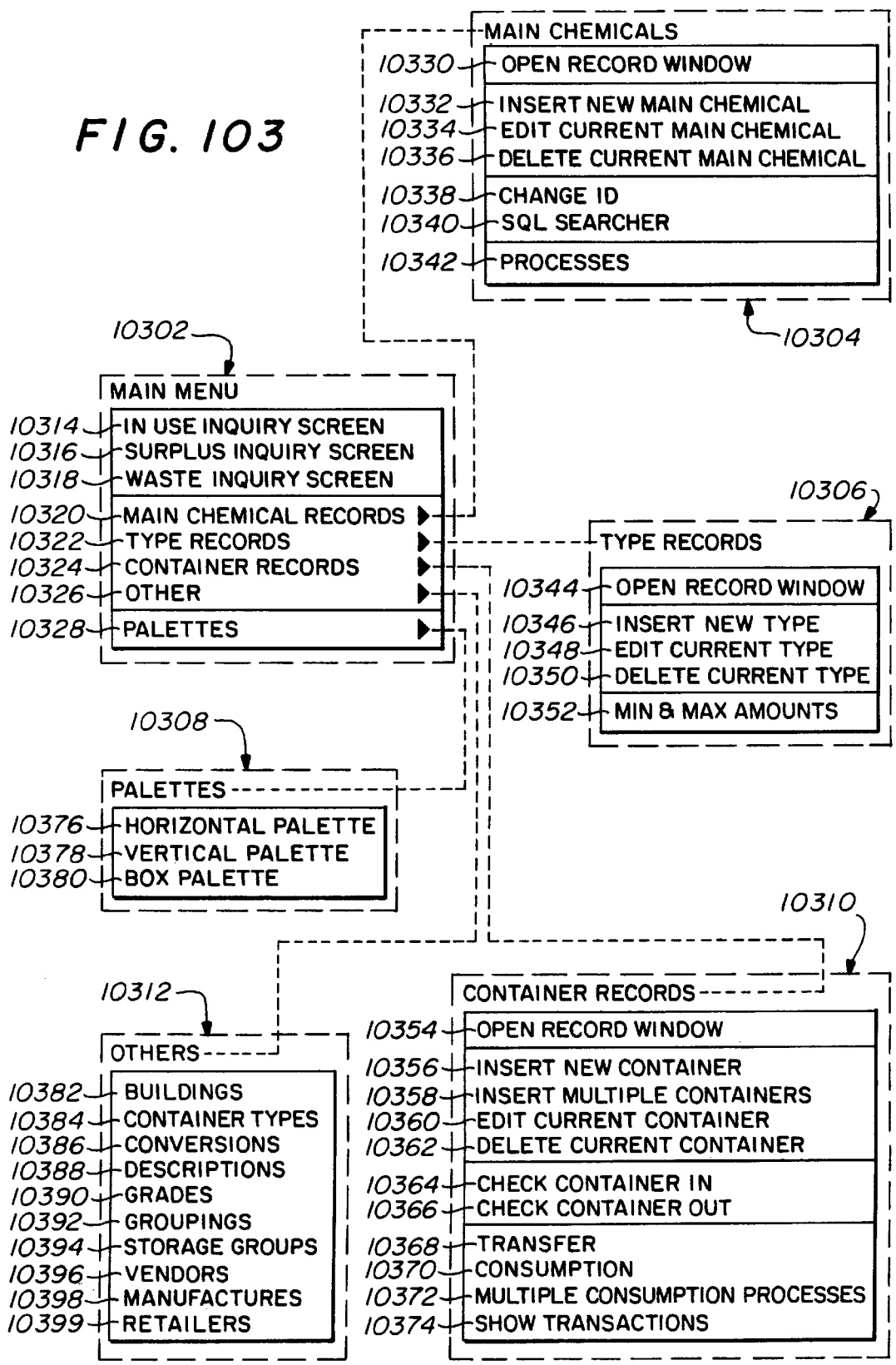

Referring to FIG. 40, various grades of chemicals can be chosen from a list of grade codes contained within this system, as shown at window 4000 of FIG. 40, which is accessed by the user by clicking on the Grades command (10390 of FIG. 103) under the Others hierarchical menu (10312 of FIG. 103). This list is accessed by the user during insert of grade in window 3900 of FIG. 39 by clicking on the pop down box list at 3914 and selecting one of the grades displayed in the list. Normally it is difficult to inventory pure chemicals because the majority of chemical suppliers instead of using standard international grades (such as i.e., practical, reagent, chromatography, primary) often use commercial names to create and promote the use of their own grades (such as Ultrex™, AR Select™, Nanograde™, Optima™). The present system addresses and essentially solves this inventory problem by creating a list of grade codes that can be used in the grade category. This list can be altered and changed as new products and their corresponding grades are entered into the system. In addition, the present system hereof links each grade to a synonym list which allows the system to conform to the international grade standard. For example, the international grade "Primary" could have a synonym list that included AR Select™, Ultrex™, and Gold Label™ which are defined by their manufacturers as meeting the international grade "Primary". This allows a user to group similar grades together or to list each grade separately as defined by the manufacturer.

iii. Description

Referring to FIG. 41, a window 4100 shows an exemplary list of various description codes which could be used to further define a chemical and its properties in use. The description codes window 4100 uses an alterable list (for details see heading "C. Lists" below) allowing a user to gather pertinent descriptive terms regarding pure chemicals. Also, the present system preferably contains a check to make sure that a new description being inserted does not already exist in the description codes list of window 4100. Descriptions Codes window 4100 of FIG. 41 is access by the user clicking on the Descriptions command (10388 of FIG. 103) under the Others hierarchical menu (10312 of FIG. 103). Description codes are inserted by the user for a particular chemical in window 3900 of FIG. 39 by accessing the list of description codes shown in window 4100 of FIG. 41 through the pop down list at 3916 of FIG. 39 and then selecting the appropriate description displayed in the list.

b. Trade name

Referring to FIG. 42, there is shown a window 4200 where the trade name vendor of a chemical can be inserted at 4202, as well as the vendor's product number at 4204. This allows the user to indicate a preferred vendor (defined in this system as a manufacturer or retailer) to the main file of a particular trade name. In addition, if the vendor is the only source of the trade name the user can click on the Boolean box at 4208 to indicate this condition. A trade name vendor is inserted by the user clicking on the pop down list at 4206 which accesses and combines the system's manufacture and retailer lists and in turn allows the user to select, for insert, the appropriate displayed vendor. Window 4200 is accessed by the user when a trade name main chemical is present by clicking on the Insert New Type command (10346 of FIG. 103) under the Type Records hierarchical menu (10306 of FIG. 103). Furthermore, the system handles the problem of trade name chemicals that are identical in composition. For example, a manufacturer of a particular cleaner may be ABC Corp. ABC Corp. then may package their cleaner under other company/vendor trade names. The system hereof handles this situation by the user inserting in the main file the most recognized trade name with the rest of the trade names being added in a synonym finder for that name. This is the same synonym file used by the pure chemical class and defined previously. It is noted that this class of chemical does not use the type file for distinguishing purity, grade, and description but instead uses this file as a vendor file.

c. Preset Mix

As stated previously, the type file represents a parent file with respect to the pure class and is not used in the inventory file structure for preset mix or variable mix. However, the trade name class uses the type file as an additional child file to the main file.

d. Variable Mix

As stated previously, the type file represents a parent file with respect to the pure class and is not used in the inventory file structure for preset mix or variable mix. However, the trade name class uses the type file as an additional child file to the main file.

3. Container

Referring to window 4300 of FIG. 43, the in use container records file contains all of the data related to an individual container within the in use group. The container file allows each individual container to be uniquely identified with all the pertinent information about that particular container. As stated previously, the inventory classification design structure of the system divides the chemical inventory into three primary groups of chemical containers: 1) in use, 2) surplus, and 3) waste. The format of the window 4300 of FIG. 43 and the records regarding any individual container is identical across the three groups. The only difference is that the heading at 4400 changes in relationship to the inventory group selected by the user. So by discussing and using windows from the in use group in regard to container record files all three groups are detailed/discussed. Window 4400 is accessed by the user when working within the in use inventory group by clicking on the Insert New Container command (10356 of FIG. 103) under the Container Records hierarchical menu (10310 of FIG. 103). Both the surplus container records window and the waste container records window is accessed in the same manner described above in regard to the in use container records window 4300. The following is a list of all the data fields preferably included in all container record files:

a. Container ID

The container ID field at 4302 is a unique number within each division. Each division starts from a container number of 1. By allowing each division to have a set or block of container ID numbers beginning at 1 and increasing by one for each additional container, a more versatile system has been developed than heretofore known. By restricting the container numbers to each division, this allows the system to serve a large complex industrial entity for a long time period without the need to reset the container number sequence. In addition, this ID system allows the length of any incorporated bar code to be smaller, which is advantageous when needing to attach bar codes to small chemical containers. This system of identification also allows for division control of unique number printing for all containers within that particular division. Also, preferably for the system and the system user to be able to recognize each container number as unique, a unique container number label with a corresponding division number is printed and placed on the container.

b. Division/Department

In a view-only mode a user is able to select any one or all of the division/departments designated in his/her Dept.

Access List for viewing simultaneously across the system. For example, in Window 1700 of FIG. 17 the division/department access of the particular user allows multiple access with two departments in the Arts and Sciences division and two departments in the Berea College division. However, only three of the possible four have been selected (designated by the bullet) for the view only mode by the user clicking on the separate division/department lines at 1702, 1704, and 1706. In addition, the division/department at 1708 has not been selected by the user for view-only and thus the records of that particular division/department would not be accessible, at this time, by the user until selected and designated (by the bullet) for view-only mode. Window 1700 is accessed by the user clicking on the Department Access command (10608 of FIG. 106) under the File menu (10602 of FIG. 106). However, in an alter data mode (which includes the insert, edit, or delete mode) the user is only given access to his default division, which is displayed in window 1700 of FIG. 17 at 1710 and also shown in window 4400 of FIG. 44 at 4402. If the user wants to insert information into another division/department(s) the user must change his/her default setting, if his/her access rights so allow. The default setting is changed by the user accessing window 1700 of FIG. 17 and simultaneously holding down the option key and clicking on a division/department line in the Dept. Access List. The default division tells the system which division the user "belongs" to. This is necessary, for example, when inserting container records. The container needs a unique ID, and since each division has its own set of unique IDS it is a must to know which division the container is being inserted into before an ID can be assigned. Rather than have the user select a division each time, which would normally be the same division every time, the default division function was added. There is a diagram showing default divisions/departments at Table IV under Administrative Subsystem Flow Charts.

c. Chemical Amount

Referring to FIG. 52 at 5202 and 5204, the amount of chemical held within the containers is expressed by the system in weight, volume, or weight and volume. The last option of the combined weight and volume can only occur when the density of the chemical has been entered into the system as explained above under III B.1.e. Weight at 5202 is defined by the system as a dry measurement and can be expressed within the system using various dry measurement terminology such as milligrams, grams, ounces, pounds, etc. Volume at 5204 is defined by the system as a wet measurement and can be expressed by the system using various wet measurement terminology such as milliliters, liters, ounces, gallons, etc.

i. Weight (Dry)

(a) Left

The heading "left" of 5202 is defined in the system as the present inventory amount of the chemical in the container. The amount in this field will be the same as that under the heading of original when the chemical container is first inventoried into the system and the amount will change as the chemical substance is removed from the container.

(b) Original

The heading "original" of 5204 is defined within the system as the amount of chemical in a container when the container is first entered into the system. Through the life of the container this amount does not change.

ii. Volume (Wet)

(a) Left

This heading is the same within the system as that described above with regard to weight.

(b) Original

This term is also the same for volume as that defined above with respect to weight.

iii. Container

The container size is defined in the present system as the rated volume size of the container which may be and most likely is, a larger size than the original volume. A container size is shown in FIG. 52 at 5206. The size of the container is important when inventorying and estimating the amount of chemical contained within the container. By knowing the size of the container a person during an inventory is able to visually estimate the amount of chemical remaining.

iv. Container Traits

There are two significant aspects of a container defined within the present system. First, the container type being used and second, whether the container is a single or multiple container.

(a) Container Type

Referring to window 4500 of FIG. 45, various container types are shown at 4502 where the container type field has been expanded by clicking on this field. The user inserts the container type in the field at 4504 by selecting the appropriate container type displayed in the list at 4502. The container type is an alterable data defined entry list (see III.C.2). This allows a user to define all chemical container types used within the organization such as plastic, gas cylinder, tin, bottle, plastic coated bottle, case, pack, tote, etc. This list can be used during the insert or edit mode.

(b) Single or Multiple Containers

Defining the type of container also necessarily defines whether the container is a unitary or multiple unit container. For example, the present system preferably defines case and pack as multiple containers, while bottle, cylinder, and drum are all single containers. Each particular type of container is defined when inserting a new container type under the container type window 4600 of FIG. 46 at 4602 by clicking or not clicking on the Boolean box at 4604, which if selected signifies to the user and the system that the entry is a multiple container.

Once a multiple container is identified, the system alerts the user to such by defining any multiple container under the container type list, as shown in FIG. 43 at 4312 and by placing an "M" before any multiple container in the individual container listings such as shown at 3802 of FIG. 38. Furthermore, the system hereof incorporates an easy to use and simple method to handle multiple cases. At the time a multiple container unit is inventoried, the number of single containers in the multiple is inserted as well as the chemical amount as indicated at 4310 (Window 4300 of FIG. 43). Once a multiple container is opened, it is important that every individual container must be removed and individually inventoried and labeled, as provided for in FIG. 47 at window 4700. Once this is accomplished, the multiple container ceases to exist and the individual containers take its place in the inventory listing within the system.

(v) Visual Container Depiction

By knowing the volume remaining and the container size, a visual volume depiction of the chemical within the container using graphics is possible and is preferably incorporated into the present system. This provides a powerful inventory support tool in that it provides the user with a visual depiction of the container and the present inventory level of the chemical held therein and the ability for the user to alter the inventory amount by simply clicking on the perceived point on the graphically displayed container that corresponds with the real container's chemical level. Once the user clicks on a level represented in the visual depiction at 4802 the system will automatically alert the user to the level's corresponding weight and/or volume indicated by the window 4804 of FIG. 48A at FIG. 48B. At this juncture the user can choose to alter the present inventory level by clicking on "OK" at 4810 or canceling the procedure by clicking at 4812.

The user is given the option in the insert and edit modes to place a level mark corresponding to the original inventory level of the actual container onto the graphic depiction of that particular container. In this way, all containers can be marked as to their original chemical level within their respective containers and this directly correlates to the original volume and/or weight. Window 4806 of FIG. 48C discloses inputting the original inventory level into the graphic depiction as seen at 4808.

vi. Measurement Setting

As stated previously, each user can define the wet and dry measurements displayed on the screen and in any reports printed. This is an extremely valuable and important design element with regard to developing a universal chemical management system. This is because, for example, in a situation where laboratory and physical plant personnel both use the same system, it is imperative that flexibility with regard to measurement default settings be included in the chemical management structure. Laboratory personnel may need a system expressed in grams and milliliters, such as shown in window 4900 of FIG. 49 at 4902 and 4904, respectively. On the other hand, physical plant personnel most likely need a system in pounds and gallons, such as shown in window 5000 of FIG. 50 at 5002 and 5004, respectively. The present system preferably allows any particular user to view the same chemical within the system in different units of measurements, which greatly enhances the usability of the system to its users. In addition, as shown in FIG. 51 at window 5100 a user is provided with the option of adding additional types of conversions at any time. All conversion factors are preferably based off of either grams for weight or milliliters for volume, because the system preferably stores everything as grams or milliliters though other base units may be used.

d. Received

The date a particular container is received is inserted into the received field at 4314 of FIG. 43.

e. Inventory

The last time a container was inventoried is inserted into the inventory field at 4316 of FIG. 43.

f. Expiration

The expiration date, if any, of the chemical is inserted into the system at 4318 of FIG. 43. The expiration date is defined in the system as a date by which the chemical needs to be used, disposed of, or reprocessed. An expiration date might be necessary because the natural deterioration of the chemical could cause it to become dangerous and unstable or to change states making it unusable for its intended purpose. An example of a dangerous and unstable chemical is ethyl ether which, under long-term storage conditions, can form a peroxide under its container's cap that can initiate an explosion by simply unscrewing the cap.

The system preferably provides a method of categorizing the expiration dates of the chemicals contained within the system. A user, when inserting an expiration date for a chemical, selects through a data-defined entry list one of the categories of chemical defined as dangerous/unstable, unusable, or both dangerous and unusable. This system design allows the administrator to set for each department an automatic expiration notification that can bring up a dialogue window and provide an audible alarm sound. In the case of a chemical that changes state and simply becomes unusable, but not dangerous or unstable, a more benign dialogue window and a less alarming sound can be selected for automatic expiration notification.

g. Waste

The date the chemical is converted to waste is inserted in window 4300 at 4320.

h. Manufacturer

A manufacturer is inserted by the user clicking on the pop down list at 5210 (window 5200 of FIG. 52) which accesses the system's alterable data defined entry list (see III.C.2) for manufacturers and in turn allows the user to insert by clicking on the appropriate displayed line at 5212 the name of the manufacturer at 5208. The systems manufacturer list is accessed for altering data (insert, edit, or delete) by the user clicking on the Manufacturers command (10398 of FIG. 103) under the Others hierarchical menu (10312 of FIG. 103).

i. Product Number

The chemicals' manufacturer product number for the individual container can be inserted by the user at 4324 (Window 4300 of FIG. 43).

ii. Lot Number

This also relates to the manufacturer and is defined as the chemical lot or batch number as indicated at 4326 of FIG. 43.

i. Retailer

Figure 53:
FIG. 53 is an example of an in-use container records window showing the retailer field expanded.

A retailer is inserted by the user clicking on the pop down list at 5302 (window 5300 of FIG. 53) which accesses the system's alterable data defined entry list (see III.C.2) for retailers and in turn allows the user to insert by clicking on the appropriate displayed line at 5304 the name of the retailer at 5306. The systems retailers list is accessed for altering data (insert, edit, or delete) by the user clicking on the Retailers command (10399 of FIG. 103) under the Others hierarchical menu (10312 of FIG. 103).

i. Product Number

The product number identified at 4330 is the product number of the particular retailer shown at 4328, and in this case is the same as the product number indicated at 4324 (because the manufacturer and retailer are the same organization). However, normally the manufacturer and retailer are different organizations, and the product number in most cases would be different.

j. PO Number

A purchase order number is shown at 4332 of FIG. 43 and is one more piece of data to identify a chemical.

k. Project

This field, shown at 4334, is used to define the intended use of the chemical. For example, a chemical may be purchased for a number of different projects within a given department or division.

i. Controller

The controller field, shown at 4336 of FIG. 43, identifies the person responsible for maintaining control over this chemical.

1. Mapping

This portion of the system allows the user to provide a very precise indication as to the location of particular chemical containers. For example, an emergency management group can set the present system to indicate the location of all flammable and combustible materials on any of the maps. This enables a fire-fighting team in an emergency, to be warned of any pending dangers in the building regarding hazardous material and where these dangers may be located within the building. The system hereof preferably provides a user with tools to scan in images such as building floor plans or other drawings of the building, import drawings created by various other software programs, and provides tools for a user to define and place buttons on the map images for creating various types of maps. For example, with respect to placing buttons on map images, the user can create maps with visible or invisible buttons to list all the chemicals found in any defined area on the map, such as a floor, room, cabinet, or shelf. The system also allows the user to locate, through various methods such as warning icons or alternating flashing numbers the amount and quantities of chemicals present in a chosen area. Also, the system allows the user to set up searches to locate particular storage groups such as oxidizers, acids, flammables, toxins, etc., and, if required, the system will list the containers.

Figure 54:
FIG. 54 is an example of a building records window.
Figure 58:
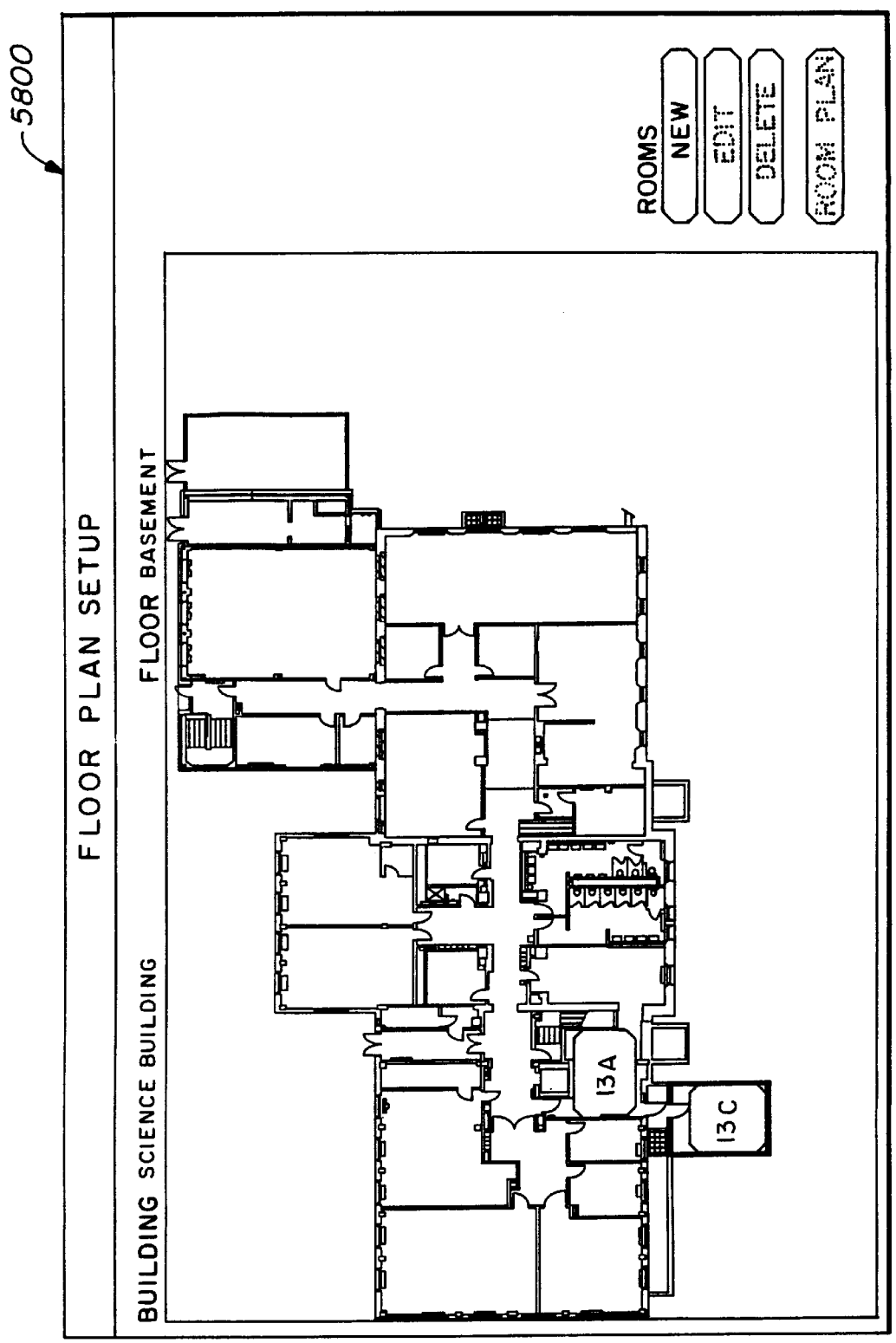
FIG. 58 is an example of a floor plan set-up window illustrating a plan view of a building storing chemicals.

The system hereof preferably includes map locators such as building, floor, room, location and specific location as indicated generally at 4338 of FIG. 43, as well as shown in window 5400 of FIG. 54. Referring to Window 5400 of FIG. 54 at 5402 under the heading Building this list indicates all of the buildings within a division in this case the Arts and Sciences division indicated at 5404. In addition as indicated at 5406 and 5408 the user has selected the Science Building which in turn brings up under the next locator at 5410 the floors within the building selected. This continues in the following manner: 1) selection of a floor at 5412 brings up under the next locator at 5414 the area/rooms on the floor selected, 2) selection of an area/room at 5416 brings up under the next locator at 5418 all of the general locations, and 3) selection of a general location at 5420 brings up under the next locator at 5422 all of the specific locations within the general location selected. A double click on any one of the above indicated selected lines under the first four locators (Building at 5406, Floor at 5412, Area/Room at 5416, and General Locations at 5420) will in turn bring up the following corresponding maps: 1) double click at 5406 (Science Building) brings up window 5600 at FIG. 56, 2) double click at 5412 (Basement) brings up Window 5800 of FIG. 58, 3) double click at 5416 (13a) brings up Window 6000 at FIG. 60, and 4) double click at 5420 (Shelving Unit 2) brings up Window 6200 at FIG. 62. Furthermore double clicking on the same lines indicated in window 4300 of FIG. 43 at 4338 (Science Building, Basement, 13a, or Shelving Unit 2) will also access the corresponding maps indicated above. The map locator Window 5400 at FIG. 54 is accessed by the user clicking on the Buildings command (10382 of FIG. 103) under the Others hierarchical menu (10312 of FIG. 103). Each of the five map locators is further explained below in regard to individual containers.

i. Building

Figures 55, 56:
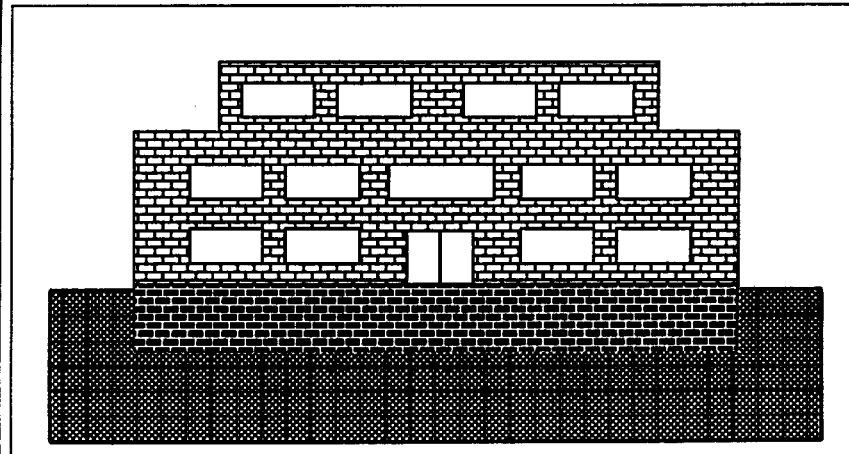
FIG. 55 is an example of an in-use container records window showing the building field expanded.
FIG. 56 is an example of a building plans window illustrating an elevation view of a building storing chemicals.

Window 5500 of FIG. 55 shows at 5502 the building list expanded. This lists indicates the buildings in the Arts and Sciences Division (indicated at 5504) where this particular container can be housed. Presently as indicated at 5506 the Science Building has been selected and in turn is inserted at 5508 as the building location for this particular container. As those skilled in the art will appreciate, the expanded list at 5502 will be accessible only when a user is in an alter data mode (insert or edit). This is because if the user is only viewing then only the actual location in this case indicated at 5214 (Window 5200 at FIG. 52) is necessary. Window 5600 of FIG. 56 also provides users with a visual indication of the building plans further described above under 1. mapping.

ii. Floor

Window 5700 of FIG. 57 shows at 5702 the floor list expanded. This list indicates the floors in the Science Building where this particular container can be housed. Presently as indicated at 5704 the Basement floor has been selected and in turn is inserted at 5706 as the floor location for this particular container. As those skilled in the art will appreciate, the expanded list at 5702 will be accessible only when a user is in an alter data mode (insert or edit). This is because if the user is only viewing then only the actual location in this case indicated at 5216 (Window 5200 at FIG. 52) is necessary. Window 5800 of FIG. 58 also provides users with a visual indication of the floor plans further described above under 1. Mapping.

iii. Room

Window 5900 of FIG. 59 shows at 5902 the room list expanded. This list indicates the rooms on the Basement Floor where this particular container can be housed. Presently as indicated at 5904 room 13a has been selected and in turn is inserted at 5906 as the room location for this particular container. As those skilled in the art will appreciate, the expanded list at 5902 will be accessible only when a user is in an alter data mode (insert or edit). This is because if the user is only viewing then only the actual location in this case indicated at 5218 (Window 5200 at FIG. 52) is necessary. Window 6000 of FIG. 60 also provides users with a visual indication of the room further described above under 1. mapping.

iv. Location: General Location

Figures 60, 61:
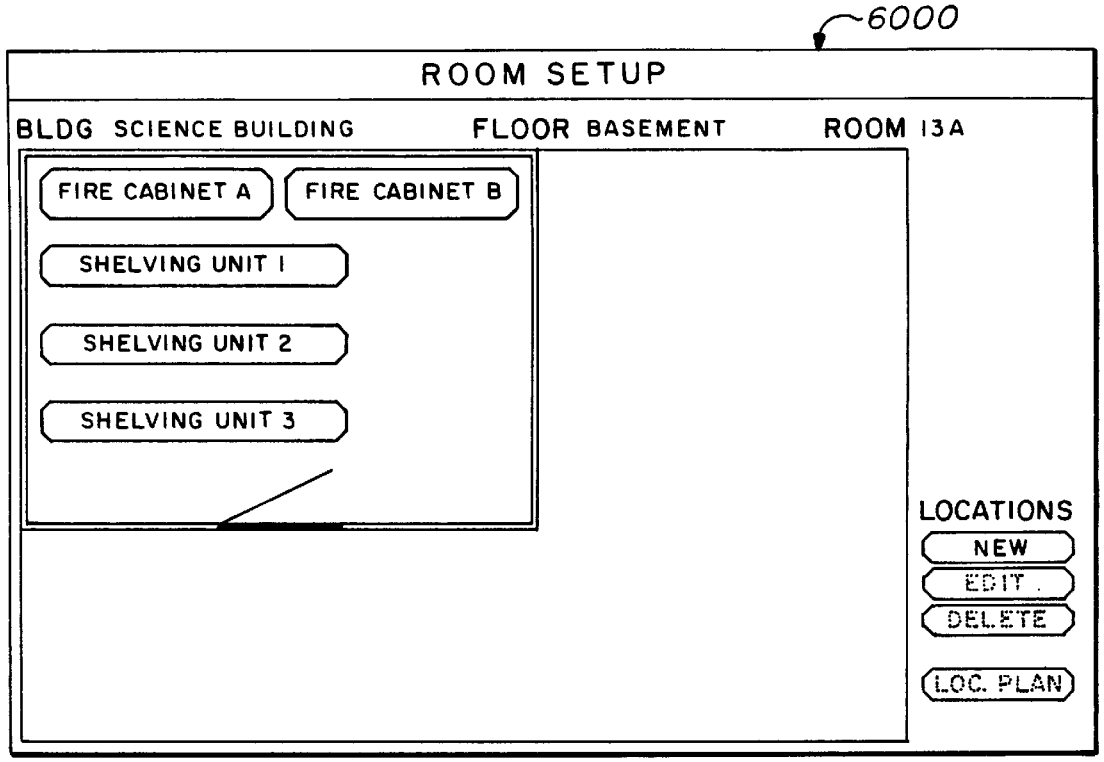
FIG. 60 is an example of a room set-up window.
FIG. 61 is an example of in-use container records window showing the location field expanded.

Window 6100 of FIG. 61 shows at 6102 the location list expanded. This list indicates the locations in the room 13a where this particular container can be housed. Presently as indicated at 6104 the location, shelving unit 2, has been selected and in turn is inserted at 6106 as the location for this particular container. As those skilled in the art will appreciate, the expanded list at 6102 will be accessible only when a user is in an alter data mode (insert or edit). This is because if the user is only viewing then only the actual location in this case indicated at 5220 (Window 5000 at FIG. 52) is necessary. Window 6200 of FIG. 62 also provides users with a visual indication of the location further described above under 1. Mapping.

v. Specific Location

Window 6300 of FIG. 63 shows at 6302 the specific location list expanded. This list indicates the specific locations in the location where this particular container can be housed. Presently as indicated at 6304 the specific location, Shelf 1, has been selected and in turn is inserted at 6306 as the specific location for this particular container. As those skilled in the art will appreciate, the expanded list at 6302 will be accessible only when a user is in an alter data mode (insert or edit). This is because if the user is only viewing then only the actual specific location in this case indicated at 5222 (Window 5220 at FIG. 52) is necessary.

C. Lists

The system hereof incorporates two types of lists, namely consolidated lists and data defined entry lists. A consolidated list is defined as a group listing of entry data, and a data defined entry list is defined as an entry list pertaining to a particular entry field. Both of these types of lists are used throughout the system and are discussed in detail below and indicated as such in the pertinent sections of this report.

1. Consolidated Lists

Consolidated lists contribute to the user friendliness and integrity of the system. This is because it allows the listing of files into groups. These groups always have something in common that is both useful and expedites the functions of review and searching for data within the system. The following is an example of the way in which consolidated lists are used in the present system:

Suppose an individual user is searching for all acetone that is presently in stock within the system. The user then opens an in-use inquiry screen (Window 6400 of FIG. 64A) and does a find, by pressing the Command/Alt F key combination, choosing find from the commands menu (10506 of FIG. 105), or clicking the find icon (10522 of FIG. 105) on the command palette (10308 of FIG. 103). A find can be carried out on either the CAS number at 6414 for acetone or the name acetone at 6402 by simply entering the search criteria into the respective fields 6414 or 6402. This find causes all the present types of acetone that have been previously inventoried into the system to appear under the purity, grade, description consolidated list discussed above. These types of acetone appear at 6404 of FIG. 64B. The user can then select and click on a particular type of acetone, shown at 6406, FIG. 64C. In the example shown in FIG. 64C at 6406 this is a container with a purity of 97.099%. This in turn causes the system to display a consolidated list of all the containers within the system of the type selected, such as shown at 6408 of FIG. 64C. The user then can select a particular container, as for example the container at 6410 of FIG. 64C. When the user clicks on this container, it causes the system to display that particular container's file, such as shown in window 6412 of FIG. 64D.

2. Data Defined Entry Lists

Data defined entry lists are used extensively through the system to provide both consistent and accurate data. There are two types of data defined entry lists, namely nonalterable and alterable. Nonalterable lists are preset and a user is not allowed to change the contents of a list. Alterable lists, on the other hand, can either be a preset or empty list that the system allows a user to change. The following are some data defined entry lists preferably contained within the system, all of which are discussed and reviewed throughout this report:

a. Synonym—Alterable
    b. Type—Nonalterable
    c. Physical State—Nonalterable
    d. Grade—Alterable
    e. Description—Alterable
    f. Container Type—Alterable
    g. Manufacturer—Alterable
    h. Retailer—Alterable
    i. Building—Alterable
    j. Room—Alterable
    k. Location—Alterable
    l. Specific Location—Alterable
    m. Deterioration Category—Alterable

D. Searches and Reports

The system hereof incorporates a design that extensively uses the advantage of the SQL language in both searches and reports. This allows information contained within the system's database files to be manipulated and displayed in very user specific terms.

1. Searches

The present system preferably incorporates preset and user defined searches.

a. Preset Searches

Figure 66:
FIG. 66 is an example of an in-use inquiry window.

These searches are automatically activated by the system when certain screen options are selected by a user. For example, when a user does a find on acetone (a "find" has been defined previously), the system automatically searches and displays all the types of acetone currently contained within the system database. This is shown in FIG. 65 at screen 6500, where the user inserts the word acetone in the prefix-name field at 6502 and a list is created at 6504 of all the types of Acetone in the system at 6508, 6510, and 6506. In addition, when the user clicks on a particular type of acetone, for example that is shown in FIG. 66 at 6604 of window 6600, the system then automatically searches and displays all of the individual chemical containers of that particular type. In this particular example the system would display all containers with acetone of 97.099% purity, HPLC grade, and of any description, such as shown at 6602. The following are examples of preset searches and are preferably incorporated within the system:

i. Type Lists
      (a) Purity, Grade and Description for Pure Chemicals
      (b) Vendors for Trade name Chemicals
    ii. Individual Container Lists
      (a) Pure Chemicals
      (b) Trade name Chemicals
      (c) Mixed Chemicals
      (d) Variable Mix Chemicals
    b. User Defined Searches User defined searches can be used throughout the present system. A user defined search is created by the user completing the constraining where clause of an SQL statement. The system preferably provides the user with several lists from which to chose the appropriate portions of an SQL select statement, thus making the possibility of syntax errors virtually impossible. An example of an SQL select statement would be "select * from fMAIN where MN_MAIN_ID= '67-64-1'". Here, the SQL statement tells the system to select all fields in the fMAIN file where the field MN_MAIN_ID is equal to 67-64-1. The user in this example would simply have selected "67-64-1" to complete the SQL statement. User defined searches are used extensively throughout the present system and a few examples of where these searches are used are described below.

i. Components of a Preset Mix

When adding components to form a mixed chemical, the user needs to inform the system of the chemical type of the component. This is accomplished by the user creating a select statement through the use of pull-down lists (2610 and 2612 of FIG. 26) and entry field (2614 of FIG. 26), executing a search by pressing the "Build List" button (2616 of FIG. 26), and finally choosing the correct main chemical record from the resultant list (2618 of FIG. 26).

ii. Multiple Consumption Process

When adding a main chemical to a multiple consumption process (MCP), a user needs to tell the system what type of chemical is being added to the process. This is accomplished by the user creating a select statement through the use of pull-down lists, (7906 and 7908 of FIG. 79) and entry field (7910 of FIG. 79), executing a search by pressing the "Build List" button (7912 of FIG. 79), and finally choosing the correct main chemical record from the resultant list (7914 of FIG. 79).

iii. SQL Searcher

The SQL searcher provides a user with a complete SQL interface to various files within the system. The user can create select statements as described above to select a list of main chemicals quickly. By double-clicking on the resultant list the user can go to the main inquiry screen for that chemical. This enables the user to find what they are looking for quickly without browsing through the inquiry screen for every chemical. For example, a user is looking for a particular chemical, to use in a lab, which contains the necessary element copper. The user can use the SQL Searcher (10902 of FIG. 109) to build a query such as "Select main chemical records where molecular formula contains "Cu". Once the query is performed, the user is presented with a list of matches (10904 of FIG. 109) and can choose the chemical that most closely matches the criteria. Double clicking on this line will cause the inquiry screen to be shown and that chemical's record to be automatically found. The user can then find a container of the chemical to use.

2. Reporting

Figure 67:
FIG. 67 is an example of a report window.

Reports differ from searches in that a report can be displayed or printed in either text or graphic form. For example, a time period review of the chemical consumption of a given chemical over a period of time can be visually depicted by a line graph. Or, a pie graph could be generated and displayed or printed comparing present inventory levels of storage groups. The preferred database provides an Ad Hoc report feature which allows for the user to set up three pertinent elements of a report: 1) the fields to be included in the report (6702 of FIG. 67), 2) the way in which records should be sorted (6704 of FIG. 67), and 3) which records to include (6706 of FIG. 67). The preferred database should provide these features in an easy to use interface such as shown in window 6700 of FIG. 67.

a. Ad Hoc Reporting

The present system supports ad hoc reporting or, in other words, allows specific reports to be set-up by user at any given time. The system does not require a programmer in order to generate these reports. This system, as shown in window 6700 of FIG. 67, allows a user to define his/her own reports and to save the report for later use.

b. Preset Reports

The system hereof preferably has a certain number of reports already prepared and readily available to the user. Preferably, the system includes several preset reports, such as shown in window 6800 of FIG. 68 and include such reports as all chemicals, no CAS #, all organic chemicals, all inorganic chemicals, etc. Window 6900 of FIG. 69 shows a screen report for acetone and is another example of a preset report contained within the system. There are also preferably preset reports available with regard to different aspects of the system such as the administrative, archiving, etc. The following is a list of example preset reports with an explanation on what the reports cover and why they are helpful:

Ingredient/MSDS report—This report lists all substances in inventory showing ingredients and hazards categories of each ingredient within the chemical. This report satisfies the requirements of SARA section 313, and can be submitted to the Environmental Protection Agency (EPA) instead of actual copies of the MSDS sheets for each of the ingredients.

Tier I Report—This report will print total amounts of each type of hazardous substance in inventory, and it also details where the hazards are located.

Tier II Report—This report contains facility information, owner/operator and emergency contact information. All chemicals being reported in this report have the appropriate hazards and physical state checked.

Section 313 Worksheet—This report shows all EPA toxic chemicals that are in inventory that exceed the Section 313 reporting thresholds. The total amount of the chemicals which exceed the thresholds are printed.

All of the above are examples of reports that help in meeting EPA regulations. There are numerous other preset reports that will be added to the system to meet regulations covered by the Department of Transportation (DOT), the Occupational Safety and Health Administration (OSHA), and other federal, state, or local government regulations.

E. Inventory

The present system is preferably designed to support a wide variety of different inventory methodologies. The user's default division specifies the only division and its corresponding departments to which a given user may have full unrestricted function access if the system administrator has allowed such access. Preferably, the system hereof can fully support a full automated bar code system, nonbar code system, and a mixture of bar code and nonbar code inventory. By implementing this type of design the system is extremely flexible in supporting both the small and large users. The user can choose between division specific inventory, department specific inventory, and site specific inventory.

1. Division Specific Inventory a. Bar Code

The present system is preferably designed to incorporate a number of different bar coding devices including wands, hand-held lasers, and portable readers. The present system preferably incorporates the ability to use a bar coding device such as the MEQ 530 bar coding device available from Mars Electronics. This particular bar code reader is capable of storing approximately 40,000 container records, is portable, and is safe because it will not emit any kind of spark thereby allowing its use in a chemical bunker with flammable and combustible materials. Any bar code reader capable of storing large amounts of data and uploading that data to a personal computer can be used. The preferred MEQ device is programmed by using the MEQ basic programming language and the system preferably provides the user with a very simple text editor to edit basic code to be sent to the MEQ such as shown in window 7000 of FIG. 70. As far as setting up the bar code reader goes, it is dependent on the kind of reader. The interface provided in the system gives the user the basic tools to communicate with an external device using the Xon/Xoff protocol. This allows the user to send commands or files to a device and receive the same. If it is impossible to communicate to a device directly with the system, it is still possible to do inventory with the device as long as it has the ability to export data into a text file. The system can then process these text files, or any text file for that matter, to carry out the inventory process. As those skilled in the art will appreciate, this can be accomplished by using protocol such as the standard X on/X off AX/ST protocol. The basic programs can be stored in the data file or in separate files and uploaded to the bar code reader using the bar code MEQ interface shown in window 7100 of FIG. 71. Once the MEQ bar code reader is programmed properly, inventorying can be done one of two ways.

i. Method One

This method, also referred to as the upload/scan/download method, is the preferred way of inventorying a large number of containers in various remote locations. Data is first uploaded to the MEQ for any or all areas of the application or system as indicated at block 7202. The bar code reader 7200 can then be taken to various locations to scan in each individual container into the system, as indicated in block 7204 of FIG. 72. The application, which has been programmed into the bar code reader, then searches the data file held in memory and displays the individual container's record on an LCD display 7206 of the bar code reader 7200. The user can then change the amount of chemical in a container in the database if it is different from the value presently being displayed on LCD 7206 by use of keypad 7208. This procedure is repeated for each container to be inventoried. When the inventory is complete, the bar code reader is taken back to a workstation where the system is installed and plugged into the modem port. The data is then downloaded as indicated at block 7210 from the bar code reader back into the system. The system can then create a report of any containers that were not inventoried, a report of containers inventoried but not in the system, and other reports which will help an inventory clerk properly complete the inventory.

ii. Method Two

This method is also referred to as the scan/download method and is useful in inventorying a number of containers in one location. This method involves data to be scanned into the bar code reader for containers in a specific location. Here the user preferably scans in the container ID and inserts a percentage to signify the amount of chemical left in the container, as indicated in block 7300. This again is accomplished by using keypad 7208 of bar code reader 7200. Once all the containers are scanned into the bar code reader 7200 the device is taken back to a workstation with the present system installed therein and plugged into the modem port. The data is then downloaded from the bar code reader back into the system as indicated at block 7302. The system then compares the data received from the bar code reader 7200 with the data already contained within the system and updates corresponding containers if necessary. Again, the system can then create reports of any containers that did not get inventoried, containers which were inventoried but should not have been in the particular area inventoried, or other reports to assist in completing an accurate inventory.

b. Nonbar Code

The system hereof allows for accurate inventorying to be done without the need for bar coding, through the use of generating reports of containers in a certain area. An inventory person then takes the generated report for the particular area and locates each bottle and checks the amounts left against the report. Any changes are made manually on the printed report and taken back to the system where the user must bring up each container record and accordingly update the data for that container. The inventory person by reviewing the report can single out those containers not found in the inventory and those that need to be added to the system.

2. Department Specific

This is simply the same inventory systems used above, both bar code and nonbar code, but regarding an entire department. The only difference lies in responsibilities designated by an organization's structure. This system is unique in that it allows inventory responsibilities to be delegated at the division level, department level, and at various sites within the organization. In other words, the system supports the use of the above bar code tools/methods and non-bar code tools/methods across and congruent with an organization's structure.

3. Site Specific

This involves inventorying a specific site such as a building floor or room and can use the same type of inventorying systems described above.

F. Transactions

The transaction design of the system is the part that provides essential elements for versatile and accurate inventory tracking. As stated above, the present system design supports three basic chemical inventory management methods namely centralized, decentralized, and unique. The system hereof allows each department to choose and follow one method exclusively or to develop a mixture of the three methods depending on that department's particular needs. For example, the system allows the chemistry department to, in general, use a decentralized management approach but at the same time support special needs of a particular research area or individual user to allow for the incorporation of the more stringent unique management approach. Therefore, those skilled in the art will appreciate, as explained below, that the system hereof supports the creation of multi-sided and individually tailored tracking systems and does so in a way that is totally unintrusive as to other users, divisions, departments, etc. The system supports multiple tracking methods because a user can choose or not choose to record any transaction except automatic transactions (explained below). To record a transaction, the user clicks on the transfer command line (10368 of FIG. 103) under the Container Records hierarchical menu (10310 of FIG. 103), which brings up the Transfer window 7200' of FIG. 72'. The user then chooses the transfer type from the pull-down list (7202' of FIG. 72') on the Transfer window, and inserts within the necessary fields that appear on the Transfer window. The user completes the transfer by hitting return. By choosing within a division and/or department to fully track all containers, a unique inventory system is supported/implemented. By choosing to partially track or not track a container can only support a decentralized or centralized inventory approach regarding a division and/or department. However, the system hereof allows the design to be developed to meet the needs of different departments, divisions, and individuals without compromising the integrity of the overall system. This is accomplished by providing transaction tools to the user to allow the user at any time to incorporate full, unique inventory tracking or to stop and restart the process over and over again. The ease with which a user, department, or division can adjust and adapt the system configuration for chemical management in real time allows the system to meet vastly different and ever changing chemical management needs. In addition, the present system preferably incorporates automatic transactions and selective transactions. An automatic transaction is defined as one that is recorded on every user no matter what and selected transactions are defined within the system as those which are only recorded if the users preference allows. An example of an automatic transaction preferably within the system is the log-in and log-out recorded for each user. Preferably, most system transactions will be handled under the selective transactions category. The system hereof has the ability to allow system designers to create specific transactions to track a virtually unlimited variation of use within the system. Any interaction between the user and the system can be traced and this allows system designers to adapt a system to meet any future chemical management needs.

1. Container.

The system hereof allows transfers between divisions or departments, transfers from one container into one or more other containers, location transfers, transfers between the three primary groups of in-use, surplus, and waste, a single process, and multiple process transfers. The user gets to the Transfer window by clicking on the Transfer command line (10368 of FIG. 103) under the Container Records hierarchical menu (10310 of FIG. 103). The user gets to the bar code reader interface screens by choosing the Interface command line (10706 of FIG. 107). The program editor is accessed by choosing the Program Editor command line (10704 of FIG. 107) of the Bar Code menu (FIG. 107). Referring to FIGS. 72'–75' various types of transfers are shown and are very straight forward. The user simply follows, for example, screen 7200' where a chemical is being transferred to another department. The user simply chooses the new department and then inserts the location mapping requirements as needed to identify where the container has been moved. Similarly, screen 7300' of FIG. 73' demonstrates the ease with which a transfer can be made from an old container into a new container. It is noted that after a user is finished with window 7300', the system will automatically bring the user to an in-use container record in the insert mode. This is to force the user to indicate the new location, etc. of the new container. The user simply inserts how much chemical was transferred to the new container and then updates the old container record within the system. Screen 7400' of FIG. 74' demonstrates the transfer of chemical from one container to another container already inventoried within the system. Window 7500' of FIG. 75' demonstrates the transfer of a container to a new location.

The system hereof also preferably includes the recording of a life record for each individual container that contains a history of all transactions involving a particular container, such as shown in windows 7600 of FIG. 76. The ability for the system at any time to begin or end the process of tracking a container is accomplished by the use of the single and multiple processes explained below.

a. A Single Consumption Process (SCP)

SCP is a process within the present system that allows any individual container to be uniquely tracked so that it can be determined how much chemical went down a drain, up a ventilation stack, became a by-product, or became waste. This is the most thorough and rigorous form of chemical inventory provided by the system. The system allows the user to set up a SCP process that will then be used in the system over and over again. This allows users to identify where the chemical is going when used based on past experience such as shown in window 7700 of FIG. 77. In window 7700 the preset SCP for cleaning spray equipment has set-up that 10% of the chemical goes up the ventilation stack, 10% down the drain, 30% is used in the process, and 50% is residual waste. Then the user simply inserts the total amount of chemical consumed, in this instance 10 grams, and the system then automatically breaks down where those 10 grams of chemical went according to the predetermined percentages. Window 7700 is accessed by selecting (or clicking on) the Consumption menu command (10370 of FIG. 103) that is under the Container Records menu (10310 of FIG. 103), which is a hierarchical menu of the main menu (10324 of FIG. 103). Window 7800 of FIG. 78 shows a list of preprocessed set-ups and the user clicking on line 7802 (Cleaning Spray Equipment) would bring up the SCP window 7700 and the breakdown of where the chemical goes corresponding to that process (as described above).

b. Multiple Consumption Process (MCP)

MCP is defined as a process where multiple chemicals from multiple containers are used in a particular process. By using the transaction function provided by the present system, a user can track all the chemicals and containers involved and determine how much chemical was used and where those chemicals used went. Examples of MCPs are distillation experiments, industrial dipping processes, chemical research experiments, and electronic circuit board cleaning. The system hereof allows a user to set up an MCP transaction for particular processes prior to actually using the process. This would typically be used for processes that will be used over and over again. An example of a multiple process screen is shown in FIG. 79 at window 7900. Window 7900 shows the chemicals that are going to be combined in this process at 7902. The percent of chemicals going to particular places is set up at 7904. Window 8000 of FIG. 80 discloses a preprocess of cleaning solution. The user gets to the Multiple Consumption Processes window by clicking on the Multiple Consumption Processes command line (10372 of FIG. 103) under the Container Records menu (10310 of FIG. 103). FIG. 80 provides a list of all Multiple consumption Processes (MCP). The user can choose an MCP and get a brief description of that MCP. If the user double clicks on a line in the MCP list, then the MCP window (7900 of FIG. 79) is opened, which shows all components making up that MCP with all by-product and usage data.

VI. ARCHIVING

A. Transactions

Archiving within the present system includes keeping all material safety data sheet (MSDS) records, user transactions, container transactions, and user records in a file easily accessible by the user. At any time a user with the proper access rights can move any or all records into a historical file. A historical file is an archive of records that has been permanently transferred out of the data file of the system into a separate historical file for various reasons such as: 1) contents of a chemical container have been consumed and the container removed from inventory and the transaction records of the container no longer need to be maintained in the system, 2) a Material Safety Data Sheet (MSDS) file has been replaced by a more up-to-date version, or 3) a user's access privileges have been revoked by leaving employment, death, etc., and the individual's transaction records no longer need to be maintained in the system. Under each of the above scenarios, the administrator may choose to transfer these unused and/or permanently dormant files to a file outside of the system known as a historical file. Transfer of such files periodically helps reduce the size of the system and provides a means for later retrieval for various reasons such as: compliance, liability (e.g., chemical accident that occurred in the past), or review of past acquisition/use. Once in the historical file the records maybe exported or transferred to another storage media. For example, floppy disks, CD ROM, etc. The archive interface allows the user to choose the source of the historical file (hard disk, CD ROM, or floppy disk and the like) and retrieve necessary data from that source to be further processed, referenced, or printed. The archive interface allows only basic data processing such as viewing records and/or printing records. FIG. 108 shows the relationship of the present system (10804 of FIG. 108) and the archive interface (10806 of FIG. 108). Arrows in the figure represent data movement. Data which is used directly by the present system datafile (10800 of FIG. 108) can be moved to the historical archive datafile (10802 of FIG. 108). Once in the historical archive, the user must use the Archive interface to retrieve the data to be viewed or printed. Notice that data cannot be placed into the historical file from the Archive interface, it can only come from a system datafile, and that data cannot be placed into a system datafile from an archive datafile.

1. Users

User transactions of normal system functions and of compliance/education functions within the system form a trace log for each user.

The flow charts corresponding to user transactions are set forth in FIGS. 125–126, 236–238, 240, and 310.

a. Normal System Functions

The trace log contains a description of every action the user has carried out within the system. For example log-in, log-out, insert, edit, etc. Each description includes the time and date of the action, a description of the action taken by the user, and the user's ID.

b. Compliance/Education Functions (This is covered in detail below under Section 2)

2. Containers

The container transactions comprise the cradle-to-grave trace log (7600 of FIG. 76) for every container. From the moment the container is inserted into the system to the time it is deleted from the inventory the system creates a container transaction log having a record of every transaction involving that particular container. Transactions include every detectible action taken with the container including location transfers, container transfers, consumption records, etc.

B. MSDS (Covered below under Section 2)

C. Users

Every user and container transaction involves a user ID that ties each transaction to a particular user. As those skilled in the art will realize when these transactions are archived to an historical record, it is imperative that the connection to the user not be lost. To prevent such a loss, the system hereof provides that each time a user is deleted from the system that particular user's record is placed into an historical file and that user's ID is never again used within the system to identify another user. This allows all transactions to be traced back to a particular user. Since the user ID number is unique, that number will always point to the transaction records contained in the system datafile or records that have been transferred to the historical file. This is accomplished in the historical file by using the unique user ID number to point to and access those records through the Archive interface. As stated previously, the Archive interface allows only basic data processing such as viewing records and/or printing records (FIG. 108).

VII. LABELS

The system hereof preferably includes the ability to print labels to be placed on each individual container for uniquely identifying each of said containers.

A. Hazardous Materials

The two important aspects of handling hazardous materials within the system are tracking these materials and identifying the chemical name and compliance requirements. Chemical name and compliance requirements will be discussed in detail below under Section 2.

1. Tracking

Preferably, the system hereof contains the ability to easily print tracking labels which, is an important component of the present system. In addition, since many chemicals are highly corrosive, the system preferably includes the ability to print replacement labels when the present labels become unreadable or otherwise unusable. Also, preferably the system hereof has the capability of printing both bar code and nonbar code labels for meeting the particular needs of the system user.

a. Bar Code

As explained above, the system preferably includes the use of a bar code reader and therefore the system also provides the capability of printing unique bar code labels for each container in the system. Preferably, the system hereof has the capability of using many types of printers including laser printers, dot matrix, and ink jet printers as well as thermal transfer label printers. The system hereof preferably is compatible with a wide range of printers in order to allow the bar coding option to be incorporated easily by system users.

b. Nonbar Code

Some users of the present system may not be able to afford or justify the cost of using the bar code function provided in the present system. However, the present system also provides support for nonbar code use.

Figures 81, 82, 83:
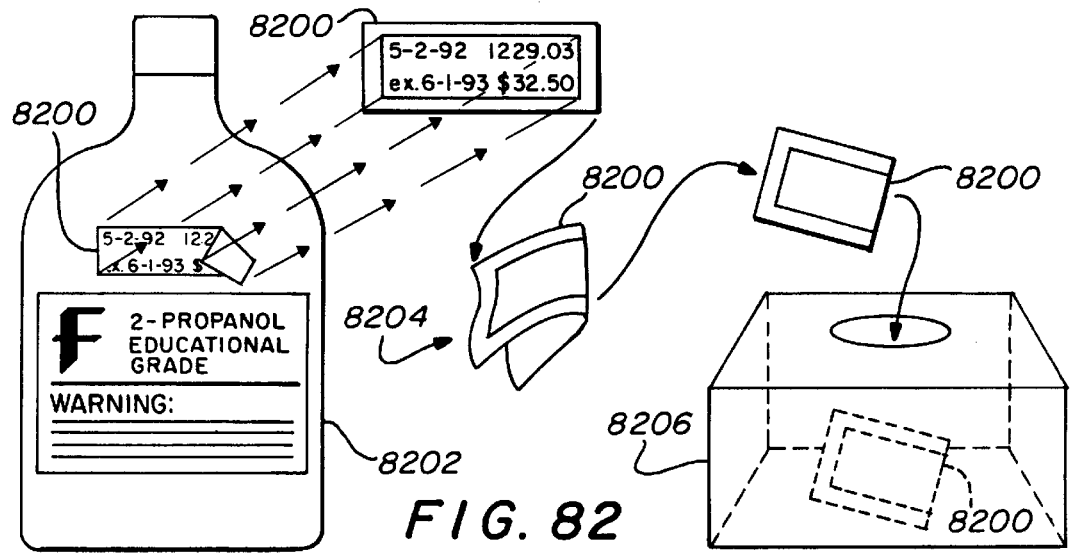
FIG. 81 is an example of a personal contacts window.
FIG. 82 is a graphical representation of a portion of a manual method of using the present system.
FIG. 83 is a representation of a sign to be used in connection with the method of FIG. 82.

FIG. 82 shows an example of a preferred method of use of hand labels. A user places a hand written or text printed label 8200 on a chemical container 8202. When container 8202 is empty the label 8200 is removed from the container and folded as shown at 8204. The folded label 8200 is then placed in a collection box 8206 which is conveniently placed somewhere within the room or placed where the container 8202 is stored. Then at some point the system user collects the labels contained within box 8206 and removes those containers from the system. To help ensure accurate inventory removal of containers, it is preferable that a sign 8300 such as shown in FIG. 83 is prominently displayed in the place where chemical containers are stored.

Figure 84:
FIG. 84 is an example of labels containing bar codes for use on the present system.

An example of a printer-generated label containing bar code information is shown in FIG. 84 at 8400. By placing such labels as shown on FIG. 84 on containers the inventorying process is greatly simplified from that described in relation to FIG. 82.

1. Chemical Name/Compliance covered under section 2

B. Fume Hoods covered under section 3

C. Eyewash and Safety Showers covered under section 3

VIII. REQUISITION SYSTEM

Figure 85:
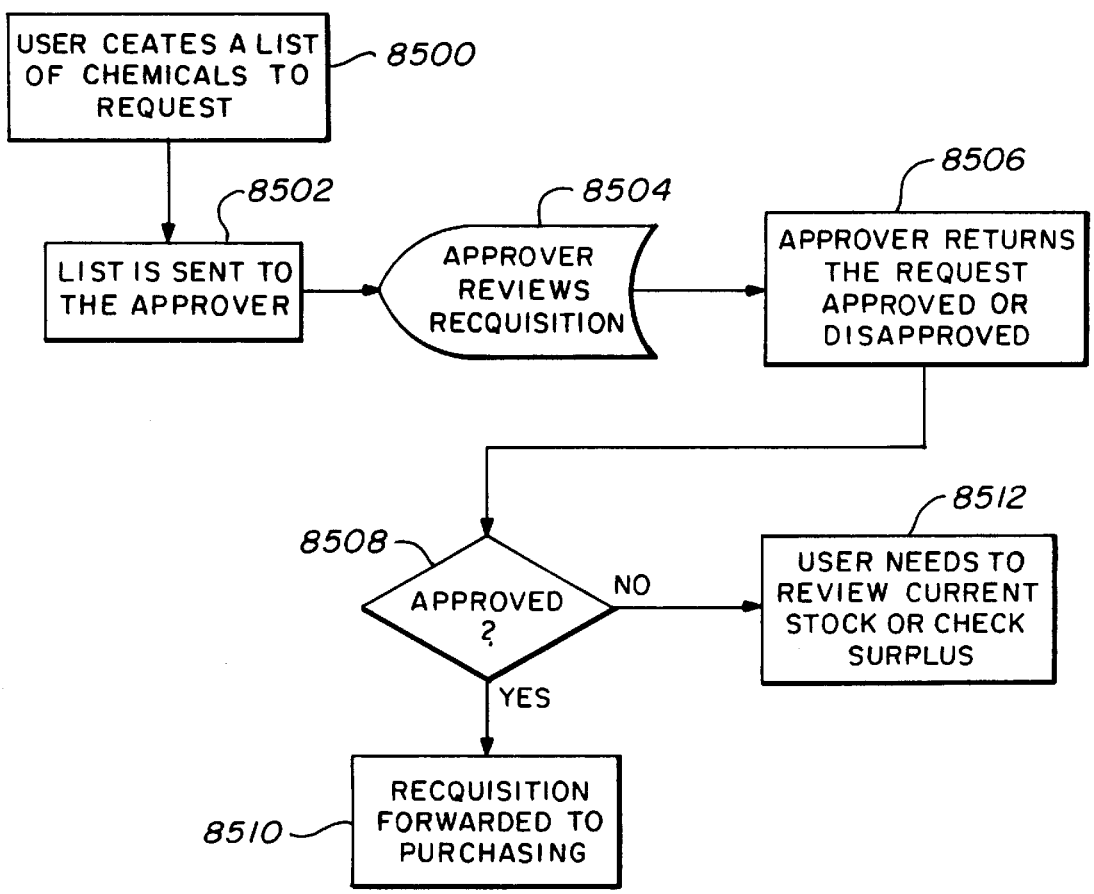
FIG. 85 is a flow chart of the requisition request.

The present system provides a requisition approval system that requires all chemical purchases to be approved by a person designated as a requisition approval officer (RAO). The preferred system for requisitioning new chemicals is shown in the flow chart of FIG. 85. The user creates a list at 8500 of requested items and then at step 8502 sends this list to the RAO, preferably via the system e-mail. At step 8504, the RAO or approver reviews the requisition and then returns the request at 8506 as approved or disapproved. The system determines at step 8508 if the requisition was approved. If step 8508 is YES, the requisition is forwarded to purchasing in step 8510. However, if at step 8508 the requisition is not approved, the system sends the user a message indicating that the user needs to review current stock or check surplus at 8512.

IX. CONTACT MANAGER

Figures 86, 87, 89A:
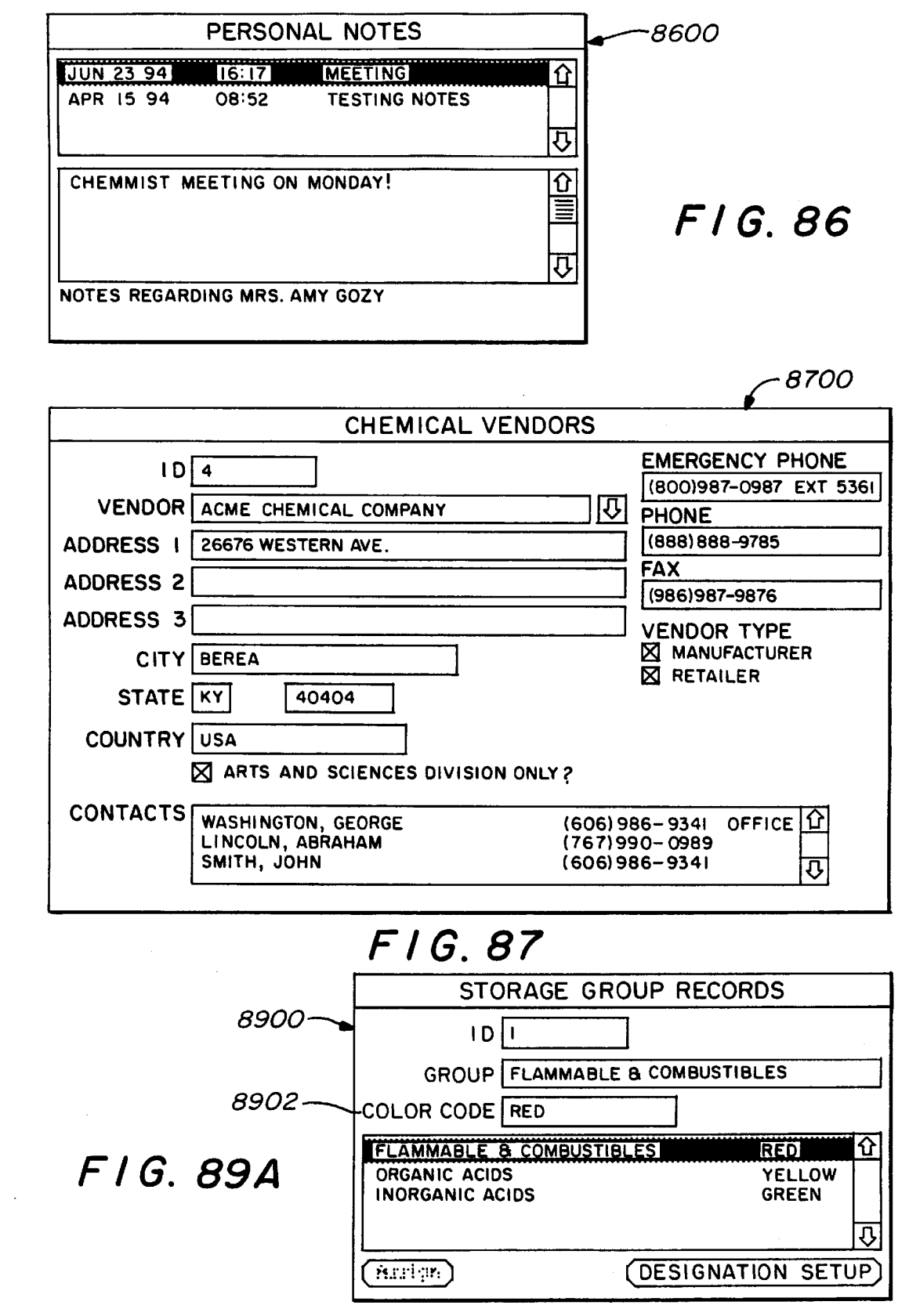

The contact management system of the present overall system allows the user to keep a list of contact persons under several categories. One such contact screen is shown in FIG. 81 at window 8100. Data for each contact person preferably includes the person's name, address, phone numbers, fax number, any e-mail address, etc. Preferably the contact manager also includes the ability to allow each user to keep private notes on any contact. An example of such personal notes is shown in FIG. 86 at window 8600. Each of the following contact categories uses the same structure as that shown in FIG. 81.

The flow charts corresponding to the contact manager include FIGS. 233–235, 240–243, and 310–313.

A. Vendors

The vendors category provides a space for an unlimited number of contact personnel for each vendor record contained within the system. An example of a vendor contact window is shown in FIG. 87 at window 8700. At 8702 it can be seen that a list of contact persons for this particular vendor has been inserted into the system.

B. Department Personnel

An important feature of the preferred system is the ability of the user to quickly identify the person or persons responsible for handling an accident involving particular chemicals. The department category preferably includes space for an unlimited number of contact personnel for each department defined within the system. This allows each department to have its own list of emergency contact people that are easily accessible by every user. The user can quickly bring up contact records by choosing one of the command lines under the Contacts hierarchical menu (10604 of FIG. 106), which is under the File menu (10602 of FIG. 06).

C. Division Personnel

The division category contact persons includes an unlimited number of contacts for each division defined within the system. A division is normally made up of more than one department. However, a division can be linked to only one department when stipulated by an organization structure. This category is for persons that have positions within a division or divisions. Depending on the organization structure, an individual could have several contact files in both the department and division category.

D. Personal Contacts

The personal contact category allows each individual user to keep a list of personal contacts and notes within the system. This feature attempts to keep the other contact categories from being cluttered with the inevitable personal references. The contacts window is opened by clicking on the "personal" menu command (10624 of FIG. 106) of the contacts hierarchical menu (10604 of FIG. 106).

E. Government Agencies

Government Agency categories includes any local, state, or federal agencies with which a particular department or division has contact.

F. Professional Support

This category provides a place for including contacts for all outside support on which department or division may rely, such as engineering or consulting firms.

G. Hazardous Waste Companies

This category includes contact personnel for any company that a division or department relies on for handling the disposal of their toxic waste.

H. Emergency Phone Contacts and Numbers

This category allows a user to quickly and easily view emergency phone numbers of the chemical manufacturers, fire departments, any emergency response teams as needed.

The user can quickly bring up contact records by choosing one of the command lines under the Contacts hierarchical menu (10604 of FIG. 106), which is under the File menu (10602 of FIG. 106).

X. INTERNATIONAL DESIGN ELEMENTS all of X covered under section 4.

XI. INTEGRATED EMERGENCY RESPONSE all of XI covered under section 5.

Section 2—Environmental/Health/Safety Information System

With the ever increasing sensitivity to environmental and health issues, the inherit dangers of handling, storing, and disposing of chemicals are now generally acknowledged. However, sheer number of chemicals commercially available makes the adequate training of staff and personnel and the proper handling of chemicals nearly impossible. In addition, local, state, and federal environmental and health regulations enacted over the past 20 years pose an overwhelming information management problem from the sheer volume of data to be analyzed. If this problem is not adequately addressed, it could result in debilitating fines and possibly severe financial liability on an organization. This is particularly true of small businesses and academic institutions because they are particularly constrained by budgetary, staffing, and technical support deficiencies.

III. B.1.m. STORAGE GROUP

Figure 88A:
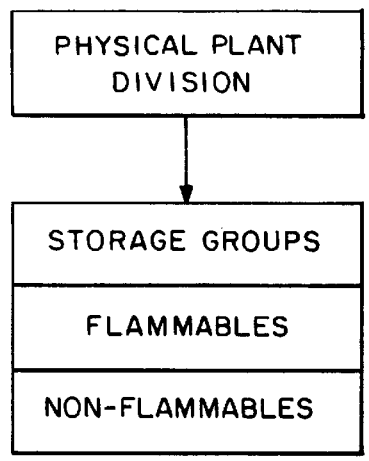
FIGS. 88A and 88B are block diagrams representing examples of storage groups within the institution divisions.
Figure 89B:
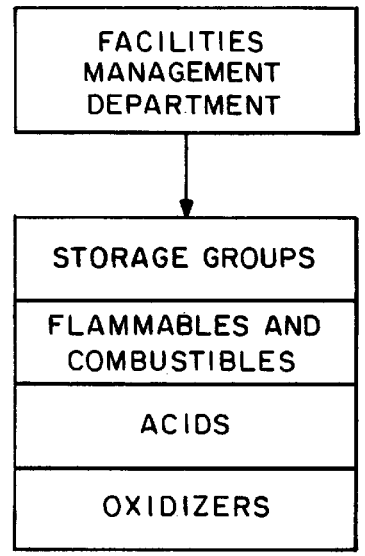
FIGS. 89B and 89C are block diagrams setting forth examples of various storage groups and departments.
Figure 88B:
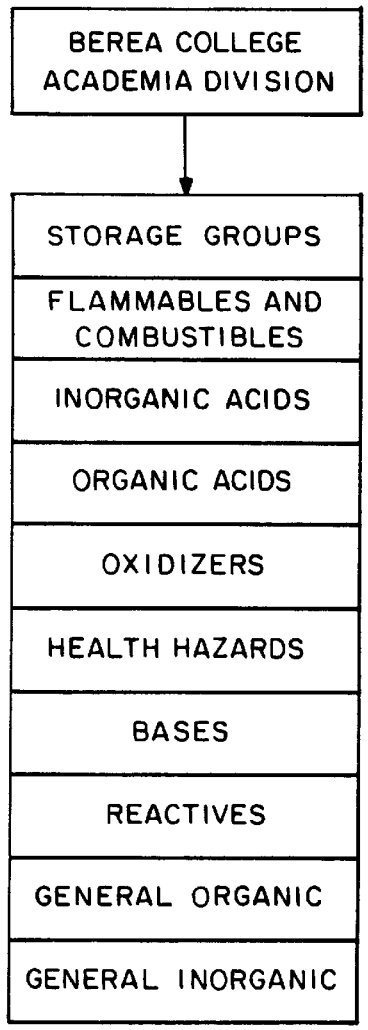
Figure 89C:
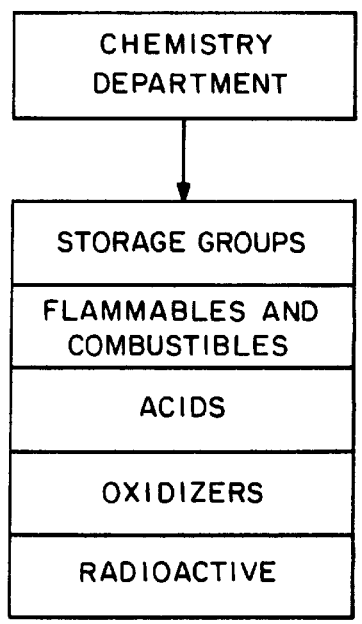

The present system hereof separates chemicals into various storage groups. This is done to ensure chemical compatibility, i.e., separating chemicals that might react under certain storage or handling conditions and to separate chemicals into groups for training users for regulatory issues of concern. The following are examples of various storage groups that may be employed, though those skilled in the art will realize all of the groupings may be important in specific circumstances: flammables, organic acids, bases, inorganic acids, oxidizers, reactives, health hazards, general organic, general inorganic, etc. The present system, hereof, preferably allows each division to design and create its own storage group, based on its particular needs. For example, FIGS. 88A and 88B show two different possible storage group configurations used by three different entities with different requirements. The set-up of this design is accomplished through the use of a data defined entry list, such as shown in FIG. 89 at window 8900, where a certain group is defined. The data defined entry list for grouping chemicals follows the design of other alterable lists explained above, except that here one unalterable storage group called special is always included. The flow chart corresponding to this section is set forth at FIG. 314.

i. Special

The special group is defined within the present system as storage group of chemicals that require particular storage and handling precautions that are applicable to specific chemicals. When the storage group special is chosen, preferably a window automatically appears that states something such as "Define below the special storage/handling contentions that must be met regarding this chemical." The system user, by entering the requested information, then automatically creates a special file linked to the main chemical record being viewed or inventoried. This special file is also linked to the general description window for the special storage group.

ii. General Description Window

The general description window is for the purpose of defining each storage group contained in a list. However, in the case of the special group the system preferably predefines the group and includes this within the system for the user. For most groups, however, when a new group is inserted into the system the system preferably automatically requests a general definition for the group. This design for grouping allows organizations to create and design various chemical grouping systems that meet the particular needs and requirements within their organization. For example, FIGS. 89A and 89B disclose two different divisions within a given institution that have different needs for storage groups. However, consistency throughout the system can be maintained by having similar storage groups in different divisions where possible and restricting certain storage groups to particular divisions.

iii. Designated Area (a) Designated Storage Area and Designated Nonstorage Area

Figure 90:
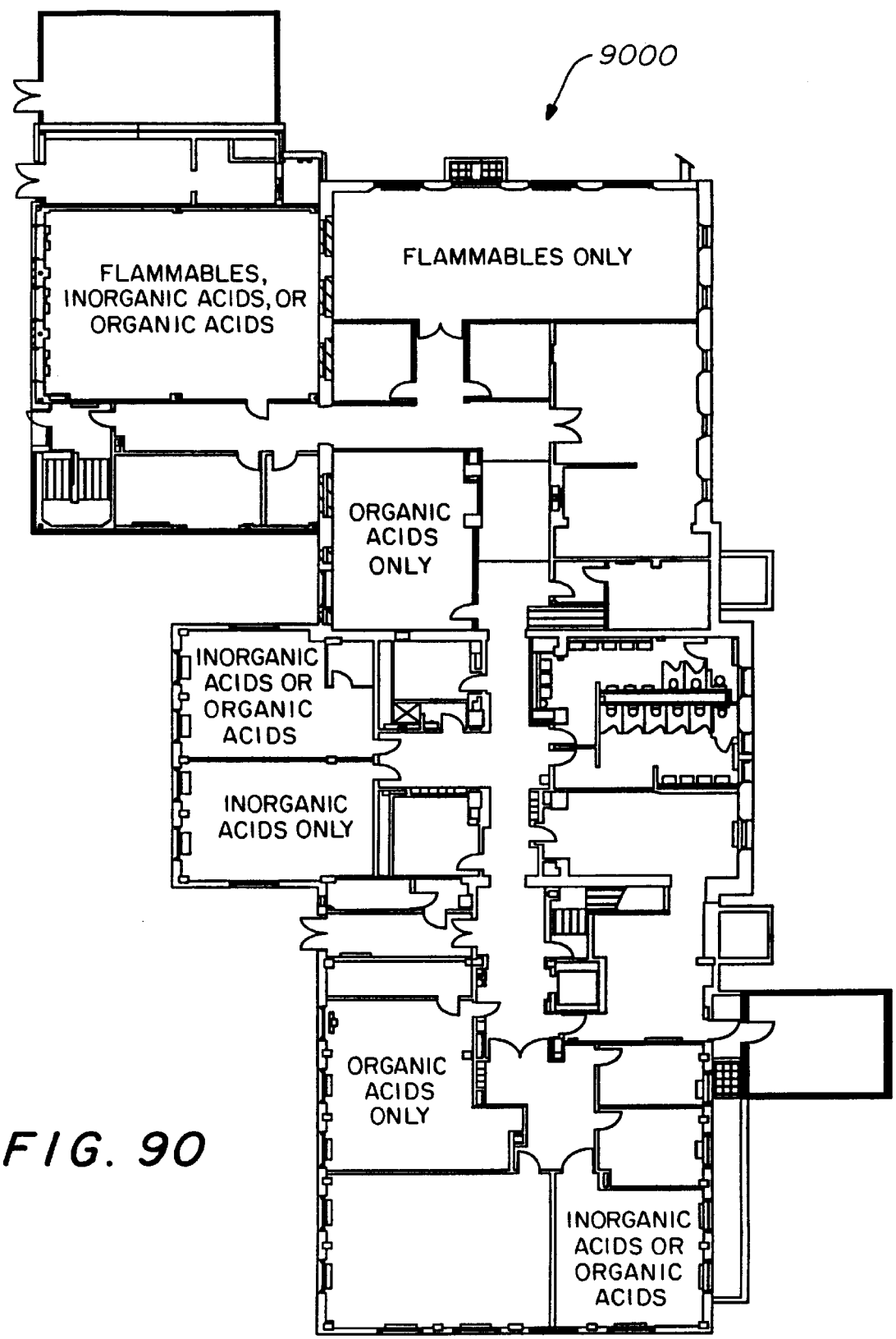
FIG. 90 is an example of a floor plan designating particular types of storage areas throughout the floor.

Each storage area location may be set as a designated storage or nonstorage area. A designated storage area is defined within the system as a location area that has been assigned a specific group and a designated nonstorage area is defined as a location area where no chemicals are allowed to be stored or used. For example, referring to FIG. 90, various rooms and areas within a floor of a building such as a chemistry building have been selected for various storage groups as indicated. If a user attempts to store a chemical from another storage group within any location in the building that is inappropriate the system will alert the user with a message such as "the radioactive storage group is not designated for this location" and the system will not allow the user to insert the chemical container into inventory under that location.

(b) Storage/Use Designation

This designation links directly to a chemical storage group and therefore this option is only available when a group has been selected for designated storage area. Then when a user selects a designated storage area, the system will automatically display a query such as "Do You Want To Select A Storage/Use Designation For This Group?". If the YES button is clicked a storage/use designation list will appear and any one of the following three options can be selected: Storage Only, Use Only, or Use and Storage.

n. Color Code

Preferably the system hereof allows for a specific color coding of every chemical group designated within a division. For example, this is shown in FIG. 89 at 8902. Color coding is highly recommended for designating the location of each chemical storage group with regard to locations. Color coding containers in storage areas is a very effective way to maintain a chemical inventory and to easily identify containers that may have been misplaced.

III. F.2. MSDS

The system hereof preferably enables the users of the system to keep an accurate and updated account of material safety data sheets (MSDS). An entry is recorded in a users trace log each time that user looks up a MSDS location, views an MSDS on screen or prints out a hard copy of the MSDS, such as shown in FIG. 9102 at window 9100. The system administrator can at any time review what MSDS a user has access or produce a list of users who have accessed a certain MSDS. This is useful because present OSHA regulations require that any employee who comes in contact with a hazardous chemical must have access to the chemical Material Safety Data Sheet provided by the manufacturer. In addition, OSHA regulations require that an employee be trained in reviewing the MSDS. Furthermore, OSHA requires an employer to write and enforce as company policy chemical hygiene plans for laboratory areas and hazardous communication plans for nonlab areas. These plans many times require the employee to review the MSDS sheet before using the chemical to assure proper handling and safety procedures are followed. This aspect of the program provides the access to MSDS sheets required by law as well as provides an assessment tool for employers who require review of MSDS by employees before handling or manipulating a chemical.

V. COMPLIANCE AND EDUCATION

The compliance and education component of the present system is designed to educate and inform users regarding compliance and recommendation issues related to chemical handling, storage, and disposal. The present system preferably provides a structure where a user can take user selected and pertinent environmental/safety/regulatory elements out of the voluminous federal documents and place them in a user friendly environment within the system. This is accomplished by clicking on icons that can access the educational and multimedia developed by the user or imported into the system from another source. Such icons are shown in window 9200 of FIG. 92 at 9202. This database structure of the present system does not seek to duplicate MSDS or various publicly accessible government documents and data but instead provides an easy and efficient way of collecting, accessing and making a user aware of pertinent information. This is accomplished through design structure within the system which incorporates a compliance/education file, environmental/safety/health awareness icons, and the ability to create or link to educational multimedia as explained below.

A. Compliance/Education File

The development of this file is made up of the following components and the discussion is with reference to FIG. 93 at window 9300:

1. Boolean Check Boxes

Boolean check boxes, if clicked, signify the chemical is controlled by a particular regulation, recommendation, or has a certain property, such as in window 9300 at 9302 indicates that an OSHA regulation applies. There are a variety of other boolean check boxes that may be clicked when entering a chemical into the system so that a user will know which recommendations, regulations, or properties may apply. Also, it should be noted that the majority of the compliance/education file of window 9300 is made up of Boolean check fields such as under the fields: solid, gas, oxidizer, general health hazards, etc.

2. Data Defined Entry Lists

Clicking on a preset line from a prepared data defined entry list to fill in the information required under a particular field. For example, the user may choose under LIQUID FLAMMABLE CLASS either class IA, IB, or IC (9304 of FIG. 93) or under COMBUSTIBLE CLASS II, IIIA, or IIIB (9308 of FIG. 93).

3. Inserting Text

Text fields are limited to special information gathering situations such as the listing of permissible exposure limit (PEL) (9306 of FIG. 93) or threshold limit values (9310 of FIG. 93). For example, if a chemical has a PEL of ten parts per million (PPM) under an OSHA regulation this number would be typed in under the text field for PEL at 9306 and automatically displayed as 10 PPM.

4. Insertion of Information

The system has the ability to be set to import select data from various data bases that contain regulatory information or specific recommendations as to chemicals within the system. This feature allows users to automatically insert and/or update specific files accessible on pertinent data bases. An example of this is shown in the FIG. 94 where compliance data from regulatory agencies at 9400 is imported into the system at 9402. This data may be imported via modem, CD ROM, or other like transfer means.

In addition, the compliance/education file design supports inserting information by hand as explained above and shown in FIG. 95. The user can take the compliance publications from the EPA, MSDS, etc. such as shown in 9500 and then the user enters these publications by hand into the system at 9502.

5. Automatic Threshold Analysis

The compliance education file preferably contains data pertaining to threshold limits. Automatic threshold analysis pertains to the present system keeping track of total volume of a material and reporting to the user if that volume exceeds the EPA requirements for total volume allowed in one area. These threshold amounts differ for each chemical and are set by the EPA. The system preferably keeps a running total of the amounts of certain chemicals and checks against designated threshold amounts. If the amount is above the threshold limit then the system hereof automatically presents a warning to the user such as a warning screen indicating the chemical has gone above the threshold limit. The system hereof also preferably distinguishes lab areas that do not have to comply with certain threshold regulations.

B. Environmental/Safety/Health Awareness Icons

Referring to FIG. 96, several icons of the present system which are preferably part of the system to graphically communicate with a user what information can be obtained by clicking on a given icon. Preferably, for any environmental, safety, or health information inserted into the system for a given chemical more and more of the icons of FIG. 96 will appear on the main chemical management screens (FIG. 92). As applicable, these icons are graphic symbols which communicate to a user, instantaneously, that particular information will be called up when a given icon is clicked on. As shown in FIG. 96 at 9600 a police officer with his hand raised as if to indicate stopping will call up regulatory suggestions on handling and storage and a list of all the organizations who have recommendations on this substance. Icon 9602 depicts a police officer with his hand raised and blowing a whistle and indicates that a regulation or law directly corresponding to the substance is involved. Clicking on Icon 9602 brings up a list of all organizations who have laws regarding this substance. Icon 9604 shows a container with its chemical being spilled and relates to spill precautions or regulations. Clicking on Icon 9604 will bring up a window showing what to do if the substance is spilled and possible effects of the spill. Icon 9606 displays a hand holding a chemical container and relates to handling precautions or regulations. Clicking on button 9606 brings up a window showing the proper way to handle this substance and possible results from improper handling. Icon 9608 is a graphic display of a tree and corresponds to environmental precautions or regulations. Clicking on Icon 9608 brings up a window explaining the effect the substance has on the environment. Icon 9610 shows a person wearing a gas mask and relates to required safety apparel to be worn when dealing with this particular substance. Clicking on Icon 9610 brings up a window showing proper apparel needed to be worn when working with the substance. Icon 9612 shows a group of chemical containers and relates to storage precautions or regulations. Clicking on Icon 9612 brings up a window showing the proper way to store this substance. Finally, Icon 9614 is a picture of a movie projector and relates to various multimedia presentations. Clicking on Icon 9614 causes the system to play an animation sequence, slide show, or possibly a Quick Time™ movie regarding concerns for this substance. Finally, Icon 9204 shown in window 9200 of FIG. 92 is a picture of the Grim Reaper and is displayed when a chemical is a hazard to human health. Clicking on this icon brings up a window showing, the human health hazards of this chemical.

Preferably, the system hereof, when a particular Icon is activated, automatically retrieves and arranges the attached data fields under regulatory and nonregulatory organizations and also separates the fields into, for example, health, safety, and environmental sections. When a particular main chemical is accessed, a group of Icons, but not necessarily all of the Icons of FIG. 96 may be displayed across the bottom of the screen such as shown in FIG. 92 at 9202.

C. Interactive Educational Multimedia

Interactive multimedia presentations within the present system enable users to be easily taught of the dangers and implications of chemicals.

1. Development Tools Provided for On-Site Development of Multimedia Modules

Figures 98, 101:
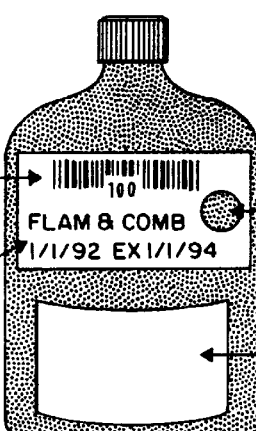

The system hereof preferably provides the user with tools required to create simple but effective multimedia presentations for use throughout the system application. Presentations can be made up of text, sound, graphics, or movies. For example, FIG. 97 shows at window 9700 with text describing general data pertinent to the flammable and combustible storage groups. This provides a quick and easy reference to initiate a user to the general characteristics of flammable substances. FIG. 98 shows window 9800 that presents a user with a graphic presentation concerning the chemical bottling labeling used within a system. Window 9800 shows a graphic representation of a sample chemical container and indicates to a user what each section of a label on that container means. Multimedia modules can also explain and teach users all the different portions of the system such as chemical storage methods, designated areas, and proper use of safety equipment.

2. Professionally Developed Multimedia Modules.

Preferably the system hereof also allows for multimedia modules created in-house or by third parties to be incorporated into the interactive educational component of the system. The preferred data base should support Quick-Time™ movies, which means that the application can provide an interface for the user to view QuickTime™ movies. The preferred database should store the information required for the movies (title, location, length, etc.) but need not store the actual movie itself. This also includes the sounds capabilities. Graphics, however, are a little different. They can be stored in the datafile just like any other data. These graphics can be manipulated from within the preferred database with no helper applications.

D. Information Gathering

Below is an outline of various agencies and organizations and several databases that have chemical lists or information pertinent to chemicals that may be maintained within the system. The list below is quite extensive and is preferably incorporated into the system hereof. However, the system hereof is designed to accommodate changes to this list and to create additions to the list below. Periodic updating of the system, both in inventory as described above and in the supporting information is essential to ensure the continuing effectiveness of the present system.

1. Environmental Protection Agency
   a. CERCLA/SARA Lists of Chemical Regulated Quantities
      i. Extremely Hazardous Substances TPQs (Code: SARA 302(A)=Chemicals Listed 361)
      ii. Section 313-Emissions Reporting (EPCRA Section 313 List of Toxic Substances—Code: SARA 313= 337 Chemicals Listed)

iii. Hazardous Substances and Reportable Quantities (Comprehensive Environmental Response, Compensation and Liability Act Hazardous Substances—Code: CERCLA=922 Chemicals)
iv. List of Radionuclides (Appendix B)
v. Superfund [Amendments and Reauthorization Act] Site Priority Contaminant List (Code: SARA 110=275 Chemicals Listed)

b. Clean Air Act:
i. National Ambient Air Quality Standards (Code: CAA 109=6 Chemicals Listed)
ii. National Emission Standards for Hazardous Air Pollutants (Code: CAA 112=189 Chemicals Listed)
iii. Standards of Performance for New Stationary Sources of Pollution (Code: CAA 111=377 Chemicals Listed)
iv. Motor Vehicle Emission and Fuel Standards (Code CAA 202(A)=8 Chemicals Listed)

c. Clean Water Act: (Clean Water Act Information and Guidelines-Code CWA 304=168 Chemicals Listed)
i. Hazardous Substances Section 311 (Code: CWA 311=389 Chemicals Listed)
ii. Priority Pollutants (Code: PRIO POLL=126 Chemicals Listed)
iii. Toxic Pollutants (Code: CWA 307(A)=74 Chemicals Listed)

d. Office of Water Regulations and Standards
i. Pre-Treatment Pollutants (Code; PARA-4C=424 Chemicals Listed)

e. Safe Drinking Water Act: 1) National Primary Drinking Water Pesticides (Code NPDWR=83 Chemicals Listed), and 2) National Secondary Drinking Water Regulations (Code: NSDWR=15 Chemicals Listed)
i. Monitoring
ii. MCLs
iii. MCLGs
iv. Proposed Contaminants
v. Priority List (proposed regulations)

f. Office of Pesticides and Toxic Substances (Active Ingredients of Registered Pesticides-Code: Federal, Insecticide, Fungicide, and Rodenticide Act -FIFRA= 879 Chemicals Listed)
i. Pesticides Inerts with High Priority for Testing
ii. Pesticide Inerts of Toxicological Concern.

g. RCRA
i. D Series-Maximum Concentration of Contaminants
ii. D Series-Chronic Toxicity Reference Levels
iii. F Series-Hazardous Wastes from Nonspecific Sources (Code: RCRA F LIST=28 Chemicals Listed)
iv. K Series-Hazardous Wastes from Specific Sources (Code:
RCRA K LIST=111 Chemicals Listed)
v. P Series-Acutely Hazardous Discarded Commercial Chemical Products (Code: RCRA P LIST=107 Chemicals Listed)
vi. U Series-Other Discarded Commercial Chemical Products (Code: RCRA U LIST=248 Chemicals Listed)
vii. TC Series-Characteristics of Hazardous Waste: Toxicity Characteristics (Code: RCRA TC LIST=41 Chemicals Listed)
viii. Characteristics of Hazardous Wastes: Ignitability, Reactivity (Code: RCRA 3 char.=3 Chemicals Listed)
ix. Hazardous Constituents without Waste Numbers
x. Basis for Listing Appendix VII
xi. Substances Banned from Land Disposal
xii. Toxic Substance Disposal (TSD) Facilities Ground Water Monitoring
xiii. Proposed Land Ban Wastes h. Toxic Substances Control Act (TSCA):
i. Code of Federal Regulation Citations
ii. Comprehensive Assessment Information Rules (CAIR) Reporting List (Code: TSCA 8A CAIR=19 Chemicals Listed)
iii. Toxic Substances Control Act-Preliminary Assessment (PAIR) Reporting List (Code: TSCA 8A PAIR= 514 Chemicals Listed)
iv. Health and Safety Reporting list
v. Chemicals Subject to Significant New Use Rules (SNURS)-(Code: TSCA 5 (A) (2)=80 Chemicals Listed)
vi. Commercial Chemical Control Rules (Code: TSCA 6 (A)=4 Chemicals Listed)
vii. Toxic Substances Subject to Information Rules on Production (Code: TSCA 8 (A)=47 Chemicals Listed)
viii. Records of Allegations of Significant Adverse Reactions (Code: TSCA 8C=53 Chemicals Listed)
ix. Health and Safety Data Reporting Rules (Code: TSCA 8D=666 Chemicals Listed)
x. Health and Safety Data Reporting Rule Terminations (Code: TSCA 8D term.=70 Chemicals Listed)
xi. HDD/HDF-Chemicals Required for Testing
xii. HDD/HDF-Precursors Required for Testing
xiii. Substances Subject to Testing Consent Orders
xiv. Hazardous Waste Constituents Subject to Testing
xv. Chemical Test Rules
xvi. Substances for Development/Reproductive Testing (proposed regulations)
xvii. Substances for Neurotoxicity Testing (proposed regulations)
xviii. ITC Priority List (proposed regulations)

i. Guidance Lists (nonregulatory)
i. Carcinogen Hazard Ranking Recommended Quantity (RQ) Adjustment
ii. OTS SIDS Program Chemicals
iii. OTS List of Chemicals for Testing
iv. CERCLA/SARA—Hazardous Substance Additions j. Analytes Listed in the Appendix C of the Consent Decree (Code Appendix C=24 Chemicals Listed)

k. Data Access Systems
i. Register of Lists (RoL)—a Pointer System
ii. Integrated Risk Information System (IRIS)
iii. Genetic-Toxicity (GENE-TOX) Database
iv. Toxic Substances Control Act Test Submission (TSCATS) Database
v. Toxic Substances Control Act (TSCA) Inventory
vi. Toxic Substances Control Act (TSCA) Preliminary Assessment Information (8a)
vii. Toxic Substances Control Act (TSCA) Substantial Risk Information (8e)
viii. Toxic Substances Control Act Test Substance (TSCATS) database 2. Department of Transportation
a. Shipping and Labeling Regulations
b. Substances from 49 CFR 172.101

3. Occupational Safety and Health Administration
a. Air Contaminants
i. PEL
(a) Ceiling Limits (b) 8-hr. Time Weighted Average (TWA)
(c) Short Term Exposure Limits (STEL)
(d) Skin Designation
(e) Transitional Exposure Limits
ii. Select Carcinogens
iii. Possible Select Carcinogens
b. Substances for which OSHA has Issued a Substance-Specific Standard
4. National Institute of Occupational Safety and Health
  a. Registry of Toxic Effects of Chemical Substances (RTECS)
    i. International Occupational Exposure Levels (OEL): 24 Different Nations
    ii. Threshold Limit Values (TLVs) American Conference of Governmental Industrial Hygienists (ACGIH)
    iii. Recommended Exposure Limits (REL)
    iv. Mine and Safety and Health Administration (MSHA) exposure standards
    v. EPA Federal Insecticide, Fungicide, and Rodenticide Act (FIFRA)
    vi. International Agency for Research on Cancer (LARC)
  b. NIOSH pocket guide
    i. Recommended Exposure Limits (RELS)
    ii. Immediately Dangerous to Life or Health Concentrations (IDLHs)
    iii. NIOSH Considers to be Potential Carcinogens
    iv. Target Organs
    v. Skin List
  c. Health Standards: Health Effects and Precautions
  d. Health Standards: Carcinogenic Chemicals
5. Agency of Toxic Substance and Disease Registry (ATSDR)
  a. Priority List for Tox profiles
  b. Hazardous Substances with NTIS Numbers
6. American International Hygiene Association (AIHA)
  a. Time Weighted Averages
  b. Ceiling or Short Term Time Weighted Averages
  c. Skin Absorption Designations
7. State Environmental Lists
  a. California-Prop. 65-Cancer List
  b. California-Prop. 65-Developmental Toxicity
  c. California-Prop. 65-Reproductive-Female
  d. California-Prop. 65-Reproductive-Male
  e. California-Prop. 65
    i. No Significant Risk Levels
    ii. Proposed No Significant Risk Levels
  f. Florida Hazardous Substance List
  g. Massachusetts Right to Know list
  h. New Jersey Right to Know Hazardous Substance List
  i. Minnesota Hazardous Substance List
  j. Pennsylvania Right to Know List
8. American Conference of Governmental Industrial Hygienists (ACGIH)
  a. TLV Time Weighted Averages (TWA)
  b. TLV Short Term Exposure Limits (STEL)
  c. TLV Ceiling Limits
  d. TLV Skin Designations
  e. TLV Carcinogens
  f. Biological Exposure limits
  g. Notice of Intended Changes
  h. Proposed Biological Exposure Indices
9. Cancer Lists
  a. Confirmed Human Carcinogen: American Conference of Governmental Industrial Hygienists (ACGIH)=Covered by OSHA as a CA
  b. Suspected Human Carcinogen: American Conference of Governmental Industrial Hygienists (ACGIH)=Covered by OSHA as a CA
  c. Human Carcinogen: National Toxicology Program (NTP)=Covered by OSHA as a CA
  d. Anticipated Human Carcinogen: National Toxicology Program (NTP)=Covered by OSHA as a CA
  e. Known, Probable, and Possible Human Carcinogen (Groups 1:
  Carcinogen to Humans, 2A: Limited Human Data or 2B: Sufficient Animal Aata): International Agency for Research on Cancer=Covered by OSHA as a CA
  f. Unclassifiable and Probably Noncarcinogenic Substances and Exposures (Groups 3 and 4): International Agency for Research on Cancer=Not covered by OSHA as a CA
  g. Substances Not Assigned an Overall Evaluation: International Agency for Research on Cancer=Not covered by OSHA as a CA
  h. NIOSH Considers to be a Potential Human Carcinogen (NIOSH Pocket Guide)
  i. NTP Proposed Reports
10. Food and Drug Administration
11. Nuclear Regulatory Commission (NRC)
12. Department of Agriculture
13. National Fire Protection Agency
14. American National Standards Institute (ANSI)
15. Compressed Gas Association
16. International Lists
  a. International Trade Commission
  b. Canadian Occupational and Health-Workplace Hazardous Materials Information System (WHMIS)
    i. Ingredient Disclosure list
  c. Australian National Occupational Health and Safety Commission (NOHSC)
    i. Australian Exposure Standards
      (a) Time Weighted Averages
      (b) Short Term Exposure Limits
      (c) Skin Effects
      (d) Carcinogens
      (e) Under Review
      (f) Proposed Changes
  d. The Ministry of Labour and Welfare of Israel
    i. Time Weighted Averages
    ii. Short Term Exposure Limits
    iii. Ceiling Exposure Limits
    iv. Action Levels
  e. Deutsche Forschungsgemeinschaft (DFG) of Germany Lists of MAKs
    i. MAK Values
    ii. Peak Limits
    iii. Skin/Sensitizes
    iv. Carcinogens
    v. Pregnancy
17. Databases with containing useful Health, Safety or Environmental Information
  a. Hazardous Substance Data Bank (HSDB) National Library of Medicine
  b. Teratogen Information System (TERIS) University of Washington c. Bretherick's Reactive Chemical Hazards Database Pull in the outline from the document containing this overview.

E. MSDS Scan and Text Import

1. Cataloging

The locations of all hard copies of MSDS and their respective revision dates are preferably stored in a catalog file within the system, such as shown in FIG. 99 at window 9900. The catalog file of window 9900 tells the user the location of the MSDS library, manufacturers' names, revision dates, and the particular binder number where the MSDS is located. This system makes it simple for a user to locate the most recent revision for a particular chemical from a particular manufacturer.

When a revised copy of an MSDS becomes available, the user needs only to update the record in the catalog file with a new revision date and location if necessary, replace the old hard copy with the revised edition, and place the old copy into an archive as required by law.

2. Scanning and Text Importing

The actual MSDS can be scanned in and stored as an image or imported into the system as text. If this system is used the user can bring up the actual MSDS on the screen for review or print out a hard copy. If the MSDS is imported into the system as text, key word searches may be used to find particular information within an MSDS. If the MSDS is imported into the system as text, key word searches may be used to find particular information within an MSDS by using a SQL Searcher window. The user can use such a feature for creating a select statement from pull-down lists which can be executed to bring up a list of MSDS's which match the select statements criteria. Double clicking on one line in the list would bring up the corresponding MSDS record.

VI. A.1.b. COMPLIANCE/EDUCATION FUNCTIONS

As defined within this system, compliance/education functions include any multimedia module that a user may view. In this way, the system hereof can keep track of the compliance and educational information that a particular user has received and apparently reviewed. This type of record can provide both legal and educational benefit to the organization by being easy to determine what information a user may or may not possess with regard to the chemicals he is using.

i. Education Rank

The system hereof also preferably provides the option of assigning to particular users an education rank. This allows, for example, a low-ranked user operating the system to be automatically shown a preset group of educational material before the user is allowed to proceed with the normal chemical management procedures. Conversely, a high-ranked user would be allowed direct access to the chemical management of the system without the need to review any educational material. Below are examples of possible educational ranks, (a) Professional A professional ranked user would not be required to review or be prompted regarding any compliance/educational information.

(b) Experienced

An experienced ranked user would not be required to review compliance information but would always be prompted with messages. For example, one possible message is "Under Long-term Storage Conditions, This Chemical Forms A Peroxide Under The Cap And Can Explode By Simply Removing The Cap. Do You Wish To Review Further Compliance/Education Information?"

(c) Novice

A novice ranked user would always be required to review any compliance/education information before proceeding.

(d) Automatic Updating of the Rank from Novice to Experienced

Preferably the system hereof can be set to automatically update the rank of a user after a predetermined number of reviews of particular compliance/education data in a particular field. Also, the system here can be set to automatically reset the user rank from experienced to novice after a preset period of time has elapsed without the user reviewing pertinent compliance/education data. Flowcharts dealing with Education Rank are at FIG. 319.

VII. A. 2.—CHEMICAL NAME/COMPLIANCE

Every chemical container must be labeled with the name of the chemical and all pertinent safety information. Safety information for each chemical will include at least the following:

Route of Entry—this includes information on the effects of importing the chemical into one's body such as by inhalation, ingestion, skin absorption, or skin or eye contact.

Health Hazards—this includes information on the manner in which a chemical may be hazardous to a person's health and includes examples such as no health hazard, toxic, highly toxic, reproductive toxin, irritant, corrosive, sensitizer, or carcinogen.

Physical Hazards—this includes information on the types of physical hazards that a chemical and/or its container poses such as no physical hazard, combustible liquid, compressed gas, oxidizer, flammable gas, explosive, flammable liquid or solid, pyrophoric, organic peroxide, water reactive, or unstable.

Target Organs and Effects—this includes information on which portions of the body may be affected by contact with a particular chemical and include any number of different body organs or other biological effects.

This system hereof preferably includes the ability to print labels for any container in inventory by accessing the information above and printing it on an appropriate label. The label will then contain, for example as shown in FIG. 100 at label 10,000, each of the particular hazards contained with the safety information file of the system. Label 10,000 is a generic label with every possibility written underneath each of the four areas of information. An actual label would contain only those categories that apply to a particular chemical. Enabling the system to produce its own printed labels will significantly lower the cost to the end user by eliminating the need to buy labels from the manufacturer or other third parties.

Some factors for different types of containers to be considered when printing labels are as follows:

a. Secondary Containers

Secondary containers include any container whose contents originated from a container presently in inventory. Preferably the label to be printed for a secondary container is the same as that for the container from which the chemical came with respect to the safety information printed thereon.

b. Mixed Containers

Mixed containers require a special label showing the components of the preset mix, their percentages, and the hazards of the components as mixed.

c. Surplus Containers

Surplus containers are containers not held in the active inventory. These containers of hazardous materials are to be disposed of, given away, sold, or used. Preferably a surplus label signifies a container as such and contains a date on which the container became a surplus.

d. Waste Containers

A waste container label preferably lists the waste contents, the date the container became waste, and any hazard warnings associated with the various components of the waste. In addition, it is possible that the container would already be labeled with appropriate hazard warnings and, if so, a label simply signifying that the container is waste and the appropriate date can be printed and added to the container.

e. Replacement Labels for the Original Containers

If a label becomes torn or unreadable it may be desirable to print a new label and the system allows for this.

Section 3—Safety Equipment Management System

Preferably, the system hereof includes the capability to manage safety equipment required when using chemicals. Examples of equipment that need to be controlled are fumes/exhaust systems, eyewash and safety showers, and various other equipment.

IV. SAFETY EQUIPMENT MANAGEMENT

The Safety Equipment Management component of the present system furnishes the user with tools necessary for keeping an accurate inventory of all safety data, stores test data when equipment is checked for proper operation, prints survey forms, and prints compliance labels. All these features greatly simplify compliance with the OSHA Laboratory Standard (29 C.F.R. 1910.1450) requiring that specific measures be taken to insure proper and adequate performance of fume hoods and other protective equipment.

A. Fume/Exhaust Systems

Fume hood and Exhaust System performance needs to be tested in order to conform to the OSHA Laboratory Standard. Preferably the safety equipment management component of the present system allows all data gathered on a fume hood or other piece of equipment in inventory to be stored and compared against a set of criteria which the fume hood must meet. If the fume hood is acceptable a compliance report and label can then be printed for each piece of equipment, as shown in FIG. 101 at label 10,100.

B. Chemical Eyewash and Safety Showers

Chemical Eyewash and Safety Showers require weekly inspection (29 C.F.R. 1910.151 (d)) to insure that they are working properly. Preferably the system hereof provides the user with the necessary survey forms for inspecting the station such as shown in FIG. 102 at Form 10,200. The system hereof also preferably stores the data that is accumulated from these weekly inspections.

C. Generic Category

This is a file created for handling miscellaneous safety equipment which requires periodic testing and record maintenance. This file is the same as the above files and enables the user to easily create reports, print labels, and maintain records of the equipment. The safety equipment portion of the system only allows for the storage and manipulation of data acquired from testing safety equipment. From this data the user can print a report whenever needed (e.g., fume hood labels telling when the last time it was tested and the test data). It will remind the user when the equipment should be checked according to the frequency number for that piece of equipment (e.g., 7 would mean every 7 days, 30 would mean every month, etc.).

Section 4—International Design Elements

It is preferable that the system here also includes the capability of incorporating international design elements into the present system. This is very important for various entities today where people in businesses communicate across international boundaries virtually every day. Therefore, the system hereof preferably serves organizations so that they may easily incorporate the ability to cross international boundaries effectively.

X. INTERNATIONAL DESIGN ELEMENTS

International design elements of the system are met by primarily following the design elements discussed above with respect to the preferred present system. The system hereof supports the development of multi-tiered compliance/education design for the development of separate compliance/education files for any country in the world and by using a data base which allows easy text conversion to a foreign language. In this way, the system hereof meets the international requirements that the United States has set-up as outlined in the Rio Declaration on Environment and Development which was signed by the United States at the United Nations Conference on Environment and Development, 1992 Earth Summit. Principle 9 of this Declaration states:

> States should cooperate to strengthen endogenous capacity-building for sustainable development by improving scientific understanding through exchanges of scientific and technological knowledge, and by enhancing the development, adaptation, diffusion, and transfer of technologies, including new and innovative technologies.

A. Multi-tiered Compliance/Education File

This is the central file which allows the present system to meet the international design. The system hereof incorporates the ability for developers to create the compliance/education files for every country in the world or only for those desired These files may be viewed in two ways. First, in the foreign language of the selected country and second in one or more foreign languages for use by an organization using the present system to review compliance/education information across several countries of interest.

For example, an international American chemical company that does business within the United States and three other countries (Canada, Mexico, and Japan) would develop a system in accordance with the disclosure hereof that included the English version of the compliance/education files (C/E files) of the United States and the C/E files of the above three countries. See TABLE II. If the company had branch factories in both the United States and in two of the foreign countries, Mexico and Canada (with factories located in Quebec, a French speaking province), each of those sites might select one or a combination of an English front end, Spanish front end, and French front end to the present system. Included in each of those systems would be the C/E files of the other countries. See TABLE III.

TABLE II

International C/E Files

| | Data File |
|---|---|
| System English Version | Company Files<br>• CIF (Chemical Inventory Files)<br>• SEF (Safety Equipment Files) |
| | C/E Files For The Following Countries:<br>• Canada C/E File<br>• Mexico C/E File<br>• USA C/E File<br>• Japan C/E File |

B. Text Translator

Preferably, the system uses a database such as Omnis 7³™ to make it possible to export all text from the application and convert the text to a foreign language with a text translator and then import the text back into the system. Preferably the database also allows for the selection of various default number formats and monetary signs. The preferable database should provide the system designer with a means of setting preferences for these parameters as well as others. The designer can then give the user the ability to choose his/her own preferences through the user's own preference

TABLE III

C/E Files

Multi-Lingual

| | Data File |
|---|---|
| System Spanish Version | Company Files<br>• CIF (Chemical Inventory Files)<br>• SEF (Safety Equipment Files) |
| System English Version | C/E Files For The Following Countries:<br>• Canada C/E File<br>• Mexico C/E File<br>• USA C/E File<br>• Japan C/E File |
| System French Version | | settings in the fUSER file.

Section 5—Integrated Emergency Response System

XI. INTEGRATED EMERGENCY RESPONSE

Since the advent of the chemical revolution in the 1900's the need to develop integrated emergency management measures within communities has slowly evolved. Large as well as small accidents involving hazardous materials over the preceding years that have injured and sometimes killed emergency response individuals (usually police, ambulance personnel, and fire fighters) have forced certain municipalities and local governments to develop responsible integrated emergency management measures. These measures started in the larger industrial towns and cities across the nation. However, with the onslaught of new environmental and health/safety regulations in the 1970's and the increase in the 1960's till present of the transport of hazardous materials across the nation's roadways and rail systems (presently one of every twelve trucks and one of every three trains carries hazardous materials), the potential for an accident is as close as a railway or roadway to both small towns and rural communities. The preceding years have shown this to be the case many times across this nation where train derailments and truck accidents have released hazardous materials and affected various smaller populated communities across this nation.

In addition, the purchase and use by members of our society of more materials created by the chemical revolution for use in the home, yard, and garden have increased the stock of hazardous materials carried by local merchants. Furthermore, in the majority of cases, stable materials created by the revolution (such as plastics used to create various household furniture and fixtures) are innocuous in normal situations but produce noxious and dangerous chemical vapors when burned. This has added to the need to increase the awareness of all emergency management personnel regarding appropriate emergency management methods across this nation in regard both to fire fighting and responding to hazardous material accidents in both large and small communities.

Last, but not least, the chemical revolution has provided the scientists the tools to discover and create more chemicals. Presently, there are more than 7 million chemicals that have been created or discovered. Of those, 80,000 are commonly used everyday across this nation with more being added to this list every year. The influx of more hazardous chemicals within our society has increased proportionally the storage and handling of such chemicals across our nation. For example, in the academic sector, the science professor (higher education) and science teacher (secondary education) can purchase and store a larger selection of hazardous chemicals than in the past. Even though the majority of times the chemical stock is small, the characteristics of the individual hazardous chemicals in the stock can vary. The following is a list of individual characteristics of various hazardous chemicals: explosive, oxidizer, flammable, combustible, corrosive, health hazard, radioactive, and unstable reactive. The more complex the chemical stock on hand, usually the higher the risk factor faced by an unprepared emergency responder in either a fire situation or a mix spill situation. In addition, the potential risk factor to emergency responders usually increases the higher up the education ladder and the larger the institution. For example, a university campus where various upper-level science classes are taught and major/minor scientific research is performed contains areas where potentially life-threatening hazardous spills and fire mishaps can occur. In this day and time it is essential that integrated emergency management contingency plans be prepared and in place regarding such areas. The same scenario applies to the industrial complexes, governmental complexes, and community businesses across our nation. This has increased the need within our society for an overall chemical management system that includes a pertinent design element which supports the need of integrated emergency management regarding hazardous materials/chemicals.

The various responsible government organizations have reacted over the years to the above by providing training and sometimes grants/resources to various individuals and communities across this nation for the purpose of development of appropriate integrated emergency management response. The reaction (many times) of the more aware/trained emergency responders (police, ambulance personnel, hazardous material teams, and fire fighters) has been to map out within their communities where the potential lies for encountering hazardous materials accidents. Requests for hazardous material inventory lists (that go way beyond the minimal requirements of the federal regulator mandates) have been routinely requested within some communities (large and small) by emergency responders from local businesses, industries, government complexes, and academic institutions within their communities.

The purpose of the Integrated Emergency Response (IER) design element within the overall system as shown in FIG. 110 is to provide the extension tool needed in this day and time regarding integrated emergency management. The IER can support the following situations: 1) allow an emergency responder working within a local community to access the system site through a local area network, 2) allow an emergency responder working in a larger geographic region to access the system site through a wide area network, 3) allow outside emergency responder experts (anywhere in the world) with access to IER to access a system site (through a local or wide area network) for the purpose of consultation or preparing outside support personnel to help respond to an emergency, and 4) provide a combination or alteration of any of the above scenarios.

The IER design element provides the user a powerful integrated emergency management tool that allows a direct link to an infinite number of system sites through both wide area networks (WAN) and local area networks (LAN) as shown in FIG. 110. The system allows the IER user the ability to view and manipulate system data in printed and screen reports. This powerful tool allows emergency responders to access at any time (through IER) the most up-to-date system data for responding to both hazardous material accidents and fire-fighting conditions within a system user site. In addition, IER also allows the emergency responder to access data and prepare and maintain pertinent hazardous material inventory reports, designated area map reports, organizations' pertinent contact records, etc. for the purpose of preparing integrated emergency management contingency plans for their area of responsibility. Furthermore, the system allows for communication between both IER and system users as well as IER to IER users. The flow chart in FIG. 111 illustrates how a communications user in FIG. 110 contacts a desired system user. The communication link can be thought of as a system application with a list of possible hosts to choose from when logging on. The communication link will make it possible to connect to a multitude of system databases located on a wide area network (WAN) or local area network (LAN) As shown in FIG. 111, each possible connection will have an fHOST record stored in a local data file. The fHOST record will have all information needed to log onto the remote database or datafile. In order for the communication link to be able to link to a system database, the communication link application must have a user name and password setup in the system database (LINKUSER). The LINKUSER can only logon from the communication link application since the user's record will be marked as communication link user. Once logged onto the database, the LINKUSER, by way of the communication link, will have view access to all system files, except personal contracts, user records, and other irrelevant data. Once the user is done with that database, it would be possible to logoff and logon to another.

The following is not accessible to the IER user: 1) sensitive data contained within a system under the contact manager (personal notes), and 2) all edit and write functions supported by the system except for communication data as set forth previously.

ADMINISTRATIVE SUBSYSTEM FLOW CHARTS

The system hereof is broken down into a number of smaller subsystems. They include the administrative, inventory, data management, and the safety subsystems. The administrative subsystem is comprised of all the formats that allow a user in control of the system i.e., the administrator, to do the following:

Create a connection to an SQL host that will be used to house all the system data.

Create divisions and departments.

Create or add users.

Maintain a trace log for each user.

Maintain a simple electronic mail system that ties all users together regardless of division or department.

Assign access privileges to any function within the system to any particular user.

Set up parameters for handling several different system functions.

The following discussion is in relation to the flow charts which disclose in detail how the system operates.

FIG. 112 is a flow chart of the system main event process. Upon the user double clicking on the program icon at step 2 the initial control procedure (ICP) for the STARTUP menu is called. At step 4 the program calls up the initialization procedure STARTUP/0 which is explained in detail at FIG. 220. The program then watches for any user-generated events at step 6 such as clicking-on a button, typing, choosing a menu command, etc. At step 8 the program looks for a timer procedure STARTUP/491 which is called every 5 minutes and explained in detail at FIG. 222. When an event is detected at steps 6 or 8 the appropriate control procedure is called for the particular detected event. After the called procedure is executed, the window control procedure (WCP) is called, if present, for the top most open window in step 8. Immediately following this, the library control procedure (STARTUP/490; described at FIG. 221) is executed at 10. Therefore, as can be seen every user event can trigger three procedures to run. All user-generated events are broken down into window events and menu events and are flow-charted by procedure for each window and menu in detail below.

In all the flow charts that follow, the following conventions are used:

ICP is used to signify the initial control procedure. All ICPs are located at Procedure 0 for each window and menu format. The ICP for a window is run immediately when a window is opened, i.e., clicked on.

WCP is used to signify the window control procedure. All WCPs are located at Procedure 500 for each window format. The WCP for each window, if set and present, is called after every user-generated event.

LCP is used to signify the library control procedure. The only LCP is located at Procedure 490 of the startup menu. The LCP is called after every event unless it is procedurally bypassed.

TCP is used to signify the timer control procedure. The TCP is used to check the idle time for the auto-logoff system and to check for newly received electronic mail. The TCP is called every five minutes and only executes if there is new mail or the system was left idle for a preset amount of time.

CRB is used to signify the current record buffer. The CRB in the preferred Omnis database holds the value of every field for the current record of every file format.

Hash variables such as #CLICK, #DCLICK, #EDATA, and #CLOSE are message variables sent by the database to control procedures after events are detected by the system such as clicking on an object (#CLICK), double clicking on an object (#DCLICK), clicking on the close box (#CLOSE) or being in an enter-data mode (#EDATA).

FIG. 113 shows the flow chart of the initial control procedure for the login window. Once someone begins to log in, the system hereof at step 2 sets the WCP as procedure number 500. Then at step 4, the system clears all format variables for the login window once the window is closed.

FIG. 114 discloses the wLOGIN/470 procedure for logging on to the SQL host. This procedure is called after the user has entered his name and password and has pressed return or clicked on the OK button. The user's name and password is then placed into the logon script to be sent to the SQL host by procedure WLOGIN/471 at step 2 and described in detail below at FIG. 115. The system then causes a message such as "Logon In Process" to be displayed to the user at step 4. Then at step 6 the system starts the connection between the database and the host. Step 8 then checks to see if the flag is true. If the flag is not true, then the system causes a message such as "Cannot Find Driver For L_SERVER" to be displayed at step 10. The system then closes the top window at step 12 and the procedure is closed at step 14. If the flag is set at step 8, then the system determines if the database version is empty at step 16. If the database version is not empty, the system clears the database version at step 18. If the database version is empty at 16 or after step 18, the system next goes to step 20 where the system sets the necessary SQL parameters such as the host name, user name, password, and any other parameters required by the host. Next, logon to the host is attempted at step 22. Step 24 then determines if the logon is successful. If step 24 is not successful, a message at step 26 is displayed to tell the user that he cannot logon. Step 28 then increments the number of logon attempts by one and step 30 determines if the user has attempted too many times to logon. If at step 30 the user has tried too many times, step 32 causes a message to be displayed such as "Too Many Attempted Logons" and then the system at step 34 stops the procedure. If, however, at step 30 the user has not attempted too many times to logon, the program places the user back at the enter logon parameters prompt so that the user may attempt to logon again.

If logging on is successful at step 24, step 36 then determines if there is an initial command that needs to be sent to the host. If the initial command field is not empty, i.e., there is a message to send, the system does so immediately at step 38. Step 40 then determines if the flag is false and, if so, step 42 causes a message such as "Initial Command To The Host Failed". The user then is returned to the enter logon parameters at step 44. If there is no initial command to be sent to the host at step 36, the system at step 46 turns off the autocommit so that the user has more control over when to commit the channel to the host; otherwise, the channel would be committed each time a new SQL command is sent. As those skilled in the art will appreciate, sometimes a user may want more control over how records are updated than is available with the autocommit option on. For instance, with autocommit off this would prevent an incomplete record update by not committing the command until the entire command has been executed. Next at step 50 the system calls procedure wLOGON/474 which verifies the logon and is explained in detail below at FIG. 118. Then at step 52, the system calls procedure wLOGIN/472 which updates the user's record to show that he is logged on and this procedure is explained in detail below at FIG. 116. Next at step 54 the system calls procedure STARTUP/483 (not shown) that simply executes the sequel that places the logon entry into the user's trace log. The system at step 56 then closes all working messages and at step 58 displays a message such as "Logon Successful". Step 60 then closes the log in window and step 62 calls procedure wLOGIN/478 which builds all lists that will constantly be used within the system and stores them in random access memory (RAM). Step 62 is described in detail below at FIG. 121. Step 64 then determines if the user is the administrator. If NO, step 66 installs proper menu commands for that particular user, but if step 64 if yes, then the administrator menu is installed at step 68.

FIG. 115 discloses the wLOGON/471 procedure where the system searches through four variables that are allowed to have scripting and replaces all occurrences of [USERNAME] and [PW] with the user's name and password as entered on the login window. This routine sets up the script that will be sent to the host for logon. FIG. 115 details the procedure that searches the logon script for the key words [USERNAME] and [PW], if these key words are found, then they are replaced in the script with the corresponding values. Step 4 of FIG. 115 checks the HOSTNAME field for the presence of the [USERNAME] key word; if it is present (step 6 of FIG. 115), then a procedure is called at step 8 of FIG. 115 which strips the key word and replaces it with the user's name as entered at logon. Step 10 of FIG. 115 checks the HOSTNAME field for the presence of the [PW] key word; if it is present (step 12 of FIG. 115) then a procedure is called at step 14 of FIG. 115 which strips the key word and replaces it with the user's password as entered at logon. This sequence of checking for [USERNAME] and [PW] is then repeated for each of the fields F_USERNAME, F_PASSWORD, and F_INIT.

FIG. 116 shows a wLOGON/472 procedure that accepts one parameter, mode. At step 2 the system determines if mode is equal to ON. If YES, at steps 4 and 6 the user's record is updated to show that the user is logged on. If at step 2 mode is not equal to ON, i.e. it is equal to off, then the user's record is updated to show that the user is logged off at steps 8 and 10. Step 12 then updates the user's trace log.

FIG. 117 shows the wLOGON/473 procedure and stores user data in the library variables. At step 2 the system finds the user's name and then at step 4 the system checks to see if the password entered is correct for the particular user's name. If at step 4 the password does not correspond, then step 6 causes a message such as "Incorrect Name Or Password" to be displayed. Step 8 then closes the working message and step 10 increments the number of logon tries by one. Step 12 then determines if the log on tries equal the maximum. If not, step 14 causes the user to be placed back at the enter logon parameters to allow the user to attempt to logon again. However, if at step 12 the number of tries equals the maximum, then step 16 causes a message such as "Too Many Logon Attempts" to be displayed and step 18 causes the system to shut down.

If at step 4 the user password entered corresponds with the user name, then step 20 causes the user's record to be transferred to library variables. Step 22 then checks to see whether the default settings for auto-logoff and checking the electronic mail have been set. If either one of these has been set, then step 24 sets the timer control procedure (TCP) of FIG. 222. Step 26 then sets the last action time equal to zero. After step 26 or if neither default value has been set at step 22, step 28 calls procedure WLOGIN/477 explained in detail below at FIG. 120, which sets the particular user's preference for conversion factors to be used for weights and volumes and places these preferences into library variables. Step 30 then clears the user's file.

FIG. 118 discloses the wLOGON/474 procedure which verifies the user's logon. At step 2 when the user has attempted to logon, the system will cause a message such as "Verifying Logon" to be displayed. At step 4, the system then determines whether the particular user's password has expired. If the password is expired, step 6 causes a message such as "Your Password Has Expired" to be displayed. Step 8 then calls procedure mPROCEDURE/4 described in detail below at FIG. 195. If at step 4 the password has not expired, then step 10 determines if the password is enabled. If not, step 12 causes a message such as "Your Password Is Not Enabled" to be displayed and step 14 calls procedure mPROCEDURE/4. If the password is enabled at step 10, then step 16 determines if the password is in use. If YES, then step 18 causes a message such as "This Password Is In Use Or Held Up On The Host" to be displayed. Step 20 then calls procedure mPROCEDURE/4. If the password is not in use, then the program continues the main event loop.

FIG. 119 is a flow chart of a wLOGON/476 procedure which is called after the user has entered his name and password and pressed return or clicked on the OK button and is attempting to logon to a database data file. Step 2 causes a message to be displayed such as "Logon In Progress". Step 4 then calls the procedure described above at FIG. 117 where the user's records are found, verified and the data stored in library variables to be available throughout the time this user is on the system. Step 6 then calls the procedure described above at FIG. 118 to verify that the logon has taken place. Next, step 8 calls the procedure described above at FIG. 116 to update the user's record to show that he is logged on. Step 10 then places a log entry in the user's trace log. Step 12 then closes the working message and step 14 causes a message to be displayed such as "Logon Successful". Step 16 then closes the window. Step 18 then calls procedure wLOGIN/478 described in detail below at FIG. 121 which builds and stores all lists to be used in a procedure in random access memory. Step 20 then determines if the user is the administrator. If NO, step 22 installs the commands menus and, if YES, step 24 installs the administrator menu.

FIG. 120 shows the flow chart for the wLOGON/477 procedure which sets the weight and volume conversions for particular users. At step 2, the user's weight conversion preference is retrieved from the conversion file. At step 4 the system determines if the flag is true. If NO, the system at step 6 causes a message such as "Error Trying To Locate Weight Conversion Record" to be displayed. If the flag says that step 4 is true, then step 8 transfers the conversion factor for the weight to library variables. Step 10 then retrieves the user's volume conversion preference from the conversion file and step 12 determines if the flag is true. If NO, an error message is displayed at step 14, and, if step 12 is true, step 16 transfers the conversion factor to library variables. Step 18 then clears the conversion file.

FIG. 121 discloses a flow chart for the wLOGON/478 procedure which builds a list and stores that list in RAM. At step 2, the procedure sets the division list as the current list. In step 4, it calls procedure mPROCEDURE/19, which is described below in detail at FIG. 205, to list all divisions currently within the division file contained within the system. Step 6 then sets the department list as the current list and step 8 calls procedure mPROCEDURE/19 to list all the departments within the department file of the system. Step 10 then sets the line as 1 and step 12 loads line 1 from the list. Step 13 then looks up the division name that the user has access to from the current division list. Step 14 then replaces the line 1 in the list with the division name. Step 16 then determines if there are more lines within the list and, if YES, step 18 increments the line number by one and loops back to step 12. Step 18 then sets the department access list as the current list. Step 20 then selects all records for the current user from the user's file which correspond to those departments to which the user has access. Step 22 then places all records selected in step 20 into the department access list. Step 24 then sets the line equal to one and step 26 loads the first line from the list. Step 28 then retrieves the department name, division ID, and division name for the current line and step 30 replaces the line with the information from step 28. Step 32 then determines if there are more lines of information. If YES, the program proceeds to step 34 where the line is incremented by one and then loops back to step 26. If there are no more lines at step 32, step 36 calls procedure wDEPT_LIST/470 which is described below in detail at FIG. 148. Then step 38 calls procedure wLOGIN/470 described in detail at FIG. 122. Step 40 then sets the department view list as the current list and step 42 retrieves all records from department access lists that have the view attribute and step 44 places these records in the department view list. Next, step 46 sets the storage group as the current list and step 48 calls mPROCEDURE/19 (FIG. 205). Step 50 then sets the building list as the current list and step 52 selects all the buildings within the user's current default division, and step 54 builds a list of the selected records in step 52 and places them in the building list file.

FIG. 122 shows a flow chart for wLOGON/479 which sets default departments for the particular user. Each user should have a department set as a default, which in turn also sets the default division to which the department belongs. The user then can only choose to view departments under the default division and can only insert chemical container records into departments to which the user has the view attribute set. This procedure at step 2 searches for the department access list for records of the user's default attribute set. Then at step 4 the system determines whether a default set was found. If YES, these values are transferred to library variables at step 6 for later reference. If no default set is found at step 4, step 8 opens the window department list and step 10 causes a message such as "No Default Department Set, Please Set One" to be displayed. After the default attribute set has been transferred to library variables, step 12 determines if the default department has the user-generated ID attribute set. This attribute is saved in a library variable for later reference.

TABLE IV

In TABLE IV of a division/department setup, the user has rights to 10 departments, this means the user has access to all those department's data. However, the user has set the view attribute for only 7 of those departments. This means that the user wants to "see" those departments only. Division 2 in this example is the user's default division. The default division means that all departments under that division are the only ones that the user can alter data in (insert container records, edit container records, delete, etc.). The user can "see" data in any department with the view attribute set, but cannot alter any data other than that which falls under the default division. The user here cannot set the view attribute for Department 1a because he has no rights to that department.

FIG. 123 shows the procedure for wLOGON/500 which signifies the WCP. If at step 2 it is determined that return has been pushed or the OK button clicked, the program proceeds to step 4 where the logon is to a database file. If YES, step 6 calls procedure wLOGIN/476, discussed Division 1

Department 1a
Department 1b (has rights, view)
Department 1c (has rights)
Department 1d (has rights, view)
Department 1e
Division 2 (default)

Department 2a (has rights, view, can alter)
Department 2b (has rights, view, can alter)
Department 2c (has rights, view, can alter)
Division 3

Department 3a (has rights, view)
Department 3b (has rights)
Department 3c (has rights, view)
Department 3d (has rights)

above at FIG. 119. Step 8 then determines if cancel has been pushed and, if YES, the system quits. Otherwise, if NO, the system loops back to step 6. If at step 4 it is determined that the logon is not for a database data file, then the system proceeds to step 10 which calls procedure wLOGIN/470 to logon to a host as described in FIG. 114.

FIG. 124 discloses in Step 2 the procedure for wUSER_TRACE_LOG/0 which is the ICP and sets the window control procedure as procedure number 500 which is disclosed below in detail at FIG. 126.

FIG. 125 shows the outline of wUSER_TRACE_LOG/2 which clears the trace log. At step 2, the trace log list is set as the current list and step 4 deletes all records that belong to the current user records and step 6 clears the trace log list. Step 8 then redraws the list.

FIG. 126 discloses the flow chart for the wUSER_TRACE_LOG/500 WCP which is the window control procedure for the user trace log. At step 2 it is determined if a user is clicking on another window while in the enter data mode. If the user attempts this, step 4 causes a message such as "Cannot Switch Windows To Be Displayed" and step 6 causes the system to remain on the current data entry windows. If the answer to 2 is NO, then at step 8 the system determines if the window is brought to the top and, if YES, step 10 determines if the window is in the enter data mode. If YES, step 12 causes the system to perform a cancel of enter data mode. If the answer to step 8 or step 10 is NO, step 14 causes the user trace log to be built.

FIG. 127 is the ICP for the user's window wUSERS/0 and sets the WCP as procedure number 500 at step 2. Step 4 then clears all format variables for this window once the window is closed. Step 6 then calls procedure wUSERS/480 which is described in detail below at FIG. 135 that builds the weight and volume conversion list. Step 8 then clears the user's file and step 10 causes the system to redraw the window to reflect that the file is empty.

FIG. 128 shows the flow chart for procedure wUSERS/12 which controls the trace log button. Step 2 determines if the trace log button has been clicked on and, if YES, step 4 opens the trace log window as indicated.

FIG. 129 shows the flow chart for procedure wUSERS/13 that allows the system to create a copy of the current user record in that a new user can be added to the system where the new user will have all the attributes, preferences, and access privilege of the current user record being copied. At step 2 it determines whether the copy button of the user window has been clicked on. If NO, the system continues the main event loop, but if YES, then step 4 causes the system to determine whether the user is the administrator. If YES, step 6 causes the system to display a message such as "You Cannot Make A Copy Of The Administrator" to be displayed in order to prevent the administrator's user record from being copied. Then, step 8 causes the procedure to quit. If at step 4 it is determined that the user is not the administrator, step 10 stores the current user's records ID in a temporary format variable so that it won't be lost. Step 12 then calls procedure mPROCEDURES/15 which is described below at FIG. 203, that requests a new unique ID for the new user file record to be inserted. Then the program places the administrator who is creating the new user record into the enter data mode at step 14 so that the new user's name and password can be entered into the system. Step 16 then determines whether the creation of a new record has been successful. If not, step 18 clears the user's file and step 20 causes the system to redraw the window without the information just added at step 14. If at step 16 it is determined that the entry of the new record has been successful, step 22 causes the new user record to be inserted into the user's file of the system. Step 24 then calls procedure wUSERS/485 to copy all the department access information as described below in detail at FIG. 137. Next, step 26 calls procedure wUSERS/486 which copies the function access information into this particular user's file and is described below in detail at FIG. 138.

FIG. 130 discloses the flow chart for procedure wUSERS/14 which causes the weight conversion list for a particular user to be placed into the CRB if at step 2 it is determined that a click in the enter data mode is made. If YES, then step 4 sets the weight conversion list as the current list and step 6 causes a line to be loaded from the conversion list which includes an ID for a weight conversion. This ID is then set as the user's weight conversion preference at step 8. If at step 2 a click is not detected the system continues the main event loop.

FIG. 131 is identical to FIG. 130 in procedure except that FIG. 131 sets the volume conversion preferences for a user. This figure shows the flow chart for the wUSERS/15 procedure. At step 2 it is determined whether a click has been detected while in the enter data mode. If step 2 is YES, then step 4 sets the volume conversion list as the current list. If step 2 is NO, the system continues the main event loop. Step 6 then places the values from this list into the CRB which includes the ID for a volume conversion. This ID is then set as the user's volume conversion preference at step 8.

FIG. 132 discloses the flow chart for the wUSERS/445 procedure which is for deleting a user. If a delete request is detected, step 2 causes a message such as "Are You Sure You Want To Delete This User?" to be displayed in order to make sure that this is what the administrator wants to do. Step 4 then determines the answer to the message displayed. If the answer to 4 is NO, the system simply continues the main event loop, but if YES, step 6 causes procedure wUSERS/479 to be called to delete the user's rights. (See FIG. 134) Step 8 then causes the system to delete the user's record from the user's file and step 10 causes the procedure wUSERS/476 to be called which causes the window to be cleaned up as described in FIG. 133.

FIG. 133 discloses the flow chart for the wUSERS/476 procedure which causes a clean-up for the present window. Step 2 causes the procedure wUSERS/481 to be called which simply redraws the weight and volume list with the correct lines selected and step 4 causes the system to redraw the windows.

FIG. 134 is a flow chart for the procedure wUSERS/479 which deletes the user's rights from the system. Step 2 causes the system to delete all user department access from the records and step 4 deletes all user function access from the records of the system.

FIG. 135 shows a procedure for wUSERS/480 which allows the system to build the weight and volume control conversion lists. Step 2 causes the weight conversion list to be set as the current list and step 4 selects all records in the conversion file that are of the weight type. Step 6 then causes a list to be built from the selected records of step 4. Step 8 then sets the volume conversion list as the current list and step 10 selects all records from the conversion file that are of the volume type. Finally, step 12 builds a list from the selected records from step 10.

FIG. 136 shows the procedure for wUSERS/481 which selects the correct lines from the weight and volume conversion list that correspond to the particular user's preference. Step 2 sets the weight conversion list as the current list and step 4 searches the list for the conversion ID that is equal to the user's weight conversion ID. Step 6 determines if the ID searching has been successful. If YES, then the system selects the line and the list that satisfies step 4 at step 8. Step 10 then causes the system to redraw the list with the proper selection made. The system then proceeds to step 12 after step 10 or if step 6 is no. Step 12 causes the system to set the volume conversion list as the current list and step 14 searches the list for the volume conversion ID that is equal to the user's volume conversion ID. If step 14 finds a match as determined in step 16 then step 18 selects the line in the list found in step 14. Step 20 then redraws the list to reflect the conversion preference found. If step 16 is NO, the system continues the main event loop.

FIG. 137 shows a flow chart for procedure wUSERS/485 which is used when creating a new user record by copying that of a current user for department access. Step 2 causes the system to display a message "Copying access information". Step 4 then selects all records from the department access user file then matches the user record to be copied. Step 6 then sets the current list as Temp_List and step 8 builds a list from the selected records in step 4 in the temporary list. Next, step 10 loads the first line of the current list into the new records to be formed and step 12 sets the access user ID as the user ID. Step 14 then inserts the values loaded from the list into the user access department with the ID of the new user. Step 16 then determines if there is another line in the list to be loaded. If NO, the system continues the main event loop; if YES, step 18 increases the line number by 1 and moves back to step 10.

FIG. 138 shows the outline for procedure wUSERS/486 which copies the functions access of a particular user to create a new user ID. Step 2 selects all records from the user function access that match the user ID to be copied. Step 4 then sets the current list as temporary list and step 6 builds the Temp_List from the selected records of step 2. Step 8 then causes each line to be loaded one at a time into the new record. Step 10 sets the function access user ID as the ID of the new user. Step 12 then causes the values from the list at step 6 to be loaded into the user function access file with the ID of the new user. Step 14 then determines if there is another line in the list to be loaded and, if YES, step 16 increments the line by 1 and loops back to step 8. If NO, the system continues the main event loop.

FIG. 139 shows the WUSERS/500 procedure which is the WCP for the user's windows. Step 2 determines if a click on another window has been made while the system is in the enter data mode. If YES, step 4 causes a message such as "Cannot Switch Windows" to be displayed and step 6 causes the system to remain in the current field where data is to be entered. If NO, step 8 then determines if the window is brought to the top of a plurality of opened windows. If YES, then step 10 determines if the system is in the enter data mode. If step 10 is YES, step 12 causes the system to cancel the move to the top. If step 10 is NO, step 14 causes the system to call procedure mPROCEDURES/0 to disable commands (see FIG. A81). If the window is not being attempted to be brought to the top in step 8, step 16 determines if a click on the OK button has been detected. If YES, step 18 unlocks and updates the file of the user record and then step 20 closes the window user's preference window. If no click on the OK button is detected, step 24 causes the system to unlock the user record file. Step 26 then retrieves the user's record and step 28 calls procedure wLOGON/477 described at FIG. 120 to restore the record to its previous state. Step 30 then closes the user's preference window.

FIG. 140 discloses the procedure wREAD_MAIL/0 which is the ICP for the mail window. Step 2 causes the system to build a list of all mail received for the particular user. Step 4 causes the system to sort the mail received so that the newest unread piece of mail is on the top of the list and step 6 redraws the list to correspond to step 4. It is noted that no WCP is required for this window because there is no need to manipulate data, i.e., the user is simply reading received mail.

FIG. 141 shows the outline for the procedure wREAD_MAIL/2. If a click is detected for the send mail button at step 2 this causes the system to clear the mail file at step 4. If step 2 is NO, the system continues the main event loop. Step 6 then opens the send mail window. Preferably when opening the window at step 6 a RECEIPT parameter is also sent. RECEIPT is a Boolean variable telling the system whether the user has requested a confirmation of when the sent mail is read.

FIG. 142 shows the flow chart for procedure wREAD_MAIL/8 which is the procedure creating the list that contains all unread and undeleted mail for the current user. If a click or double click is detected at step 2, then step 4 causes the line clicked on to be loaded into the CRB. If step 2 is NO, the system continues the main event loop. Step 6 then updates the mail file to show that this message has been read by the user and such confirmation is possibly sent back to the sender of the message if so requested. Step 8 then replaces a line in the list and removes the flag that signifies the message was unread. Step 10 then determines if the sender of the message has requested a receipt. If YES, step 12 causes the message "Sending Receipt" to be displayed. Step 14 then calls mPROCEDURE/62 as described in detail below at FIG. 217. Step 16 then closes this message. If no receipt is requested at step 10, step 18 causes the system to redraw the list and windows to reflect the current state of the user's received mail.

FIG. 143 shows the procedure wREAD_MAIL/9 which responds to a click on the respond push button of the system. If a click on the respond button is detected at step 2, step 4 determines whether the message to be sent has been sent from the system itself. If YES, step 6 displays a message such as "You Cannot Respond To System Internal Mail" and step 8 causes the procedure to stop because this is simply a message from the system to the user. For example, the system may send the user a message stating that the user's password is about to expire. This would not be a message to which the user could respond. If it is determined at step 4 that the message was not sent from the system, step 10 causes the system to open a window wSEND_MAIL. Step 12 causes a tab to be performed to move the cursor directly to the message field so that the user may begin typing his message.

FIG. 144 discloses the procedure for wREAD_MAIL/11 which controls a button enabling the user to toggle between a receipt requested and not requested. If a click on the receipt requested button is detected at step 2, step 4 causes the button to change states. If step 2 is NO, the system continues the main event loop.

FIG. 145 shows the procedure for wREAD_MAIL/445 which controls the deletion of mail messages from the record. Step 2 determines if the message field of the present user is empty and, if so, step 4 causes a message such as "No Record Present To Delete" to be displayed. If there is a message in the field in step 6 then the message selected is deleted from the mail file and step 8 causes the line to be deleted from the in box-window. Step 10 then causes the system to redraw the window without the deleted message.

FIG. 146 is the initial control procedure for the department list and step 2 sets the WCP as 500.

FIG. 147 discloses the procedure for wDEPARTMENT_LIST/1 which identifies the list of all departments within divisions to which the user has access. The user can select any number of these accessible departments to which he may have a view attribute set. Of those departments with the view attribute set, one must include the default division as long as the departments are within his default division. The view attribute being set means the user can only view and insert chemicals from these departments. This list allows the user to set the view attributes and a default division or, more accurately, the administrator to set this for a particular user. The administrator actually chooses a department to be the default department for a particular user and the division to which the department belongs is automatically set as the default. If a click is detected while holding down the option key at step 2 then the default department needs to be reset. If YES, the system calls procedure wDEPARTMENT_LIST/473 at step 4 to remove the default department and allow the default department to be reset as described in detail at FIG. 151. Step 6 then calls procedure wDEPARTMENT_LIST/472 to set the default department as explained in detail at FIG. 150. If step 2 is NO, step 8 determines if a click has been detected without the option key being held down. If YES, this indicates that the view attribute state needs to be changed from set or unset. Step 10 sets the current list as the department access list and step 12 determines if a line has been selected. If no line was selected step 14 clears the container list and step 16 calls procedure wDEPARTMENT_LIST/470 described in detail at FIG. 148. Step 18 then builds the department view list for all departments with the view attributes set for this particular user and step 20 redraws the windows. If step 12 is YES, step 14 loads the selected line from the list. Step 16 then locks the record in the user department access file. Step 18 then determines if the flag is set and, if NO, step 20 causes a message such as "Can't View/Unview Because Record Is Locked" to be displayed. If 18 is YES, step 22 sets the access view department attribute to the opposite of what it was. Step 24 then determines if this department was the default and, if YES, step 26 causes the system to remove the default setting. Step 28 then sets the access default to zero and step 30 unlocks and updates the user record accordingly. If 24 was NO, the system also loops to step 30. Step 32 then determines if the flag is true and, if YES, step 34 replaces a line in the list as updated and loops back to step 12. If step 32 is NO, step 36 causes a message such as "Error When Updating Record" to be displayed and the program then loops back to step 12.

FIG. 148 shows the flow chart for procedure wDEPARTMENT_LIST/470 which creates the SQL search string used when building lists of container records for each of the departments with the view attributes set for the particular user. Step 2 sets the department access list as the current list and step 4 sets the number shown as 0 Step 6 then sets up the initial search string. Step 8 then determines if any lines from the list of step 2 are to be selected. If YES, step 10 loads the selected line into the CRB and step 12 determines if the view attribute is set for this line. Step 14 then concatenates onto the search string a constraining clause for the department which is the department's ID number loaded from the list. Step 16 then increments the number shown by 1 and loops back to step 8. Once step 8 determines that there are no more lines to be selected, step 18 eliminates the last "OR" in the search string. Step 20 then determines if the number shown is greater than 1; if YES, step 22 shows the department icon as multiple departments and step 24 sets the department title field as empty and step 26 sets the division title field as "Multiple Department Inquiry". If at step 20 the number is not greater than 1 step 28 determines if the number shown is equal to 1; if YES, step 30 loads the line from the list that is selected. Step 32 then sets the department title as the department name from the line and sets the department icon to depict that particular department's icon. Step 34 then sets the division title field to the department's division name selected. If the number shown in step 28 is not equal to 1, step 36 determines if the number shown is equal to 0; if YES, step 38 clears the department title, division title, and department icon fields. FIG. 149 shows the procedure for wDEPARTMENT_LIST/471 which builds a list for all the departments that particular user has access to and to which he has the view attribute set. Step 2 sets the department view list as the current list and step 4 searches the department access list for all lines for which the view attribute is set. Step 6 then copies all the lines found in step 4 into the department view list.

FIG. 150 discloses a procedure for wDEPT_LIST/472 which sets the default department. This procedure takes a line that has been clicked on in the department access list and makes that line the default department in the division for a particular user. Step 2 of FIG. 150 sets the department access list as the current list and step 4 loads the selected line from the list into the CRB. Step 6 then checks if the view attribute is disabled and, if YES, step 8 causes the system to display a message such as "The Default Department Must Have The View Attribute Set". Step 10 then determines if the user wants to have the view attribute set, and, if not, the system continues the main event loop. If YES, step 12 locks the user department access record. Step 14 then determines if the user department access record has been locked. If NO, step 16 causes a message such as "Error When Locking Record" to be displayed and then the system continues the main event loop. If 14 is YES, then step 18 transfers all the corresponding department information into library variables. Step 20 then sets the access default and access view department flags as true. Step 22 then updates and unlocks the user department access file record. Next, step 24 determines if the flag is true and, if NO, step 26 causes the system to display a message such as "Error When Updating Record" to be displayed and then the system continues the main event loop. If the flag in step 24 is true, step 26 replaces a line in the list and redraws the windows. In order to protect against an endless loop that could result when this procedure is called from certain other procedures, step 28 determines if a bypass parameter is true. If step 28 is YES, the system continues the main event loop and, if NO, the system at step 30 causes this procedure to call wDEPT_LIST/470 as described at FIG. 148.

FIG. 151 discloses the flow chart for wDEPT_LIST/473 which removes the default department for a particular user from the system. At step 2, the system stores the current selected line in RAM, i.e., the new default. Step 4 then loads the old default department from the department access list. Step 6 checks if the flag is true and, if NO, the system continues the main event loop. If step 6 is YES, step 8 sets the department and division names and IDs to the default selected in step 2 and step 10 locks the record in the user department access files. Step 12 then checks if the flag is true for the locking of the record and, if NO, step 14 causes a message such as "Error When Locking Record" to be displayed and then the system continues the main event loop. If step 12 is YES, step 16 clears the access default field for this record and step 18 unlocks the record. Step 20 then checks if the unlocking step succeeded by checking if the flag is true and, if NO, step 22 causes the system to display a message such as "Error When Updating Record" to be displayed and then the system quits this procedure. If the flag is true in 20, step 24 replaces the line in the list with that selected in step 12 and redraws the windows. Step 26 then calls procedure wDEPT_LIST/470 as described in FIG. 148.

FIG. 152 discloses the flow chart for the procedure wDEPT_LIST/500 which is the WCP for selecting to view departments. Step 2 determines if the user has clicked on the close box or clicked behind the current window and, if neither is true, the system continues the main event loop. If the user does either in step 2, step 4 determines if at least one department has been selected and, if NO, step 6 causes a message such as "You Must Select At Least One Department" to be displayed. Step 8 then causes the system not to perform any default action, i.e., prevents closure of the window. If in step 4 it is determined that at least one department has been selected, step 10 determines if the default department has been set. If step 10 is NO, step 12 causes a message such as "You Must Set Default Department" to be displayed. Step 14 causes the system not to perform any default action, i.e., prevents closure of the window. If the default department has been set, the system continues the main event loop.

FIG. 153 discloses the procedure wSEND_MAIL/0 which is the ICP for the user to send mail within the system. At step 2 the procedure receives two parameters, respond and receipt, both of which are Boolean. Step 4 then sets the user list as the current list and step 6 calls procedure mPROCEDURES/19 described below in detail at FIG. 205. Step 8 then determines if a respond parameter has been detected and, if YES, step 10 selects the user to which the present user is responding in order to send the present user's mail automatically. If step 8 is NO, step 12 sets the window control procedure as wSEND_MAIL/500. Step 14 then determines if the MSG_TO field is empty. If NO, step 16 selects the user to whom the mail is to be sent from the list of users within the system. If step 14 is YES, step 18 deselects all lines and step 20 redraws the lists and the system moves to step 16.

FIG. 154 shows a flow chart for the procedure wSEND_MAIL/500 which is the WCP for the send mail option. Step 2 determines if an OK button has been clicked. If step 2 is NO, step 4 determines if the cancel button has been clicked and, if YES, step 6 closes the window and clears the mail file. If step 4 is NO, step 6 determines if the close button has been clicked and, if YES, step 8 clears the mail file. If step 6 is NO, the system continues the main event loop. If step 2 is YES, step 10 determines if there are any selected lines in the user list and, if NO, step 12 sounds a bell or sets a current field to the USER-LIST to inform the user that he must select someone to whom to send the message. If there is a line selected in step 10, step 14 loads the selected line from the user list into the CRB. Step 16 then retrieves a unique ID for the mail file and step 18 inserts the record or message into the mail file and sets the message to user field as the user loaded from the list. Step 20 then determines if any more lines, i.e. users, have been selected and, if NO, the system continues the main event loop. If YES, the system loops back to step 14.

FIG. 155 is a flow chart for procedure wRIGHTS_DEPT/0 which is the ICP for the user rights to particular departments and at step 2 sets the WCP as procedure number 500.

FIG. 156 sets forth the wRIGHTS_DEPT/1 procedure which is a list of all departments within the system and their respective division names. If at step 2 a click on this particular field is detected, step 4 sets the all departments list as the current list. Step 6 then determines if there is a selected line, i.e. department, and, if NO, step 8 redraws the list and continues the main event loop. If step 6 is YES, step 10 loads the next selected line from the list in step 4. Step 12 then determines if the line begins with a "•". If YES, step 14 calls a procedure to delete access to that department and replace a line in the list in step 16 whereupon the system loops back to step 6. If step 12 is NO, step 18 enables the user to access the particular department selected and step 20 places a "•" in front of the line.

FIG. 157 sets forth the flow chart for the procedure wRIGHTS_DEPT/470 which builds the list for all departments. Step 2 sets the all departments list as the current list and step 4 copies the department list to the all departments list. Step 6 then sorts the list in step 4 by division name and step 8 calls procedure wRIGHTS_DEPT/471 described below at FIG. 158.

FIG. 158 describes the procedure for wRIGHTS_DEPT/471, which checks to see if the user has access to the department requested. Step 2 sets the all departments list as the current list and step 4 finds all records in the user department access file belonging to the user. Step 6 then places a "•" in front of each line in the list matching a record found in step 4. Step 8 then redraws the lists accordingly.

FIG. 159 shows the procedure for wRIGHTS_DEPT/472 which deletes the current user department access record held in the CRB at step 2.

FIG. 160 shows a flow chart for the procedure wRIGHTS_DEPT/500 which is a window control procedure for this procedure. Step 2 determines if this window is clicked on while in the enter data mode and, if YES, step 4 causes a message such as "Cannot Switch Windows" to be displayed and step 6 causes the system to remain in the current field. If step 2 is NO, step 8 determines if the window is brought to the top. If YES, step 10 determines if the system is in the enter data mode and, if YES, step 12 performs a cancel. If step 8 or step 10 is NO, then the system at step 14 calls procedure mPROCEDURES/0 which disables all commands not allowed for this window.

FIG. 161 shows the procedure for wUSER_PREFS/0 which is the ICP for the user preference window and sets the WCP as number 500 at step 2. Step 4 then fetches the present users from the user file and step 6 determines if the flag is true. If step 6 is NO, step 8 causes a message such as "User Record Not Found" to be displayed and step 10 then clears the user file and closes this window. If step 6 is YES, step 12 locks the user record and step 14 calls procedure wUSER_PREFS/480 which sets up the weight and volume list and selects the corresponding user preference for these conversion preferences at step 16. Step 18 then determines if the User Check Mail field preference is set and, if NO, the system then continues the main event loop and, if YES, step 20 hides the check mail options.

FIG. 162 shows the procedure for wUSER_PREFS/5 which is a procedure for determining if a new weight conversion preference is to be set for the user. Step 2 determines if a click on this list has been detected while in the enter data mode. If step 2 is NO, the main event loop of FIG. 112 continues to search for detectable events. If YES, step 4 sets the weight conversion list as the current list and step 6 loads the line clicked on from that list into the CRB. Step 8 then transfers the values from the line into library variables and step 10 causes the system to redraw the windows.

FIG. 163 shows the procedure for wUSER_PREFS/6 which is the procedure to determine if a new volume conversion preference is to be set for the user. Step 2 determines if a click on this list is detected while in the enter data mode. If step 2 is NO, the main event loop continues. If YES, step 4 sets the volume conversion list as the current list and step 6 loads the line clicked on from that list. Step 8 then transfers the values from the list into library variables and step 10 redraws the windows.

FIG. 164 sets forth a procedure for wUSER_PREFS/480 which builds two lists for the weight conversion list and the volume conversion list. Step 2 sets the volume conversion list as the current list and step 4 builds that list from the conversions file of all volume conversion types. Step 6 then sets the weight conversion list as the current list and step 8 builds the list from the conversion files of all weight conversion types.

FIG. 165 sets forth the procedure for wUSER_PREFS/481 that searches the weight and volume conversion lists for the user preference. Step 2 sets the weight conversion list as the current list and step 4 searches that list for the user default selection for weight conversion. Step 6 then checks the flag to see if it is true and, if YES, step 8 selects the identified list line and redraws the list. After step 8 or if step 6 is NO, step 10 sets the volume conversion list as the current list. Step 12 then searches the list for the user's default selection for volume conversion and step 14 checks the flag to see if it is true. If the flag is true, step 16 selects the identified list line and redraws the list. If the flag in step 14 is not true, the system continues the main event loop.

FIG. 166 shows the procedure for wUSER_PREFS/500 which is the window control procedure for the user preference window. Step 2 checks to see if a click on this window was made while in the enter data mode and, if YES, step 4 causes the system to display a message such as "Cannot Switch Windows" and step 6 causes the system to remain in the current field. Steps 2, 4, and 6 are a common procedure taken in many of the procedures outlined in this specification and they act to prevent the user from clicking on another window while in the enter data mode. If step 2 is NO, step 8 determines if the window is being brought to the top and, if YES, step 10 determines if the system is in the enter data mode. If 10 is YES, step 12 cancels the enter data mode and, if NO, step 14 calls procedure mPROCEDURES/0 which disables all the commands not allowed for this window. If step 8 is NO, step 16 determines if the OK button was clicked and, if YES, step 18 unlocks and updates the user file record. Step 20 then closes the user preference window. If 16 is NO, step 22 determines if a cancel button has been clicked. If YES, step 24 unlocks the user file record and step 26 closes the user preference window. If step 22 is NO, the main event loop continues.

FIG. 167 shows the procedure for wRIGHTS_FUNC/0 which is the ICP for the function rights window. This ICP sets the WCP as number 500 at step 2. Step 4 then clears the format variables when the window is closed.

FIG. 168 shows the procedure for wRIGHTS_FUNC/1 which creates a menu list that holds all the menus for the system to which the administrator can assign access. Step 2 determines if the menu list option has been clicked on and, if NO, the main event loop continues and, if YES, step 4 sets the menu list as the current list. Step 6 then sets the first selected line as the one clicked on and step 8 loads the selected line from the list into CRB. Step 10 then determines if the line from step 8 starts with a "•". If step 10 is NO, step 12 removes the corresponding record from the user function access and, if step 10 is YES, step 14 inserts the line into the user function access file. After step 12 or 14, step 16 determines if more lines have been selected from the list and, if NO, step 18 redraws the list. If step 16 is YES, then step 20 sets the current line as the next selected line.

FIGS. 169 and 171 use identical logic to that described above at FIG. 168. The only difference is that the procedure creates a different window. FIG. 169 details the flow chart for the menu functions list and FIG. 171 details the flow chart for the window function list.

FIG. 170 shows a procedure for wRIGHTS_FUNC/3, which creates the window list that holds all the windows to which the administrator can assign access to a particular user. Step 2 determines if a click on the window list option has been detected and, if NO, continues the main event loop and, if YES, step 4 sets the window list as the current list. Step 6 then loads the line clicked on from the list into CRB and step 8 calls procedure wRIGHTS_FUNC/481 described below in detail at FIG. 180.

FIG. 172 shows a procedure for wRIGHTS_FUNC/10 which uses the database's notation to build a list of all menu and window formats for the system. Step 2 sets the menu list as the current list and step 4 uses the database notation to build the list of all window formats. Step 6 then uses the database notation to add to this list all the menus formats.

FIG. 173 discloses the flow chart for procedure wRIGHTS_FUNC/470 that removes embedded titles in the menu. In order for a menu to have the ability to be assigned access, it must have an embedded title. The embedded title is placed in the menu description field of a menu and is surrounded by braces. This procedure searches through a list of all menus for embedded titles and removes all lines that do not have one. If a menu does have an embedded title, then that title that is between the braces is added to the list. Step 2 sets the menu list as the current list and step 4 sets the line as 1. Step 6 then loads the current line from the list and step 8 determines if the flag is true. If the flag is not true, step 10 deletes all lines from the list that have blank titles. If step 8 is YES, step 12 determines if there is an open brace anywhere in the menu name and, if NO, then step 14 replaces the line in the list with the updated data. If 12 is YES, step 16 adds the menu name to the list as whatever was between the braces. Step 18 then increments the line by 1 and loops back to step 6.

FIG. 174 sets forth the procedure for wRIGHTS_FUNC/471 which builds the menu procedure list. Step 2 sets the menu functions list as the current list and step 4 clears the current list. Step 6 then builds the list of all procedures for the menu stored in the format variable menu name.

FIG. 175 discloses the procedure for wRIGHTS_FUNC/472 which sets forth the format menu procedure list. This procedure causes the system to display only those procedures that a user can see on an installed menu. Step 2 sets the menu functions list as the current list and step 4 deletes all but the first 22 lines in the list. Step 6 then loads the line from the list and step 8 determines if the menu description is empty and, if YES, step 10 replaces the line in the list with a description of a series of dashed lines. If 8 is YES, step 12 replaces the line in the list with a "•" in front of the description and step 14 then deselects all list lines.

FIG. 176 is a flow chart for the procedure wRIGHTS_FUNC/475 which builds a list of all menu formats in the present system. Step 2 sets the menu list as the current list and step 4 uses the database notation to build a list of all menus. Step 6 then calls procedure wRIGHTS_FUNC/470 and replaces each line in the menu list with the embedded title if there is one present as described above at FIG. 173.

FIG. 177 is a procedure for wRIGHTS_FUNC/476 which is a procedure to create a list of menus that the user has access to. Step 2 sets the menu functions list as the current list and step 4 retrieves all records in the user access function file that belongs to this particular user. Step 6 then searches the list and removes the "•" from in front of each line in the list.

FIG. 178 is the procedure for wRIGHTS_FUNC/477 which holds a record for each function the user does not have access to and in order to grant access to the user for this particular function the record needs to be deleted from this file. It is done in step 2.

FIG. 179 sets forth the flow chart for the procedure wRIGHTS_FUNC/480 which removes embedded titles from the windows list. Step 2 then sets the windows list as the current list and step 4 loads the first line from the list into CRB. Step 6 then checks to see if the flag is true and, if not, step 8 deletes all blank lines from the list. If in step 6 the flag is true, step 10 determines if the window description contains a brace. If step 10 is NO, step 12 replaces the line from step 4 in the list as empty. If step 10 is YES, step 14 replaces the line in the list with whatever title was between the braces and step 16 if another line is present loads the next line into CRB and loops back to step 6.

FIG. 180 shows a flowchart for the procedure wRIGHTS_FUNC/481 which is the build the windows procedure list for all procedures contained within the format variable window name. Step 2 sets the windows function list as the current list and step 4 clears the current list. Step 6 then builds a list of all procedures for the menu contained within the format variable window name.

FIG. 181 discloses the flowchart for the wRIGHTS_FUNC/482 procedure which searches the window functions list for embedded titles.

Step 2 sets the window functions list as the current list and step 4 selects all lines on the list that have a brace in the format variable window function description field. Step 6 then selects the first line from the list and step 8 replaces the line in the list with what was between the braces. Step 10 then determines if there is another line selected and, if YES, the procedure loops back to step 6. If step 10 is NO, step 12 deletes all nonselected lines in the list and step 14 deselects all lines in the list.

FIG. 182 shows the flowchart for the procedure wRIGHTS_FUNC/485 which builds the window list from all window formats within the system.

Step 2 sets the window list as the current list and step 4 uses the notation of the database to make a list of all the windows in the system. Step 6 then calls procedure wRIGHTS_FUNC/480 described above at FIG. 179 to remove embedded titles within the windows and step 8 redraws the windows.

FIG. 183 sets forth the flowchart for the procedure wRIGHTS_FUNC/486 which checks the accessible window functions that a user is allowed access to. Step 2 sets the window functions list as the current list and step 4 selects all user function access files for this particular user. Step 6 then checks each record line in the list for a "•" and removes the "•". Step 8 then redraws the list.

FIG. 184 sets forth the flowchart for the procedure wRIGHTS_FUNC/500 which is the WCP for the rights function window. Step 2 determines whether a click on this window was detected while in the enter data mode and, if YES, step 4 causes a message to be displayed such as "Cannot Switch Windows" and step 6 causes the system to remain in the current field. Step 8 then determines if the window is being brought to the top and, if NO, the system continues the main event loop and, if YES, step 10 determines if the system is in the enter data mode and, if YES, step 12 performs a cancel. If step 10 is NO, step 14 calls procedure mPROCEDURES/0 that disables all the commands which will not be allowed for this window. Step 16 then builds the menu list by calling procedure wRIGHTS_FUNC/475 described at FIG. 176 above. Step 18 then calls procedure wRIGHTS_FUNC/485 which builds the window list and is described above at FIG. 182.

FIG. 185 sets forth the flowchart for the procedure wADMINISTRATOR/0 which is the ICP for the administrator window. This administrator setup window is the only place within the system that uses the native database language instead of SQL. The only file within this window that uses the native database language instead of SQL is the SQL administrator file. The reason for this is that the setup record needs to be read in before any connection can be made to any host. The procedure of FIG. 185 finds a first and only record in the SQL administrator file and puts it into the CRB where the record is then ready to be edited by the administrator.

Step 2 sets the WCP procedure as wADMINISTRATOR/500 and Step 4 begins a reversible block. Step 6 then disables the administrator menu and step 8 disables the main menu. Step 10 then sets the set up field as a current data file and sets SQL Administrator File as the main file. Step 14 then finds the first FSQL_ADMINISTRATOR record and step 16 determines if the flag is true. If step 16 is true, step 18 redraws the windows, but if step 16 is NO, step 20 causes the message to be displayed such as "Your Administrator File Is Absent Or Has Been Corrupted" and the system continues the main event loop.

FIG. 186 sets forth the flow charts for the wADMINISTRATOR/443 procedure which edits the SQL Administrator File. To do this, the native database language needs to be used. Step 2 prepares the system for editing the administrator record file. Step 4 then places the system in the enter data mode which allows keyboard input and at step 6, the system determines if an OK or a cancel click is detected. If a click on the OK button is detected, step 8 updates the files accordingly. Step 6 is NO, that is a cancel is detected. Step 10 finds the first blank on the SQL_ID field and step 12 redraws the windows.

FIG. 187 sets forth the flow chart for the procedure wADMINISTRATOR/500 which is the WCP for the administrator window. Step 2 detects if there is a click on administrator window while in the enterdata mode and, if YES, step 4 causes a message such as "Cannot Switch Windows" to be displayed and step 6 causes the system to remain in the current field. If step 2 is NO, step 8 determines if the windows attempted to be brought to the top, if YES, step 10 determines if the system is in the enterdata mode. If step 10 is YES, step 12 performs a cancel. step 10 is NO, or after step 12, step 14 calls for procedure mPROCEDURES/0 which disables all commands not allowed for this window.

After step 14, or if step 8 is NO, step 16 determines if a click on the close button has been detected and, if YES, step 18 calls procedure mPROCEDURES/0 which disables all the commands for this window. If a close is not detected in step 16, the system continues the main event loop. FIG. 188 sets forth the procedure for wPRESENT_USERS/0 ICP which sets the WCP as number 500 for this procedure at step 2.

FIG. 189 sets forth flow chart for the procedure wPRESENT_USERS/2 which is the procedure for logging a user off the system. After a click on the logoff button is detected at step 2, step 4 checks to see if no line is selected and, if YES, step 6 causes a message such as "No User Selected" to be displayed. The system then continues the main event loop. If step 4 is NO, step 8 loads the line clicked on from the list into the CRB. Step 10 then selects a corresponding user record from the list of current users and step 12 determines if the user is trying to logoff. If step 12 is YES, step 14 causes a message such as "Do You Really Want To Logoff, System Will Shut Down" to be displayed. Step 16 then determines the response of the user to step 14 and, if step 16 is NO, the system exists from the procedure. Step 12 is NO, or step 16 is YES, step 18 updates the user file record for the particular user to show that the user has logged off. Step 20 then deletes this particular user line from the list in CRB and step 22 determines if the user is logging himself off. Step 22 is NO, step 24 makes an entry in the user trace log such as "Logoff, Manual By Administrator." If step 22 is YES, step 26 calls procedure mPROCEDURES/5 which is the logoff and quit procedure detailed hereafter at FIG. 196.

FIG. 190 sets forth a flow chart for procedure wPRESENT_USERS/470 which builds a list of all user records that are presently logged on to the system. Step 2 sets the logged on users list as a current list, step 4 builds a list of all records from the user file that are logged on at the present time and step 6 redraws the list.

FIG. 191 sets forth the wPRESENT_USERS/500 procedure which is the WCP for the present user window. Step 2 determines if this window was clicked on in the enterdata mode and, if so, step 4 displays a message such as "Cannot Switch Windows" and step 6 causes the system to remain on the current field. If step 2 is NO, step 8 determines if the window is brought to the top. If NO, then the system continues the main event loop. If YES, step 10 determines if the system is in the enterdata mode. If step 10 is YES, step 12 cancels the enter data mode and the system exists from this procedure. If step 10 is NO, the system continues the main event loop.

FIG. 192 shows flow chart for the mPROCEDURES/0 procedure that is called when most windows are open to disable certain commands within the commands menu or any commands palette so that only those commands relevant to the window being brought up are enabled. In step 2 the procedure receives parameters placed in variables named A through H. Step 4 then determines if any parameters have been set in place in the variables of step 2. If step 4 is NO, step 6 enables each menu line to the commands menu and step 8 enables each button on the current palette. Next, step 10 calls procedure mPROCEDURES/2 which checks individual window procedures for access and then the system exists from the procedure. If parameters are sent up for the rest of the procedure determines which parameters were sent.??? The parameters are going to be one of F, I, E, D, P, N, C, or O. Each of these stand for Find, Insert, Edit, Delete, Previous, Next, Cancel and Okay, respectively. Any of the parameters received in step 2 are equal to one of these values then the corresponding command is disabled on the commands menu and palettes. Conversely, if a value is not present in step 2 the corresponding command is enabled. If it is determined in step 4 that parameters were sent, step 12 determines if the parameter was equal to F. If YES, steps 14 and 16 disable the Find command and it is enabled in the menu and the button on the current palette is also disabled. If step 12 is NO, steps 18 and 20 enable the Find command in the command menu and on the button of the current palette. The same logical steps then are taken for each of the remaining factors to determine which parameters are enabled and which are to be disabled for the particular window. Step 22, after all the parameters have been checked calls the procedure mPROCEDURES/2 to check the individual window procedures for access.

FIG. 193 discloses a flow chart for procedure mPROCEDURES/1 which checks for disables commands and sets up the parameters required to call the procedure outlined above at FIG. 192 to disable commands on the menu and palettes. Step 2 sets up local variables A through H. Step 4 determines if the Find menu command is to be enabled and, if NO, step 6 sets local variable A as F. After step 6 or if step 4 is YES, step 8 determines if the insert menu command is to be enabled and, if NO, step 10 sets local variable B as I. The process then chains through each possible menu command in a similar manner and then after all parameters have been set, step 12 calls the procedure described at FIG. 192.

FIG. 194 shows the flow chart for mPROCEDURES/3 procedure which checks for window commands if the administrator has disabled any procedure numbers that equal 444–447 on every window for the particular user. Step 2 builds a list of all procedures that the present user does not have access to and step 4 retrieves the first row in this list. Step 6 then determines if the flag is true and, if NO, the system continues the main event loop. If YES, step 8 determines if the procedure number is equal to 441 and, if YES, steps 10 and 12 disable the Find menu command and the Find button on the current palette. The remaining steps in the flow chart perform the same analysis and determine if the procedure to be disabled is any of those that appear on every window. If none of the procedures are equal to this number of after the particular row fetched has been determined to be one of the procedures, step 14 fetches the next row and loops back to step 6.

FIG. 195 shows the flow chart for procedure mPROCEDURES/4 which inserts a log entry into the trace log of the ID sent as a parameter, normally the current user. The three parameters that are accepted are LOG_INFO, USER, and BYPASS. Step 2 receives the parameters and places them in the corresponding data field. Step 4 then determines if the user trace is on or BYPASS is true and, if so, step 6 inserts the trace record into the user's trace log. If step 4 is NO, the system continues the main vent loop.

FIG. 196 shows the procedure mPROCEDURES/5 which is the logoff and quit procedure accessible through the file menu and it is the normal way in which to quit a system session. Step 2 determines if the system is in the enter data mode and, if YES, step 4 displays a message such as "Are You Sure You Want To Quit While Entering Data?". Step 6 then determines the answer to the displayed message and, if the flag is not true, the system continues the main event loop. If step 2 is NO, or step 6 is YES, step 8 calls procedures mPROCEDURES/4 and wLOGON/472 to update the user record. Procedures of step 8 are explained in detail above at FIGS. 195 and 116, respectively. Step 10 then calls procedure STARTUP/483 which makes an entry into the user's trace log. Step 12 then logs off from the host and step 14 disconnects the current channel.

FIG. 197 discloses procedure mPROCEDURES/8 which is used to lock a record so the user can update the record without worrying about a deadly embrace. This procedure must have at least three parameters: Table, Key, and Lock and will accept a fourth, Skip Logic. Step 2 determines if at least the three necessary parameters have been sent and, if so, step 4 loads the record into the CRB. If NO, the system continues the main event loop. Step 6 then determines if the flag is true and if the user does not own a lock. This is because only the user that locked the record can, at this point, update the record. If step 6 is NO, step 8 determines if the flag is true and if a user does own a lock. If step 8 is YES, step 10 sets the quit procedure flag for the logoff and quit procedure of FIG. 196. If step 8 is NO, step 12 clears the quit procedure flag. If step 6 is YES, step 14 asks if anybody owns a lock and, if NO, step 16 updates the record with lock equals the present user's ID. Step 18 then sets the quit procedure flag. If step 14 is YES, step 20 determines if the skip logic parameter was received. If step 20 is YES, step 22 determines if there have been fewer than three tries and, if YES, step 24 sets the tries as tries +1. If step 22 is NO, step 26 clears the quit procedure flag. If step 20 is NO, step 28 display the message asking the user what to do and the system gives the users three choices of: Try Again, Cancel, and Lock Anyway. Step 30 then determines what the user's choice is. If the user chooses to try again, step 32 determines if the skip logic parameter has been received. If YES, the program returns to step 4. If NO, the system continues the main event loop. If at step 30 the user chooses lock anyway the procedure goes to steps 16 and 18. If at step 30 the user chooses cancel, then step 34 clears the flag and quits the procedure.

FIG. 198 sets forth a procedure mPROCEDURES/9 that unlocks and updates a record previously locked. In step 2 the record lock is reloaded into the CRB. Step 4 then determines if the lock still belongs to the user and, if NO, step 6 displays a message such as "Record Was Locked While Updating" to be displayed and step 8 clears the quit procedure flag. If it's step 4, the lock does belong to the user, step 10 updates the record in the CRB and step 12 unlocks the record. Step 14 then sets the flag and quits the procedure.

FIG. 199 discloses the procedure mPROCEDURES/10 which unlocks a record that has previously been locked. Step 2 loads the record lock into the CRB. Step 4 then determines if the lock belongs to the user if YES, step 6 unlocks the record and step 8 sets the quit procedure flag. If step 4 is NO, step 10 displays a message such as "Use Doesn't Own Lock or There is No Lock" and step 12 clears the flag and quits the procedure.

Each department preferably has the choice of whether or not to allow the system to create container ID's at the time the container is entered into the inventory of the system. If the department chooses to have computer generated IDs, then the IDs are assigned when the bottle or containers are inserted into the inventory and the label must be created at that time. However, a department may not want computer generated ID's and prefer to have a pre-printed stock of labels. If this is the case, the ID's cannot be computer generated at the time of insertion into the inventory. In order to keep all numbers unique, ID's are issued in blocks at the request of the user. Preferably, each department is allowed to have two current blocks of ID's.

Referring to FIG. 200, all containers inserted in a department under a user generated ID option must fall within the range of ID's in one of the two blocks of ID's. If the computer generated ID is checked, the system automatically assigns an ID within the range of the two blocks of ID's and does not allow keyboard entry into the ID field in this mode. When a user requests the system for container ID's, step 2 displays a message such as "How Many ID's Do You Want?" and then places this number into the CRB. Step 4 then checks to see if the flag is true and, if NO, the system exists from this procedure. If step 4 is YES, step 6 retrieves the next container ID from the next ID's file for the current division and step 8 checks this flag. If in step 8 the flag is not true, step 10 inserts FNEXT_ID record. Step 12 then calculates the Lo Range and the Hi Range. If the flag is true at 8, step 14 then locks the next ID file record and increments that number by 1 and then unlocks the file. Step 16 then determines if the flag is true and, if NO, step 18 displays a message such as "Error When Generating Unique ID" and then quits the procedure. If the flag is true at step 16, step 20 sets the low range of ID as equal to the ID fetch from the next ID's file in the high range as a low range +1. Step 22 then displays a message showing a range of ID's that the user requested and step 24 calls procedure mPROCEDURES/480 as described below at FIG. 218.

FIG. 201 sets forth a procedure mPROCEDURE/13 which retrieves the next sequential ID from the table passed as a parameter. There are two parameters accepted, namely TABLE and KEY and these must be sent. Step 2 determines if these two parameters were sent and, if not, step 4 displays a message such as "You Must Call This Procedure With Two Parameters" and then quits the procedure. If at step 2 the parameters have been sent, step 6 retrieves the largest ID already used for the given table and step 8 determines if the flag is true. If 8 is NO, step 10 calculates the new ID as one and, if 8 is YES, step 12 calculates the new ID as the largest ID plus 1. It is noted that this procedure should only be used in cases where there is no chance of another person inserting a record at the same time. This procedure would be used where only the system administrator has access to the files requiring an ID.

FIG. 202 discloses the procedure mPROCEDURES/14 that searches the table given and finds the first sequentially unused ID number and returns that value. Again, the parameters accepted are TABLE and KEY and they must be sent or the procedure is aborted. Step 2 determines if the procedures have been sent and, if not, step 4 displays a message such as "You Must Call This Procedure With Two Parameters" and then quits the procedure. If the parameters have been set at step 2, step 6 selects all ID's from a given table. Step 8 then sets the percent count as one and step 10 fetches the first row containing the first ID. step 12 then determines if the ID fetch is less than or equal to the count set and, if YES, step 14 increments the count by one and loops back to step 10. If step 12 is NO, step 16 holds the next unused ID in the % count field and returns this value to the calling procedure.

FIG. 203 sets forth procedure mPROCEDURES/15 which uses the next IDs filed to find the next unique ID for a given file. Step 2 determines if at least the table parameter was sent and, if not, step 4 displays a message such as "You Must Call This Procedure With At Least One Parameter" and then quits the procedure. If the table procedure is received to step 2, step 6 determines if a second procedure division has been received. If 6 is YES, step 8 finds a matching record in the next ID file for the given table and division. If 6 is NO, step 10 finds the matching record in the next IDs filed for the given table. After step 10 or step 8, the appropriate row is fetched and step 14 checks to see if the flag is true. If 14 is NO, step 16 inserts the record into the next ID's file in the next unique ID field as 2 since the value of 1 will be returned for the unique ID at step 18. If step 14 is YES, step 20 locks the record, increments the ID by 1, and updates the record and unlocks it. Step 22 then determines if the flag is true, and, if NO, step 24 displays a message such as "Error When Generating Unique ID" and quits the procedure. If the flag is true at step 22, step 26 sets the return value for the ID as the NEXT_UNIQUE_ID field that was fetched and returns this value to the calling procedure.

FIG. 204 sets forth the procedure mPROCEDURES/17 which is the most widely used procedure within the system. This procedure checks to make sure every SQL command being sent to the host executes properly, and if it does not, then an error is reported and the channel is rolled back. If Sys(131) equals zero, then there is no error and step 2 determines this. If step 2 is YES, step 4 commits the current channel to the procedure and sets the quit procedure flag. If step 2 is not, step 4 displays a message such as "SQL Statement Error" and step 6 rolls the current channel back and then quits all procedures.

FIG. 205 sets forth procedure mPROCEDURES/19 which is a generic build list procedure to build a list of all records in the table sent as the TABLE parameter. Step 2 selects all records for a given table using an SQL command and step 4 builds a list from the selected table. Step 6 then determines if the flag is true and, if NO, step 8 displays a message such as "Build List Error" and sets the flag and quits the procedure. If the flag is true at step 6, the system continues the main event loop.

FIG. 206 sets forth a procedure mPROCEDURES/20 which enables a line to be selected in the list. This procedure searches a list for a line where the field held in the parameter FIELD is equal to the value held in the field VALUE. Step 2 searches the list from the beginning for field equal value, and step 4 determines if the flag is true and, if not, the quit procedure flag is set as false. If step 4 is YES, step 6 selects the line from the list and redraws the list and then quits the procedure setting the flag as true.

FIG. 207 sets forth procedure mPROCEDURES/21 which takes a list in the list field and selects the first line and redraws the list. Step 2 sets the current list as list in a reversible block so the current list is restored. Step 4 determines if there is a line selected and, if YES, step 6 selects this line and redraws the list and, if NO, the system continues the main event loop.

FIG. 208 sets forth the procedure mPROCEDURES/22 which is used throughout the system to get a value from a list without loading the whole line into the CRB. Four parameters must be sent or an error will result. The four parameters are: List, Lookup Field, Lookup Value, and Return Field. Step 2 determines if the four parameters have been sent and, if NO, step 4 displays a message such as "You Must Call This Procedure With Four Parameters" and quits the procedure and the flag is set as false. If step 2 is YES, step 6 stores the selection state of the list so that it may be restored once the procedure terminates. Step 8 then sets the temporary line (% TEMP_HASH_L) as the current line. Step 10 then searches the list from the beginning and step 12 determines if the flag is true. If step 12 is NO, step 14 restores the list status by loading the % TEMP_HASH_L line from the list. If step 12 is YES, step 16 returns the value of the field in the return field as the return value and step 18 restores the list status by loading the % TEMP_HASH_L.

FIG. 209 sets forth the procedure mPROCEDURES/28 which assigns the system icons to the library variables. All icons used within the system are stored on a window. The icon window acts as a data file for these icons and is accessible through the database notations. Step 2 determines if colors are available in the display and, if YES, step 4 transfers the color icons to the library variables. If step 2 is NO, step 6 transfers black and white icons to the library variables. After steps 4 or 6, step 8 transfers the info, request, warning, and danger dialogue icons to the library variables and then the system continues the main event loop.

FIG. 210 discloses procedure mPROCEDURES/30 which converts the weight into units of grams. This procedure accepts one parameter, VALUE, which is a numerical value for weight at step 2. Step 4 then returns a value wherein the value has been converted into grams by using the procedure weight conversion factor.

FIG. 210 discloses procedure mPROCEDURES/31 which converts the volume into units of milliliters. This procedure accepts one parameter, VALUE, which is a numerical value for volume at step 2. Step 4 then returns a value wherein the value has been converted into milliliters by using the procedure volume conversion factor.

FIG. 212 sets forth procedure mPROCEDURES/50 which disables all menu lines needed to be disabled at the initial startup. Step 2 selects all records in the user function access file for this particular user and step 4 selects the first row of the selected records. Step 6 then determines if the flag is true and, if YES, step 8 determines if the function of the row from step 4 is a menu line. If step 8 is YES, step 10 disables the menu line. After step 10 the procedure moves back to step 4 where it fetches the next row. If the flag is not true in step 6, the system continues the main event loop.

FIG. 213 discloses the procedure mPROCEDURE/51 which is called before every menu command is executed to check if the user has access to the menu line. Step 2 selects the record in the user function access file for the current user in the procedure name. Step 4 then touches the first row of the selected record and step 6 checks if the flag is true. If the flag is true at step 6, step 8 causes a message such as "You Do Not Have Access To This Procedure" to be displayed and then quits all procedures. If step 6 is NO, the system continues the main event loop.

FIG. 214 discloses a procedure mPROCEDURE/52 which is the same procedure described above as FIG. 213 except that a bell is sounded rather than a message being displayed.

FIG. 215 describes procedure mPROCEDURE/60 which is used by the system to send electronic mail to other users. Step 2 calls procedure mPROCEDURE/15 described above at FIG. 203 to request a new ID for the mail file to be sent. Step 4 then sets all the mail fields including the text parameter to enable the message to be sent. Step 6 inserts the record into the mail file and step 8 clears the mail file.

FIG. 216 sets forth the procedure mPROCEDURE/61. This procedure checks the mail file for any electronic mail messages that are unread belonging to the current user. If the user is in the enter data mode this procedure is bypassed, as shown in step 2. If the user is not in the enter data mode step 4 selects all unread letters that are directed to the current user. Step 6 then fetches any of these records from the mail file. The user then needs to be notified of any unread messages and the system preferably provides at least two ways in which to do this. Step 8 determines if the user is to be notified by audible beeps and, if YES, step 10 sounds a bell, for example, three times. If step 8 is NO, step 12 causes a message such as "You Have New E-Mail" and gives the user the choice of read mail or cancel. Step 14 then determines if the user wants to read mail and, if so, step 16 opens the window for W Read mail described above at FIG. 142. If step 14 is NO, system continues the main event loop.

FIG. 217 sets forth the procedure mPROCEDURE/62 that informs the sender of a message that the recipient has read the message. This procedure sends a read mail receipt to the user whose ID is held in the "To Who" field. Step 2 calls procedure mPROCEDURE/15 described at FIG. 203 to obtain a new ID for the mail file. Step 4 then calculates all mail file fields and step 6 inserts into the mail file the record of the acknowledgement and step 8 clears the mail file.

FIG. 218 sets forth the procedure mPROCEDURE/480 after a block of ID's is requested by a user. This procedure updates the department records to reflect a new range of container ID's allowed. Each department can have two ID blocks and if two are present, then the oldest block is replaced by the newest requested block. Two parameters are accepted here, low and high, and are the new range of ID's to be inserted into the range fields of the department's file. Step 2 receives the parameters which are placed into the low and high fields. Step 4 then selects two current ranges for the corresponding department and step 6 fetches the row containing these values. Step 8 then determines if the flag for a row fetch is true and, if not, step 10 updates the department file and replaces range 2 with the values in the low and high fields. If step 8 is YES, step 12 determines if the first set is older and, if YES, step 14 updates the department file and replaces range 1 with the values in the low and high fields. If step 12 is NO, the procedure moves to step 10 after which the system continues the main event loop.

FIG. 219 sets forth the flow chart for the mADMINISTRATOR which is the administrator menu. This menu is straightforward and basically its command opens up a corresponding window all of which have been described above in detail. Procedure 2 is a setup procedure and when this is chosen it opens the administrator window at 4. Procedure 6 is the SQL tools procedure and when chosen opens up the data dictionary window at 8. Procedure 10 is the user's procedure which opens up the user's window at 12. Procedure 14 is the divisions procedure which opens up the divisions window at 16. Procedure 18 is the departments procedure and it opens up the department window at 20. Finally, procedure 22 is the logged on user's procedure which opens the present user's window at 24 and then calls procedure wPRESENT_USER/4 at 26 to build a list of logged on users.

FIG. 220 sets forth the procedures STARTUP/0 which is the ICP that is first run when the system is started up. At step 2 the standard file menu is replaced with the custom file menu. Step 4 then calls procedure mPROCEDURES 28 described above at FIG. 209. Step 6 then opens up the setup data file and step 8 checks to see if the flag is true. If NO, step 10 causes a message such as "Couldn't Find Setup DF1, Be Sure File Is In System Folder" to be displayed and the procedure is then quit. If step 8 is YES, step 12 finds the first record in the SQL_ADMINISTRATOR file and step 14 checks if the flag is true. If NO, step 16 causes a message to be displayed such as "No Administrator Record Present" and the application is then ended. If step 14 is YES, step 18 transfers the values from the CRB to library variables. Step 20 then determines if Omnis SQL is being used and, if YES, step 22 opens an individual data file. If step 20 is NO, step 24 opens the wLOGON window. After step 22, step 26 determines if the flag is true and, if NO, step 28 displays a message such as "Couldn't Find INV DF1" and quits the application. If step 26 is YES, step 30 starts Omnis SQL connection.

FIG. 221 sets forth the procedure STARTUP/490 which is the library control procedure for the system and its purpose is to determine the amount of time that has elapsed since the last user generated action. The user is allowed to override the autologoff feature by setting the idle time to 0 minutes. Step 2 checks for this and bypasses the procedure if the minutes allowed idle is zero. All actions within the system with the exception of one procedure, the time procedure, will cause the timer to be reset. Reset here means that the time of the last action is stored in a variable LAST_ACTION_TIME. This variable can then be used by the timer control procedure to check against the current time to see how long the system has been idle.

FIG. 222 is the procedure STARTUP/491 which is the timer control procedure for the system and its purpose is to check if the system has been idle for longer than the preset time allowed. If the present time has expired, the system automatically logs the user off. This procedure also checks for new E-Mail for the user if that preference has been so chosen by the user. Step 2 determines if the minutes since the last event are greater than or equal to the values set in the minutes idle field. If step 2 is NO, step 4 determines if the user check mail flag has been set and, if YES, step 6 calls procedure mPROCEDURES/61 described above at FIG. 216. If step 4 is NO, the system continues the main event loop. If step 2 is YES, step 8 causes a bell to be sounded and a one-minute timer to be started. Step 10 then causes a message to be displayed such as "System Will Auto Logoff In One Minute". Step 12 then determines if the one minute has elapsed and, if NO, step 14 checks if the cancel button has been clicked and, if NO, loops back to step 12. If step 14 is YES, step 16 determines if the system is in the enter data mode and, if NO, the procedure is quit at step 18. If step 16 is YES, step 20 causes the procedure to stop and puts the user back into enter data mode. If step 12 is YES, step 22 calls procedure mPROCEDURE/5 described above at FIG. 196.

CHEMICAL MANAGEMENT SUBSYSTEM

The following are all flow charts relating to the chemical management subsystem and are described in detail.

FIG. 223 is a procedure for mPROCEDURE/70 which is the ICP to set up a new transaction file record and to prepare the file for receiving data. In step 2 the procedure calls mPROCEDURE/15 described above at FIG. 203 to obtain a unique ID. Step 4 then transfers all pertinent fields in the cont field to the corresponding fields in the new transaction file record at step 2.

FIG. 224 is a procedure for mPROCEDURES/71 which inserts a record into the fTRANSACTION file. At step 2 the values from the CRB are used to insert a record into the fTRANSACTION file. Step 4 then calls procedure mPROCEDURES/17 described above at FIG. 204 to check if the insertion into the record has been made properly.

FIG. 225 discloses procedure mPROCEDURE/72 which is the initial transaction procedure and is the first record that the system will have on a particular container. This record is inserted into the system as soon as a container is placed into inventory. Step 2 receives the initial amount of material in milliliters and in grams as well as a parent ID if the container is a secondary container. Step 4 then calls procedure mPROCEDURE/70 described above at FIG. 223. Step 6 then sets the transaction type to zero. The transaction type is an integer field which holds a different number for each type of transaction and in this example the transaction type is zero to indicate an initial transaction. Step 8 then determines the transaction volume as milliliters and step 10 sets the transaction volume of weight in grams. Step 12 then sets the transaction parent container i.d. as the parent if this is proper. Step 24 then sets all other transaction file fields not already set as empty. Step 16 then calls procedure mPROCEDURE/71 described at FIG. 224 above to insert the record called.

FIG. 226 disclosed procedure mPROCEDURE/73 which is a department transfer transaction that is inserted into the system when a container is transferred to a different department. Step 2 then calls procedure mPROCEDURE/70 which sets up the transaction fields and is described at FIG. 223. Step 4 then sets the transaction type as 1 and step 6 calculates all other transaction file fields not already used as empty. Step 8 then calls procedure mPROCEDURE/71 described at FIG. 224.

FIG. 227 discloses procedure mPROCEDURE/74 which is a location transfer transaction. Step 2 calls the procedures described at FIG. 223 and step 4 sets the transaction type as 2. Step 6 then calculates all other transaction file fields not already set as empty. Step 8 then calls the procedure set forth in FIG. 224.

FIG. 228 discloses procedure mPROCEDURE/75 which discloses a transfer to an existing container transaction and is used when a portion of one container already within the system is transferred to another existing container. Step 2 receives the amount of substance in milliliters and grams and the parent container if applicable. Step 4 then calls Procedure mPROCEDURE/70 described at FIG. 223 to set up the transaction fields. Step 6 then sets the transaction type as 3. Step 8 sets the total transaction volume as an amount in milliliters and step 10 sets the total transaction weight as an amount in grams. Step 12 sets the parent container ID. Step 14 then sets all other transaction file fields not already set as empty. Step 16 then calls the procedure described at FIG. 224.

FIG. 229 sets forth procedure mPROCEDURE/76 which sets forth a transfer from an existing container in the system to a new container. Step 2 receives the amount to be transferred in milliliters and grams as well as the parent container ID, if applicable. Step 4 then calls procedures described at FIG. 223 and step 6 sets the transaction type as 4. Step 8 then calculates the total transaction volume as an amount in milliliters and step 10 sets the total transaction weight as an amount in grams. Step 12 then sets the parent container ID. Step 14 calculates all other transaction file fields not already set as empty. Step 16 then calls the procedure described at FIG. 224.

FIG. 230 sets forth procedure mPROCEDURE/77 which is performed when a container is added to the system. Step 2 receives the amount of substance to be added in milliliters and grams as well as the parent container ID if applicable. Step 4 then calls the procedure at FIG. 223 and step 6 sets the transaction type as 7. Step 8 then calculates the total transaction volume as an amount in milliliters and step 10 sets the total transaction weight as an amount in grams. Step 12 then sets the parent container ID. Step 14 calculates all other transaction file fields not already set as empty. Step 16 calls the procedure at FIG. 224.

FIG. 231 sets forth procedure mPROCEDURE/78 which is used when a portion of the contents of the container are used. Step 2 issued the parameters for the amount of substance used in milliliters and grams. Step 4 then calls the procedure described at FIG. 223 and step 6 sets the transaction type as 5. Step 8 calculates all other transaction file fields not already set as empty. Step 10 then calls the procedure described at FIG. 224.

FIG. 232 sets forth procedure mPROCEDURE/79 which sets forth a multiconsumption transaction for use when a plurality of containers are used in a process. Step 2 receives the parameters of the amount of substance used in milliliters and grams and optionally the target container. Step 4 then calls the procedure described at FIG. 223 and step 6 sets the transaction type as 8. Step 8 then sets the multiple consumption process ID. Step 10 sets all other transaction file fields not already set as empty. Step 12 calls the procedure described at FIG. 224.

FIG. 233 sets forth Procedure mCONTACTS/1 which is a menu procedure that brings up the contacts window for the current default division. Step 2 obtains the current default division records for a particular user. Step 4 then builds a list of all contacts for the default division and step 6 loads the first contact from that list. Step 8 then opens the contacts window and sends the list built at step 4 and the default division as parameters within that window.

FIG. 234 sets forth the procedure mCONTACTS/2 which is a menu procedure that brings up the contacts window for the current default department. Step 2 retrieves the current default record for the current user. Step 4 then builds a list of all contacts for the default department and step 6 loads the first contact from the list. Step 8 then opens the contacts window and sends the list built in step 4 in the default department as parameters to be contained within that window.

FIG. 235 sets forth procedure mCONTACTS/3 which brings up the contacts window for the current user. Step 2 builds a list of all contacts for the current user and step 4 loads the first contact from the list. Step 6 then opens the contacts window and sends the list built in step 2 and the current user as parameters to be displayed in the contacts window.

FIG. 236 sets forth procedure mMEQ/1 which simply initiates the database command of prompt for port name at step 2. This allows the user to set port parameters for any port and choose one of the ports as the current port.

FIG. 237 sets forth procedure mMEQ/2 that opens the wBROWSEPRO window that allows a user to edit MEQ basic programs stored in the data file at step 2. This window mimics a simple line editor.

FIG. 238 sets forth procedure mMEQ/3 which sets up the MEQ interface that allows a user to load programs, set up parameters, upload and download data, and delete data on the MEQ. This is the only interface between the system and the MEQ bar code device. This menu command opens the MEQ window which is the interface window at step 2.

FIG. 239 sets forth procedure mMEQ/5 which loads the bar code reader with pertinent system data to enable the bar code reader to perform its inventory functions. Step 2 calls the procedure to establish communications between the system and the bar code device as disclosed in most bar code reader manuals. Step 4 then calls a procedure to establish a four-line display on the preferred MEQ bar code device. Step 6 then causes a message such as "Are The Required Files In The Data File Or In Separate Files?" to be displayed. Step 8 then determines the user's response to the query at step 6 by asking if the required files are in separate files. If step 8 is no, step 10 transmits the required files from the data file search library to the bar code device and runs the program. Step 12 transmits the basic program MYTRANS.BAS, which is stored in the datafile, to the MEQ. This procedure simply loads the program in line-by-line and sends it to the MEQ. Step 14 transmits the basic program MEQCHEM.GEN, which is also stored in the datafile, to the MEQ. Once this program has been sent, a run command is sent after it. Step 22 and 24 are similar to steps 12 and 14 except for the fact that the basic programs MYTRANS.BAS and MEQCHEM.GEN are stored in files, not in the datafile. If step 8 is YES, step 16 prompts for the path of the searchlib file. Step 18 then determines if this path is empty and, if YES, the procedure quits. If step 18 is NO, step 20 transmits the searchlib file to the bar code device and runs it.

FIG. 240 sets forth procedure wCONTACTS/0 which is the ICP for the contacts window and sets the window control procedure as number 500 at step 2. Step 4 then receives the parameters into the contact list field and the type field. Step 6 then transfers these parameters to format variables and step 8 redraws the windows accordingly.

FIG. 241 sets forth procedure wCONTACTS/470 that sets the contact type such as divisions, department, user, government agency, etc. at step 2. The contacts file preferably contains a number of "CON_OF_" fields that are used to distinguish between types of contacts. For example, division contact will have a field named "CON_OF_DIVISION" with a value of the division. All of the other CON_OF_ fields will be set as empty. This procedure takes the type of contact which is sent as a parameter when the window is open, and sets the appropriate CON_OF_field values and clears all the rest.

FIG. 242 sets forth procedure wCONTACTS/471 which rebuilds the contact list. Step 2 determines if the contact type equals the vendor. The contact type is a format variable to which the type parameter is copied when the window is opened. If step 2 is YES, step 4 calls the procedure containing the list of vendors for this particular chemical and step 6 redraws the list accordingly. If step 2 is NO, step 8 determines if the contact type is equal to division. If 8 is YES, step 10 calls the procedure containing the contacts for the particular division and step 6 redraws the list accordingly. If step 8 is NO, step 12 determines if the contact type is equal to department. If step 12 is YES, step 14 calls the procedure containing the specific department's contacts and step 6 redraws the list accordingly. If step 12 is NO, the system continues the main event loop. This is just a sample of the manner in which this procedure works and there can be many more types of contacts added to this procedure, such as government agencies, hazardous waste companies, and professional support to name a few.

FIG. 243 sets forth the procedure wCONTACTS/500 which is the window control procedure for the contacts window. Step 2 determines if a click on the contacts window is made while in the enter data mode and, if YES, step 4 displays a message such as "Cannot Switch Windows" and step 6 causes the system to remain in the current field. If step 2 is NO, step 8 determines if the window is being brought to the top and, if YES, step 10 determines if the system is in the enter data mode. If 10 is YES, step 12 performs a cancel and, if NO, the system continues the main event loop. If step 8 is NO, step 14 determines if the close button has been clicked. If YES, step 16 calls the procedure described at FIG. 242.

FIG. 244 sets forth procedure wCONSUMPTION/0 which is the ICP for the consumption window and sets the WCP as number 500 at step 2. Step 4 then calls procedure wCONSUMPTION/470 described below at FIG. 246 to build the process list. Step 6 then calls procedure wCONSUMPTION/469 to build a container list as described below at FIG. 245.

FIG. 245 sets forth procedure wCONSUMPTION/469 which builds a residual container list for the particular chemical being consumed in this procedure. Step 2 determines if the chemical is pure and, if YES, step 4 selects all container file records that belong to the current type record. If step 2 is NO, step 8 selects all container file records that belong to the current main record. After step 8 or step 4, step 10 builds a list from the selected records of steps 4 and 8.

FIG. 246 sets forth the procedure wCONSUMPTION/470 which builds a process list. Step 2 selects all process file records for the current main record and step 4 builds a process list from these selected records.

FIG. 247 sets forth procedure wCONSUMPTION/475 which subtracts the amount of used substance from the container and calls the procedure that does the actual transaction. Step 2 subtracts the amount of substance used from the container. Step 4 then calls procedure mPROCEDURES/78 which performs the consumption transaction described above at FIG. 231. Step 6 then determines if there is residual material left in the container, and, if not, the procedure quits. If 6 is YES, step 8 updates the container into which the residual material is to be placed. Step 10 then calls the procedure to perform the addition transaction for the residual container described above at FIG. 230. At step 12, to the addition transaction is added all variable-mix containers, whether from type or main records.

FIG. 248 sets forth procedure wCONSUMPTION/500 which is the window control procedure for the consumption window. If the OK button is clicked at step 2 for the consumption window, step 4 checks to make sure that the percentages in the list do not add up to more than 100%. If step 2 is NO, the system continues the main event loop. Step 6 then calls the procedure described above at FIG. 245 to perform the consumption transaction and step 8 rebuilds the container list.

FIG. 249 sets forth procedure wCONSUMPTION_MULTI/0 which is the ICP for carrying out multiple consumption processes. This procedure is used when a transaction involves multiple substances that may or may not result in by-products. Step 2 receives the multiple consumption parameter and step 4 sets the WCP as number 500. Step 6 then calls procedure wCONSUMPTION_MULTI/472 which sets up lists and is described below at FIG. 260. Step 8 then determines if the mode is the insert mode or is empty. If 8 is either one, step 10 opens the palette window for this window. If step 8 is NO, step 12 calls procedure wCONSUMPTION_MULTI/480 to obtain the multiple consumption process components as described below at FIG. 260. Step 14 then calls procedure wCONSUMPTION_MULTI/488 to build the by-product list as described below at FIG. 268.

FIG. 250 sets forth procedure wCONSUMPTION_MULTI/100 which adds a line to the component list at step 2. Step 2 also holds all the MCPCs until the done button is clicked on.

FIG. 251 sets forth procedure wCONSUMPTION_MULTI/101 which replaces the currently selected line in the multicomponent list field with the data in the CRB at step 2. Step 4 then redraws the list accordingly.

FIG. 252 sets forth procedure wCONSUMPTION_MULTI/102 that deletes the currently selected line in the multicomponent list field at step 2. Step 4 then redraws the list accordingly.

FIG. 253 sets forth procedure wCONSUMPTION_MULTI/103 which is used to add a by-product to the format variable by-product link list. Step 2 checks to see that at least one line is selected in the component list from which a by-product will be made. If step 2 is NO, step 4 causes a message such as "No Line Selected In List" to be displayed and the procedure then quits. If step 2 is YES, step 6 obtains the container file record of the container into which the by-product will be placed and step 8 checks to see if the flag is true for that container. If step 8 is NO, step 10 displays a message such as "Container Chosen To Transfer By-product To Does Not Exist Within Your Division" and then the procedure quits. If step 8 is YES, step 12 then obtains the type information for the container from the type file and step 14 checks to see if the flag is true for that type of container. If step 14 is NO, step 16 displays a message such as "Error Trying To Locate Type Record For Container" and then the procedure quits. If step 14 is YES, step 18 obtains the main information for the container from the main file and step 20 checks to see if the flag is true for this information. If step 20 is NO, step 22 displays a message such as "Error Trying To Locate Main Record For Container" and then the procedure quits. If the flag in step 20 is true, step 24 adds a line to the format variable by-product list. Step 26 then adds a line in the format variable by-product link list for each line selected in the format variable multicomponent list which provides a way of linking each component of a by-product to its parent MCP. Step 28 then redraws the windows accordingly.

FIG. 254 sets forth procedure wCONSUMPTION_MULTI/104 which simply replaces the currently selected line in the format variable by-products list with the values in the CRB at step 2. Step 4 then redraws the list accordingly.

FIG. 255 sets forth procedure wCONSUMPTION_MULTI/105 which deletes the currently selected line in the format variable by-products list if there is a line selected. Step 2 determines if the line selected equals zero, indicating no line selection. If step 2 is YES, step 4 displays a message such as "No Lines Selected In By-product List To Remove" and the procedure quits. If step 2 is NO, step 6 deletes the selected line and step 8 redraws the list accordingly.

FIG. 256 sets forth procedure wCONSUMPTION_MULTI/106 which runs when the user is done inserting by-products and components into the list. When the user clicks on the Done button, step 2 displays a message such as "Are You Sure You Are Done?" to prompt the user to verify that this procedure should proceed. Step 4 then determines the user's response to the query in step 2. If at step 4 it is determined that the user is not done, step 6 asks the user again if he is not done and, if YES, the procedure quits. If step 6 is NO, step 8 determines if a Cancel has been selected and, if NO, the system continues with the main event loop. If step 8 is YES, step 10 displays a message such as "Are You Sure You Want To Cancel This MCP?". Step 12 then determines if the flag is true for step 10, and, if not, the procedure quits. If step 12 is YES, step 14 deletes the current multiple consumption process record from the system. Step 16 then closes the multiconsumption window. Step 18 then calls procedure wMCP/470 to build the MCP list as described below at FIG. 279.

If step 4 above of FIG. 256 is YES, step 20 loads the line from format variable multicomponent list field into the CRB. Step 22 then calls procedure wCONSUMPTION_MULTI/481 that inserts the MCPC record as described at FIG. 266. Step 24 then determines if the current container ID field is empty. If step 24 is NO, step 26 calls procedure wCONSUMPTION_MULTI/482 which copies the components needed from the MCP components file to the transactions file. Step 28 then calls procedure wCONSUMPTION_MULTI/484 to update the container as detailed below at FIG. 268. Step 30 then calls procedure mPROCEDURES/79 to complete the transaction as described at FIG. 232. Step 32 then determines if the MCPC residual container ID field is empty. If step 32 is NO, step 34 updates the container record of the residual container with the new amount. After step 34, or if step 32 is YES, step 36 determines if there are more lines in the list and, if so, loops back to step 20. If step 36 is NO, step 38 at FIG. 257 loads the line from the format variable by-product link list. Step 40 then calls procedure wCONSUMPTION_MULTI/491 to insert a by-product record as described at FIG. 275. Step 42 then calls procedure wCONSUMPTION_MULTI/486 and updates the by-product container record. Step 44 then determines if there are more lines, and, if so, the procedure loops back to step 38. If step 44 is NO, step 46 loads a line from the format variable by-product link list. Step 48 then calls procedure wCONSUMPTION_MULTI/490 to insert the by-product record into the system as described at FIG. 273 below. Step 50 then determines if there are more lines, and, if YES, the procedure loops back to step 46. If step 50 is NO, the system continues the main event loop.

FIG. 258 sets forth procedure wCONSUMPTION_MULTI/470 that builds a list of all TYPE records belonging to the current main record. Step 2 selects all TYPE records belonging to the current main records and step 4 builds a format variable type list from the selected records. Step 6 then redraws the list accordingly.

FIG. 257 sets forth the procedure wCONSUMPTION_MULTI/471 which builds a container list of all containers that belong to the current main record if the chemical is not pure and of all containers that belong to the current type of record if the chemical is pure. Step 2 determines if the main record is pure and, if NO, step 4 selects all container records belonging to the current main record file. If step 2 is YES, step 6 selects all container record files belonging to the corresponding current type record file. Step 8 then builds a container list from the selected records of steps 4 or 6. Finally, step 10 redraws the list accordingly.

FIG. 260 sets forth the procedure wCONSUMPTION_MULTI/472 which creates the setup lists for the MCP and clears them all.

FIG. 261 sets forth procedure wCONSUMPTION_MULTI/474 which reconfigures the amount of the material used in the process based on the percentages given and the total amount used at step 2.

FIG. 262 sets forth the procedure wCONSUMPTION_MULTI/475 which builds a component list from the current main record. Step 2 selects all components records belonging to the main record file. Step 4 fetches a record and step 6 determines if the record is not a blank and if it is a mixture. If step 6 is YES, step 8 selects all type and main files for this component. If step 6 is NO, step 10 determines if the record is a trade name and not special. If 10 is YES, step 12 selects all main files for this component. After steps 8 and 12, step 14 adds the line to the component list file. If step 10 is NO, the system continues the main event loop. Step 16 then determines if there are more records in the select table of step 2, and, if YES, the procedure loops back to step 4 to fetch the next record. If step 16 is NO, step 18 redraws the list to reflect the nearly built list.

FIG. 263 sets forth procedure wCONSUMPTION_MULTI/476 that ensures that the totals of the percentage column inserted by the user add up to 100% when inserting MCP components. Step 2 calculates the local variable totals as Total Of The Percent column in the component list field. Step 4 then determines if the total equals 100 and, if YES, step 6 displays a message such as "Components Already Add Up To 100%" and the procedure quits. If step 4 is NO, step 8 determines if the calculated percent total is greater than 100 and, if YES, step 10 displays a message such as "Percentage Entered Will Make The Total Greater Than 100%" and the procedure quits. If step 8 is NO, the system continues the main event loop.

FIG. 264 sets forth procedure wCONSUMPTION_MULTI/478 which is called when the user is editing MCP components. Step 2 calculates the local variable total as the total of the percent column in the component list from which the current line's percent is subtracted. Step 4 then determines if the total equals 100 and, if YES, step 6 displays a message such as "Components Already Add Up To 100%" and the procedure then quits. If step 4 is NO, step 8 determines if the calculated percent total is greater than 100 and, if YES, step 10 displays a message such as "Percentage Entered Will Make The Total Greater Than 100%" and the procedure then quits. If step 8 is NO, the system continues the main event loop.

FIG. 265 sets forth the procedure wCONSUMPTION_MULTI/480 which is called when an MCP is being viewed as necessary to show all the components of the MCP being viewed. Step 2 selects all MCP components file records belonging to the current MCP record file. Step 4 then builds a temporary list from the selected records and step 6 loads the first line from the temporary list. Step 8 then retrieves the container type and main file information for the current MCP components record file and step 10 adds this line to the format variable multicomponent list field. Step 12 then determines if there are more lines in the list, and, if YES, loops back to step 6 to get the next line. If there are no more lines in the list, the system continues the main event loop.

FIG. 266 sets forth procedure wCONSUMPTION_MULTI/481 which executes the SQL command to insert the values from the CRB into the MCP components file table at step 2.

FIG. 267 sets forth procedure wCONSUMPTION_MULTI/482 which copies the values from the MCP components file that are also needed in the transaction file at step 2.

FIG. 268 sets forth procedure wCONSUMPTION_MULTI/484 which updates the container records. Step 2 selects the current container record file and locks it. Step 4 then subtracts the amounts consumed from the container and step 6 updates the record accordingly and unlocks the file.

FIG. 269 sets forth procedure wCONSUMPTION_MULTI/485 which inserts a by-product record. Step 2 calculates the by-product file fields as belonging to the current container file record in the current MCP record file. Step 4 then inserts the by-products file record into the container record file.

FIG. 270 sets forth the procedure wCONSUMPTION_MULTI/486 which is called when a container record is selected to be a by-product recipient. Step 2 then selects the current container file record needing to be updated and step 4 adds the appropriate amounts. Step 6 then updates the record accordingly and step 8 calls procedure mPROCEDURES/77 which performs the addition transaction. Step 10 then calls procedure wCONSUMPTION_MULTI/484 to build a by-product list as described below at FIG. 272. Step 12 then redraws the windows accordingly.

FIG. 271 sets forth procedure wCONSUMPTION_MULTI/487 which executes an SQL command to insert a record into the by-product link file at step 2.

FIG. 272 sets forth procedure wCONSUMPTION_MULTI/488 which builds a by-product list of all by-products for an MCP. Step 2 selects all records from the by-products file which belong to the current MCP records file and step 4 builds a format variable by-product list from the selected records. Step 6 then loads the first line from the list and step 8 retrieves the container type and main files into the current line in the list. Step 10 then replaces the line in the list with this information. Step 12 then determines if there are any more lines and, if YES, loops back to step 6. If NO, the system continues the main event loop.

FIG. 273 sets forth procedure wCONSUMPTION_MULTI/490 which inserts a record into the by-product link file by executing the proper SQL command at step 2.

FIG. 274 sets forth procedure wCONSUMPTION_MULTI/491 which inserts a record into the by-products file by inserting the values held in the CRB for the file at step 2.

FIG. 275 sets forth procedure wCONSUMPTION_MULTI/493 which builds a residual container list for the current MCP component. Step 2 determines if the main chemical is pure and, if YES, step 4 selects all container file records that belong to the current type record. If step 2 is NO, step 6 determines if the main chemical is not pure and, if YES, step 8 selects all container file records that belong to the current main record. After steps 4 and 8, step 10 builds a list from the selected records and step 12 adds all variable mixed containers to the list regardless of type or main. If step 6 is NO, the system continues the main event loop.

FIG. 276 sets forth procedure wCONSUMPTION_MULTI/500 which is the WCP for the multiconsumption window. Step 2 determines if this window has been clicked on in the enter data mode and, if YES, step 4 displays a message such as "Cannot Switch Windows" and step 6 causes the system to remain on the current field. If step 2 is NO, step 8 determines if the window is brought to the top and, if YES, step 10 determines if the system is in the enter data mode and, if YES, step 10 performs a cancel. If step 8 or 10 is NO, the system continues the main event loop.

FIG. 277 sets forth the procedure wMCP/0 which is the ICP that calls the procedure to build the MCP list described below at FIG. 279, as indicated at step 2.

FIG. 278 sets forth the procedure wMCP/5 which is a pushbutton procedure. If the user clicks on the MCP components button at step 2, it opens the multiconsumption window in the View mode at step 4.

FIG. 279 sets forth the procedure wMCP/470 which builds the MCP list. Step 2 selects all MCP file records for the current division and step 4 builds a format variable MCP list from the selected records. Step 6 then redraws the list accordingly.

FIG. 280 sets forth the procedure wOPEN_CASE/0 which is the ICP for the open case window. If the open case window is selected, step 2 determines if the multi-insert parameters is set and, if YES, step 4 sets the format variable multi-insert as true. After step 4 or if step 2 is NO, step 6 sets the WCP as #500m. Step 8 then transfers the current container file records to a temporary list. Step 10 then calls the procedure to build a case list described below at FIG. 286. Step 12 then redraws the windows accordingly.

FIG. 281 sets forth the procedure wOPEN_CASE/1 which is the field procedure behind every current container ID field in the case list. This procedure is only executed when the user leaves the field for any reason other than cancel. Step 2 determines if the user has left the field and not chosen cancel and, if NO, the system continues the main event loop, and, if YES, step 4 asks if the ID is within the valid range. If step 4 is YES, step 6 displays a message such as "ID Not Within Valid Range" and step 8 causes the system to remain on the current field. If step 4 is YES, step 10 determines if the ID is already in the list. If step 10 is YES, step 12 displays a message such as "ID Is Already In The List" and step 14 causes the system to remain on the current field. If step 10 is NO, the system continues the main event loop.

FIG. 282 discloses procedure wOPEN_CASE/9 which is a pushbutton procedure that sets the current line in the case list to be designated as having the same location as the parent container. Step 2 determines if there has been a click on the Currents button and, if NO, the system continues the main event loop, and, if YES, step 4 loads the current line from the list into the CRB. Step 6 then replaces the line with the same values of the location fields from the original container file record that is in the temporary list and marked as parent. Step 8 then redraws the list.

FIG. 283 discloses procedure wOPEN_CASE/10 which is a pushbutton procedure that sets the current line in the case list to be designated as having a default location. Step 2 determines if a click has been made on the Location button and, if YES, step 4 loads the current line from the list into the CRB. If NO, the system continues the main event loop. Step 6 then replaces the line with the same values of the location fields currently held in the various location ID's that are marked as "default." Step 8 then redraws the list accordingly.

FIG. 284 sets forth the procedure wOPEN_CASE/11 which sets forth the pushbutton procedure for a case list having a special location. Step 2 detects if a click has been made on the Special Location button and, if YES, step 4 loads the current line from the list. If NO, the system continues the main event loop. Step 6 then chooses a special location from a prompt screen. Step 8 then replaces the line with the same values of the location fields that are returned from the choice the user has made that are marked as "Other." Step 10 then redraws the list accordingly.

FIG. 285 sets forth the procedure wOPEN_CASE/13 which prompts the user to select a default location. Step 2 then determines if a click has been detected on the Default Location button and, if NO, the system continues the main event loop, and, if YES, step 4 prompts the user to choose a location from a prompt screen. Step 6 then stores the new location in the format variables.

FIG. 286 sets forth the procedure wOPEN_CASE/470 which builds a case list. Step 2 receives a parameter indicating how many individual containers are in a case and places this into the HOW MANY? field. Step 4 then asks if the HOW MANY? field is equal to zero. If step 4 is YES, step 6 takes this as an open case function and therefore sets the value for the amounts of each container within the case. Step 8 then sets the number of records in the case. If step 4 is NO, step 10 uses this window as a multiple container insert window and the number of lines in the list is set to equal the value in step 2. Step 12 then builds a list of new container records with the number of lines in step 10.

FIG. 287 sets forth the procedure wOPEN_CASE/475 which validates the list once a user attempts to open a case or multi-insert and an error occurs. Step 2 loads a line from the list and step 4 checks the ID range. Step 6 then determines if the flag is true and, if YES, step 8 causes a message such as "The ID At Line____Is Not Within A Valid Range" and the procedure quits. If step 6 is NO, step 10 checks to see if the ID is used by the current default division. Step 12 then checks to see if the flag is true and, if YES, step 14 displays a message such as "Container ID Is Already In Use By Your Division" and the procedure quits. If step 12 is NO, step 16 determines if there are more lines and, if NO, step 18 displays a message such as "All ID's Seem To Be Okay, Review Your Data And Try Again." If step 16 is YES, the procedure loops back to step 2 to load the next line from the list.

FIG. 288 sets forth procedure wOPEN_CASE/480 which is called after the user has entered the required information in each line of the case list and presses the OK button. Step 2 asks the user "Are You Positive That All The Information Is Correct For Each Container?". Step 4 then determines if the flag is true and, if YES, step 6 loads the first line from the case list. If NO, the system continues the main event loop. Step 8 then determines if the line is marked as "Parent" and, if YES, step 10 calculates the location as the same location of the original container which is currently being held in the temporary list. If step 8 is NO, step 12 determines if the line is marked as "Default" and, if YES, step 14 calculates the location as a location being held in the default format variable. If step 12 is NO, or after steps 10 or 14, step 16 inserts the container record into the container file. Step 18 then determines if the flag is true and, if NO, step 20 calls procedure wOPEN_CASE/475 described above at FIG. 287 which validates the list. Step 22 then rolls back the current channel and the procedure quits. If step 18 is YES, step 24 calls procedure mPROCEDURES/72 which is the initial transactions procedure and is described at FIG. 225. Step 26 then determines if there are more lines and, if YES, loops back to step 6 to add the next line from the case list. If step 26 is NO, step 28 determines if there is a multiple insert and, if NO, step 30 deletes the container file record being held in the temporary list. After step 30 or if step 28 is YES, step 32 commits the current channel and rebuilds the container list field accordingly.

FIG. 289 sets forth the procedure wOPEN_CASE/500 which is a WCP for the open case window. Step 2 determines if the OK button has been clicked for the open case window and, if YES, step 4 loads the first line from the list. Step 6 then determines if the container ID field is empty and, if YES, step 8 displays a message such as "Container ID's Are Not Complete" and the procedure quits. If step 6 is NO, step 10 determines if there are more lines and, if YES, it loops back to step 4 to load the next line. If step 10 is NO, step 12 calls procedure wOPEN_CASE/480 described above at FIG. 288. If step 2 is NO, step 14 determines if a cancel has been made and, if YES, step 16 loads the line from the temporary list to restore the original container's record. Step 18 then closes the open case window. If step 14 is NO, step 20 determines if the Close button has been clicked on and, if YES, step 22 does not perform a close operation but queues a cancel to close the open case window. If step 20 is NO, the system continues the main event loop.

FIG. 290 sets forth procedure wPROCESSES/0 which is the ICP for the processes window and sets the WCP as number 500 at step 2.

FIG. 291 sets forth the procedure wPROCESSES/470 which builds a process list. Step 2 selects all process file records for the current main record and step 4 builds a format variable from the selected records in the process list field.

FIG. 292 sets forth process wPROCESSES/500 which is the WCP for the processes window. Step 2 determines if the processes window has been clicked on while in the enter data mode and, if YES, step 4 displays a message such as "Cannot Switch Windows" and step 6 causes the system to remain on the current field. Step 8 then determines if the window is being brought to the top and, if NO, the system continues the main event loop, and, if YES, step 10 determines if the system is in the enter data mode. If step 10 is YES, step 12 performs a cancel. If step 10 is NO, or after step 12, step 14 calls procedure wPROCESSES/470 to build a processes list as described at FIG. 291.

FIG. 293 sets forth procedure wTRANSACTIONS/0 which is the ICP for the transactions window and sets the WCP as #500 at step 2.

FIG. 294 sets forth procedure wTRANSACTIONS/470 which builds a transactions list. Step 2 selects all transaction file records for the current container record. Step 4 then builds a format variable from the selected records in the transactions list field and step 6 redraws the list accordingly.

FIG. 295 sets forth the procedure wTRANSACTIONS/500 which is the WCP for the transactions window. Step 2 determines if this window has been clicked on while in the enter data mode and, if YES, step 4 displays a message such as "Cannot Switch Windows" and step 6 causes the system to remain on the current field. If step 2 is NO, step 8 determines if the window is being brought to the top and, if YES, step 10 determines if the system is in the enter data mode. If step 8 is NO, the system continues the main event loop. If step 10 is YES, step 12 performs a cancel. If step 10 is NO, step 14 calls procedure wTRANSACTIONS/470 described above at FIG. 294.

FIG. 296 sets forth procedure wTRANSFERS/0 which is the ICP for the transfers window and sets the WCP as number 500 at step 2. Step 4 builds a list of transfer types and step 6 calls procedure wPROCEDURE which selects the correct container locations from the list. Step 8 selects the department from the department list to which this container belongs. Step 10 then calls procedure wTRANSFERS/470 described below at FIG. 303. Step 12 then redraws the windows accordingly.

FIG. 297 sets forth procedure wTRANSFERS/1 which creates a list of all transfers. Step 2 determines if there has been a click on the Transfers List button and, if NO, the system continues the main event loop, and, if YES, step 4 loads the line from the list. Step 6 then sets the transfer type as the line loaded and step 8 redraws the windows accordingly.

FIG. 298 sets forth the procedure wTRANSFERS/3 which processes a list of all departments to which the user has access rights and has set the view attribute. Step 2 detects a click or double click on the Access Rights button. If step 2 is NO, the system continues the main event loop, and, if YES, step 4 loads the line from the list into the CRB.

FIG. 299 sets forth the procedure wTRANSFERS/10 which is a list of buildings for the current division that the user can set as a location for a container. Step 2 detects if there is a click on the Buildings List button and, if NO, the system continues the main event loop, and, if YES, step 4 loads the line from the list into the CRB. Step 6 then builds a list of rooms for the currently selected building. Step 8 then clears the location in specific location lists.

FIG. 300 sets forth the procedure wTRANSFERS/11 which is a list of all rooms that are currently in the selected building. Step 2 determines if there is a click on the Rooms List button and, if NO, the system continues the main event loop, and, if YES, step 4 loads the lines from the list into the CRB. Step 6 then builds a list of locations available for the currently selected room and step 8 clears the specific location list.

FIG. 301 sets forth the procedure wTRANSFERS/12 which is a list of all specific locations within the currently selected room. Step 2 detects a click on the Specific Locations button and, if NO, the system continues the main event loop, and, if YES, step 4 loads the line from the list into the CRB. Step 6 then builds a list of specific locations within the currently selected room.

FIG. 302 sets forth procedure wTRANSFERS/13 which detects a click on specific line of the specific location list. If a click on a specific line of the specific location list is detected at step 2, step 4 loads that line from the list into the CRB. If step 2 is NO, the system continues the main event loop.

FIG. 303 sets forth the procedure wTRANSFERS/470 which builds a list of containers eligible to receive residual materials from the current container. Step 2 selects all current container ID's from the container file that are of the same kind as the current container. Step 4 then builds a container list from the records selected and step 6 selects all containers that are a variable mix. Step 8 adds the variable mix containers to the list since they may receive any material.

FIG. 304 sets forth procedure wTRANSFERS/475 which is called when the user wants to transfer a container to another department. When a department transfer is detected, step 2 displays a message such as "Are You Sure You Want To Transfer This To Another Department?". Step 4 then determines the answer to the query at step 2. If step 4 is YES, step 6 updates the container file record with the new information for department and locations. Step 8 then calls the procedure to perform a transfer department transaction as described at FIG. 226. If step 4 is NO, the system continues the main event loop.

FIG. 305 sets forth the procedure wTRANSFERS/476 which is called when the user wants to transfer a container to a new location within the current department. When a location transfer is detected, step 2 displays a message such as "Are You Sure You Want To Transfer This To A New Location?". Step 4 then determines the response of the user to the query at step 2. If step 4 is YES, step 6 updates the container file record with the new location information. Step 8 then calls the procedure to perform a transfer location transaction as described at FIG. 227. If step 4 is NO, the system continues the main event loop.

FIG. 306 discloses procedure wTRANSFERS/477 which is called when the user wants to transfer an amount of substance into an existing container. When an existing container transfer is detected, step 2 displays a message such as "Are You Sure You Want To Transfer This Amount To An Existing Container?". Step 4 then determines the user's answer to the query in step 2 and, if YES, step 6 converts the amount transferred into milliliters and grams. If step 4 is NO, the system continues the main event loop. Step 8 then updates the source container by subtracting the amounts added to the new container. Step 10 then calls the procedure to perform a transfer to existing container transaction as described at FIG. 228. Step 12 then updates the target container by adding the amounts to be transferred to that container. Step 14 then calls the procedure to perform an addition transaction as described at FIG. 230.

FIG. 307 sets forth the procedure wTRANSFERS/478 which is called when the user wants to transfer an amount of substance to a new container. When a new container transfer is detected, step 2 displays a message such as "Are You Sure You Want To Transfer This Amount To A New Container?" Step 4 then determines the user's answer to the query in step 2 and, if YES, step 6 converts the amount given to milliliters and grams. If step 4 is NO, the system continues the main event loop. Step 8 then updates the source container by subtracting the amounts given from the source container. Step 10 then calls the procedure to perform a transfer to new container transaction as described at FIG. 229. Step 12 then calls the procedure wTRANSFERS/482 described below at FIG. 308 to insert a new container. Step 14 then calls the procedure to perform an initial transaction as described at FIG. 225.

FIG. 308 sets forth the procedure wTRANSFERS/482 which is called to create a new container record. Step 2 opens a container window and step 4 allows the user to insert data for the new container record into the window. Step 6 then inserts the record into the system and step 8 closes the container window.

FIG. 309 sets forth the procedure wTRANSFERS/500 which is a WCP for the transfers window. This window holds all of the transfer types allowed for the present user and places the current type selected into a variable. Step 2 detects if the OK button has been clicked for the transfers window and, if NO, the system continues the main event loop, and, if YES, step 4 determines if the user wants to make a transfer to another department and, if YES, step 6 calls the procedure described above at FIG. 304. If step 4 is NO, step 8 determines if the user wants to transfer a container to a new location and, if YES, step 10 calls the procedure described above at FIG. 305. If step 8 is NO, step 12 determines if the user wants to transfer a substance into a new container and, if YES, step 14 calls the procedure described above at FIG. 306. If step 12 is NO, or after steps 6, 10 or 14, step 16 rebuilds the container list field according to the changes made. Step 18 then redraws the windows accordingly.

FIG. 310 sets forth the procedure wNOTES/0 which is the ICP for the notes window and sets the WCP as number 500 at step 2. Step 4 then clears the notes file and step 6 calls the procedure wNOTES/470 to build a notes list as described below at FIG. 312. Step 8 then redraws the windows accordingly.

FIG. 311 sets forth the procedure wNOTES/3 which detects a click on the notes list file at step 2. If step 2 is NO, the system continues the main event loop. If step 2 is YES, then step 4 then determines if the line clicked on is equal to zero and, if YES, step 6 clears the notes file. If step 4 is NO, step 8 loads the line from the list into the CRB. Step 10 then fetches the corresponding record from the notes file and step 12 redraws the windows accordingly.

FIG. 312 sets forth the procedure wNOTES/470 which builds a notes list. Step 2 selects all notes from the notes file for the current user and contact. Step 4 then builds a notes list in the format variable from the selected records and step 6 sorts the list by date and time in descending order.

FIG. 313 sets forth the procedure wNOTES/500 which is the window control procedure for the notes window. Step 2 determines if the click on the notes window has occurred while in the enter data mode and, if YES, step 4 displays a message such as "Cannot Switch Window" and step 6 causes the system to remain on the current field. If step 2 is NO, step 8 determines if the window is being brought to the top and, if NO, the system continues the main event loop, and, if YES, step 10 determines if the system is in the enter data mode. If step 10 is YES, step 12 performs a cancel. If step 10 is NO, the system continues the main event loop.

Miscellaneous Flowcharts

The following are descriptions of various flowcharts used in the system to create a comprehensive hazardous waste and chemical management system.

FIG. 314 sets forth the procedure taken when a special storage group is designated as special for a main chemical at step 2. Step 4 then prompts the user for a special storage description that tells why the chemical needs to be placed into a special storage group. Step 6 then stores this description in a special storage field in the main file of the main chemical.

FIG. 315 sets forth a procedure used for a general description window. Step 2 fills in the general description inserted by the user for the storage group in the general description field. Step 4 then stores the general description of the storage group in the storage group file record.

FIG. 316 sets forth the procedure needed to be taken when designating an area for storage or for nonstorage of chemicals within the various location parameters. When an area is being inserted into the system at step 2 the system prompts the user at step 4 as to whether this area is to be for storage. If NO, step 6 marks the area as a nonstorage area. If step 4 is YES, step 8 then chooses amongst a number of storage groups present for the division.

FIG. 317 sets forth the procedure used for the compliance lists education file. Each compliance list education field is linked to an icon in a corresponding module at step 2. Step 4 then determines if a user has clicked on an icon and, if YES, step 6 prompts the user with the modules that correspond to the icon category chosen. If step 4 is NO, the system continues the main event loop. Step 8 then displays the corresponding module which can be text, pictures, movies, sounds, or a combination of the above. Step 10 then inserts a record in the user's trace log that he has viewed the particular module in step 8.

FIG. 318 sets forth the procedure for keeping track of the material safety data sheet locations and updating the files as new MSDS are received. Step 2 indicates to the system that a new MSDS is to be inserted into the system. Step 4 then determines if an earlier version of the MSDS to be inserted is present. If step 4 is YES, step 6 archives the earlier version into an historical archive. If step 4 is NO, or, after step 6, step 8 provides the user with the option to scan in a picture of the MSDS or to import text of the MSDS into a long text field. Step 10 then adds the record to the file.

FIG. 319 sets forth the procedure for assigning an education rank to a user. When a user brings up a chemical on an inquiry screen in step 2, step 4 determines if the user's education rank is set at Professional and, if YES, step 6 causes the system not to show the environmental safety health modules. If step 4 is NO, step 8 determines if the user's education rank is set at Experienced and, if YES, step 10 prompts the user to inform him of the pertinent modules. If step 8 is NO, step 12 determines if the user's rank is set at Novice and, if YES, step 14 forces the user to view the pertinent environmental safety and health modules. If NO, the system continues the main event loop.

FIG. 320 sets forth the procedure filed for printing chemical name and compliance labels. When a container label is requested in step 2, step 4 prompts the user for the particular type of report format he wishes, i.e., the label type required. Step 6 then queries the compliance list education file and any necessary information is printed on the label.

FIG. 321 sets forth the procedure for managing safety equipment. The system hereof preferably allows the user to keep an inventory of all safety equipment as indicated at 2. Each piece of equipment contained in the safety equipment file of two can be then linked to other procedures to produce required safety forms at 4, test data at 6 or print compliance labels at 8.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A user controlled hazardous material management system for relatively small, medium and large size organizations comprising:

a computer;

data storage device coupled to said computer;

a display coupled to said computer that provides display screens;

a user input device coupled to said computer; and hazardous material inventory control data stored in said data storage device enabling user selection of a selected one or a combination of (1) a central control station for a given organization that monitors the in-flow of enclosed hazardous materials to the station by means of unique identification of each hazardous material enclosure, the storage and use of said hazardous materials within the station, and the out-flow of said hazardous material from said central control station as waste; (2) a plurality of individual hazardous material control stations for said given organization, each control station monitoring its in-flow of enclosed hazardous materials by said means of unique identification of each hazardous material enclosure, the storage and use of its hazardous materials and the out-flow of its waste hazardous materials; and (3) a system for said given organization that enables tracking each individual hazardous material enclosure throughout its life by said means of unique identification and a transaction log for each enclosure of said hazardous material, said system including a multi-tier classification of hazardous materials based upon origin and composition.

2. A user-controlled hazardous material management as in claim 1 further including environmental, health, and safety information data stored in said computer representing user-created unique, customized hazardous material capability storage groups, said groups designating storage areas within said organization for hazardous materials and areas within said organization prohibited from being used for storage of said hazardous materials.

3. A system as in claim 2 further including safety equipment management data stored in said computer for generating a maintenance and inspection record of all safety equipment within said organization, including fume/exhaust systems and eye wash and safety showers defined according to government standards and including generic safety equipment that does not fall under the defined safety equipment.

4. A system as in claim 3 further including international hazardous material compatibility data stored in said computer and including multi-tier compliance/education design data for creating compliance/education files within said organization for any country in the world with means for enabling text conversions to the foreign language of a selected country.

5. A system as in claim 4 wherein said international hazardous material compatibility system comprises:

a user created compliance/education file in the language of any selected country in the world;

stored numerical data representing required compliance/education information concerning the hazardous materials in the system; and said user created compliance/education file including a display in either the foreign language of a selected country or in one or more foreign languages to enable international review of said stored numerical data representing said compliance/education information across predetermined countries of interest.

6. A system as in claim 5 further including a text translator for receiving all text in said system, converting the text to a selected foreign language and storing the converted text.

7. A system as in claim 2 further including:

an unique password for each user having login access to the system;

a preset time after which said password expires; and user-controlled password disabling means for disabling the password after a predetermined number of invalid login attempts.

8. A system as in claim 7 further including:

a user tracelog record of access to said containers of hazardous material, the record including the personal preference of the user of measurement data, such as gallons versus liters and kilograms versus ounces to be viewed on the user's display; and said user tracelog record maintaining the use, storage and disposal of said hazardous materials as controlled by the user.

9. A system as in claim 2 wherein said environmental, health, and safety information system storage groups further comprise an unalterable storage group for hazardous material containers that require special storage/handling precautions that are unique to a particular hazardous material because of compatibility with other hazardous materials or environmental/safety/health requirements.

10. A system as in claim 9 wherein any hazardous material designated in said unalterable storage group is provided a record, unique to that hazardous material, of special storage requirements that can be displayed.

11. A system as in claim 9 wherein said group arrangements include:

designated storage and nonstorage areas, including a particular building, a particular floor in a building, a particular room on said particular floor and as general or specific locations in said particular room; and designated storage/use options for the selected locations, including hazardous material storage only, hazardous material use only, or hazardous material use/storage where both storage and use of the hazardous material may occur.

12. A system as in claim 11 further including:

stored data representing an elevation view of said particular building indicating the floor or floors in which the hazardous materials are located, a plan view of particular floor in said building, and a plan view of the particular room in which the hazardous materials are located illustrating the location of the hazardous materials in said room; and said user input device enabling display of the desired one of said elevation views and said plan views for use by appropriate personnel in the case of an emergency that might affect said hazardous materials.

13. A system as in claim 3 wherein said safety equipment management system includes:

an inventory of all user-selected system safety equipment items;

stored test data of equipment check procedures that ensure proper safety equipment operation;

stored data representing printed survey forms for inspection of said safety equipment, said survey forms listing equipment elements that require inspection; and printed compliance labels containing compliance data for each item of safety equipment inspected.

14. A system as in claim 13 wherein said compliance data and said printed compliance labels represents a comparison of sampled data from an item of safety equipment compared to a set of standard criteria for performance of the item.

15. A system as in claim 2 wherein the environmental health safety system further comprises:

first stored data representing icons, training materials, and warnings regarding any particular hazardous material;

second stored data in said memory designating each system user, each user being designated as professional, experienced or a novice in handling hazardous materials; and an inquiry screen containing icon prompts for selected use by a professional user of hazardous materials, icon prompts and warning materials concerning a selected hazardous material for an experienced user of hazardous materials, and icon prompts and a display of training materials required for a novice to review in the use of hazardous materials, said training materials requiring review of the selected training materials and warnings and requiring specific responses from the novice user before said novice can use said hazardous material in a process.

16. A user controlled hazardous material management system as in claim 1 further comprising hazardous material container classification data stored in said data storage device and including:

first data representing containers storing hazardous materials that are in-use;

second data representing containers storing waste hazardous materials; and said first and second data representing said containers of the waste group of hazardous materials including four classes of information concerning the hazardous materials in said containers, including pure hazardous material, the trade name of the hazardous material, a preset mixture of hazardous materials, and a variable mixture of hazardous materials so as to enable said system to track said hazardous material in any one of said four classes of information from its beginning as an in-use hazardous material through its disposition as a waste hazardous material.

17. A system as in claim 16 further including:

third data representing containers storing surplus hazardous materials; and said third data representing said surplus of hazardous materials, including said four classes of information concerning pure hazardous material, the trade name of the hazardous material, preset mixes of the hazardous material, and variable mixes of the hazardous materials so as to allow management of the hazardous materials from the in-flow to the out-flow.

18. A system as in claim 17 wherein:

said term "pure" hazardous material denotes the hazardous material with a recognized scientific name and hazardous material that originates from an outside vendor;

said term "trade name" denotes the designated commercially known name of the hazardous material that originates from an outside vendor;

said term "preset mix" denotes hazardous material originating from a mixture of in-house hazardous materials; and said term "variable mix" represents a mixture of hazardous materials not normally maintained in stock such that every container of hazardous material is tracked from in-flow to out-flow.

19. A system as in claim 18 further comprising:

a first stored record giving a first unique identification to a first container of a first hazardous material;

a second stored record giving a second unique identification to a second container of hazardous material taken from said first container;

an $n^{th}$ stored record giving an $n^{th}$ unique identification to an $n^{th}$ container of hazardous material taken from the n−1 container; and a special stored record giving an additional unique identification to a container having a mixture of said first hazardous material from one of said n containers and a second different hazardous material from another container so as to maintain a genealogy of the hazardous material stored in any container such that the unique origin and history of each hazardous material in a given container is known, each of said stored records being identified by a unique code.

20. A system as in claim 17 wherein said data representing surplus hazardous materials is available for display to every user of the system to reduce unnecessary purchasing of hazardous materials already in surplus.

21. A system as in claim 17 further including:

icons appearing on any selected display screen representing in-use, surplus, or waste hazardous materials; and each of said icons giving a visual representation of a warning relating to each particular hazardous material.

22. A system as in claim 21 further including:

training material data stored in said computer pertaining to at least one of said hazardous materials; and a particular icon on said display screen that enables the user to select said training materials relating to said hazardous materials for display.

23. A system as in claim 1 further including:

at least one enclosure having multiple individual containers of hazardous material;

a stored data record identifying each hazardous material enclosure that has multiple individual containers of hazardous material inside thereof; and an inventory data record of an individual container of hazardous material created by entering into said computer said identifying data when any one of said containers is removed from said enclosure.

24. A system as in claim 1 further including:

data representing containers storing surplus hazardous materials; and said data representing said surplus hazardous materials including pure hazardous material, the trade name of the hazardous material, preset mixes of the hazardous material, and variable mixes of the hazardous materials so as to allow for cradle to the grave management of the hazardous materials.

25. A system as in claim 1 wherein said monitoring of said use of said hazardous materials further includes:

a stored designation for each particular container of hazardous material at least some of which is to be taken out of said container for use in a process; and a display screen for monitoring said hazardous material taken from said designated particular container and used in said process, said display screen having a first area for entering consumption data including data representing a percentage of said hazardous material consumed in said process, a second area for entering data representing a percentage of said hazardous material transferred to the atmosphere during the process, a third area for entering data representing a percentage of the hazardous material that is disposed on-site essentially as a liquid during the process, and a fourth area for entering data representing a percentage of the hazardous material that is retained as residual waste from the process so that a complete cradle to the grave tracking of each container of hazardous material is possible.

26. A system as in claim 25 wherein said screen includes a fifth area for entering data representing a particular container in which said residual waste is disposed.

27. A system as in claim 25 further including a preprocessing display screen for use with repetitive processes, said preprocessing screen enabling automatic recording of said consumption percentage data by said computer for hazardous materials used in said repetitive process.

28. A system as in claim 25 further including:

multiple containers of different hazardous materials to be used in a process; and a display screen that allows a user of the process to enter by-products of said process on said screen and link an appropriate portion of each of said by-products to each of said hazardous materials used in the process.

29. A system as in claim 28 further including a preprocessing display screen for use with repetitive processes using multiple containers, said preprocessing display screen enabling automatic recording of consumption percentage data by said computer for hazardous materials used in said repetitive process.

30. A system as in claim 1 wherein the hazardous material management system further includes:

said data storage device storing data representing in-flow and out-flow of said hazardous materials;

a plurality of host platforms, each at a plurality of different locations within said organization; and a program format in said computer enabling any one of the host platforms at any one of the plurality of different locations within said organization to connect to said storage device and to display data monitoring said in-flow and out-flow of said hazardous materials.

31. A system as in claim 1 further comprising:

a plurality of groups of identical hazardous materials, each group of hazardous materials having different manufacturers and/or international designations;

a synonym representing each of said groups of identified hazardous materials; and means for displaying all of a group of hazardous materials and inventory without reference to said particular designation by selecting said synonym for said selected group.

32. A user-controlled hazardous material management system for relatively small, medium and a large size organizations comprising:

a computer;

a data storage device coupled to the computer;

a display device coupled to the computer;

a user input device coupled to said computer; and a hazardous material container classification system stored in said data storage device for access by said user through said input device and including:

first data representing containers storing hazardous materials that are in-use;

second data representing containers storing hazardous materials that are classified as waste hazardous materials; and said first and second data representing said containers of in-use hazardous materials and waste hazardous materials being designated as pure hazardous materials, as the trade names of the hazardous material, as a preset mixture of hazardous materials, or as a variable mix of hazardous materials so as to enable such system to track each container of hazardous material in any one of said designations from its beginning as an in-use hazardous material through its disposal as a waste hazardous material.

33. A system as in claim 32 wherein:

said term "pure" hazardous material denotes a hazardous material with a recognized scientific name that originates from an outside vendor;

said term "trade name" denotes the designated commercially known name of the hazardous material that originates from an outside vendor;

said term "preset mix" denotes hazardous material originating from a mixture of in-house hazardous materials; and said term "variable mix" represents a container with a mixture of hazardous materials not normally maintained in stock such that every container of hazardous material is tracked from the in-flow to the out-flow.

34. A system as in claim 33 further comprising:

a first stored record giving a first unique identification to a first container of a first hazardous material;

a second stored record giving a second unique identification to a second container of hazardous material taken from said first container;

an $n^{th}$ stored record giving an $n^{th}$ unique identification to an $n^{th}$ container of hazardous material taken from the $n-1$ container; and a special stored record giving an additional unique identification to a container having a mixture of said first hazardous material from one of said n containers and a second different hazardous material from another container so as to maintain a genealogy of the hazardous material stored in any container such that the unique origin and history of each hazardous material in a given container is known, each of said stored records being identified by a unique code.

35. A system as in claim 34 further including:

a display screen having an icon representing any particular container;

a scale displayed along side said icon representing a predetermined original level of hazardous material in said container; and pointing means movable by the user to said scale for causing said icon to visually represent the level of hazardous material actually in said particular container as determined visually by said user to approximate the amount of hazardous material in said container at any given time when compared to the predetermined original amount of hazardous material in the container.

36. A system as in claim 34 further comprising:

a printer coupled to said computer; and said computer automatically printing labels with all government requirements for said hazardous material in all individual containers created in said genealogy.

37. A system as in claim 36 wherein, if said label for any container is damaged, a replacement label is generated by said computer when said name of said hazardous material or the container unique code is entered into said computer.

38. A management system as in claim 32 further comprising a three-tier hierarchy user function access that supports a different restriction of user function access in each function tier.

39. A management system as in claim 38 wherein the three-tier hierarchy function access comprises:

a division with predetermined users designated as the top level of access;

a department that is a part of a division and having users designated as the mid-level of access;

a user who is in a division or department and who is designated as the bottom level of access; and said administrator function allowing an administrator to restrict access at each level to predetermined users.

* * * * *